US011394946B2

(12) United States Patent
Oh et al.

(10) Patent No.: US 11,394,946 B2
(45) Date of Patent: Jul. 19, 2022

(54) VIDEO TRANSMITTING METHOD, VIDEO TRANSMITTING APPARATUS, VIDEO RECEIVING METHOD, AND VIDEO RECEIVING APPARATUS

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/287,034

(22) PCT Filed: Oct. 30, 2019

(86) PCT No.: PCT/KR2019/014437
§ 371 (c)(1),
(2) Date: Apr. 20, 2021

(87) PCT Pub. No.: WO2020/091404
PCT Pub. Date: May 7, 2020

(65) Prior Publication Data
US 2021/0385423 A1 Dec. 9, 2021

(30) Foreign Application Priority Data
Oct. 30, 2018 (KR) ........................ 10-2018-0131123

(51) Int. Cl.
*H04N 13/161* (2018.01)
*H04N 13/178* (2018.01)
*H04N 13/194* (2018.01)
*H04N 19/597* (2014.01)

(52) U.S. Cl.
CPC ......... *H04N 13/161* (2018.05); *H04N 13/178* (2018.05); *H04N 13/194* (2018.05)

(58) Field of Classification Search
None
See application file for complete search history.

(56) References Cited

U.S. PATENT DOCUMENTS

| 8,532,180 | B2 | 9/2013 | Koo et al. | |
|---|---|---|---|---|
| 2011/0261050 | A1* | 10/2011 | Smolic | G06T 9/001 345/419 |
| 2011/0280311 | A1* | 11/2011 | Chen | H04N 13/161 375/240.24 |
| 2011/0298895 | A1 | 12/2011 | Tian et al. | |
| 2015/0304681 | A1 | 10/2015 | An et al. | |

FOREIGN PATENT DOCUMENTS

| KR | 101726534 B1 | 4/2017 |
|---|---|---|
| KR | 1020180107001 A | 10/2018 |

* cited by examiner

*Primary Examiner* — Christopher Braniff
(74) *Attorney, Agent, or Firm* — Dentons US LLP

(57) ABSTRACT

A video transmitting method according to embodiments may comprise the steps of: removing inter-view redundancy of pictures with respect to a plurality of viewing positions; packing the pictures in which the inter-view redundancy is removed; and encoding the packed pictures and signaling information. A video receiving method according to embodiments may comprise the steps of: decoding a bitstream of a video, on the basis of a viewing position and viewport information; unpacking pictures and signaling information in the decoded bitstream; view regenerating the unpacked pictures; and view synthesizing the view-regenerated pictures.

16 Claims, 63 Drawing Sheets

FIG. 8

```
.....
        <basic metadata>
unsigned    int(8)      vr_geometry;
unsigned    int(8)      projection_scheme;
        <Stereoscopic related metadata>
unsigned    int(1)      is_stereoscopic;
unsigned    int(3)      stereo_mode;
        <Initial View related metadata>
signed      int(8)      initial_view_yaw_degree;
signed      int(8)      initial_view_pitch_degree;
signed      int(8)      initial_view_roll_degree;
        <ROI related metadata>
unsigned int(1)         2d_roi_range_flag;
unsigned int(1)         3d_roi_range_flag;
if(2d_roi_region_flag == 1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if(3d_roi_region_flag == 1) {
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <Field Of View related metadata>
unsigned int(1)         content_fov_flag;
if(content_fov_flag == 1) {
  unsigned int(16)      content_fov;
}
        <Cropped Region related metadata>
unsigned int(1)         is_cropped_region;
if(is_cropped_region == 1) {
  unsigned int(16)      cr_region_left_top_x;
  unsigned int(16)      cr_region_left_top_y;
  unsigned int(16)      cr_region_width;
  unsigned int(16)      cr_region_height;
}
.....
```

FIG. 11
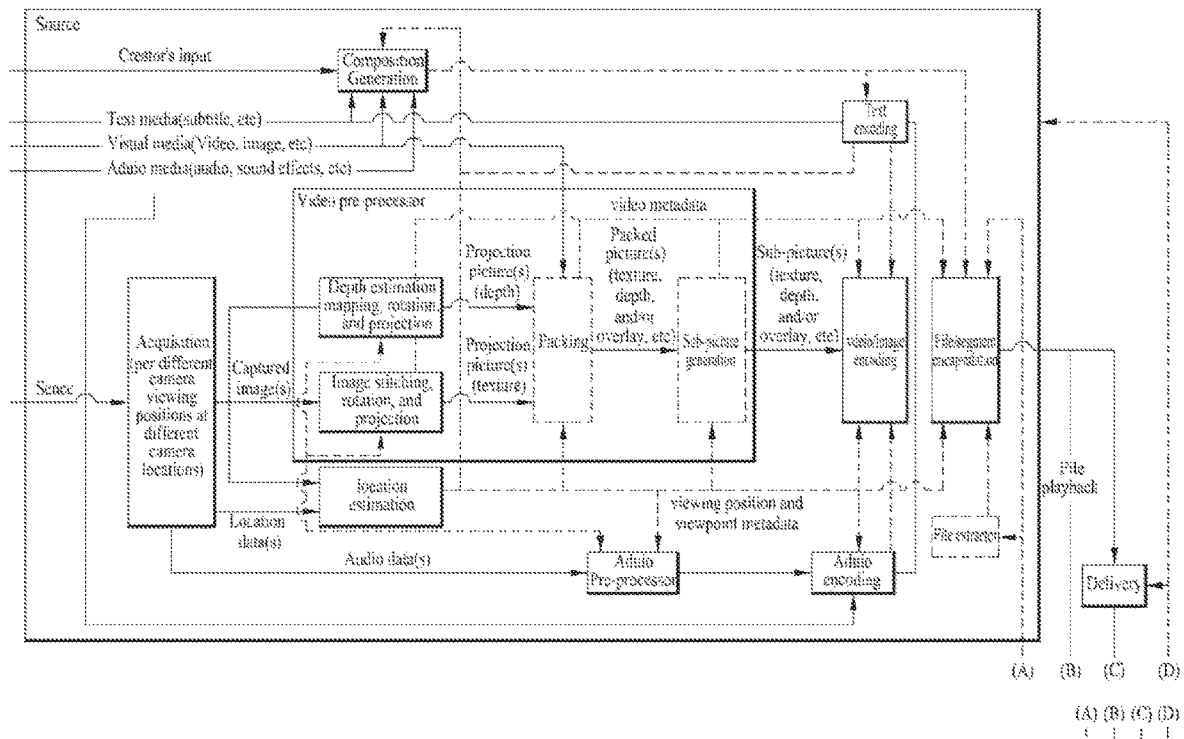
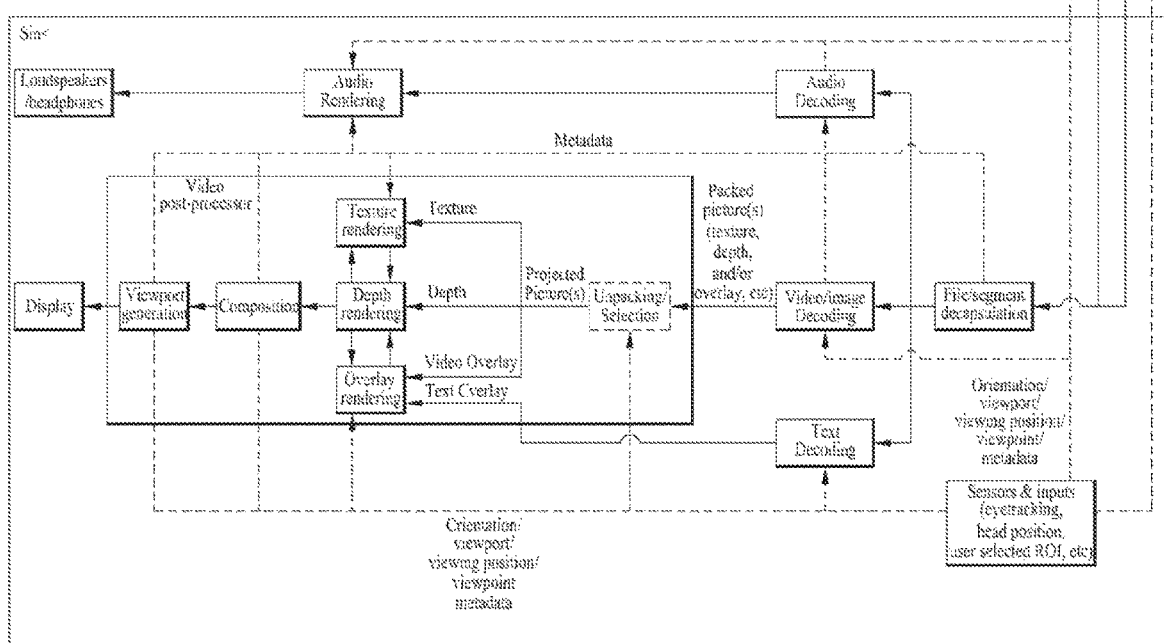

FIG. 39

| | Descriptor |
|---|---|
| sparse_view_regeneration_info ( payloadSize ) { | |
| sparse_view_regeneration_info_id | u(11) |
| sparse_view_regeneration_info_cancel_flag | u(1) |
| if( !sparse_view_restoration_info_cancel_flag ) { | |
| sparse_view_regeneration_info_persistence_flag | u(1) |
| num_sparse_view_minus1 | u(8) |
| for( i = 0; i <= num_sparse_view_minus1; i++ ) { | |
| target_view_id[ i ]   // target_view_id | u(8) |
| view_position_descriptor() | |
| num_comonents[ i ] | u(8) |
| for( j = 0; j <= num_component[ i ]; j++ ) { | |
| component_id[ i ][ j ] | u(8) |
| component_type[ i ][ j ]   // texture, depth, alpha channel, overlay, etc | u(8) |
| pruned_sparse_view_present_flag[ i ][ j ] | u(1) |
| reference_sparse_view_present_flag[ i ][ j ] | u(1) |
| sparse_view_regeneration_type[ i ][ j ] | u(6) |
| output_sparse_view_id[ i ][ j ] | u(8) |
| if( pruned_sparse_view_present_flag[ i ][ j ] ) | |
| pruned_sparse_view_id[ i ][ j ] | u(8) |
| if( reference_sparse_view_present_flag[ i ][ j ] ) { | |
| reference_sparse_view_id[ i ][ j ] | u(8) |
| view_position_descriptor() | |
| } | |
| } | |
| } | |
| } | |
| } | |
| view_position_descriptor() { | |
| viewing_position_id | u(8) |
| viewing_position_x | u(32) |
| viewing_position_y | u(32) |
| viewing_position_z | u(32) |
| viewing_orientation_yaw | u(32) |
| viewing_orientation_pitch | u(32) |
| viewing_orientation_roll | u(32) |
| coverage_horizontal | u(32) |
| coverage_vertical | u(32) |
| } | |

FIG. 40

VIDEO TRANSMITTING METHOD, VIDEO TRANSMITTING APPARATUS, VIDEO RECEIVING METHOD, AND VIDEO RECEIVING APPARATUS

CROSS-REFERENCE TO RELATED APPLICATIONS

This application is the National Stage filing under 35 U.S.C. 371 of International Application No. PCT/KR2019/014437, filed on Oct. 30, 2019, which claims priority to Korean Patent Application No. 10-2018-0131123 filed on Oct. 30, 2018 in Korea, the entire contents of which is hereby incorporated by reference in its entirety.

TECHNICAL FIELD

The present disclosure relates to a video transmission method, a video transmission device, a video reception method, and a video reception device.

BACKGROUND ART

A virtual reality (VR) system provides a user with a sense of being in an electronically projected environment. The system for providing VR may be further improved to provide higher quality images and stereophonic sound. A VR system may allow a user to interactively consume VR content.

DETAILED DESCRIPTION OF THE DISCLOSURE

Technical Problems

The VR system needs to be improved in order to more efficiently provide a VR environment to users. To this end, data transmission efficiency for transmitting a large amount of data such as VR content, robustness between transmission and reception networks, network flexibility in consideration of mobile reception devices, and methods for efficient playback and signaling need to be proposed.

Technical Solutions

To achieve the above technical objects, a video transmission method and a video reception method according to embodiments are disclosed.

A video transmission method according to embodiments may include removing inter-view redundancy between pictures for a plurality of viewing positions; packing pictures from which inter-view redundancy has been removed; and encoding the packed pictures and signaling information.

The video transmission method may further include generating a center view picture and center view generation information, based on source view pictures included in the pictures for the viewing positions; and synthesizing intermediate view pictures based on the source view pictures, wherein the synthesizing the intermediate view pictures includes generating pre-generation information and view synthesis recommendation information. The removing the inter-view redundancy may include generating sparse view pictures based on at least two pictures among the source view pictures, the intermediate view pictures, and the center view picture. The removing the inter-view redundancy may further include generating reference view pictures, reference view information, and regeneration information.

According to embodiments, the video transmission method may further include generating a temporally regenerated view picture based on a first sparse view picture of the sparse view pictures and the center view picture; and pruning an estimated source view from the temporally regenerated view picture and the center view picture, wherein the pruning includes generating a second sparse view picture. The encoding may further include encoding the second sparse view picture.

The video transmission method may include decoding and unpacking the packed and encoded pictures, wherein the decoded and unpacked pictures include a temporally decoded common reference view picture and a temporally decoded sparse view picture; generating a regenerated view, based on the temporally decoded common reference view picture and the temporally decoded sparse view picture; and pruning the estimated source view picture from the regenerated view and the temporally decoded common reference view picture, wherein the pruning includes generating an error-robust sparse view picture. The packing may further include packing the error-robust sparse view picture.

According to embodiments, the removing the inter-view redundancy may include performing first pruning on a first source view picture related to a first viewing position based on the center view picture, wherein the performing the first pruning includes generating a first sparse view picture; performing second pruning on the first source view picture based on a second source view picture related to a second viewing position different from the first viewing position, wherein the performing the second pruning includes generating a second sparse view picture; and selecting one of the first sparse view picture and the second sparse view picture. The encoding may further include encoding one picture selected from among the first sparse view picture and the second sparse view picture.

The video transmission method may include pruning a reference sparse view picture related to a first viewing position included in the sparse view pictures, based on a sparse view picture related to a second viewing position included in the sparse view pictures, wherein the second viewing position is a viewing position different from the first viewing position, and wherein the pruning the reference sparse view picture includes generating a pruned sparse view picture; and detecting a residual from the pruned sparse view picture. The pruned sparse view picture may be packed based on presence of the residual.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The signaling information may include viewing position group information, the viewing position group information including center view generation information, pre-generation information, view synthesis recommendation information, reference view information, and regeneration information.

The video reception method may include generating a center view picture, based on reference view pictures and the center view generation information, included in the unpacked pictures. The regenerating may include generating a regenerated view based on the reference view pictures, sparse view pictures in the unpacked pictures, the center view picture, the reference view information, and the regeneration information. The synthesizing may include generating a synthesized view based on the regenerated view, the center view picture, the reference view pictures, the pre-generation information, and the view synthesis recommendation information.

The regenerating may include generating a first regenerated view related to a first viewing position, based on the center view and on a first sparse view picture related to the first viewing position included in the sparse view pictures; and generating a second regenerated view related to a second viewing position, based on the first regenerated picture and the center view picture. The second viewing position may be a viewing position different from the first viewing position.

The regenerating may include generating a temporally generated view related to a first viewing position, based on the center view picture and on a first sparse view related to the first viewing position included in the sparse view pictures; estimating a second sparse view picture related to a second viewing position from the temporally generated view, wherein, based on inclusion of a pruned sparse view picture in the sparse view pictures, the estimating includes estimating the second sparse view picture based on the pruned sparse view picture; and generating a regenerated view related to the second viewing position, based on the estimated second sparse view picture and the center view picture. Alternatively, the regenerating may include regenerating the second sparse view picture from the first sparse view picture, wherein regenerating the second sparse view picture includes generating the second sparse view based on inclusion of the pruned sparse view picture in the sparse view pictures; and generating the regenerated view based on the regenerated second sparse view picture and the center view picture. The second viewing position may be different from the first viewing position.

Advantageous Effects

A transmission device according to embodiments may perform an adaptive inter-view redundancy removal operation that adjusts the amount of data and computational load according to a transmission/reception environment of the transmission device and a reception device by selecting a sparse view picture for one viewing position. Accordingly, the transmission device according to embodiments may quickly cope with the transmission/reception environment by selecting the sparse view in consideration of the transmission environment of the transmission device and the reception environment of the reception device.

The video transmission device according to embodiments may efficiently provide a plurality of multi-spherical images representing different viewing positions of a viewpoint.

A sparse view pruner and a residual detector of the video transmission device according to embodiments may raise data transmission efficiency of the transmission device according to embodiments by further removing unnecessary or redundant information.

The transmission device according to embodiments may determine the number of errors of various sparse view pictures for one viewing position to select a picture having fewer errors, thereby providing a virtual reality environment which is accurate, like a real environment, to viewers who use the reception device.

The video transmission device according to embodiments may reduce the number of sparse view pictures to be transmitted and reduce the amount of data to be transmitted. In addition, the video reception device according to embodiments may reduce the number of sparse view pictures to be received so that load on a reception end may be reduced.

An encoder end according to embodiments of the video transmission device according to embodiments may reduce the number of sparse view pictures to be transmitted and reduce the amount of data to be transmitted.

The video transmission device according to embodiments performs pruning by re-detecting an error between a plurality of sparse views, thereby causing a decoder end to generate an accurate view for a corresponding viewing position. The decoder end according to embodiments may raise bit efficiency by generating a virtual space only through reception of a small amount of data.

The video reception device according to embodiments may accurately and efficiently generated regenerated views.

The above configuration of the video reception according to embodiments may regenerate and synthesis views for different viewing position with a small amount of data, thereby raising transmission and reception efficiency.

DESCRIPTION OF DRAWINGS

FIG. 8 illustrates 360-degree video related metadata according to an embodiment of the present disclosure.

FIG. 11 shows the structure of a 3DoF+ end-to-end system.

FIG. 39 illustrates a sparse view regeneration information SEI message syntax according to embodiments.

FIG. 40 illustrates a viewing position group information SEI message syntax according to embodiments.

BEST MODE FOR CARRYING OUT THE DISCLOSURE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

Figure 1:
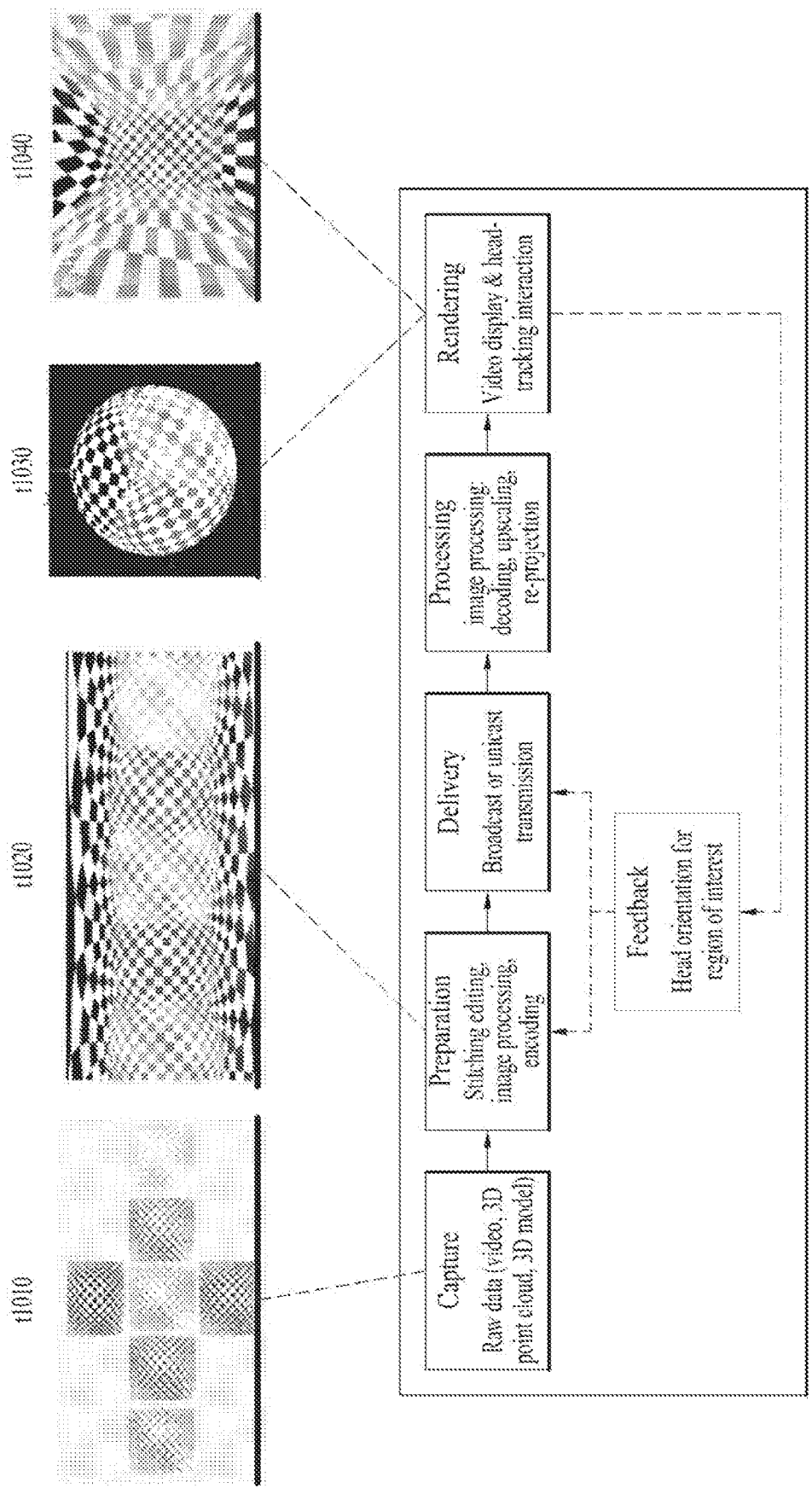
FIG. 1 illustrates an architecture for providing 360 video according to the present disclosure.

FIG. 1 illustrates an architecture for providing 360-degree video according to the present disclosure.

The present disclosure provides a method for providing 360-degree content to provide virtual reality (VR) to users. VR refers to a technique or an environment for replicating an actual or virtual environment. VR artificially provides sensuous experiences to users, and users can experience electronically projected environments.

360-degree content refers to convent for realizing and providing VR and may include 360-degree video and/or 360-degree audio. 360-degree video may refer to video or image content which is necessary to provide VR and is captured or reproduced in all directions (360 degrees). 360-degree video can refer to video or image represented on 3D spaces in various forms according to 3D models. For example, 360-degree video can be represented on a spherical plane. 360-degree audio is audio content for providing VR and can refer to spatial audio content which can be recognized as content having an audio generation source located in a specific space. 360-degree content can be generated, processed and transmitted to users, and users can consume VR experiences using the 360-degree content. 360-degree content/video/image/audio may be referred to as 360 content/video/image/audio, omitting the term "degree" representing a unit, or as VR content/video/image/audio.

The present disclosure proposes a method for effectively providing 360 video. To provide 360 video, first, 360 video can be captured using one or more cameras. The captured 360 video is transmitted through a series of processes, and a reception side can process received data into the original 360 video and render the 360 video. Thus, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 can be generated through the capture process. Each plane of the shown image/video data t1010 can refer to an image/video for each view. The captured images/videos may be called raw data. In the capture process, metadata related to capture can be generated.

For the capture process, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions can be obtained by dividing the 2D image equally or arbitrarily according to an embodiment. Regions may be divided according to a projection scheme according to an embodiment. The region-wise packing process is an optional process and thus may be omitted from the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or region of interest (ROI) of the video data projected on the 2D image may be generated.

The transmission process may be a process of processing and transmitting the image/video data and metadata which have pass through the preparation process. For transmission, processing according to any transmission protocol may be performed. The data that has been processed for transmission can be delivered over a broadcast network and/or broadband. The data may be delivered to the reception side in an on-demand manner. The reception side can receive the data through various paths.

The processing process may refer to a process of decoding the received data and re-projecting the projected image/video data on a 3D model. In this process, the image/video data projected on the 2D image can be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may take a form t1040 shown in the figure.

The feedback process may refer to a process of delivering various types of feedback information which can be acquired in the display process to a transmission side.

Through the feedback process, interactivity in 360 video consumption can be provided. According to an embodiment, head orientation information, viewport information indicating a region currently viewed by a user, and the like may be delivered to the transmission side in the feedback process. According to an embodiment, a user can interact with content realized in a VR environment. In this case, information related to the interaction may be delivered to the transmission side or a service provider during the feedback process. According to an embodiment, the feedback process may not be performed.

The head orientation information may refer to information about the location, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the reception side and the analysis result may be delivered to the transmission side through a feedback channel a device such as a VR display can extract a viewport region on the basis of the location/direction of a user's head, vertical or horizontal FOV supported by the device.

According to an embodiment, the aforementioned feedback information may be consumed at the reception side as well as being delivered to the transmission side. That is, decoding, re-projection and rendering processes of the reception side can be performed using the aforementioned feedback information. For example, only 360 video for the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and can refer to a center point of a viewport region. That is, a viewport is a region based on a view, and the size and form of the region can be determined by the field of view (FOV), which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
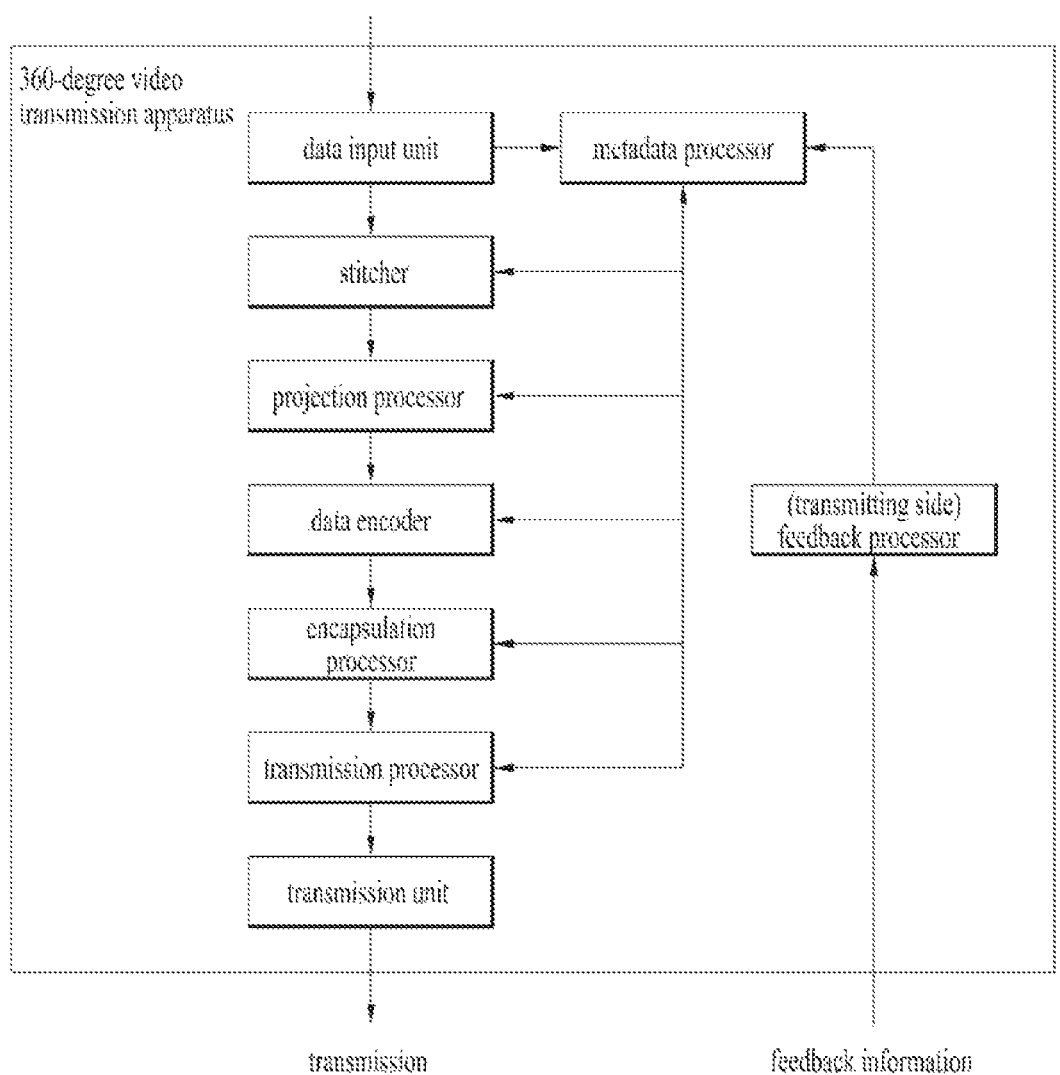
FIG. 2 illustrates a 360-degree video transmission device according to one aspect of the present disclosure.

FIG. 2 illustrates a 360-degree video transmission device according to one aspect of the present disclosure.

According to one aspect, the present disclosure may relate to a 360 video transmission device. The 360 video transmission device according to the present disclosure may perform operations related to the above-described preparation process to the transmission process. The 360 video transmission device according to the present disclosure may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher may deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor may be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which may be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor may deliver acquired or generated metadata to internal elements of the 360 video transmission device as necessary. The metadata processor may deliver the 360 video related metadata to the data encoder, the encapsulation processor and/or the transmission processor such that the metadata may be transmitted to the reception side.

The data encoder may encode the 360 video data projected on the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata may be included in boxes of various levels in an ISOBMFF file format or included as data in an additional track in a file. The encapsulation processor may encapsulate the 360 video related metadata into a file according to an embodiment. The transmission processor may perform processing for transmission on the 360 video data encapsulated in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmitter may transmit the processed 360 video data and/or the 360 video related metadata over a broadcast network and/or broadband. The transmitter may include an element for transmission over a broadcast network and an element for transmission over a broadband.

According to an embodiment of the 360 video transmission device according to the present disclosure, the 360 video transmission device may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the 360 video transmission device according to the present disclosure, the 360 video transmission device may further include a transmitter feedback processor and/or a network interface (not shown) as internal/external elements. The network interface may receive feedback information from a 360 video reception device according to the present disclosure and deliver the feedback information to the transmitter feedback processor. The transmitter feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in processing of 360 video data.

According to another embodiment of the 360 video transmission device according to the present disclosure, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission device according to the present disclosure, the data encoder may perform encoding differently on respective regions. The data encoder may encode a specific region with high quality and encode other regions with low quality. The feedback processor at the transmission side may deliver the feedback information received from a 360 video reception device to the data encoder such that the data encoder may use encoding methods differentiated for regions. For example, the transmitter feedback processor may deliver viewport information received from a reception side to the data encoder. The data encoder may encode regions including a region indicated by the viewport information with higher quality (UHD) than other regions.

According to another embodiment of the 360 video transmission device according to the present disclosure, the transmission processor may perform processing for transmission differently on respective regions. The transmission processor may apply different transmission parameters (modulation orders, code rates, etc.) to regions such that data delivered to the regions have different robustnesses.

Here, the transmitter feedback processor may deliver the feedback information received from the 360 video reception device to the transmission processor such that the transmission processor may perform transmission processing differentiated for respective regions. For example, the transmitter feedback processor may deliver viewport information received from the reception side to the transmission processor. The transmission processor may perform transmission processing on regions including a region indicated by the viewport information such that the regions have higher robustness than other regions.

The internal/external elements of the 360 video transmission device according to the present disclosure may be hardware elements realized by hardware. According to an embodiment, the internal/external elements may be modified, omitted, replaced by other elements or integrated with other elements. According to an embodiment, additional elements may be added to the 360 video transmission device.

Figure 3:
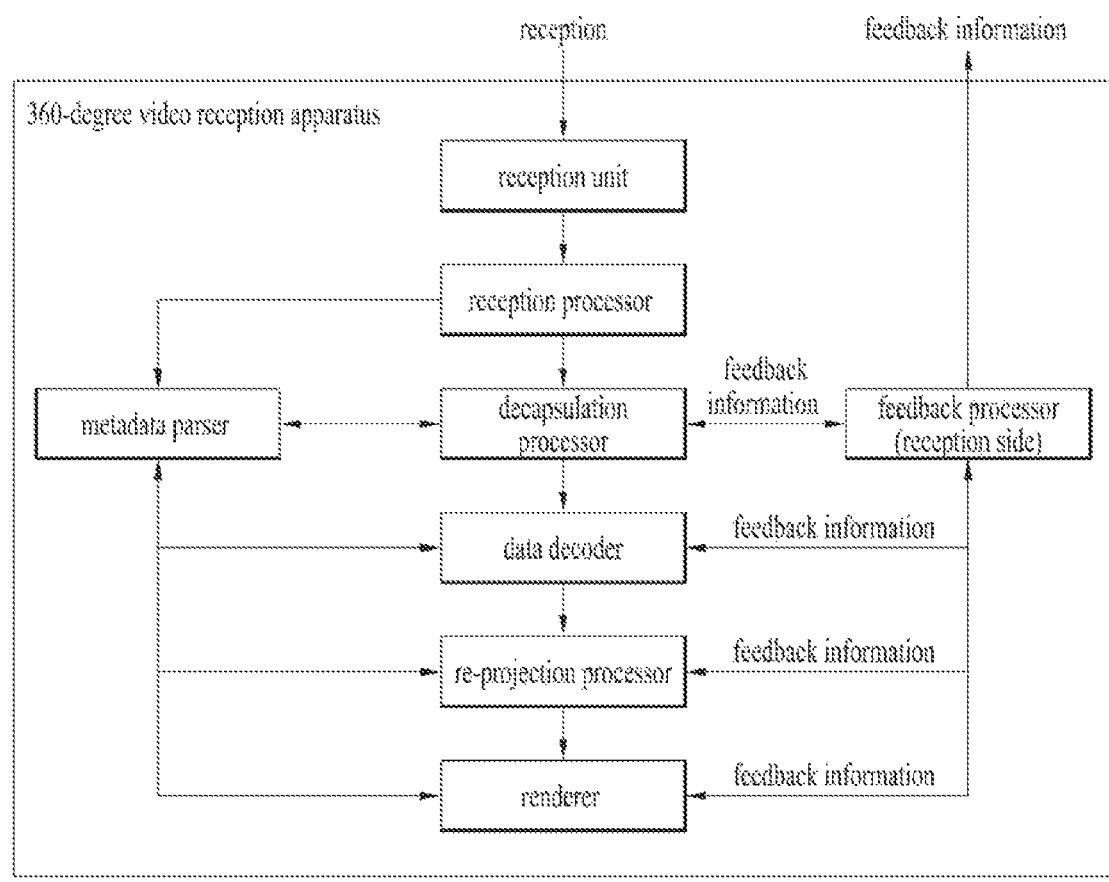
FIG. 3 illustrates a 360-degree video reception device according to another aspect of the present disclosure.

FIG. 3 illustrates a 360-degree video reception device according to another aspect of the present disclosure.

According to another aspect, the present disclosure may relate to a 360 video reception device. The 360 video reception device according to the present disclosure may perform operations related to the above-described processing process and/or the rendering process. The 360 video reception device according to the present disclosure may include a reception unit, a reception processor, a decapsulation processor, a data decoder, a metadata parser, a receiver feedback processor, a re-projection processor and/or a renderer as internal/external elements.

The reception unit may receive 360 video data transmitted from the 360 video transmission device according to the present disclosure. The reception unit may receive the 360 video data through a broadcast network or a broadband according to a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms according to used 3D modes. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated to perform both the processes in the renderer. According to an embodiment, the renderer may render only a region viewed by a user according to view information of the user.

A user may view part of the rendered 360 video through a VR display. The VR display is a device for reproducing 360 video and may be included in the 360 video reception device (tethered) or connected to the 360 video reception device as a separate device (un-tethered).

According to an embodiment of the 360 video reception device according to the present disclosure, the 360 video reception device may further include a (receiver) feedback processor and/or a network interface (not shown) as internal/external elements. The receiver feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the receiver feedback processor and transmit the same to the 360 video transmission device.

As described above, the feedback information may be used by the reception side in addition to being delivered to the transmission side. The receiver feedback processor may deliver the acquired feedback information to internal elements of the 360 video reception device such that the feedback information is reflected in a rendering process. The receiver feedback processor may deliver the feedback information to the renderer, the re-projection processor, the data decoder and/or the decapsulation processor. For example, the renderer may preferentially render a region viewed by a user using the feedback information. In addition, the decapsulation processor and the data decoder may preferentially decapsulate and decode a region viewed by the user or a region to be viewed by the user.

The internal/external elements of the 360 video reception device according to the present disclosure may be hardware elements realized by hardware. According to an embodiment, the internal/external elements may be modified, omitted, replaced by other elements or integrated with other elements. According to an embodiment, additional elements may be added to the 360 video reception device.

Another aspect of the present disclosure may relate to a method of transmitting 360 video and a method of receiving 360 video. The methods of transmitting/receiving 360 video according to the present disclosure may be performed by the above-described 360 video transmission/reception devices or embodiments thereof.

The aforementioned embodiments of the 360 video transmission/reception devices and embodiments of the internal/external elements thereof may be combined. For example, embodiments of the projection processor and embodiments of the data encoder may be combined to create as many embodiments of the 360 video transmission device as the number of the embodiments. The combined embodiments are also included in the scope of the present disclosure.

Figure 4:
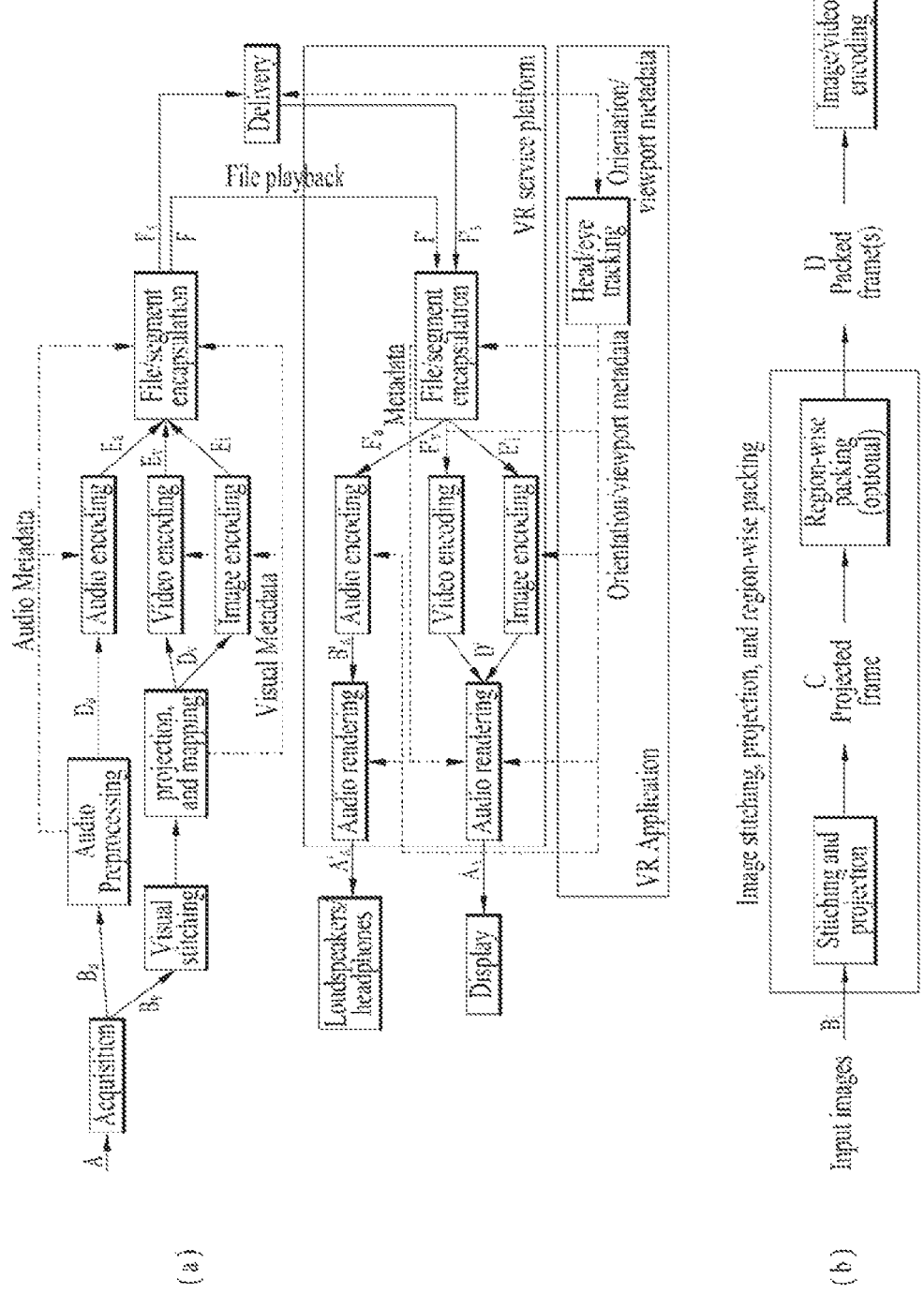
FIG. 4 illustrates a 360-degree video transmission device/360-degree video reception device according to another embodiment of the present disclosure.

FIG. 4 illustrates a 360-degree video transmission device/360-degree video reception device according to another embodiment of the present disclosure.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. In these processes, audio related metadata may be generated, and the encoded audio and audio related metadata may be subjected to processing for transmission (file/segment encapsulation).

The 360 video data may pass through the aforementioned processes. The stitcher of the 360 video transmission device may stitch the 360 video data (visual stitching). This process may be omitted and performed at the reception side according to an embodiment. The projection processor of the 360 video transmission device may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the reception side.

The 2D image may also be called a projected frame (C). Region-wise packing may be optionally performed on the 2D image. When region-wise packing is performed, the locations, forms and sizes of regions may be indicated such that the regions on the 2D image may be mapped on a packed frame (D). When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video stream or a file format and delivered. The metadata may be used for encoding, file format encapsulation, processing for transmission, etc.

The 360 audio/video data may pass through processing for transmission according to the transmission protocol and then may be transmitted. The aforementioned 360 video reception device may receive the 360 audio/video data over a broadcast network or broadband.

In (a), a VR service platform may correspond to an embodiment of the aforementioned 360 video reception device. In (a), loudspeakers/headphones, display and head/eye tracking components are performed by an external device or a VR application of the 360 video reception device. According to an embodiment, the 360 video reception device may include all of these components. According to an embodiment, the head/eye tracking component may correspond to the aforementioned receiver feedback processor.

The 360 video reception device may perform processing for reception (file/segment decapsulation) on the 360 audio/video data. The 360 audio data may be subjected to audio decoding and audio rendering and provided to a user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking component may acquire and process head orientation information, gaze information and viewport information of a user. This has been described above.

A VR application which communicates with the aforementioned processes of the reception side may be present at the reception side.

Figure 5:
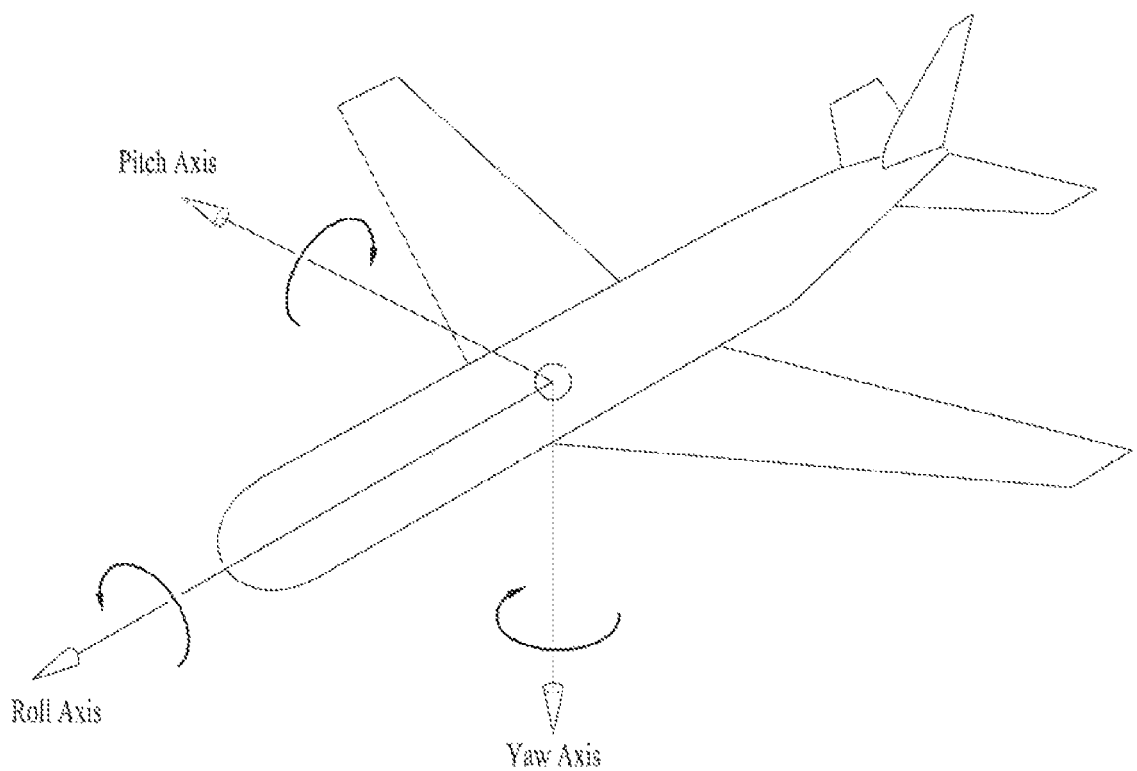
FIG. 5 illustrates the concept of aircraft principal axes for describing a 3D space of the present disclosure.

FIG. 5 illustrates the concept of aircraft principal axes for describing a 3D space of the present disclosure.

In the present disclosure, the concept of aircraft principal axes may be used to represent a specific point, location, direction, spacing and region in a 3D space.

That is, in the present disclosure, the concept of aircraft principal axes may be used to describe a 3D space before projection or after re-projection and to signal the same. According to an embodiment, a method using X, Y and Z axes or a spherical coordinate system may be used.

An aircraft may freely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis may refer to an axis connected between wings of the aircraft.

The yaw axis may refer to a reference axis of a direction in which the front end of the aircraft rotates to the left/right. In the shown concept of aircraft principal axes, the yaw axis may refer to an axis connected from the top to the bottom of the aircraft.

The roll axis may refer to an axis connected from the front end to the tail of the aircraft in the shown concept of aircraft principal axes, and rotation in the roll direction may refer to rotation based on the roll axis.

As described above, a 3D space in the present disclosure may be described using the concept of pitch, yaw and roll.

Figure 6:
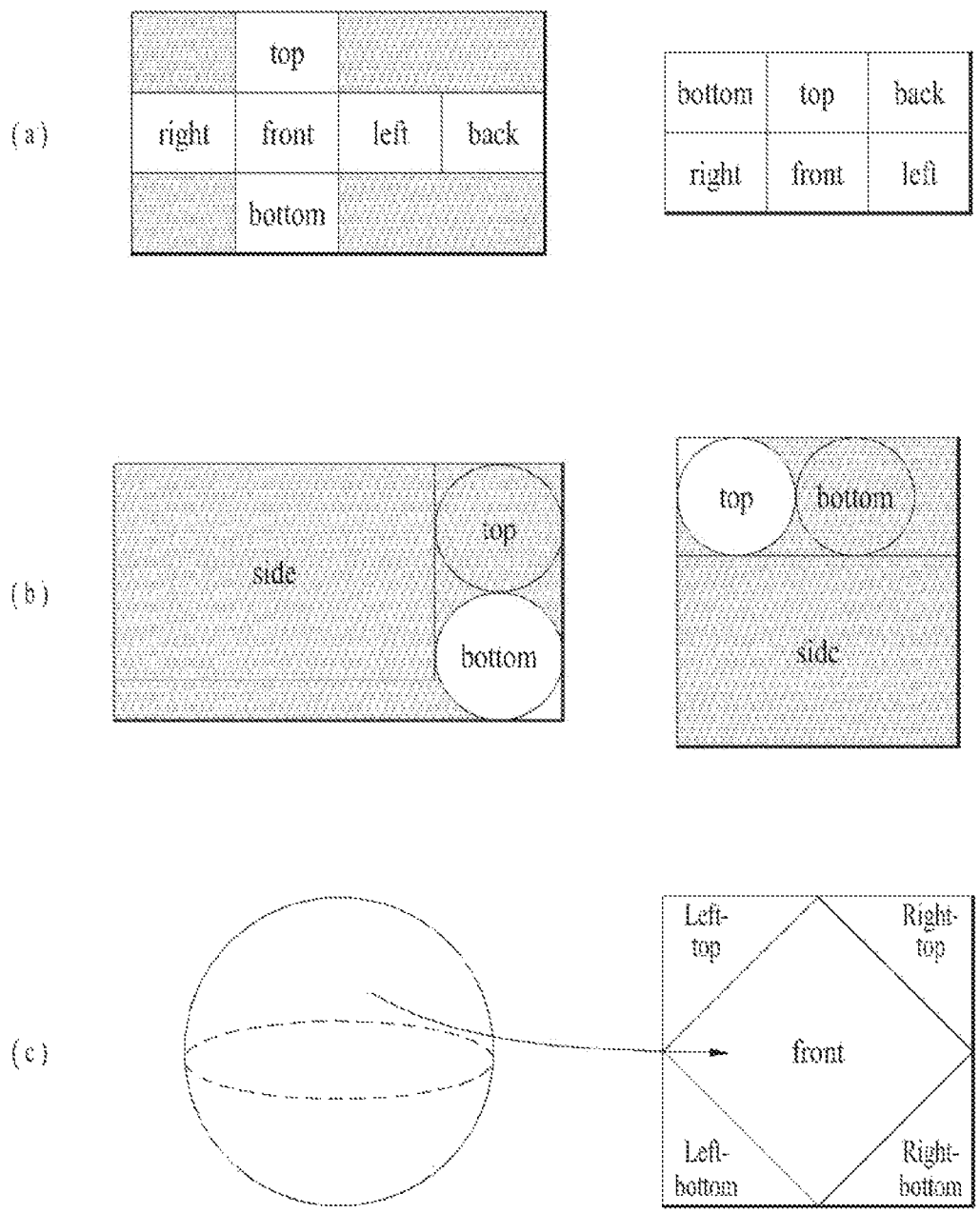
FIG. 6 illustrates projection schemes according to an embodiment of the present disclosure.

FIG. 6 illustrates projection schemes according to an embodiment of the present disclosure.

As described above, the projection processor of the 360 video transmission device according to the present disclosure may project stitched 360 video data on a 2D image. In this process, various projection schemes may be used.

According to another embodiment of the 360 video transmission device according to the present disclosure, the projection processor may perform projection using a cubic projection scheme. For example, stitched video data may be represented on a spherical plane. The projection processor may segment the 360 video data into a cube and project the same on the 2D image. The 360 video data on the spherical plane may correspond to planes of the cube and be projected on the 2D image as shown in (a).

According to another embodiment of the 360 video transmission device according to the present disclosure, the projection processor may perform projection using a cylindrical projection scheme. Similarly, if stitched video data may be represented on a spherical plane, the projection processor may segment the 360 video data into a cylinder and project the same on the 2D image. The 360 video data on the spherical plane may correspond to the side, top and bottom of the cylinder and be projected on the 2D image as shown in (b).

According to another embodiment of the 360 video transmission device according to the present disclosure, the projection processor may perform projection using a pyramid projection scheme. Similarly, if stitched video data may be represented on a spherical plane, the projection processor may regard the 360 video data as a pyramid form and project the same on the 2D image. The 360 video data on the spherical plane may correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube may be respective regions in (a). The side, top and bottom of the cylinder may be respective regions in (b). The front, left top, left bottom, right top and right bottom sides of the pyramid may be respective regions in (c).

Figure 7:
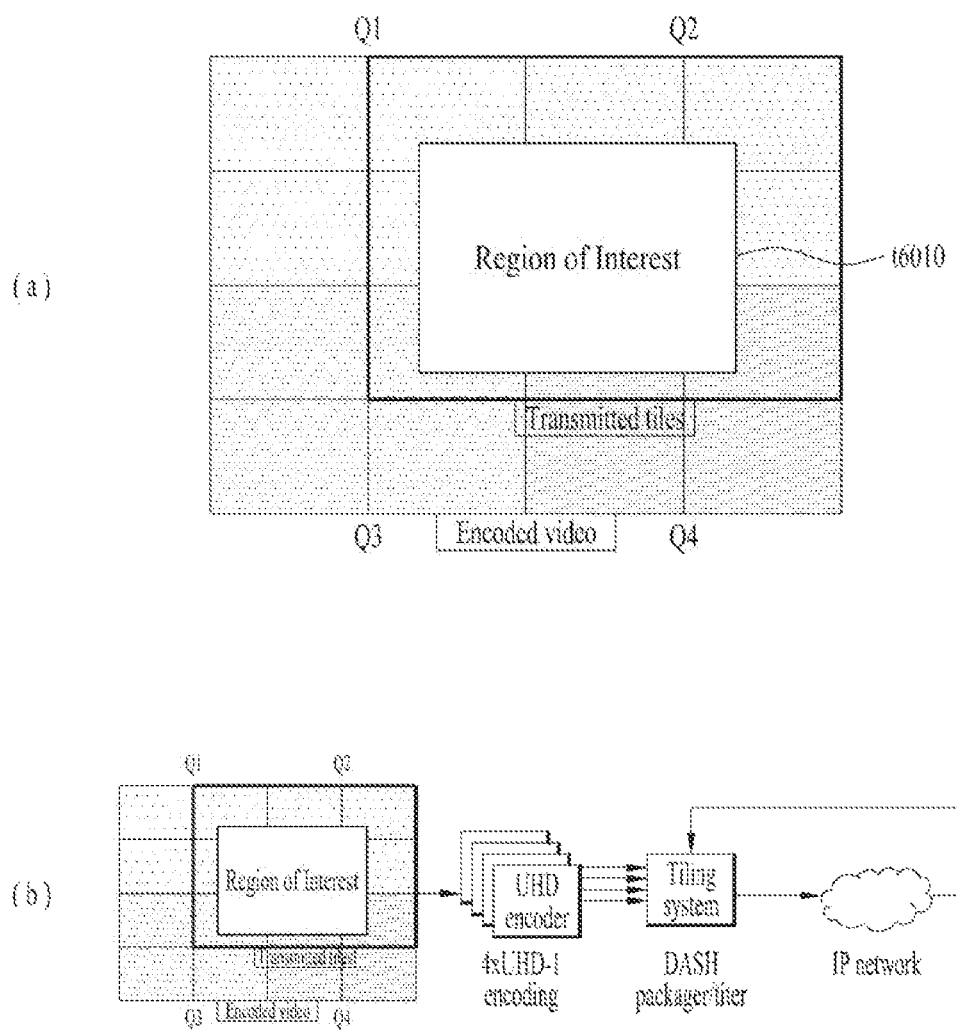
FIG. 7 illustrates tiles according to an embodiment of the present disclosure.

FIG. 7 illustrates tiles according to an embodiment of the present disclosure.

360 video data projected on a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission device according to the present disclosure, the data encoder may independently encode the tiles.

The aforementioned region-wise packing may be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a reception side on a limited bandwidth. Through tiling, a limited bandwidth may be used more efficiently and the reception side may reduce computational load compared to a case in which the entire 360 video data is processed simultaneously.

A region and a tile are discriminated from each other and thus they need not be identical. However, a region and a tile may refer to the same area according to an embodiment. Region-wise packing may be performed to tiles and thus regions may correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

Region of Interest (ROI) may refer to a region of interest of users, which is provided by a 360 content provider. When 360 video is produced, the 360 content provider may produce the 360 video in consideration of a specific region which is expected to be a region of interest of users. According to an embodiment, ROI may correspond to a region in which important content of the 360 video is reproduced.

According to another embodiment of the 360 video transmission/reception devices according to the present disclosure, the receiver feedback processor may extract and collect viewport information and deliver the same to the transmitter feedback processor. In this process, the viewport information may be delivered using network interfaces of both sides. In the 2D image shown in (a), a viewport t6010 is displayed. Here, the viewport may be displayed over nine tiles of the 2D images.

In this case, the 360 video transmission device may further include a tiling system. According to an embodiment, the tiling system may be located following the data encoder (b), may be included in the aforementioned data encoder or transmission processor, or may be included in the 360 video transmission device as a separate internal/external element.

The tiling system may receive viewport information from the transmitter feedback processor. The tiling system may select only tiles included in a viewport region and transmit the same. In the 2D image shown in (a), only nine tiles including the viewport region t6010 among 16 tiles may be transmitted. Here, the tiling system may transmit tiles in a unicast manner over a broadband because the viewport region is different for users.

In this case, the transmitter feedback processor may deliver the viewport information to the data encoder. The data encoder may encode the tiles including the viewport region with higher quality than other tiles.

Furthermore, the transmitter feedback processor may deliver the viewport information to the metadata processor. The metadata processor may deliver metadata related to the viewport region to each internal element of the 360 video transmission device or include the metadata in 360 video related metadata.

By using this tiling method, transmission bandwidths may be saved and processes differentiated for tiles may be performed to achieve efficient data processing/transmission.

The above-described embodiments related to the viewport region may be applied to specific regions other than the viewport region in a similar manner. For example, the aforementioned processes performed on the viewport region may be performed on a region determined to be a region in which users are interested through the aforementioned gaze analysis, ROI, and a region (initial view, initial viewpoint) initially reproduced when a user views 360 video through a VR display.

According to another embodiment of the 360 video transmission device according to the present disclosure, the transmission processor may perform processing for transmission differently on tiles. The transmission processor may apply different transmission parameters (modulation orders, code rates, etc.) to tiles such that data delivered for the tiles has different robustnesses.

Here, the transmitter feedback processor may deliver feedback information received from the 360 video reception device to the transmission processor such that the transmission processor may perform transmission processing differentiated for tiles. For example, the transmitter feedback processor may deliver the viewport information received from the reception side to the transmission processor. The transmission processor may perform transmission processing such that tiles including the corresponding viewport region have higher robustness than other tiles.

FIG. 8 illustrates 360-degree video related metadata according to an embodiment of the present disclosure.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present disclosure may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present disclosure may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection_scheme field, etc. According to an embodiment, the basic metadata may further include additional information.

The vr_geometry field may indicate the type of a 3D model supported by the corresponding 360 video data. When the 360 video data is re-projected on a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space may conform to 3D models of a sphere, a cube, a cylinder and a pyramid. When the field has the remaining values, the field may be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection_scheme field may indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field may be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is_stereoscopic field and/or a stereo_mode field. According to an embodiment, the stereoscopic related metadata may further include additional information.

The is_stereoscopic field may indicate whether the 360 video data supports 3D. When the field is 1, the 360 video data supports 3D. When the field is 0, the 360 video data does not support 3D. This field may be omitted.

The stereo_mode field may indicate 3D layout supported by the corresponding 360 video. Whether the 360 video supports 3D may be indicated only using this field. In this case, the is_stereoscopic field may be omitted. When the field is 0, the 360 video may be a mono mode. That is, the projected 2D image may include only one mono view. In this case, the 360 video may not support 3D.

When this field is 1 and 2, the 360 video may conform to left-right layout and top-bottom layout. The left-right layout and top-bottom layout may be called a side-by-side format and a top-bottom format. In the case of the left-right layout, 2D images on which left image/right image are projected may be located at the left/right on an image frame. In the case of the top-bottom layout, 2D images on which left image/right image are projected may be located at the top/bottom on an image frame. When the field has the remaining values, the field may be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field may indicate an initial view when the 360 video is reproduced. That is, the center point of a viewport which is initially viewed when the 360 video is reproduced may be indicated by these three fields. The fields may indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception device may provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user may change for each scene of the 360 video. In this case, the initial view/initial viewpoint related metadata may indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields may indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field may represent minimum/maximum values of the coordinates of the left top end of the ROI. These fields may sequentially indicate a minimum x coordinate, a maximum x coordinate, a minimum y coordinate and a maximum y coordinate of the left top end.

The min_width field, max_width field, min_height field and max_height field may indicate minimum/maximum values of the width and height of the ROI. These fields may sequentially indicate a minimum value and a maximum value of the width and a minimum value and a maximum value of the height.

The min_x field, max_x field, min_y field and max_y field may indicate minimum and maximum values of coordinates in the ROI. These fields may sequentially indicate a minimum x coordinate, a maximum x coordinate, a minimum y coordinate and a maximum y coordinate of coordinates in the ROI. These fields may be omitted.

When ROI related metadata includes fields which indicate ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field may indicate a region occupied by ROI on a 3D space using minimum/maximum values of yaw, pitch and roll. These fields may sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field may indicate minimum/maximum values of FOV of the corresponding 360 video data. FOV may refer to the range of view displayed at once when 360 video is reproduced. The min_field_of_view field and max_field_of_view field may indicate minimum and maximum values of FOV. These fields may be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field may indicate whether corresponding 360 video includes information about FOV intended when the 360 video is produced. When this field value is 1, a content_fov field may be present.

The content_fov field may indicate information about FOV intended when the 360 video is produced. According to an embodiment, a region displayed to a user at once in the 360 video may be determined according to vertical or horizontal FOV of the 360 video reception device. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area may be called a cropped region or a default display region. The active video area is viewed as 360 video on an actual VR display and the 360 video reception device or the VR display may process/display only the active video area. For example, when the aspect ratio of the image frame is 4:3, only an area of the image frame other than an upper part and a lower part of the image frame may include 360 video data. This area may be called the active video area.

The cropped region related metadata may include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception device or the VR display. That is, this field may indicate whether the entire image frame indicates an active video area. When only part of the image frame is an active video area, the following four fields may be added.

A cr_region_left_top_x field, a cr_region_left_top_y field, a cr_region_width field and a cr_region_height field may indicate an active video area in an image frame. These fields may indicate the x coordinate of the left top, the y coordinate of the left top, the width and the height of the active video area. The width and the height may be represented in units of pixel.

As described above, the 360-degree video-related signaling information or metadata may be included in an arbitrarily defined signaling table, may be included in the form of a box in a file format such as ISOBMFF or Common File Format, or may be included and transmitted in a DASH MPD. In addition, 360-degree media data may be included and transmitted in such a file format or a DASH segment.

Figure 9:
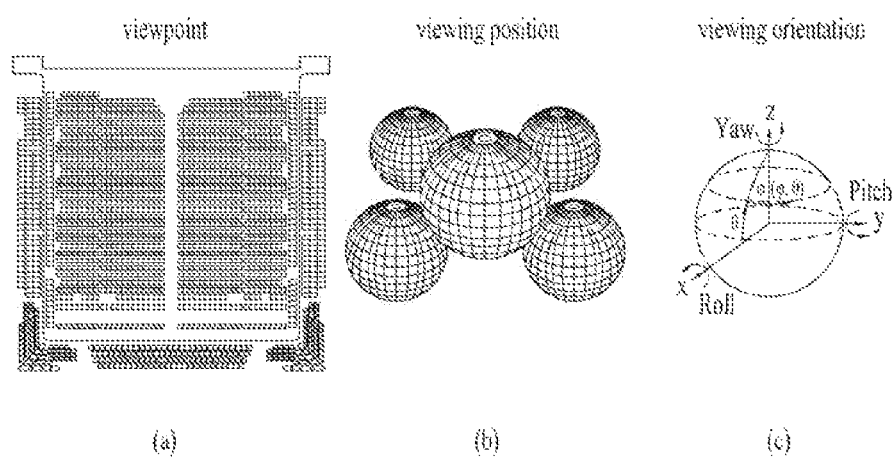
FIG. 9 illustrates a viewpoint and a viewing position that are additionally defined in the 3DoF+VR system.

FIG. 9 illustrates a viewpoint and viewing location additionally defined in a 3DoF+ VR system.

The 360 video based VR system according to embodiments may provide visual/auditory experiences for different viewing orientations with respect to a location of a user for 360 video based on the 360 video processing process described above. This method may be referred to as three degree of freedom (3DoF) plus. Specifically, the VR system that provides visual/auditory experiences for different orientations in a fixed location of a user may be referred to as a 3DoF based VR system.

The VR system that may provide extended visual/auditory experiences for different orientations in different viewpoints and different viewing locations in the same time zone may be referred to as a 3DoF+ or 3DoF plus based VR system.

Assuming a space such as (a) (an example of art center), different locations (an example of art center marked with a red circle) may be considered as the respective viewpoints. Here, video/audio provided by the respective viewpoints existing in the same space as in the example may have the same time flow.

In this case, different visual/auditory experiences may be provided according to a viewpoint change (head motion) of a user in a specific location. That is, spheres of various viewing locations may be assumed as shown in (b) for a specific viewpoint, and video/audio/text information in which a relative location of each viewpoint is reflected may be provided.

Visual/auditory information of various orientations such as the existing 3DoF may be delivered at a specific viewpoint of a specific location as shown in (c). In this case, additional various sources as well as main sources (video/audio/text) may be provided in combination, and this may be associated with a viewing orientation of a user or information may be delivered independently.

Figure 10:
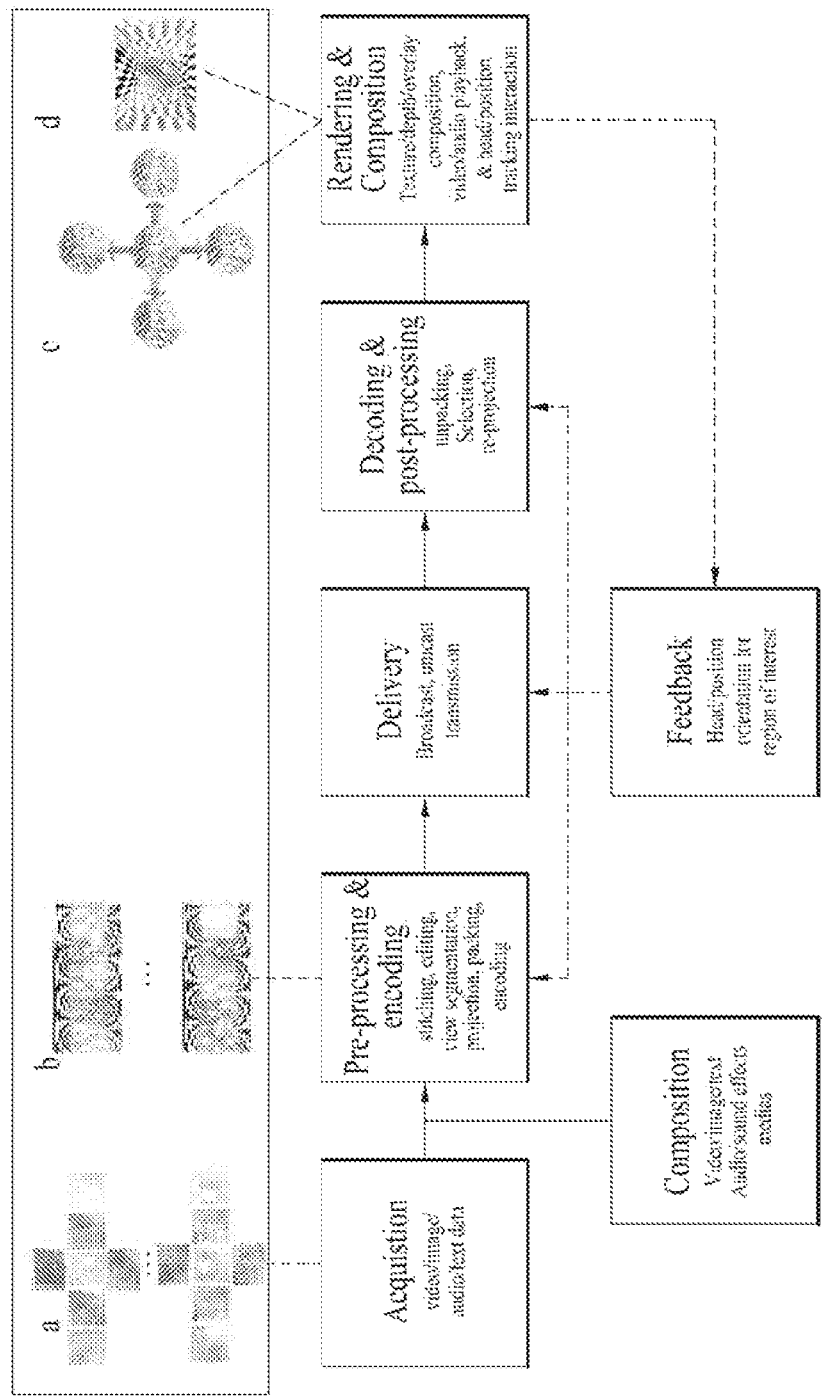
FIG. 10 illustrates a method of implementing 360-degree video signal processing and a related transmission/reception device based on a 3DoF+ system.

FIG. 10 is a view showing a method for implementing 360-degree video signal processing and a related transmission device/reception device based on 3DoF+ system.

FIG. 10 is an example of 3DoF+ end-to-end system flow chart including video acquisition, preprocessing, transmission, (post)processing, rendering and feedback processes of 3DoF+.

Acquisition: may mean a process of acquiring 360-degree video through capture, composition or generation of 360-degree video. Various kinds of video/audio information according to head motion may be acquired for a plurality of locations through this process. In this case, video information may include depth information as well as visual information (texture). At this time, a plurality of kinds of information of different viewing locations according to different viewpoints may be acquired as in the example of video information of a.

Composition: may define a method for composition to include video (video/image, etc.) through external media, voice (audio/effect sound, etc.) and text (caption, etc.) as well as information acquired through the video/audio input module in user experiences.

Preprocessing: is a preparation (preprocessing) process for transmission/delivery of the acquired 360-degree video, and may include stitching, projection, region wise packing and/or encoding process. That is, this process may include preprocessing and encoding processes for modifying/complementing data such as video/audio/text information according to a producer's intention. For example, the preprocessing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video according to a region, and encoding for compressing video information. A plurality of projection videos of different viewing locations according to different viewpoints may be generated like example in view of video of B.

Delivery: may mean a process of processing and transmitting video/audio data and metadata subjected to the preparation process (preprocessing). As a method for delivering a plurality of video/audio data and related metadata of different viewing locations according to different viewpoints, a broadcast network or a communication network may be used, or unidirectional delivery method may be used.

Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

Rendering: may mean a process of rendering and displaying re-projected image/video data on a 3D space. In this process, the process may be reconfigured to finally output video/audio signals. A viewing orientation, viewing location/head location and viewpoint, in which a user's region of interest exists, may be subjected to tracking, and necessary video/audio/text information may selectively be used according to this information. At this time, in case of video signal, different viewing locations may be selected according to the user's region of interest as shown in c, and video in a specific orientation of a specific viewpoint at a specific location may finally be output as shown in d.

Feedback: may mean a process of delivering various kinds of feedback information, which may be acquired during a display process, to a transmission side. In this embodiment, a viewing orientation, a viewing location, and a viewpoint, which corresponds to a user's region of interest, may be estimated, and feedback may be delivered to reproduce video/audio based on the estimated result.

FIG. 11 illustrates an architecture of a 3DoF+ end-to-end system.

FIG. 11 illustrates an architecture of a 3DoF+ end-to-end system. As described in the architecture of FIG. 11, 3DoF+ 360 contents may be provided.

The 360-degree video transmission device may include an acquisition unit for acquiring 360-degree video (image)/audio data, a video/audio preprocessor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception device through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information according to sensor orientation (viewing orientation in view of video), information acquisition timing of a sensor (sensor location, or viewing location in view of video), and information acquisition location of a sensor (viewpoint in case of video). At this time, video, image, audio and location information may be acquired.

In case of video data, texture and depth information may respectively be acquired, and video preprocessing may be performed according to characteristic of each component. For example, in case of the text information, 360-degree omnidirectional video may be configured using videos of different orientations of the same viewing location, which are acquired at the same viewpoint using image sensor location information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video preprocessing end is delivered as video metadata.

If additionally given video/audio/text information is served together with the acquired data (or data for main service), it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis according to application. At this time, only necessary information may be extracted (file extractor) according to a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing location information according to each viewpoint (viewing location and viewpoint metadata), etc. This information may be processed through a separate metadata processor.

The 360-degree video reception device may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text according to types of data and separately decoded to be reproduced.

The tracking unit generates viewpoint of a user's region of interest, viewing location at the corresponding viewpoint, and viewing orientation information at the corresponding viewing location based on a sensor and the user's input information. This information may be used for selection or extraction of a region of interest in each module of the 360-degree video reception device, or may be used for a post-processing process for emphasizing information of the region of interest. Also, if this information is delivered to the 360-degree video transmission device, this information may be used for file selection (file extractor) or subpicture selection for efficient bandwidth use, and may be used for various video reconfiguration methods based on a region of interest (viewport/viewing location/viewpoint dependent processing).

The decoded video signal may be processed according to various processing methods of the video configuration method. If image packing is performed in the 360-degree video transmission device, a process of reconfiguring video is required based on the information delivered through metadata. In this case, video metadata generated by the 360-degree video transmission device may be used. Also, if videos of a plurality of viewpoints or a plurality of viewing locations or various orientations are included in the decoded video, information matched with viewpoint, viewing location, and orientation information of the user's region of interest, which are generated through tracking, may be selected and processed. At this time, viewing location and viewpoint metadata generated at the transmission side may be used. Also, if a plurality of components are delivered for a specific location, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated according to the user's ROI.

The decoded audio signal may be generated as an audio signal capable of being reproduced, through an audio renderer and/or the post-processing process. At this time, information suitable for the user's request may be generated based on the information on the user's ROI and the metadata delivered to the 360-degree video reception device.

The decoded text signal may be delivered to an overlay renderer and processed as overlay information based on text such as subtitle. A separate text post-processing process may be included, if necessary.

Figure 12:
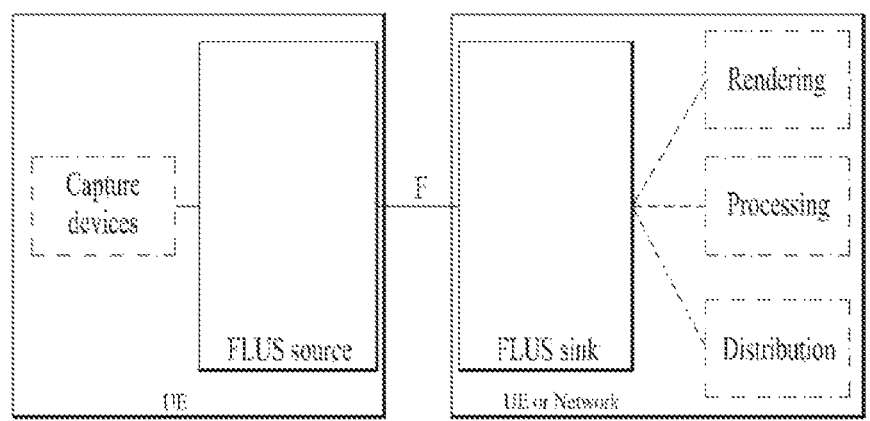
FIG. 12 shows the structure of Framework for Live Uplink Streaming (FLUS).

FIG. 12 illustrates an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission device or the aforementioned 360-degree reception device.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

Figure 13:
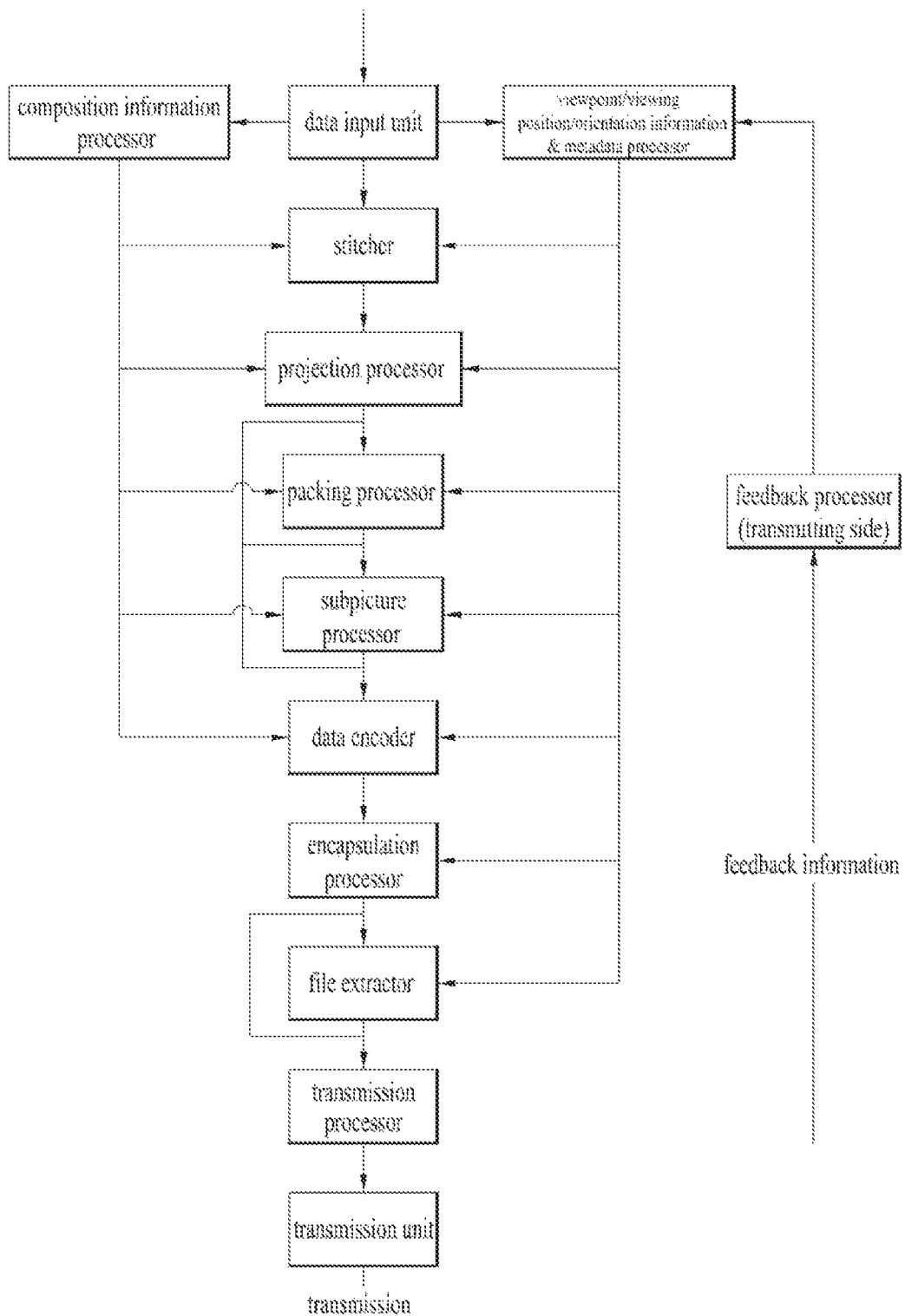
FIG. 13 illustrates the configuration of a 3DoF+ transmission terminal.

FIG. 13 is a view showing a configuration of 3DoF+ transmission side.

The transmission side (the 360 video transmission device) may perform stitching for a spherical image configuration per viewpoint/viewing position/component if input data are images output through a camera. If sphere images per viewpoint/viewing position/component are configured, the transmission side may perform projection for coding in 2D image. The transmission side may generate a plurality of images as subpictures of a packing or segmented region for making an integrated image according to application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed according to application or request of the system. The generated bitstreams may be transformed into the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

Figure 14:
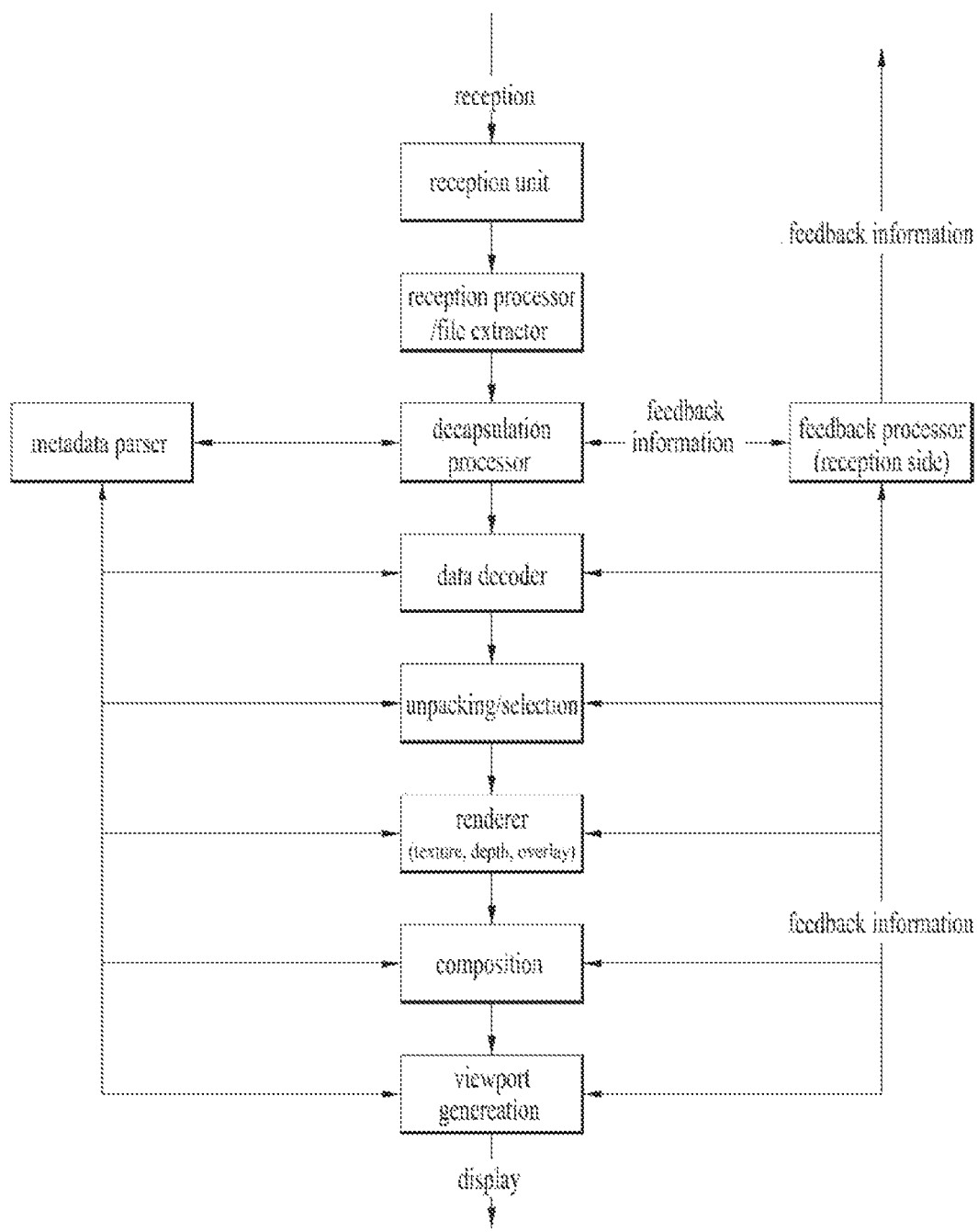
FIG. 14 illustrates the configuration of a 3DoF+ reception terminal.

FIG. 14 illustrates a configuration of 3DoF+ reception terminal.

The reception terminal (the 360 video reception device) may extract a necessary file after receiving the bitstreams delivered from the transmission side. The reception terminal may select bitstreams in the generated file format by using the viewpoint/viewing position/orientation information delivered from the feedback processor and reconfigure the selected bitstreams as image information through the decoder. The reception terminal may perform unpacking for the packed image based on packing information delivered through the metadata. If the packing process is omitted in the transmission side, unpacking of the reception terminal may also be omitted. Also, the reception terminal may perform a process of selecting images suitable for the viewpoint/ viewing position/orientation information delivered from the feedback processor and necessary components if necessary. The reception terminal may perform a rendering process of reconfiguring texture, depth and overlay information of images as a format suitable for reproduction. The reception terminal may perform a composition process for composing information of different layers before generating a final image, and may generate and reproduce an image suitable for a display viewport.

Figure 15:
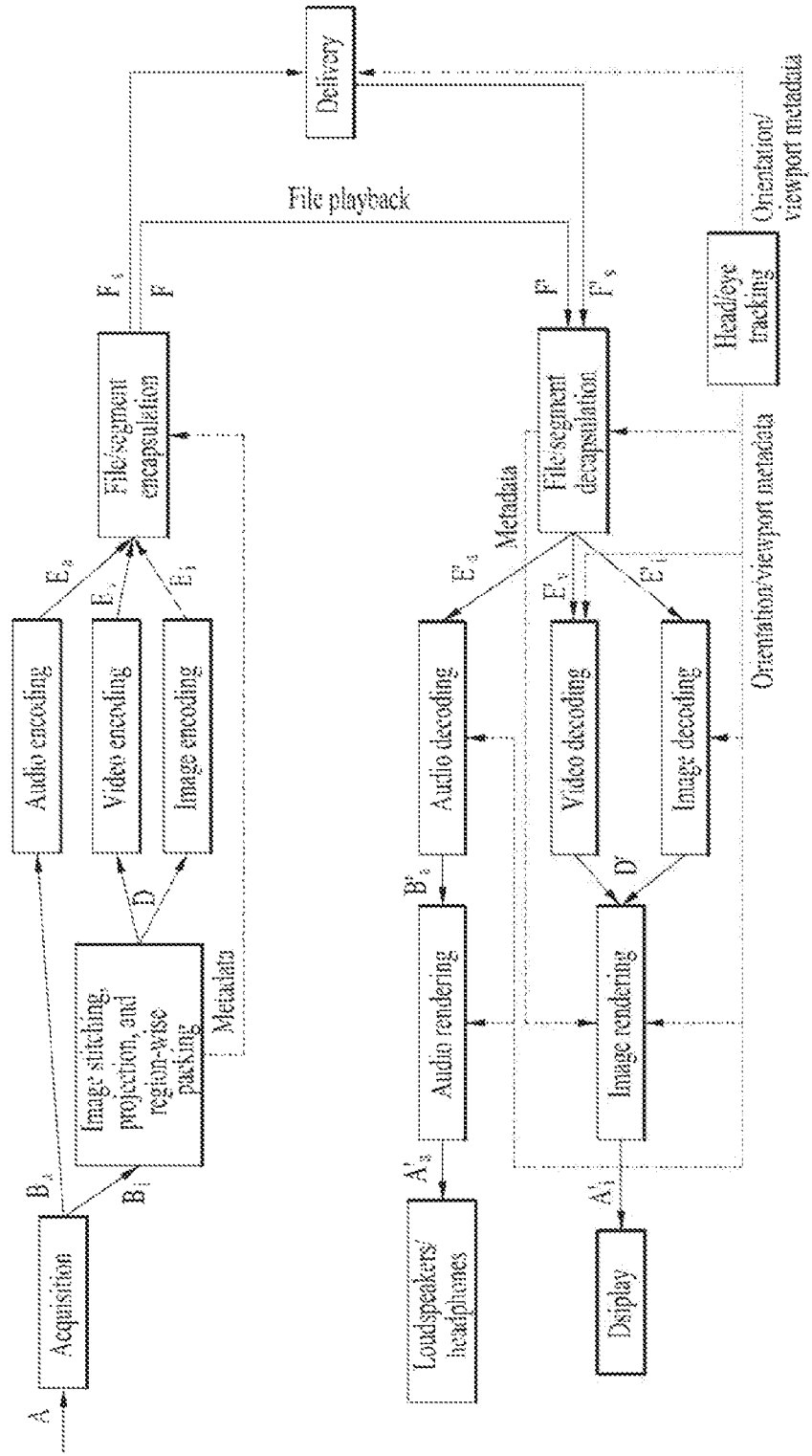
FIG. 15 shows an OMAF structure.

FIG. 15 shows an OMAF structure.

The 360 video based VR system may provide visual/ auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in a random viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

Figure 16:
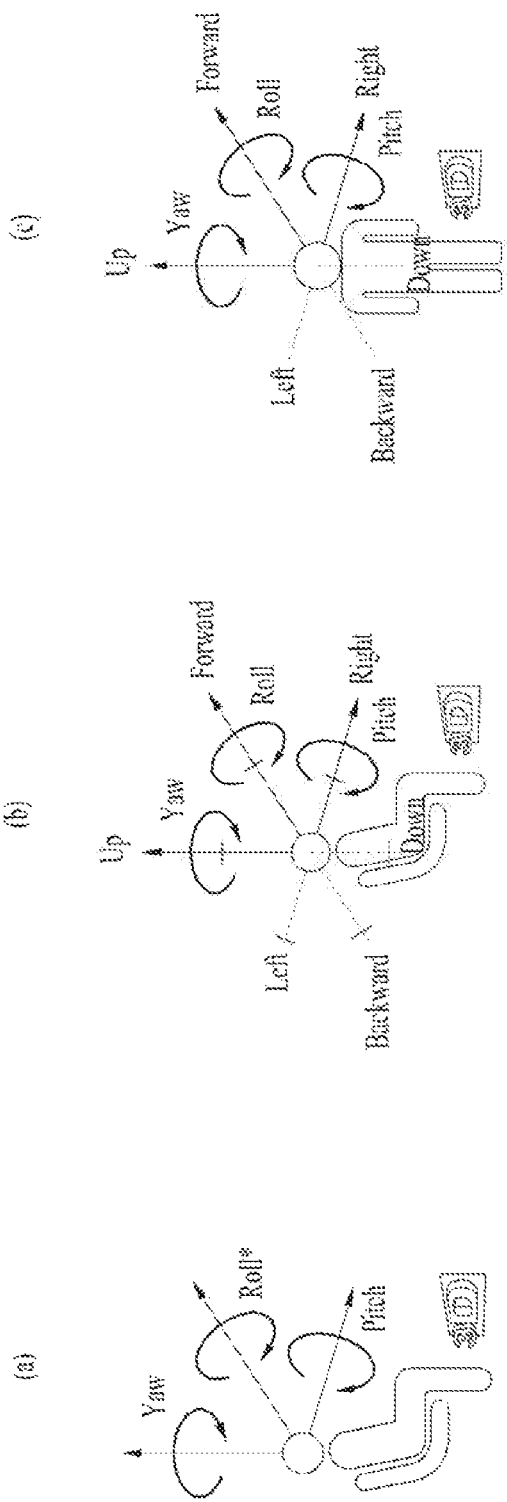
FIG. 16 shows a type of media according to movement of a user.

FIG. 16 shows a type of media according to movement of a user.

The present disclosure provides a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which may provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present disclosure provides a method for effectively providing 6DoF video. The 6DoF video may be captured at different positions by two or more cameras. The captured video may be transmitted through a series of processes, and the reception terminal may process and render some of the received data as 360-degree video having an initial position of the user as a starting point. If the position of the user moves, the reception terminal may process and render new 360-degree video based on the position where the user has moved, whereby the 6DoF video may be provided to the user.

Hereinafter, a transmission method and a reception method for providing 6DoF video services will be described.

Figure 17:
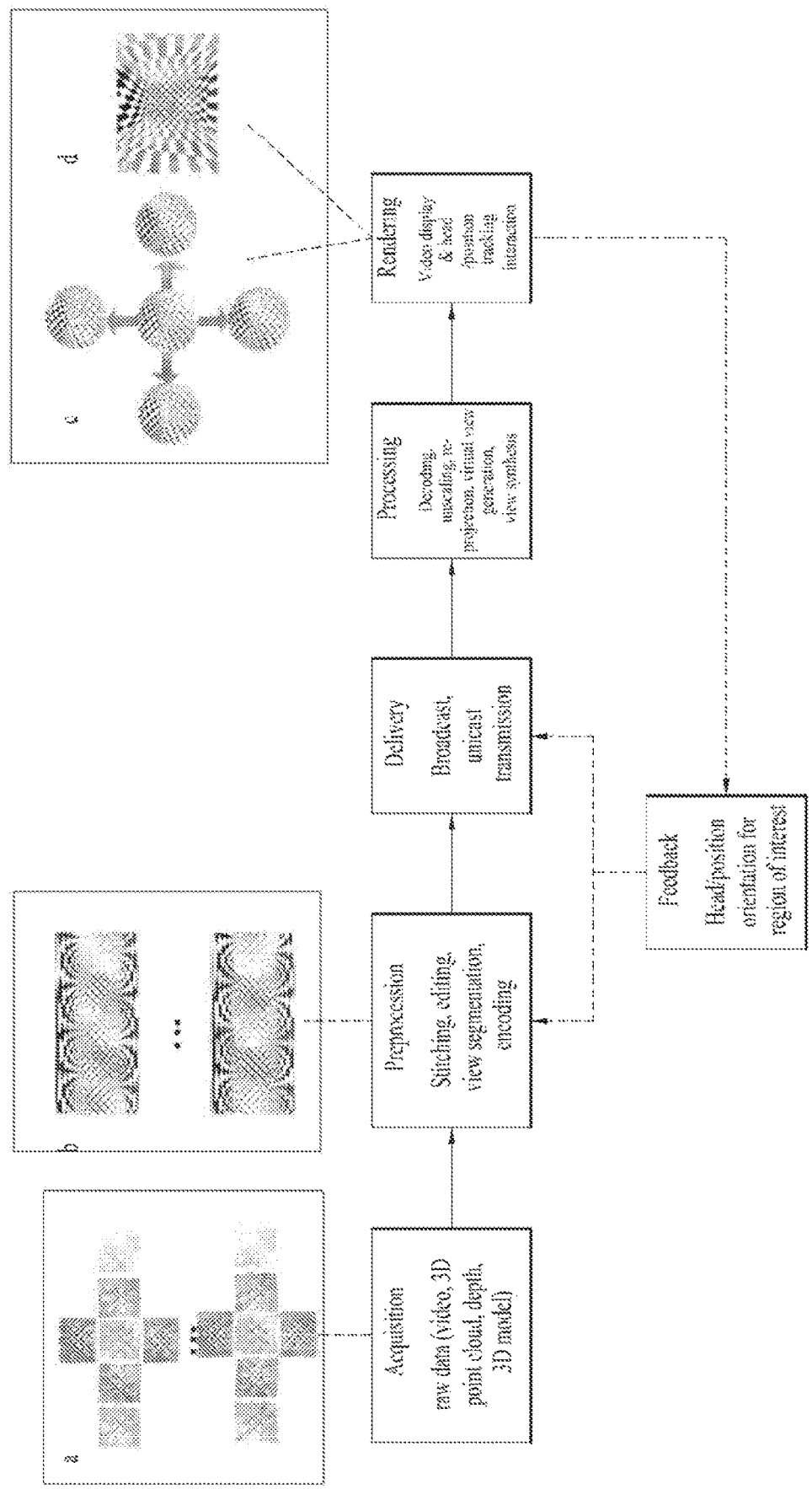
FIG. 17 shows an overall architecture for providing 6DoF video.

FIG. 17 shows an overall architecture for providing 6DoF video.

A series of processes described above will be described in detail based on FIG. 17. First of all, as an acquisition step, HDCA (High Density Camera Array), Lenslet (microlens) camera, etc. may be used to capture 6DoF contents, and 6DoF video may be acquired by a new device designed for capture of the 6DoF video. The acquired video may be generated as several image/video data sets generated according to a position of a camera, which is captured as shown in FIG. 3a. At this time, metadata such as internal/external setup values of the camera may be generated during the capturing process. In case of image generated by a computer not the camera, the capturing process may be replaced. The preprocessing process of the acquired video may be a process of processing the captured image/video and the metadata delivered through the capturing process. This process may correspond to all of types of preprocessing steps such as a stitching process, a color correction process, a projection process, a view segmentation process for segmenting views into a primary view and a secondary view to enhance coding efficiency, and an encoding process.

The stitching process may be a process of making image/ video by connecting image captured in the direction of 360-degree in a position of each camera with image in the form of panorama or sphere based on the position of each camera. Projection means a process of projecting the image resultant from the stitching process to a 2D image as shown in FIG. 3b, and may be expressed as mapping into 2D image.

The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may be newly generated as virtual information by the receiver in some cases.

In some embodiments, the preprocessing process may further include an editing process. In this process, editing for image/video data may further be performed before and after projection, and metadata may be generated even during the preprocessing process. Also, when the image/video are provided, metadata for an initial view to be first reproduced and an initial position and a region of interest (ROI) of a user may be generated.

The media transmission step may be a process of processing and transmitting the image/video data and metadata acquired during the preprocessing process. Processing according to a random transmission protocol may be performed for transmission, and the preprocessed data may be delivered through a broadcast network and/or a broadband. The preprocessed data may be delivered to the reception terminal on demand.

The processing process may include all steps before image is generated, wherein all steps may include decoding the received image/video data and metadata, re-projection which may be called mapping or projection into a 3D model, and a virtual view generation and synthesis process. The 3D model which is mapped or a projection map may include a sphere, a cube, a cylinder or a pyramid like the existing 360-degree video, and may be a modified type of a projection map of the existing 360-degree video, or may be a projection map of a free type in some cases.

The virtual view generation and synthesis process may mean a process of generating and composing the image/video data to be reproduced when the user moves between the primary view and the secondary view or between the primary view and the primary view. The process of processing the metadata delivered during the capture and preprocessing processes may be required to generate the virtual view. In some cases, only some of the 360 images/videos may be generated/synthesized.

In some embodiments, the processing process may further include an editing process, an up scaling process, and a down scaling process. Additional editing required before reproduction may be applied to the editing process after the processing process. The process of up scaling or down scaling the received images/videos may be performed, if necessary.

The rendering process may mean a process of rendering image/video, which is re-projected by being transmitted or generated, to be displayed. As the case may be, rendering and re-projection process may be referred to as rendering. Therefore, the rendering process may include the re-projection process. A plurality of re-projection results may exist in the form of 360 degree video/image based on the user and 360 degree video/image formed based on the position where the user moves according to a moving direction as shown in FIG. 3c. The user may view some region of the 360 degree video/image according to a device to be displayed. At this time, the region viewed by the user may be a form as shown in FIG. 3d. When the user moves, the entire 360 degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which may be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
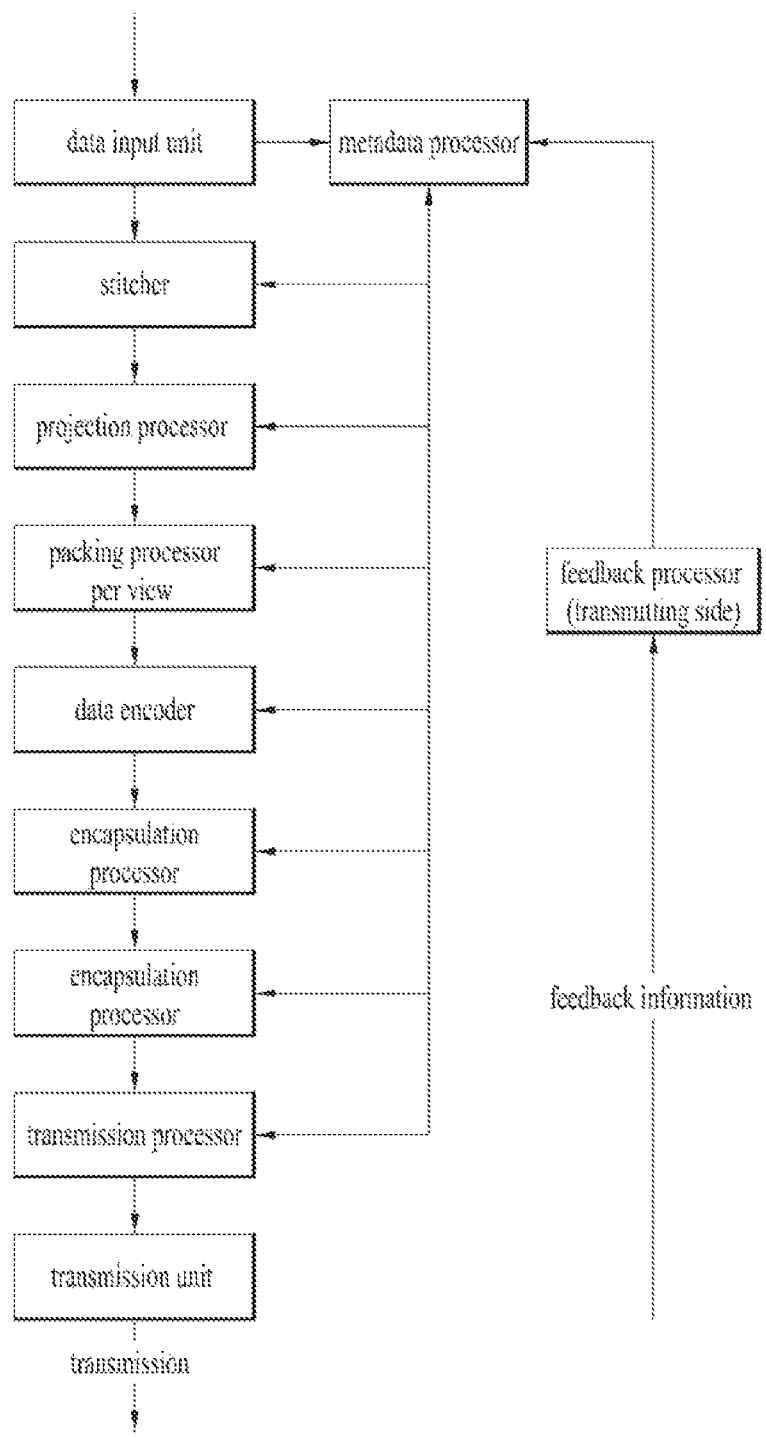
FIG. 18 illustrates the configuration of a transmission device for providing a 6DoF video service.

FIG. 18 illustrates the configuration of a transmission device for providing a 6DoF video service.

The present disclosure may relate to a 6DoF video transmission device at the transmission side. The 6DoF video transmission device according to the present disclosure may perform the aforementioned preparation processes and operations. The 6DoF video/image transmission device according to the present disclosure may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmitter as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360 degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results according to a scheme, and the corresponding scheme may similar to the projection scheme of the existing 360 degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception terminal.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission processor may perform additional processing for transmission on the encapsulated video data according to the format. The corresponding processing may be performed using the metadata received from the metadata processor. The transmitter may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception device, which will be described later in the present disclosure, and may deliver the feedback information to the feedback processor (transmission side). The feedback processor may deliver the information received from the reception terminal to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission device may be hardware components implemented by hardware. In some embodiments, the respective components may be modified or omitted or new components may be added thereto, or may be replaced with or incorporated into the other components.

Figure 19:
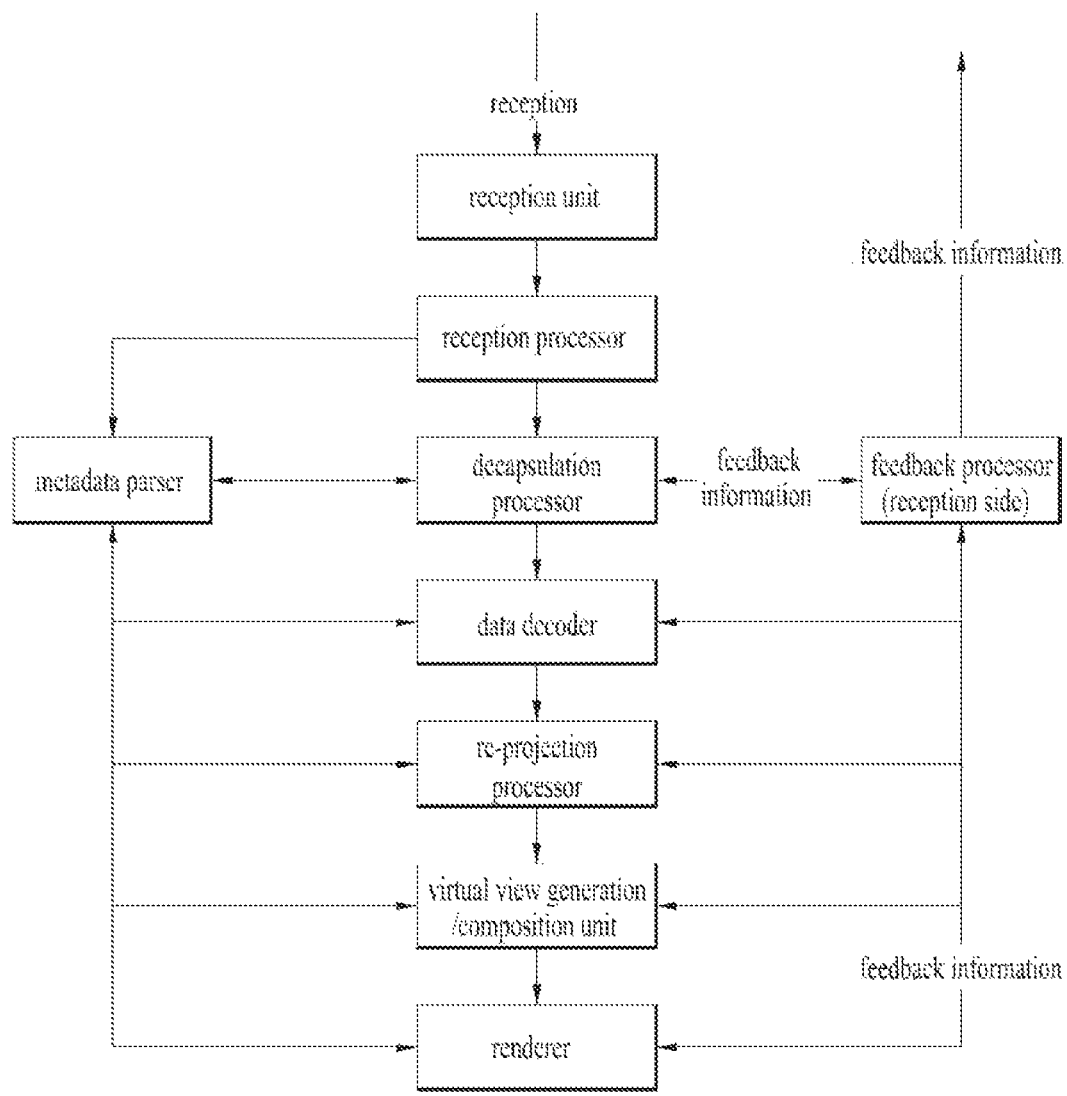
FIG. 19 illustrates the configuration of a 6DoF video reception device.

FIG. 19 illustrates the configuration of a 6DoF video reception device.

The present disclosure may be related to the reception device. According to the present disclosure, the 6DoF video reception device may include a reception unit, a reception processor, a decapsulation-processor, a metadata parser, a feedback processor, a data decoder, a re-projection processor, a virtual view generation/synthesis unit and/or a renderer as components.

The reception unit may receive video data from the aforementioned 6DoF transmission device. The reception unit may receive the video data through a broadcast network or a broadband according to a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. The decapsulation-processor may receive metadata necessary for decapsulation from the metadata parser, when necessary.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generation/synthesis unit and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/synthesis unit may generate video data, which are not included in the 6DoF video data re-projected by being transmitted and received on the 3D space but need to be reproduced, in a virtual view area by using given data, and may compose video data in a new view/position based on the virtual view. The virtual view generation/synthesis unit may use data of the depth information processor (not shown) when generating video data of a new view. The virtual view generation/synthesis unit may generate/compose the specific area received from the metadata parser and a portion of a peripheral virtual view area, which is not received. The virtual view generation/synthesis unit may selectively be performed, and is performed when there is no video information corresponding to a necessary view and position.

The renderer may render the 6DoF video data delivered from the re-projection unit and the virtual view generation/synthesis unit. As described above, all the processes occurring in the re-projection unit or the virtual view generation/synthesis unit on the 3D space may be incorporated within the renderer such that the renderer may perform these processes. In some embodiments, the renderer may render only a portion that is being viewed by a user and a portion on a predicted path according to the user's view/position information.

In the present disclosure, the feedback processor (reception terminal) and/or the network interface (not shown) may be included as additional components. The feedback processor of the reception terminal may acquire and process feedback information from the renderer, the virtual view generation/synthesis unit, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmitter. The feedback information may be consumed in each component of the reception terminal. For example, the decapsulation processor may receive position/viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/synthesis, and rendering.

The components of the aforementioned 6DoF video reception device may be hardware components implemented by hardware. In some embodiments, the respective components may be modified or omitted or new components may be added thereto, or may be replaced with or incorporated into the other components.

Figure 20:
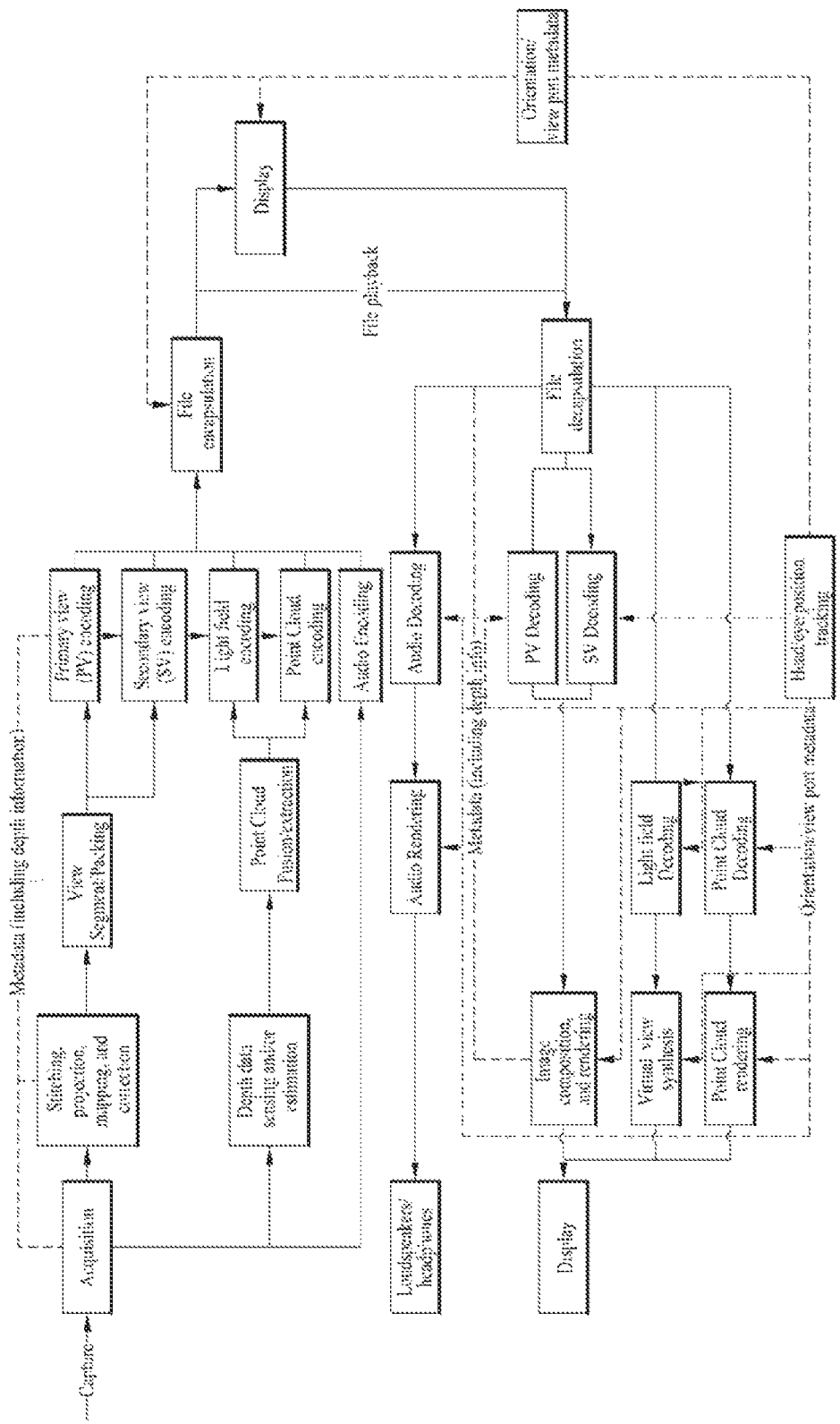
FIG. 20 illustrates the configuration of a 6DoF video transmission/reception device.

FIG. 20 illustrates a configuration of a 6DoF video transmission/reception device.

6DoF contents may be provided in the form of a file or a segment-based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio encoding: 6DoF audio data may be subjected to audio preprocessing and encoding. In this process, metadata may be generated, and related metadata may be subjected to encapsulation/encoding for transmission.

Stitching, projection, mapping, and correction: 6DoF video data may be subjected to editing, stitching and projection of the image acquired at various positions as described above. Some of these processes may be performed according to the embodiment, or all of the processes may be omitted and then may be performed by the reception terminal.

View segmentation/packing: As described above, the view segmentation/packing processor may segment images of a primary view (PV), which are required by the reception terminal, based on the stitched image and pack the segmented images and then perform preprocessing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point cloud fusion/extraction: a process of modifying a previously acquired depth map to data capable of being encoded may be performed. For example, a preprocessing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed into segments.

Metadata (including depth information): Like the 6DoF video data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception terminal. The reception terminal may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception device may perform processing for 6DoF video/audio data reception.

Audio decoding/audio rendering/loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point cloud rendering: when captured video/image data are re-projected on a 3D space, a 3D spatial position is configured, and a process of generating a 3D space of a virtual view to which a user may move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or synthesis process may be omitted.

Image composition and rendering: as a process of rendering image based on a user's position, video data decoded according to the user's position and eyes may be used or video and image near the user, which are made by the virtual view generation/synthesis, may be rendered.

Figure 21:
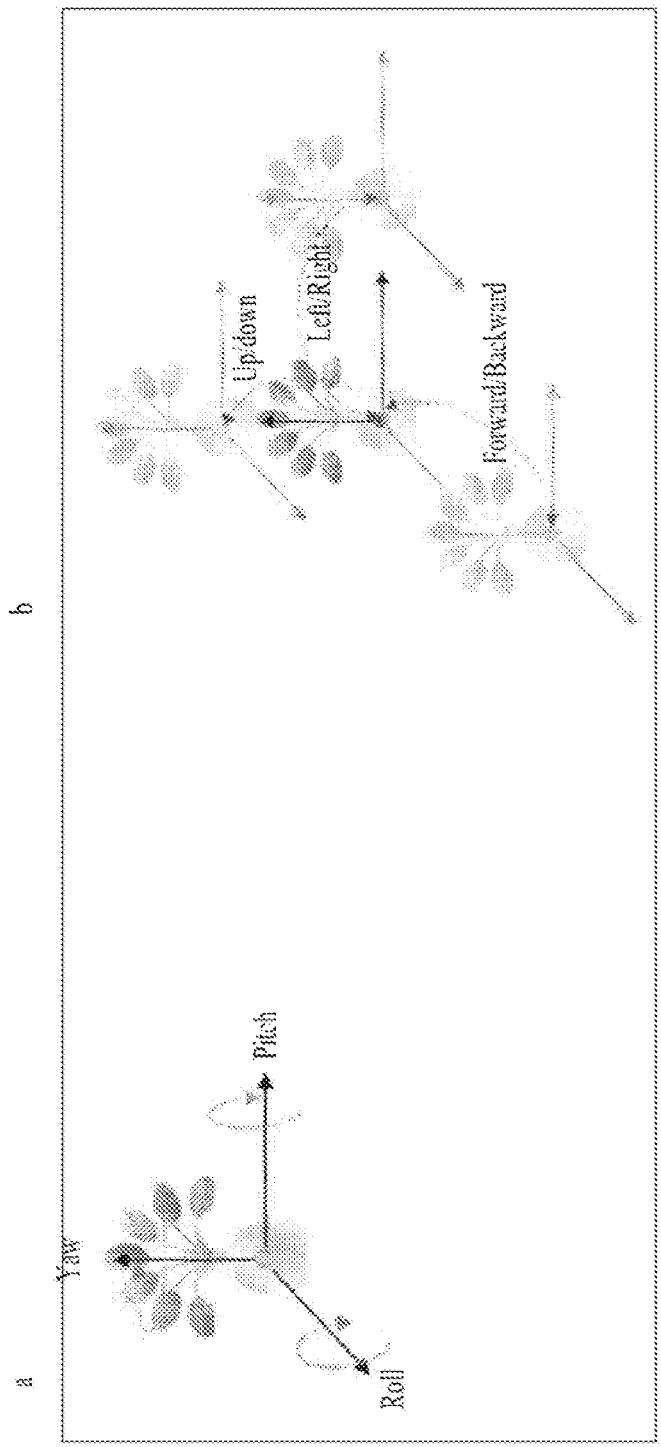
FIG. 21 shows a 6DoF space.

FIG. 21 shows a 6DoF space.

In the present disclosure, a 6DoF space before projection or after re-projection will be described and the concept of FIG. 21 may be used to perform corresponding signaling.

The 6DoF space may categorize an orientation of movement into two types, rational and translation, unlike the case that the 360 degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present disclosure proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): Region may mean a region where 360 video data projected on 2D image is located in a packed frame through region-wise packing. In this case, the region may refer to a region used in region-wise packing depending on the context. As described above, regions may be identified by equally dividing 2D image, or may be identified by being randomly divided according to a projection scheme.

Region (general meaning): Unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: may mean the entire 2D image in which 360 degree video data are projected. In some embodiments, a projected frame or a packed frame may be the picture.

Sub-picture: A sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: A tile is a sub-concept of a sub-picture, and the sub-picture may be used as a tile for tiling. That is, the sub-picture and the tile in tiling may be the same concept. Specifically, the tile may be a tool enabling parallel decoding or a tool for independent decoding in VR. In VR, a tile may mean a Motion Constrained Tile Set (MCTS) that restricts a range of temporal inter prediction to a current tile internal range. Therefore, the tile herein may be called MCTS.

Spherical region: spherical region or sphere region may mean one region on a spherical surface when 360 degree video data are rendered on a 3D space (for example, spherical surface) at the reception terminal. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. According to the context, the spherical region may simply be called region.

Face: Face may be a term referring to each face according to a projection scheme. For example, if cube map projection is used, a front face, a rear face, side face, an upper face, or a lower face may be called face.

Figure 22:
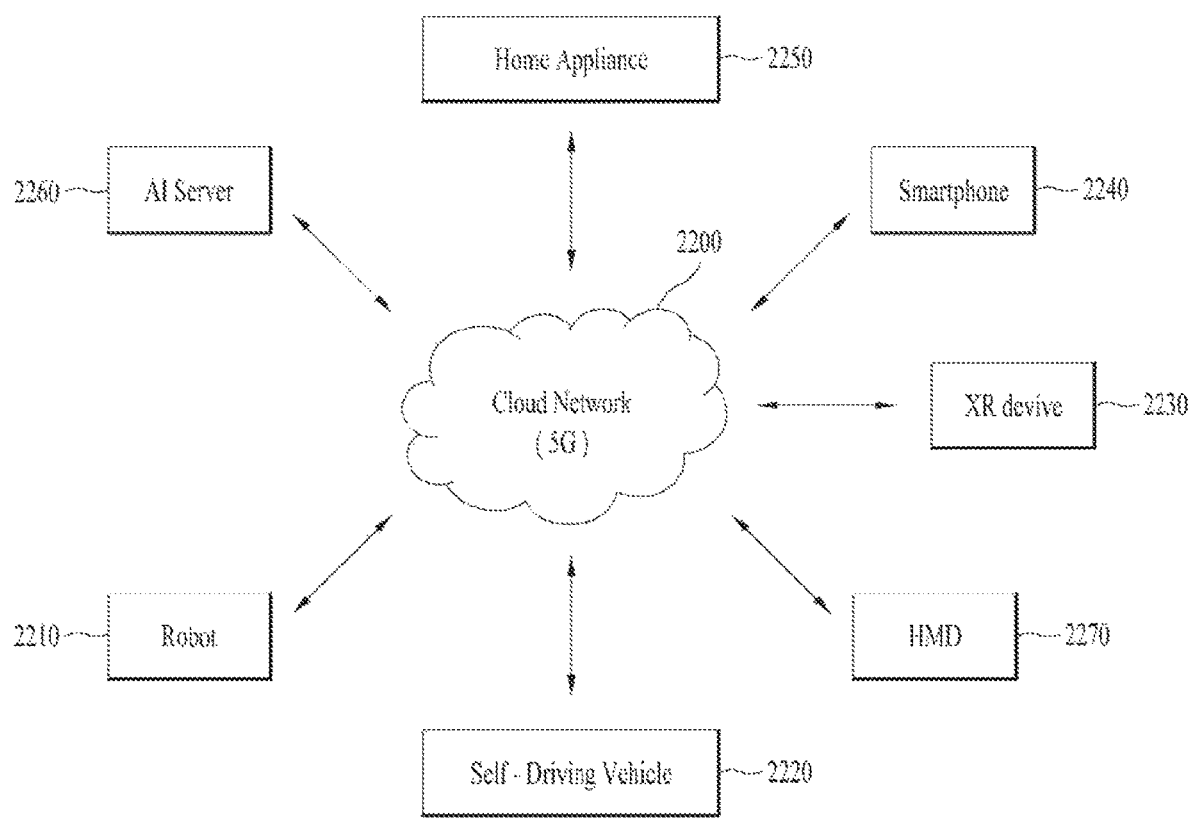
FIG. 22 illustrates an exemplary structure operatively connectable with a video transmission/reception method/device according to embodiments.

FIG. 22 illustrates an exemplary structure operatively connectable with a video transmission/reception method/device according to embodiments.

Referring to FIG. 22, the structure according to embodiments represents a configuration in which at least one of a server 2260, a robot 2210, a self-driving vehicle 2220, an XR device 2230, a smartphone 2240, a home appliance 2250, and/or a head-mount display (HMD) 2270 is connected to a cloud network 2210. The robot 2210, the self-driving vehicle 2220, the XR device 2230, the smartphone 2240, or the home appliance 2250 is referred to as a device. In addition, the XR device 2230 may correspond to a video transmission/reception device according to embodiments or may be operatively connected to the video transmission/reception device.

The cloud network 2200 may represent a network that constitutes part of the cloud computing infrastructure or is present in the cloud computing infrastructure. Here, the cloud network 2200 may be configured using a 3G network, 4G or long term evolution (LTE) network, or a 5G network.

The server 2260 may be connected to at least one of the robot 2210, the self-driving vehicle 2220, the XR device 2230, the smartphone 2240, the home appliance 2250, and/or the HMD 2270 over the cloud network 2200 and may assist in at least a part of processing of the connected devices 2210 to 2270.

The HMD 2270 represents one of the implementation types of the XR device and/or a point cloud compression (PCC) device according to embodiments. The HMD type device according to embodiments includes a communication unit, a control unit, a memory, an I/O unit, a sensor unit, and a power supply unit.

Hereinafter, various embodiments of the devices 2210 to 2250 to which the above-described technology is applied will be described. The devices 2210 to 2250 illustrated in FIG. 22 may be operatively connected/coupled to the video transmission/reception device according to the above-described embodiments. Here, XR may include 3DoF, 3DoF+, 6DoF, and/or PCC.

<XR>

The XR device 2230 may employ XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR device 2230 may analyze 3D point cloud data or image data acquired through various sensors or from an external device and generate position data and attribute data about 3D points. Thereby, the XR 2230 may acquire information about a surrounding space or a real object, and render and output an XR object. For example, the XR device 2230 may match an XR object including auxiliary information about a recognized object with the recognized object and output the matched XR object.

<Self-Driving+XR>

The self-driving vehicle 2220 may be implemented as a mobile robot, a vehicle, an unmanned aerial vehicle, or the like by applying the XR technology.

The self-driving vehicle 2220 to which the XR technology is applied may represent a self-driving vehicle provided with a means for providing an XR image, or a self-driving vehicle that is a target of control/interaction in the XR image. In particular, the self-driving vehicle 2220 which is a target of control/interaction in the XR image may be distinguished from the XR device 2230 and may be operatively connected thereto.

The self-driving vehicle 2220 having the means for providing the XR image may acquire sensor information from sensors including a camera, and output the generated XR image based on the acquired sensor information. For example, the self-driving vehicle 2220 may have an HUD and output the XR image thereto, thereby providing an occupant with an XR object corresponding to a real object or an object present on the screen.

When the XR object is output to the HUD, at least a part of the XR object may be output to overlap the real object to which the occupant's eyes are directed. On the other hand, when the XR object is output on a display provided inside the self-driving vehicle, at least a part of the XR object may be output to overlap an object on the screen. For example, the self-driving vehicle 2220 may output XR objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, video-based PCC (V-PCC), and geometry-based PCC (G-PCC) techniques is applicable to such technologies.

The method/device according to embodiments may be applied to a vehicle that provides a self-driving service.

The vehicle that provides the self-driving service is connected to a device for wired/wireless communication.

When the video transmission/reception device according to embodiments is connected to a vehicle for wired/wireless communication, the device may receive/process content data related to an AR/VR/PCC service, which may be provided together with the self-driving service, and transmit the same to the vehicle. In the case in which the video transmission/reception device is mounted on a vehicle, the video transmission/reception device may receive/process content data related to the AR/VR/PCC service according to a user input signal input through a user interface device and provide the same to the user. The vehicle or the user interface device according to embodiments may receive a user input signal. The user input signal according to embodiments may include a signal indicating the self-driving service.

Figure 23:
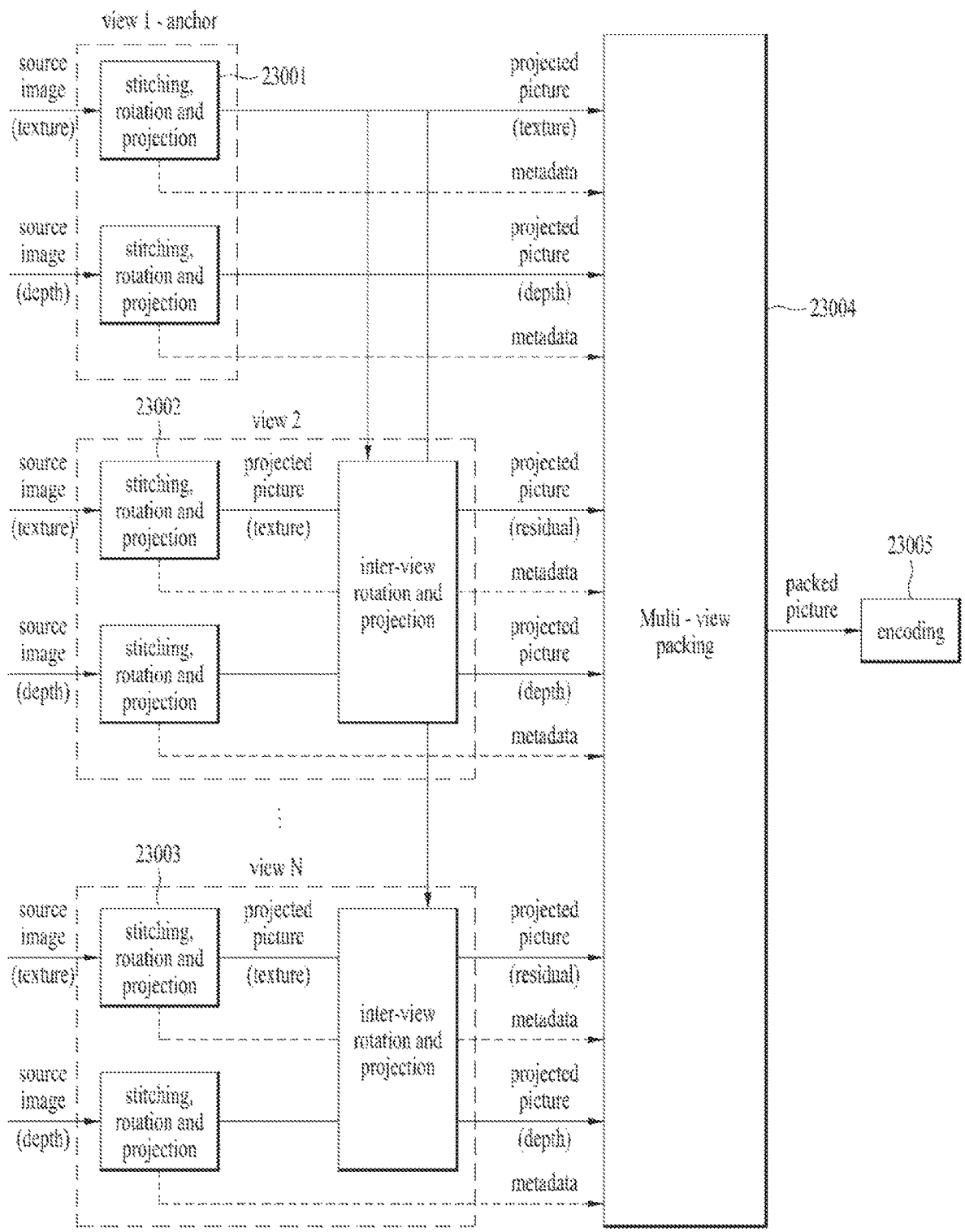
FIG. 23 is a block diagram of an encoder preprocessing module according to embodiments.

FIG. 23 is a block diagram of an encoder preprocessing module according to embodiments.

The encoder preprocessing module may be referred to as an encoder preprocessor, an encoder end, or an encoding module and may generically refer to a device constituting a video transmission device. That is, the encoder preprocessing module may include an inter-view redundancy remover, a packer, and/or an encoder, which are components included in the above-described video transmission device.

FIG. 23 illustrates a device (and/or operation) for pre-encoding processing (or head motion parallax) for multi-view 3DoF+ video according to embodiments. As described in this figure, respective views (or view pictures) may be composed of different components, textures, and depth maps. The textures and depth maps may mean pictures generated by projected pictures of respective components for respective views. The textures and depth maps may be generated by a stitching/rotation/projection and/or multi-view packing operation according to embodiments.

In the video transmission device (or encoder preprocessing module) according to embodiments, an inter-view redundancy remover according to embodiments (or pruner according to embodiments) may remove redundancy between views (e.g., source view pictures). For example, the redundancy remover (or pruner) or the video transmission device according to embodiments may remove redundancy between an anchor view (or a center view picture) and a right head motion view (e.g., a source view picture for a specific viewing position) to generate a sparse view picture (and/or related signaling information), related to the right head motion view. Alternatively, the redundancy remover (or pruner) or the video transmission device according to embodiments may remove redundancy between the anchor view (or the center view picture) and a depth picture (or a picture related to another component) to generate a sparse view picture (and/or related signaling information), related to the depth picture (or the picture related to another component).

The video transmission device according to embodiments may maximize transmission efficiency of the transmission device by removing redundancy between views (e.g., source view pictures, projected pictures, and/or sparse view pictures) and provide 360-degree images like real images to users with a small amount of data by increasing bit efficiency (or bit rate).

When inter-view redundancy removal is performed on such projected pictures or source view pictures, the pictures may be packed on a 2D image. That is, projected pictures (textures, residuals, and/or depths) for respective views (i.e., multiple views) may be packed on the 2D image by a packer or a multi-view packer 23004 according to embodiments. A picture on the 2D image, into which projected pictures (i.e., textures, residuals, and/or depths) for respective views are packed, may be referred to as a packed picture.

The packed picture may be encoded by an encoder 23005 according to embodiments. The encoder according to embodiments may encode, for example, the above-described packed picture by a single layer video encoder. The single layer video encoder may be, for example, an HEVC or a future video codec.

Specifically, FIG. 23 is a block diagram of a video transmission device according to embodiments. The video transmission device according to embodiments may mean a structure of a pre-encoding process for a multi-view 3DoF+ video. The video transmission device according to embodiments may include a processor 23001 for view 1 to a processor 23003 for view N, the multi-view packer 23004, and the encoder (or encoding module) 23005.

The processor 23001 for view 1 may perform stitching/rotation/projection, according to embodiments, for each of a texture source image and/or a depth source image, corresponding to view 1, and generate a texture projected picture for the texture source image and/or a depth projected picture for the depth source image. Here, view 1 may mean an anchor view according to embodiments. The anchor view may be referred to as a center view picture or a center view which is to be described later.

Upon performing stitching/rotation/projection according to embodiments on each of the texture source image and/or the depth source image corresponding to view 1, the processor 23001 for view 1 may generate metadata for view 1. Here, the metadata for view 1 may include signaling information about a method of performing stitching, rotation for view 1, and/or projection. The metadata for view 1 may include reconstruction parameters according to embodiments.

The processor 23002 for view 2 may perform stitching/rotation/projection according to embodiments on each of a texture source image and/or a depth source image corresponding to view 2, rather than view 1 (i.e., anchor view) according to embodiments, and generate a texture projected picture for the texture source image and/or a depth projected picture for the depth source image. The processor for view 2 may further perform inter-view redundancy removal according to embodiments on the texture projected picture to generate a residual projected picture. The residual projected picture may mean a reference view picture and/or a sparse view picture which is to be described later. In this case, an inter-view redundancy remover according to embodiments may generate the residual projected picture based on the texture projected picture corresponding to view 1 (i.e., anchor view).

Similarly, upon performing stitching/rotation/projection according to embodiments on each of the texture source image and/or the depth source image corresponding to view 2, the processor 23002 for view 2 may generate metadata for view 2. Here, the metadata for view 2 may include signaling information about a method of performing stitching, rotation for view 2, and/or projection. The metadata for view 2 may include the reconstruction parameters according to embodiments.

The processor 23003 for view N may perform stitching/rotation/projection according to embodiments on each of a texture source image and/or a depth source image corresponding to view N, rather than view 1 (i.e., anchor view) according to embodiments, and generate a texture projected picture for the texture source image and/or a depth projected picture for the depth source image. The processor for view N may further perform inter-view redundancy removal according to embodiments on the texture projected picture to generate a residual projected picture. The residual projected picture may mean a reference view picture and/or a sparse view picture which is to be described later. In this case, the inter-view redundancy remover according to embodiments may generate the residual projected picture based on the texture projected picture corresponding to view 1 (i.e., anchor view).

Similarly, upon performing stitching/rotation/projection according to embodiments on each of the texture source image and/or the depth source image corresponding to view N, the processor 23003 for view N may generate metadata for view N. Here, the metadata for view N may include signaling information about a method of performing stitching, rotation for view N, and/or projection. The metadata for view N may include the reconstruction parameters according to embodiments.

The multi-view packer 23004 may generate a packed picture by packing the texture projected picture, the depth projected picture, and the metadata for view 1 generated from the processor 23001 for view 1, the texture projected picture, the depth projected picture, and the metadata for view 2 generated from the processor 23002 for view 2, . . . , and the texture projected picture, the depth projected picture, and the metadata for view N generated from the processor 23001 for view N. The multi-view packer 23004 may mean a packer according to embodiments and may be referred to as a multi-view packing module.

The encoder 23005 may encode the packed picture generated from the multi-view packer 23004 according to embodiments. The encoder may mean an encoder according to embodiments. The encoder may perform encoding by a single-layer video encoder such as an HEVC or a future video codec or by a device corresponding to the single-layer video encoder.

According to embodiments, each of the processor 23001 for view 1, the processor 23002 for view 2, . . . , the processor 23003 for view N, the multi-view packer 23004, and/or the encoder 23005 may correspond to hardware. According to embodiments, the video transmission device may perform a processing operation based on the processor for view 1, a processing operation based on the processor for view 2, a processing operation based on the processor for view N, a multi-view packing operation, and/or an encoding operation.

Therefore, a video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

Accordingly, the transmission/reception device according to embodiments may reduce bandwidth for transmitting a 3DoF+ video and a storage space of a storage device and ensure a 3DoF+ video of high quality that provides head motion parallax and/or binocular parallax.

In addition, this configuration enables a receiver to generate a video or different viewpoints with head motion parallax and/or binocular parallax so that the receiver may generate an interactive video with a changed position.

Figure 24:
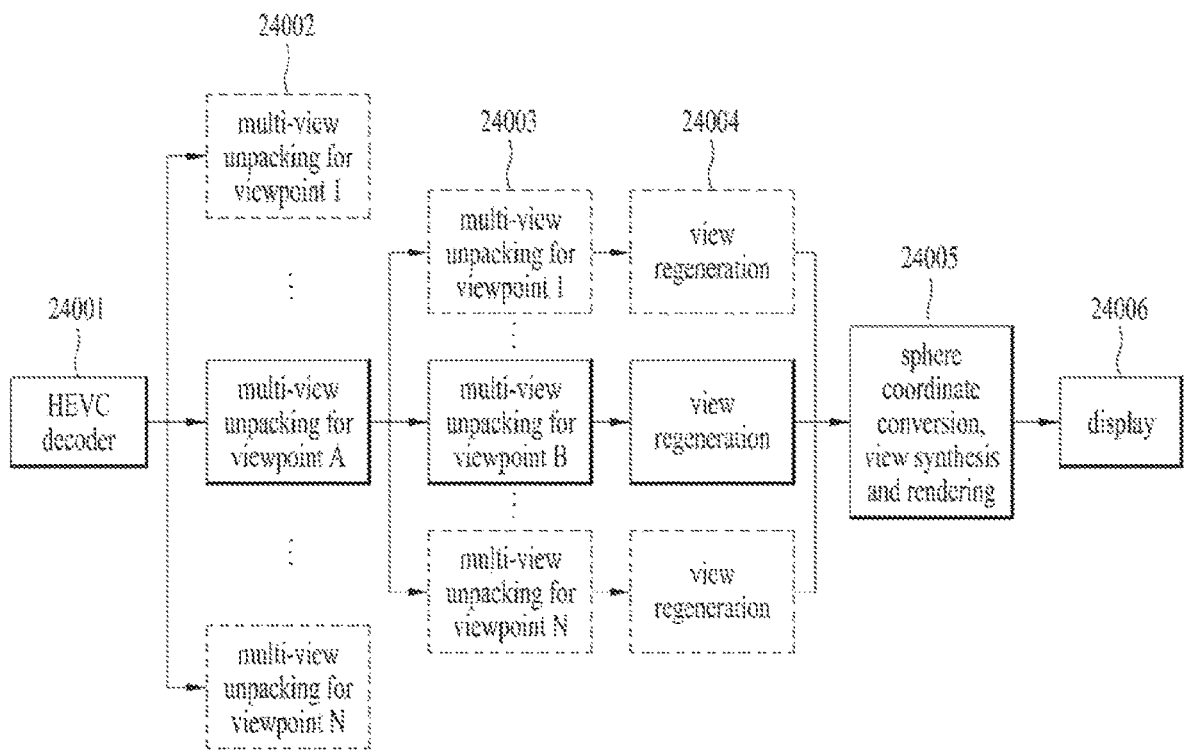
FIG. 24 is a block diagram of a decoder post-processing module according to embodiments.

FIG. 24 is a block diagram of a decoder post-processing module according to embodiments.

The decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

FIG. 24 illustrates a post-decoder processor according to embodiments, for receiving and processing a multi-view 3DoF+ video. The post-decoder processor according to embodiments receives a bitstream including the multi-view 3DoF+ video and generates a plurality of projected pictures representing views for respective viewpoints.

In this case, the video reception device according to embodiments may not necessarily display all viewing positions (or all received pictures). Accordingly, the video reception device according to embodiments may perform regeneration and synthesis by decoding a target projected picture based on information about a viewpoint and/or a viewing position of a viewer. That is, the video reception device may not decode or unpack pictures other than the target projected picture among all pictures included in the received bitstream. Here, the target projected picture may be referred to as a target view picture.

In other words, the video reception device according to embodiments may reference the viewing position and/or viewpoint information for a viewer in order to generate or synthesize the target view picture. Accordingly, some or all components included in the video reception device according to embodiments may perform operations based on the viewing position and/or viewpoint information for a viewer.

For example, an unpacker 24003 according to embodiments may unpack only view pictures related to a viewer among received view pictures. In this case, the unpacker according to embodiments may perform unpacking based on the viewing position and/or viewport information for a viewer. As another example, the unpacker 24003 according to embodiments may select a view B for a viewpoint A from among a plurality of viewpoints and a plurality of views corresponding to the viewpoints to generate (or extract) a texture, a residual, and/or a depth map included in the view B.

When the selected and generated (extracted) view is not a full view displayed on the reception device according to embodiments, the reception device according to embodiments may reconstruct (i.e., regenerate and/or synthesize) a target view by performing a texture depth regeneration process and/or a view regeneration process. The process of reconstructing the target view by the reception device according to embodiments may be performed using some or all of textures, depths, and/or residuals included in the corresponding view or other views.

Specifically, FIG. 24 is a block diagram of the video reception device according to embodiments. The video reception device according to embodiments may mean a structure of a post-decoder process for a multi-view 3DoF+ video. The video reception device according to embodiments may include a decoder 24001, a multi-view unpacker 24002 for one or more viewpoints, the unpacker 24003 for one or more views, a view regenerator 24004 for a view, a spherical coordinate converter/view synthesizer/renderer 24005, and a display 24006.

An HEVC decoder 24001 may decode a bitstream input to the video reception device. The HEVC decoder may mean a decoder according to embodiments. The HEVC decoder may generate or output multiple views for one or more viewpoints.

The multi-view unpacker 24002 for one or more viewpoints may select (or unpack) pictures (or views) for respective viewpoints included in the decoded bitstream.

The multi-view unpacker 24003 for one or more views may select (or unpack) one or more pictures from among the selected views for the viewpoints.

The view regenerator 24004 may generate a regenerated view according to embodiments from one or more views (or pictures) selected by the multi-view unpacker 24002 for one or more viewpoints and/or by the multi-view unpacker 24003 for one or more views.

The spherical coordinate converter/view synthesizer/renderer 24005 may render a picture for an arbitrary viewpoint (or for a target viewing position) using the regenerated view generated by the view regenerator 24004.

The display 24006 may display the rendered picture for the arbitrary viewpoint (or for the target viewing position).

According to embodiments, each of the HEVC decoder 24001, the multi-view unpacker 24002 for one or more viewpoints, the multi-view unpacker 24003 for one or more views, the view generator 24004, the spherical coordinate converter/view synthesizer/renderer 24005, and/or the display 24006 may correspond to hardware, and the video transmission device according to embodiments may perform an operation based on all or part of these elements.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Therefore, the transmission and reception devices according to embodiments may reduce bandwidth for delivering a 3DoF+ video and a storage space of a storage device and achieve a 3DoF+ video of high quality that provides head motion parallax and/or binocular disparity.

In addition, this configuration enables a receiver to generate a video or different viewpoints with head motion parallax and/or binocular parallax so that the receiver may generate an interactive video with a changed position.

Figure 25:
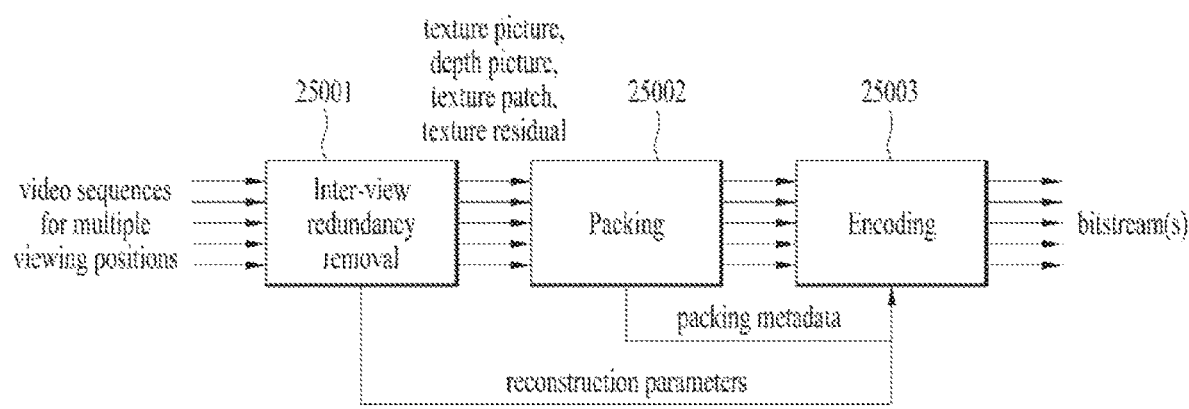
FIG. 25 is a block diagram of an encoder preprocessing module according to embodiments.

FIG. 25 is a block diagram of an encoder preprocessing module according to embodiments.

The encoder preprocessing module may be referred to as an encoder preprocessor, an encoder end, or an encoding module and may generically refer to a device constituting a video transmission device. That is, the encoder preprocessing module may include an inter-view redundancy remover, a packer, and/or an encoder, which are components included in the above-described video transmission device.

FIG. 25 illustrates a device (and/or operation) for pre-encoding processing (or head motion parallax) according to embodiments for a multi-view 3DoF+ video. Pictures included in adjacent viewing positions may have high correlation (or high similarity). Accordingly, views in the viewing positions having high similarity may have unnecessary pixels (i.e., redundant pixels between pictures due to common elements). Accordingly, encoder preprocessing according to embodiments may remove such unnecessary pixels, that is, redundancy. This process may be performed by an inter-view redundancy remover according to embodiments.

When the encoder preprocessing module removes the above-described redundancy, fewer picture(s) are used to estimate the above-described removed pixels. That is, fewer picture(s) remaining after the encoder preprocessing module removes the above-described redundancy include information (or pixels) representing elements that are unpredictable or difficult to predict.

In this case, information about viewing positions of the preserved (i.e., remaining) pictures, information about other viewing positions, and information about how other views are generated (derived) from the preserved pictures may be generated by signaling information or other pictures. In addition, information about an anchor view (or center view), which is representative of the entire viewing positions, may be generated. Signaling information including the information about the anchor view may be included in reconstruction parameters. Reconstruction information may be included in a view regenerator information SEI message or a texture depth regeneration information SEI message.

When the encoder preprocessing module removes the above-described redundancy, pictures from which redundancy has been removed may be packed into one or more pictures. That is, the remaining pictures (i.e., reference view pictures, sparse view pictures, patches, residuals, etc.) may be packed. In this case, the encoder preprocessing module may generate information about packing. For example, when pictures are packed, the information about packing may include information about locations, information about sizes, and information about pixel types with respect to specific pictures (or patches, residuals, reference view pictures, sparse view pictures, etc.). Such information may be referred to as packing metadata and may be transmitted by a multi-view region-wise packing information SEI message.

Specifically, FIG. 25 is a block diagram of the video transmission device according to embodiments. In more detail, the video transmission device according to embodiments may include an encoder preprocessing module. The video transmission device according to embodiments may include an inter-view redundancy remover 25001, a packer 25002, and/or an encoder 25003.

The encoder preprocessing module may be referred to as an encoder preprocessor, an encoder end, or an encoding module and may generically refer to a device constituting the video transmission device. That is, the encoder preprocessing module may include the inter-view redundancy remover 25001, the packer 25002, and/or the encoder 25003, which are components included in the above-described video transmission device.

The inter-view redundancy remover 25001 receives video sequences for a plurality of viewing positions and removes redundancy between adjacent views for the viewing positions included in the video sequences. The inter-view redundancy remover 25001 may output texture pictures, depth pictures, texture patches, and/or texture residuals from which redundancy between views have been removed. Here, the video sequences for the viewing positions may mean or include images or source images for the viewing positions.

In this case, the inter-view redundancy remover may generate reconstruction parameters. The reconstruction parameters may mean signaling information needed to perform view regeneration of a reception end according to embodiments. For example, the reconstruction parameters may include all or part of parameters included in a viewing position group information SEI message syntax shown in FIG. 31.

The packer 25002 packs the pictures (texture pictures, depth pictures, texture patches, and/or texture residuals) generated from the inter-view redundancy remover 25001 and generates one or more packed pictures. The packer may further generate packing metadata. The packing metadata may mean signaling information needed to perform unpacking according to embodiments. For example, the packing metadata may include all or part of parameters included in the viewing position group information SEI message syntax shown in FIG. 31.

The encoder 25003 may output bitstreams by encoding the packed pictures received from the packer. The encoder may mean the encoder according to FIG. 23 or according to the above-described embodiments. The encoder may further encode not only the packed pictures but also the packing metadata and/or the reconstruction parameters according to embodiments.

According to embodiments, each of the inter-view redundancy remover 25001, the packer 25002, and the encoder 25003 may correspond to hardware. According to embodiments, the video transmission device may perform the redundancy removal, packing, and/or encoding operation.

A video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

Therefore, the transmission and reception devices according to embodiments may reduce bandwidth for delivering a 3DoF+ video and a storage space of a storage device and achieve a 3DoF+ video of high quality that provides head motion parallax and/or binocular disparity.

In addition, this configuration enables a receiver to generate a video or different viewpoints with head motion parallax and/or binocular parallax so that the receiver may generate an interactive video with a changed position.

Figure 26:
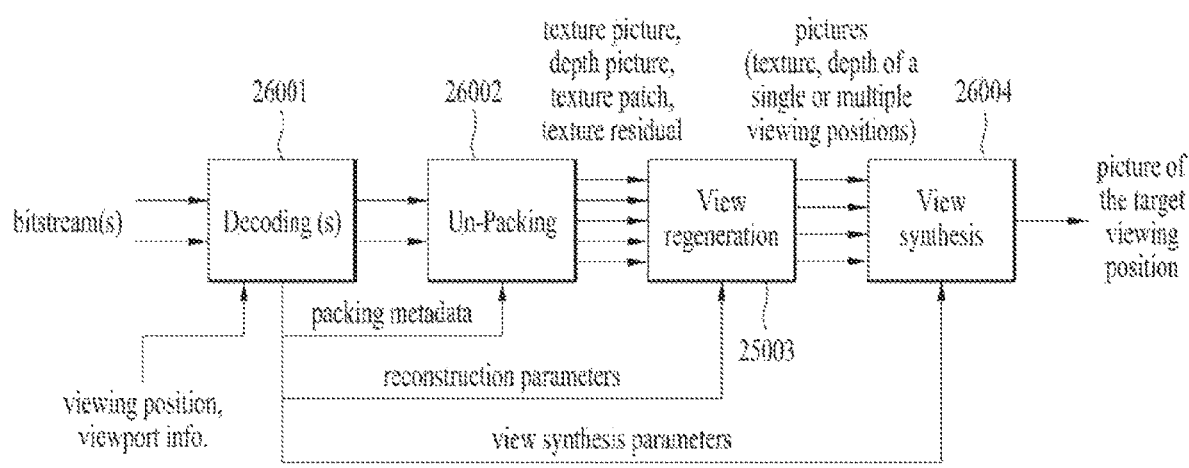
FIG. 26 is a block diagram of a decoder post-processing module according to embodiments.

FIG. 26 is a block diagram of a decoder post-processing module according to embodiments.

The decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

FIG. 26 is a block diagram of a decoder post-processing module for a multi-view 3DoF+ video.

The decoder post-processing module (or video data reception device) according to embodiments may receive bitstreams and decode the bitstreams by a decoder 26001. The decoded bitstreams may be referred to as output pictures.

The output pictures (or decoded bitstreams) may be unpacked by an unpacker 2602. In this case, the unpacker according to embodiments may perform an operation based on packing metadata according to embodiments. When the received bitstreams are decoded, the packing metadata may indicate which pictures among pictures included in the decoded bitstreams should be unpacked and how pictures should be output. For example, the packing metadata according to embodiments may include information about sizes, types, locations, and viewing positions of target pictures.

After the unpacking process is performed, missing pictures that are not included in the unpacked pictures (i.e., pictures for missing viewing positions) may be restored (or regenerated) by a view regeneration and/or view synthesis operation. The view regeneration operation may be referred to as a texture depth regeneration process and/or a texture depth regeneration operation. The view regeneration operation may be performed based on reconstruction parameters. The reconstruction parameters may include information about sizes and locations of unpacked pictures (e.g., patches or residuals), information about a method of estimating removed pixel values, information about a method of regenerating missing pixel values, and post-filtering parameters for block boundary removal.

Using the regenerated pictures, a view synthesizer according to embodiments may synthesize views of viewing positions of viewers into one view.

Specifically, FIG. 26 is a block diagram of the video reception device according to embodiments. The video reception device according to embodiments may include a post-processing module according to embodiments. The video reception device according to embodiments may include the decoder 26001, an unpacker 26002, a view regenerator 26003, and/or a view synthesizer 26004.

The decoder 26001 may generate or output packed views (or pictures) and/or related signaling information by decoding the bitstreams received from the video reception device according to embodiments. The related signaling information output from the decoder may include, for example, packing metadata, reconstruction parameters, and view synthesis parameters. The packing metadata may be signaling information necessary for the unpacker 26002 according to embodiments to perform unpacking. The reconstruction parameters may be signaling information required for the view regenerator 26003 according to embodiments to perform view regeneration. The view synthesis parameters may be signaling information necessary for the view synthesizer 26004 according to embodiments to perform view synthesis. The decoder may perform decoding based on viewing position and/or viewport information of the reception end as information generated within the reception end.

The viewing position and/or viewport information according to embodiments is information about a viewing position and/or a viewport of a viewer. The decoder 26001 according to embodiments may decode all pictures included in the received bitstreams. The decoder 26001 according to embodiments may decode the pictures included in the received bitstreams and decode pictures corresponding to the viewing position and/or viewport information based on the viewing position and/or viewport information. The decoder 26001 according to embodiments may provide an effect of efficiently decoding only pictures related to a viewing position and/or a viewport viewed by a viewer.

The unpacker 26002 may unpack packed views (or packed pictures) included in the bitstreams decoded by the decoder to generate or output one or more texture pictures, depth pictures, texture patches, and/or texture residuals. The unpacker may perform unpacking based on the packing metadata included in signaling information included in the bitstreams decoded by the decoder. For example, the packing metadata may include all or part of parameters included in the viewing position group information SEI message syntax shown in FIG. 31.

The view regenerator 26003 may generate or output regenerated views based on the one or more texture pictures, depth pictures, texture patches, and/or texture residuals generated/output from the unpacker. The regenerated views may mean texture pictures of a single viewing position or multiple viewing positions and/or depth pictures of a single viewing position or multiple viewing positions. In this case, the view regenerator 26003 may perform view regeneration based on the reconstruction parameters included in the signaling information included in the bitstreams decoded by the decoder. The reconstruction parameters may include all or part of the parameters included in the viewing position group information SEI message syntax shown in FIG. 31.

The view synthesizer 26004 may generate a picture of a target viewing position based on the regenerated views generated by the view regenerator. The picture of the target viewing position may mean a picture for an arbitrary viewing position. In this case, the view synthesizer performs view synthesis based on the view synthesis parameters, according to embodiments, included in the signaling information included in the bitstream decoded by the decoder. The view synthesis parameters may mean signaling information needed to perform view synthesis according to embodiments. The view synthesis parameters may include all or part of the parameters included in the viewing position group information SEI message syntax shown in FIG. 31.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Therefore, the transmission and reception devices according to embodiments may reduce bandwidth for delivering a 3DoF+ video and a storage space of a storage device and achieve a 3DoF+ video of high quality that provides head motion parallax and/or binocular disparity.

In addition, this configuration enables a receiver to generate a video or different viewpoints with head motion parallax and/or binocular parallax so that the receiver may generate an interactive video with a changed position.

Figure 27:
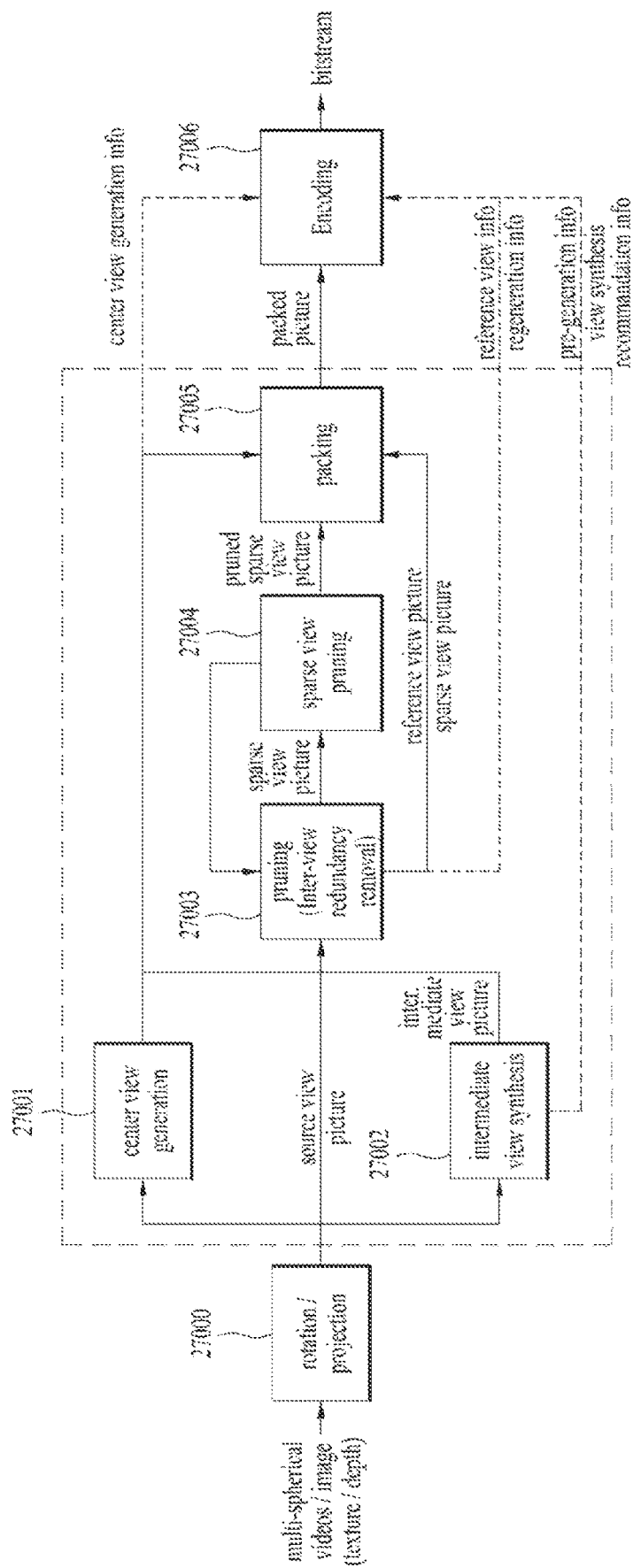
FIG. 27 is a block diagram of an encoder preprocessing module according to embodiments.

FIG. 27 is a block diagram of an encoder preprocessing module according to embodiments.

The encoder preprocessing module may be referred to as an encoder preprocessor, an encoder end, or an encoding module and may generically refer to a device constituting a video transmission device. That is, the encoder preprocessing module may include an inter-view redundancy remover, a packer, and/or an encoder, which are components included in the above-described video transmission device.

FIG. 27 illustrates an inter-view redundancy remover of an encoder preprocessing module according to embodiments.

A center view generator (or center view generation) 27002 generates a center view for a group of viewing positions from received pictures (e.g., source view pictures). The center view generator according to embodiments may generate a center view picture and/or further generate center view generation information. Specifically, the center view picture may mean a spherical video/image for a center position of a multi-spherical video/image. In addition, when the center view picture is included or is not included in an input image, the center view picture may be generated by generating a virtual viewpoint of the center view generator according to embodiments.

An intermediate view synthesizer (or intermediate view synthesis) 27003: If the transmission device according to embodiments uses views generated based on source views (or provided views), an intermediate view may be synthesized. According to embodiments, the intermediate view synthesizer may output intermediate views including additional information of pre-generation information. Furthermore, the transmission device according to embodiments may transmit information related to intermediate view synthesis to the decoder post-processing module.

A pruner (or pruning) 27004: The pruner according to embodiments may remove redundancy between pictures using a source view, a center view, and/or an intermediate view according to embodiments. The pruner according to embodiments may generate sparse view pictures and reference view pictures. The sparse view picture means a picture containing unpredictable information (i.e., including unique information/pixels) for a specific viewing position. That is, the sparse view picture may represent a picture from which information which is commonly present between a plurality of pictures to be pruned has been removed. The reference view picture may mean a picture that may provide basic information/pictures for a specific viewing position. The pruner may generate reference view information and/or regeneration information according to embodiments.

A sparse view pruner (or sparse view pruning) 27005: The sparse view pruner may remove redundancy between sparse view pictures using the sparse view pictures generated from the pruner according to embodiments. The sparse view pruner according to embodiments may generate pruned sparse view picture(s) and/or related metadata. The related metadata may include information about a target viewing position of a corresponding viewing position, information about a reference sparse view, and a sparse view regeneration method. For example, the related metadata may include target_view_id, component_id, component_type, pruned_sparse_view_present_flag, reference_sparse_view_present_flag sparse_view_regeneration_type, output_sparse_view_id, pruned_sparse_view_id, and reference_sparse_view_id.

The video transmission device (or the encoder preprocessing module, encoder module, or encoding end) according to embodiments includes a rotator/projector 27001, the center view generator (or center view generation module or center view generation) 27002, the intermediate view synthesizer 27003, a pruner 27004, a sparse view pruner 27005, a packer 27006, and/or an encoder 27007.

The rotator/projector (or rotation/projection) 27001 according to embodiments rotates and/or projects a multi-spherical video/image (multi-spherical video/image data)

including a texture/depth picture. Picture(s) of the multi-spherical video/image (texture/depth) may be rotated and/or projected. Outputs of the rotator/projector are pictures (texture/depth) and/or the rotated/projected pictures that may be referred to as source view pictures according to embodiments.

The center view generator 27002 according to embodiments generates a center view picture from the rotated/projected pictures and/or pictures (texture/depth) and generates signaling information including center view generation information related to profiles/characteristics of the center view picture.

The intermediate view synthesizer 27003 synthesizes an intermediate view picture from the rotated/projected pictures and/or the pictures (texture/depth) (source view pictures) and generates signaling information including pre-generation information and/or view synthesis recommendation information. The signaling information may be used to decode data in a receiver (decoder).

The pruner 27004 according to embodiments prunes redundancy between pictures. Pruning represents removing redundancy between views. This process may be referred to as inter-view redundancy removal. According to embodiments, inputs of the pruner include the center view picture, the source view picture, and/or the intermediate view picture. Furthermore, pruned sparse view(s) may be input to the pruner. The pruner generates signaling information including reference view information and/or regeneration information that may be used to decode data in the receiver (decoder). The signaling information includes information related to pruning in order to regenerate views. According to embodiments, outputs of the pruner include a sparse view picture, a reference view picture, and/or a sparse view picture. According to embodiments, a view may be referred to as a view picture.

The sparse view pruner 27005 prunes redundancy between pictures. Sparse view pruning represents removing redundancy between sparse views (sparse view pictures). According to embodiments, pruning removes redundancy between reference views, whereas sparse view pruning removes redundancy between sparse views. The sparse view pruner may efficiently remove redundancy between views, thereby improving encoding and/or transmission performance In accordance with embodiments, outputs of the sparse view pruner are pruned sparse view pictures and some of the pruned sparse view pictures may be provided to the pruner.

The packer (or packing) 27006 packs pictures, for example, a center view picture, a pruned sparse view picture, a reference view picture, and/or a sparse view picture. An output of the packer is a packed picture.

The encoder (or encoding) 27007 encodes, for example, the packed picture and/or the signaling information including center view generation information, reference view information, regeneration information, pre-generation information, and/or view synthesis recommendation information. In accordance with embodiments, the encoded data is transmitted in the form of bitstream(s).

In accordance with embodiments, the preprocessor (encoder preprocessing module) includes the rotator/projector, the center view generator, the intermediate view synthesizer, the pruner, the sparse view pruner, the packer, and/or the encoder to perform the operation described above.

In accordance with embodiments, the center view picture means a spherical video/image for a center location of a multi-spherical video/image. In accordance with embodiments, the center view picture may be included in input data or may be generated by generating a virtual viewpoint.

In accordance with embodiments, the intermediate view picture means a virtually generated picture. The intermediate view picture is not included in input data (e.g., a multi-spherical video/image). In accordance with embodiments, the pre-generation information and/or the view synthesis recommendation information is included in a viewing position group information SEI message syntax related to viewing_position_picture_type[i]==3, 4 according to embodiments.

In accordance with embodiments, the source view picture and/or the center view picture is used for pruning. The reference view information and/or the regeneration information in accordance with embodiments is included in a viewing position group information SEI message syntax related to viewing_position_picture_type[i]==1 in accordance with embodiments.

In accordance with embodiments, a viewing position group information SEI message is transmitted by an encoder and received by a receiver as signaling information. The viewing position group information SEI message includes views_position_picture_type.

In accordance with embodiments, VIEW_position_picture_type specifies the picture type of an i-th viewing position in terms of picture generation. When viewer_position_picture_type is equal to 0, the i-th viewing position is a center view. When view_position_picture_type is equal to 1, the picture of the i-th viewing position is used as a reference picture in a view regeneration process. When view_position_picture_type is equal to 2, the picture of the i-th viewing position will be generated from the view regeneration process. When views_position_picture_type is equal to 3, the picture of the i-th viewing position is a view pre-generated generated by an encoder preprocessor. When views_position_picture_type is equal to 4, the picture of the i-th viewing position may not be present in the decoded picture and a view synthesis method is recommended with additional information. This may be used to reduce a time consuming process with regard to view synthesis. When views_position_picture_type is equal to 5, the picture of the i-th viewing position may not be present in the decoded picture and an alternative picture from another viewing position is present.

In accordance with embodiments, the sparse view picture means a picture including information which is not predictable when a current viewpoint is predicted based on surrounding viewpoint(s). For example, gray or black region(s) mean duplicate information between a picture for a current viewpoint and a picture for surrounding viewpoint(s). In accordance with embodiments, the duplicate information means predictable information. Therefore, the sparse view picture includes unpredictable information.

In accordance with embodiments, a reference viewpoint picture (or reference view picture) means a picture for a surrounding viewpoint used to predict a picture for a current viewpoint. In accordance with embodiments, a source view picture/image and/or a picture/image generated by a virtual viewpoint may be used as the reference view picture.

In accordance with embodiments, the sparse view pruner generates signaling information for a sparse view and/or metadata for indicating a target viewing position, a reference sparse view, and a sparse view regeneration method type, for example, information such as target_view_id, component_id, component_type, pruned_sparse_view_present_flag, reference_sparse_view_present_flag_sprese_view_present, output_sparse_view_id, pruned_sparse_view_id, and reference_sparse_view_id.

In accordance with embodiments, the sparse view pruner generates sparse view regeneration information according to embodiments.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

By such a configuration, the video transmission device according to embodiments may efficiently provide a plurality of multi-spherical images representing different positions of a view point.

The pruner and/or the sparse view pruner according to embodiments may reduce the amount of data to be transmitted.

In addition, the pruner (or pruning process) and/or the sparse view pruner (or sparse view pruning) of the video transmission device may efficiently and accurately provide necessary views to viewers using a small amount of data. This configuration in accordance with embodiments may reduce computational load of the video transmission device and the video reception device.

Figure 28:
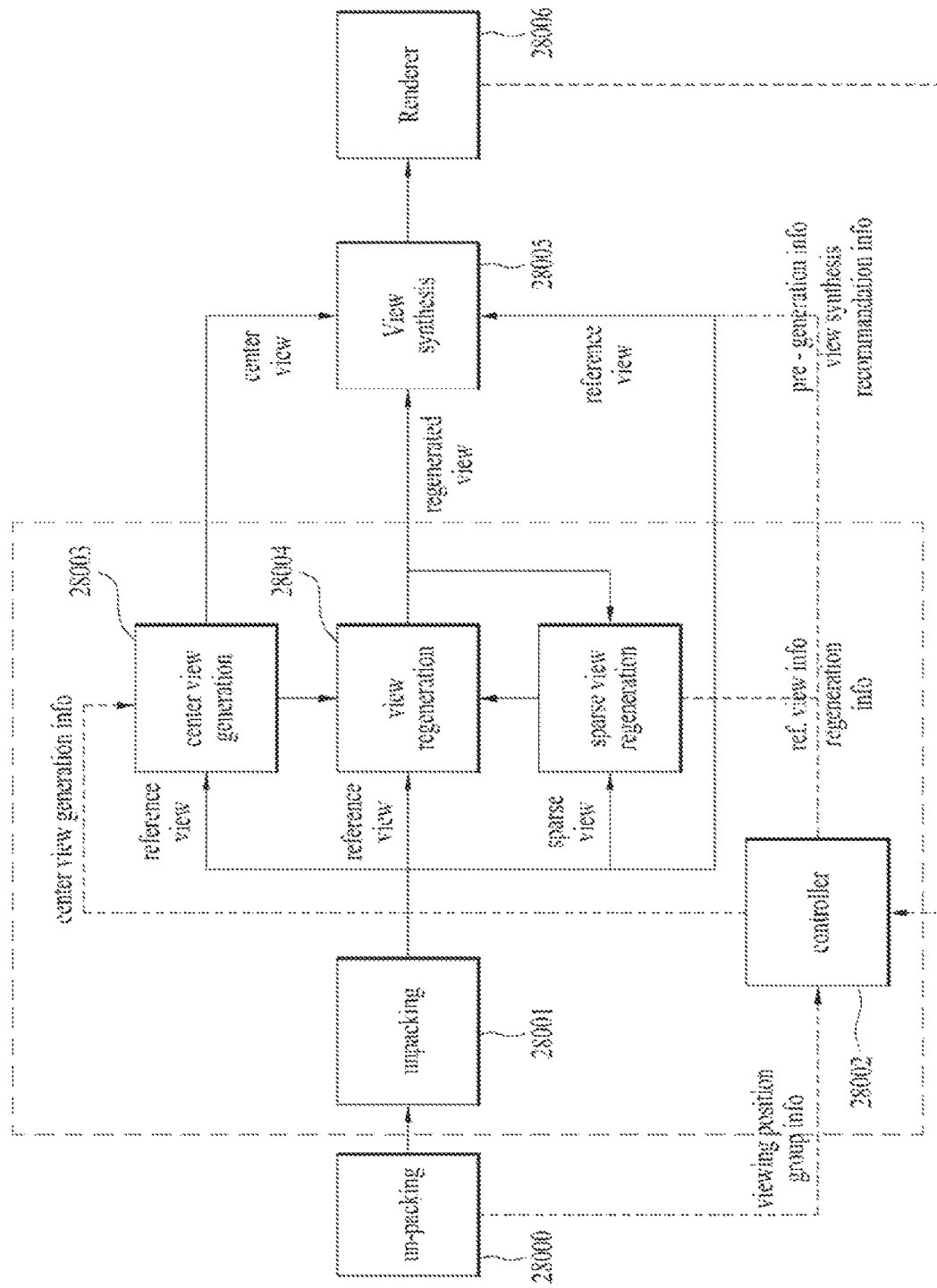
FIG. 28 is a block diagram of a decoder post-processing module according to embodiments.

FIG. 28 is a block diagram of a decoder post-processing module according to embodiments.

The decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

The decoder post-processing module according to embodiments may determine a viewing position related to view synthesis performed by a view synthesizer according to a viewpoint of a viewer. Thereafter, the decoder post-processing module may determine an operation for each viewing position and/or an operation order in a receiver.

For example, when a sparse view regeneration SEI message is present, a sparse view regeneration operation may be performed according to sparse_view_regeneration_type information for each viewing position. Next, post-processing may be performed on all components indicated by component_id and component_type corresponding to target_view_id. An example of a sparse view regeneration operation which may be performed based on the sparse_view_regeneration_type information is described below.

Figure 35:
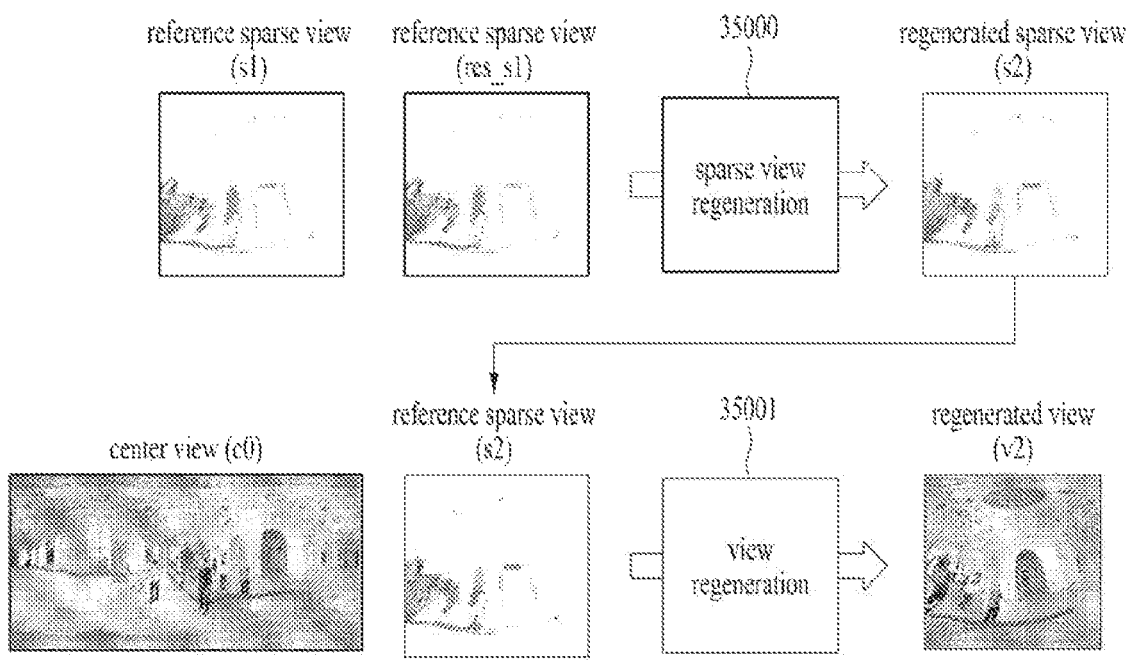
FIG. 35 illustrates a decoder post-processing scheme according to embodiments using a view regenerator and/or a sparse view regenerator according to embodiments.

When sparse_view_regeneration_type is equal to 1, the sparse view regeneration operation may be performed based on FIG. 35. The reference sparse view s1 and the pruned sparse view res_s1 in FIG. 35 are indicated by reference_sparse_view_id and pruned_sparse_view_id, respectively. In predicting the regenerated view in FIG. 35, disparity between views may be calculated using the locations, rotation, and coverage of a reference sparse view picture and a target view indicated by view_position_descriptor( ). In predicting the regenerated view in FIG. 35, disparity between views may be calculated using the location, rotation, and coverage of the reference sparse view and the location, rotation, and coverage of the target view. The location, rotation, and coverage of the reference sparse view and the location, rotation, and coverage of the target view may be indicated by view position descriptor information (i.e., view_position_descriptor( )) corresponding to reference_sparse_view_id and target_view_id, respectively.

Figure 36:
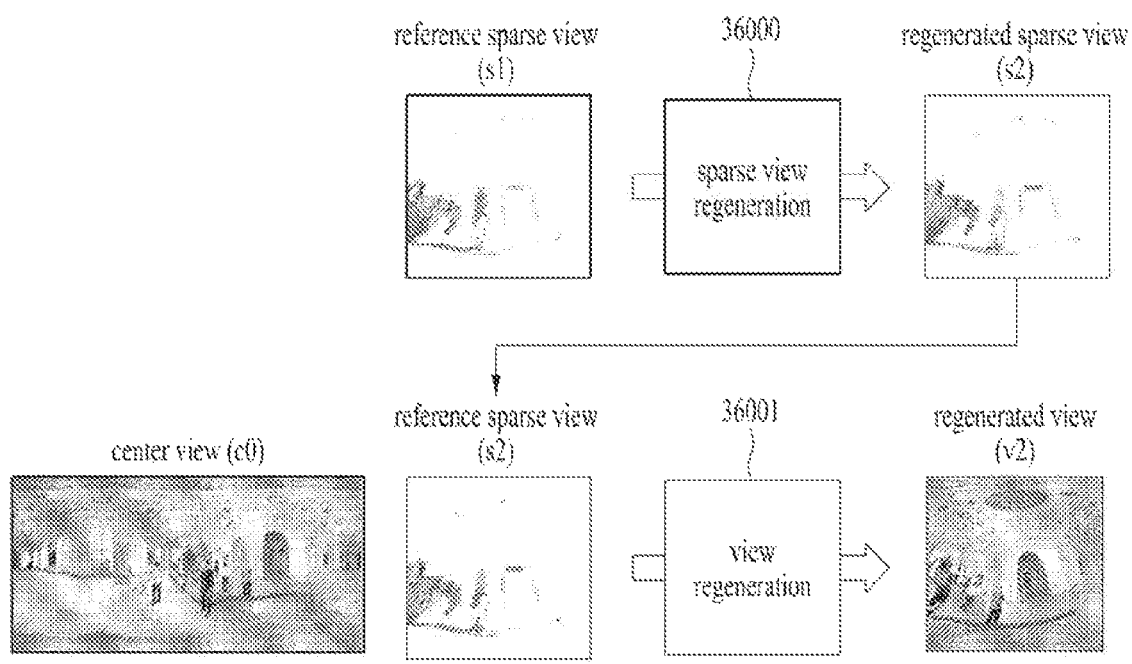
FIG. 36 illustrates a decoder post-processing scheme according to embodiments using a view regenerator and/or a sparse view regenerator according to embodiments.

When sparse_view_regeneration_type is equal to 2, the sparse view regeneration operation may be performed based on FIG. 36. The reference sparse view s1 in FIG. 36 may be indicated by reference_sparse_view_id. In predicting the regenerated view in FIG. 36, disparity between views may be calculated using the locations, rotation, and coverage of a reference sparse view picture and a target view indicated by view_position_descriptor( ). In predicting the regenerated view in FIG. 36, disparity between views may be calculated using the location, rotation, and coverage of the reference sparse view and the location, rotation, and coverage of the target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

Figure 37:
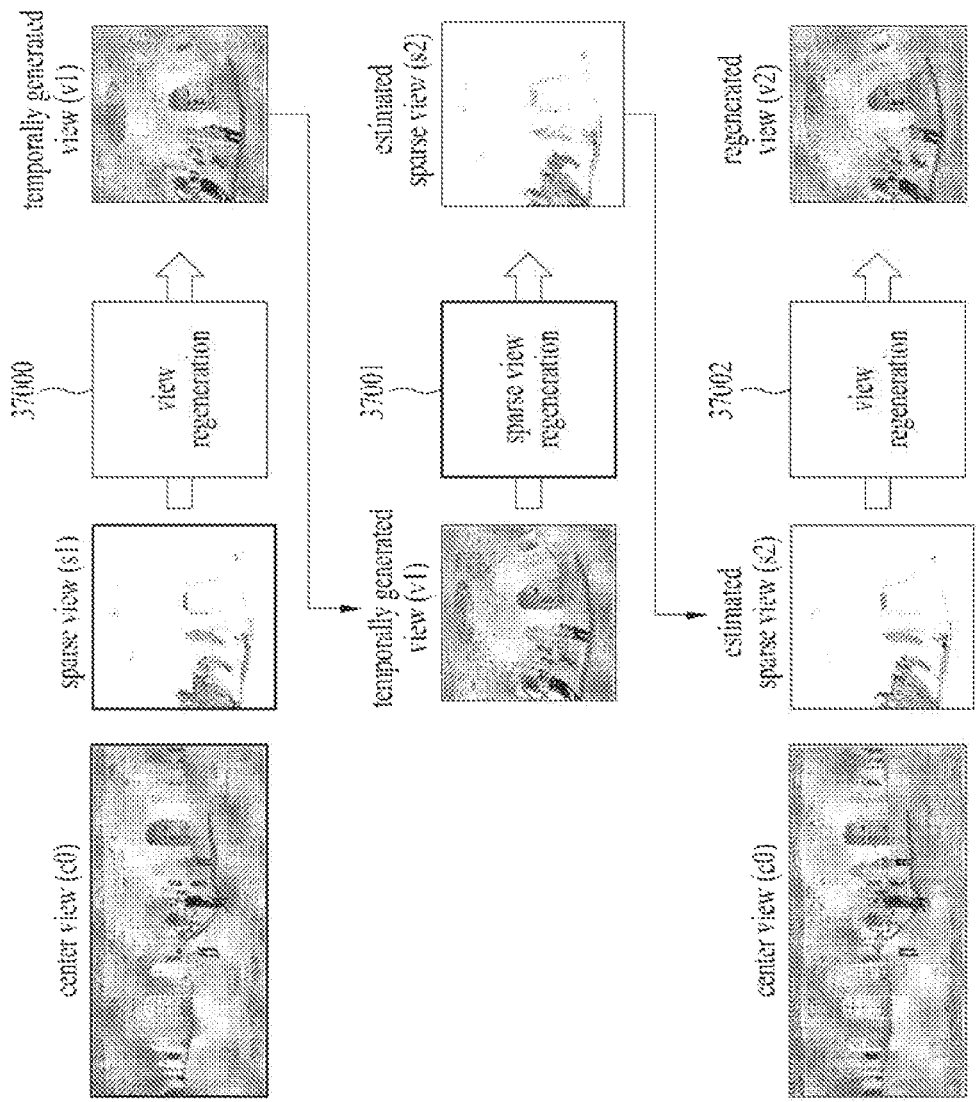
FIG. 37 illustrates a decoder post-processing scheme according to embodiments using a view regenerator and/or a sparse view regenerator according to embodiments.

When sparse_view_regeneration_type is equal to 3, the sparse view regeneration operation may be performed according to FIG. 37. The reference sparse view s1 in FIG. 37 may be indicated by reference_sparse_view_id. Prior to performing the sparse view regeneration operation according to embodiments, the temporally regenerated view v1 may be generated. The temporally regenerated view may be referred to as a reference view. In predicting the sparse view s2 in FIG. 37, disparity between views may be calculated using the location, rotation, and coverage of the reference sparse view and the location, rotation, and coverage of a target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

Figure 38:
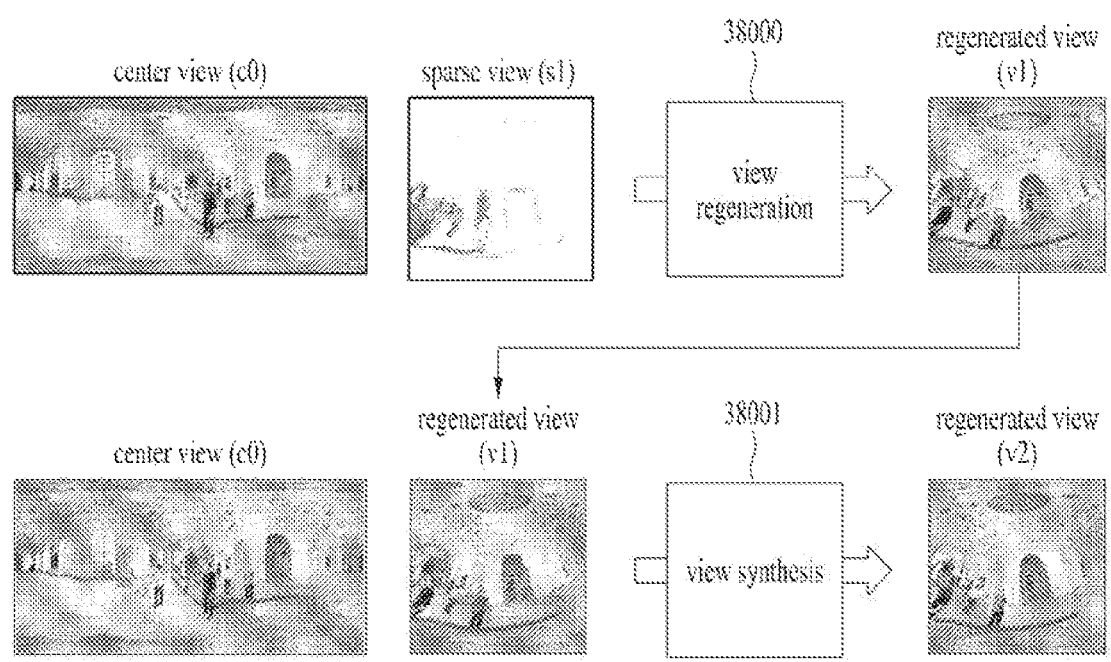
FIG. 38 illustrates a decoder post-processing scheme according to embodiments using a view regenerator and/or a sparse view regenerator according to embodiments.

When sparse_view_regeneration_type is equal to 4, the sparse view regeneration operation may be performed based on FIG. 38. The reference sparse view s1 in FIG. 38 may be indicated by reference_sparse_view_id. When the decoder post-processing module according to embodiments regenerates a reference view, a target view may be regenerated by an operation of the view synthesizer. In performing view synthesis, disparity between views may be calculated using the location, rotation, and coverage of the reference view (i.e., regenerated picture v1) and the location, rotation, and coverage of the target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

View position group information transmitted by the encoder preprocessing module according to embodiments may be parsed by the controller 2806 according to embodiments. The controller may control the entire viewport generation operation by determining which viewing position is used, which view regeneration operation and/or view synthesis operation method is performed, and in which order view regeneration and/or view synthesis is performed. For example, if a viewer wants to view a picture at a position that is exactly the same as a center position or a reference picture position, unpacking may be performed by selecting only the corresponding picture (a center view picture or a reference view picture).

However, if the center position is not generated by the encoder preprocessing module, the controller according to embodiments may control the center view generator according to embodiments so as to generate a center view from received reference views.

In addition, for example, since a corresponding viewing position is not for a full picture, an additional operation for the full picture may be required. In this case, the controller according to embodiments may control the view generator and/or the center view generator according to embodiments. That is, the controller may control the view generator and/or the center view generator according to embodiments using related metadata. Here, the metadata may be signaled by the encoder preprocessing module, and the decoder post-processing module according to embodiments may generate a center view picture, a reference view picture, and/or a sparse view picture based on the metadata.

In this process, the center view picture and/or the reference view picture according to embodiments may be used to generate other views (e.g., target views) according to embodiments. Accordingly, an operation of generating the center view, an operation of generating the reference view, and/or an operation of generating an intermediate view may be performed prior to an operation of a view generator according to embodiments.

If a viewing position of the reception device according to embodiments does not match a regenerated or provided viewing position, pictures for the regenerated and/or provided viewing position may be synthesized. Accordingly, the operation of the view regenerator according to embodiments may precede the operation of the view synthesizer according to embodiments. Here, the above-described processing order may be indicated by viewing_position_picture_type and/or view_position_processing_order_idx.

The video reception device in accordance with embodiments includes a decoder, an unpacker, a controller, a center view generator, a view regenerator, a sparse view regenerator, a view synthesizer, and/or a renderer/viewport generator.

A decoder (or decoding module or decoding) 2800 decodes, for example, received data including pictures and signaling information (including viewing position group information) in a bitstream.

An unpacker (or unpacking module or unpacking) 2802 unpacks pictures, for example, packed pictures in the bitstream.

The controller (or controlling) 2806 controls signaling information in the bitstream, for example, viewing position group information, center view generation information according to embodiments, reference view information according to embodiments, regeneration information according to embodiments, pre-generation information according to embodiments, and/or synthesis recommendation information according to embodiments. The signaling information is used for each operation in post-processing.

A center view generator (or center view generation) 2803 generates a center view picture based on the center view generation information. In accordance with embodiments, when viewing_position_picture_type in the signaling information according to embodiments is equal to 0 or center_view_present_flag is equal to 0, center view generation is processed. Reference viewing positions and parameters for respective viewing positions are given by viewing_position_id and center_view_generation_parameter. Otherwise, if computational complexity is a huge burden on the receiver, an alternative viewing position may be used by given information such as alternative_viewing_position_id, alternative_view_distance, or rec_center_view_generation_method_type.

A view regenerator (or view regeneration or view regeneration module) 2804 regenerates a regenerated view based on reference view(s) and/or sparse view(s). In accordance with embodiments, the sparse views may be transmitted in the bitstream or may be generated by a sparse view regenerator (or sparse view regeneration).

In accordance with embodiments, when viewing_position_picture_type is equal to 1, a picture may be used as a reference picture for another viewing position. In this case, the decoder may store the picture in a buffer together with information about a viewing position that uses this picture given by viewing_position_id. When viewing_position_picture_type is equal to 2, the view regenerator may be used to restore the picture of this viewing position. A reference view and a sparse view that are needed for a regeneration process are indicated by viewing_position_id and picture_id, respectively. The receiver in accordance with embodiments may restore a viewing position intended by the encoder using a regeneration processing method given by view_regeneration_method_type.

A sparse view regenerator (or sparse view regeneration) 2805 regenerates a sparse view picture based on a sparse view picture and signaling information in the bitstream.

A view synthesizer (or view synthesis) 2807 synthesizes a picture and/or a picture for a target viewing position based on a center view (e.g., for center location), a regenerated view picture, and/or a reference view picture (e.g., for surrounding viewpoints and/or signaling information including pre-generation information and/or view synthesis recommendation information).

In accordance with embodiments, when viewing_position_picture_type is equal to 3, a picture is not a source picture but a pre-generated view. The receiver determines whether to use this picture or to synthesize a new picture using a regenerated picture. In this determination, a processing method may be one of determination criteria given by pregeneration_method_type. If the receiver uses this picture, a reference picture given by viewing_position_id and a sparse view given by picture_id are used together with a regeneration method.

In accordance with embodiments, when viewing_position_picture_type is equal to 4, recommended view synthesis information is provided for this viewing position. The recommended view synthesis information includes a synthesis method, parameters, a reference viewing position indicator, and a sparse view presence flag given by ref_view_systhesis_method_type, view_synthesis_parameter, viewing_position_id, and sparse_view_present_flag, respectively.

In accordance with embodiments, when viewing_position_picture_type is equal to 5, a viewing position may be replaced by an alternative view from a source view, a regenerated view, or a synthesized view, indicated by alternative_viewing_position_id.

A renderer/viewport generator (or rendering/viewport generation) 2808 renders a view that is generated by view synthesis and generates viewport information for a viewport that is acquired from a viewer, a display, or a receiver. Viewport information in accordance with embodiments is provided to the controller.

In accordance with embodiments, the post-processing module including the decoder, the unpacker, the center view generator, the view regenerator, the sparse view regenerator, the controller, the view synthesizer, and/or the renderer/viewport generator performs operations as mentioned above.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

By such a configuration, the video transmission device according to embodiments may efficiently provide a plurality of multi-spherical images representing different viewing positions of a viewpoint.

Using the view regenerator according to embodiments, the receiver according to embodiments may provide accurate views like real views to viewers while reducing the amount of data to be received.

The view regenerator of the reception device and/or the sparse view regenerator of the video transmission device may efficiently and accurately provide necessary views to viewers using a small amount of data. This configuration according to embodiments may reduce computational load of the transmission device and the reception device.

Figure 29:
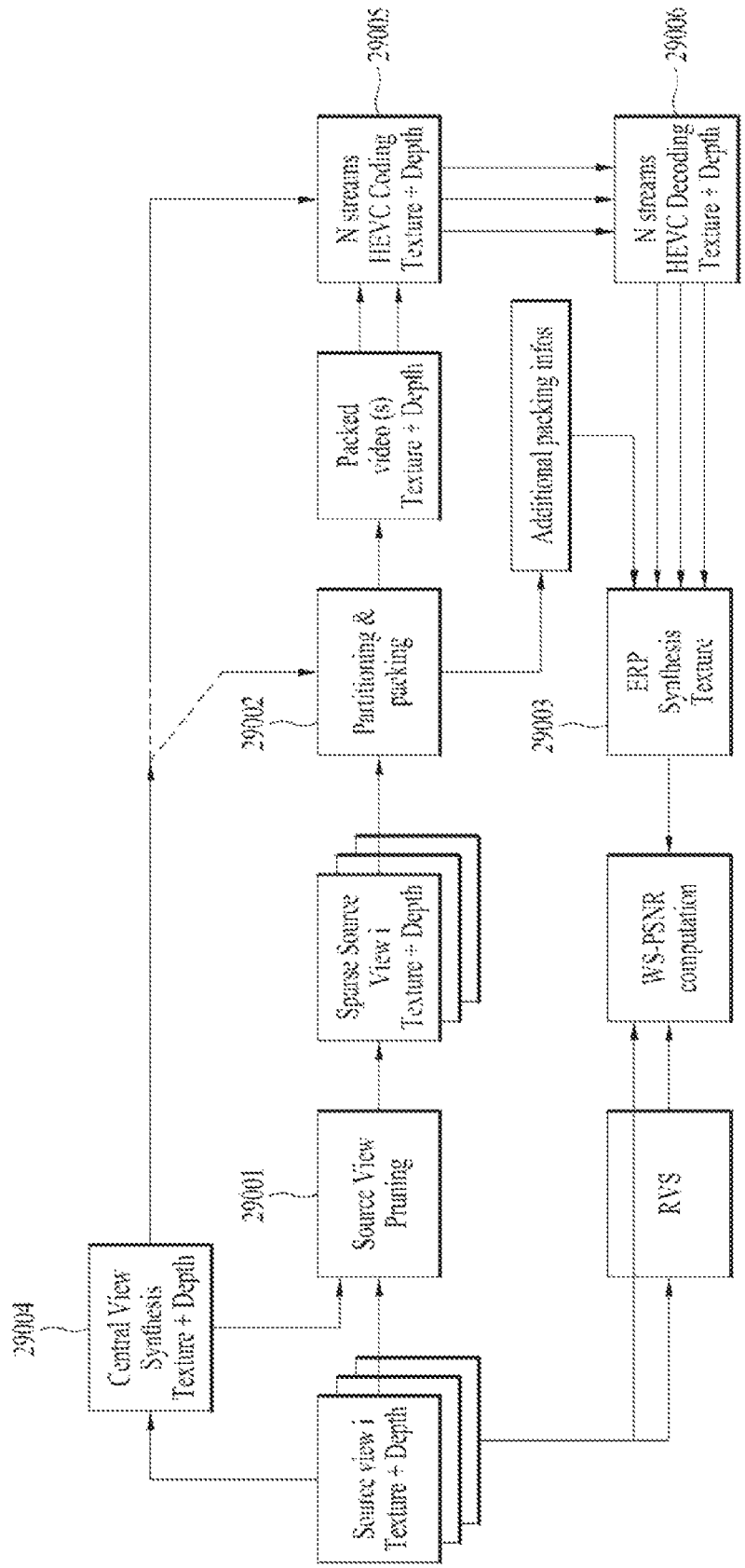
FIG. 29 illustrates a software platform of a video reception device according to embodiments and/or a video transmission device according to embodiments.

FIG. 29 illustrates a software platform of a video reception device according to embodiments and/or a video transmission device according to embodiments.

Central View Synthesizer (or Central View Synthesis Module) 29003

The central view synthesizer in accordance with embodiments generates a plain and full ERP (texture+depth) view in charge of conveying most of visual information. Parameters of the central view synthesizer according to embodiments include information about resolution of a related stream and an exact position of a center view.

Source View Pruner (or Source View Pruning Module) 29001

The source view pruner according to embodiments may use a depth buffer output by the central view synthesizer and discard any pixel already projected. Parameters of this module include information about resolution of a related stream, QP for a texture, and QP for a depth.

Partitioner and Packer (or Partitioning and Packing Module) 29002

When the partitioner and packer according to embodiments is activated, this module browses the totality of sparse source views and implements the following:
  partitions each sparse source view;
  discards empty partitions;
  packs sparse source views in a patch atlas on one or more streams; and
  generates additional information accordingly.

View Synthesizer (or View Synthesis Module) 29006

The view synthesizer according to embodiments generates a final viewport like a reference view synthesizer (RVS). The view synthesizer according to embodiments receives a heterogeneous set of texture+depth videos complemented with previously generated additional information as input. The view synthesizer then synthetizes views in ERP or perspective mode.

In accordance with embodiments, the central view synthesis module, the source view pruning module, the partitioning and packing module, and/or the view synthesis module may correspond to hardware, software and/or processors of a transmitter side.

In accordance with embodiments, the central view synthesizer 29003 generates a center view picture from a source view picture that is acquired from source view pictures or generated from source view pictures virtually.

In accordance with embodiments, the source view pruner 29001 prunes (e.g., removes) redundancy between source view pictures and/or between the source view pictures and the center view picture. Outputs of the source view pruner are a number of sparse source views (including texture and/or depth) (e.g., sparse source view #0, ..., sparse source view #i).

In accordance with embodiments, the sparse views are additionally pruned by the sparse view pruner 29001.

In accordance with embodiments, the partitioner and packer 29002 packs sparse source views and/or sparse views into packed video(s) including texture and/or depth and generates additional packing information that is related to signaling information in accordance with embodiments.

In accordance with embodiments, multiple bitstreams, for example, N streams, are encoded by an HEVC coder 29004.

In accordance with embodiments, N streams and/or signaling information are transmitted.

In accordance with embodiments, the N streams (including texture and/or depth) and/or the signaling information are received at a receiver side.

In accordance with embodiments, an ERP synthesizer 29006 synthesizes views based on the signaling information and the N streams. A view for a target viewing position may be regenerated (predicted).

Figure 30:
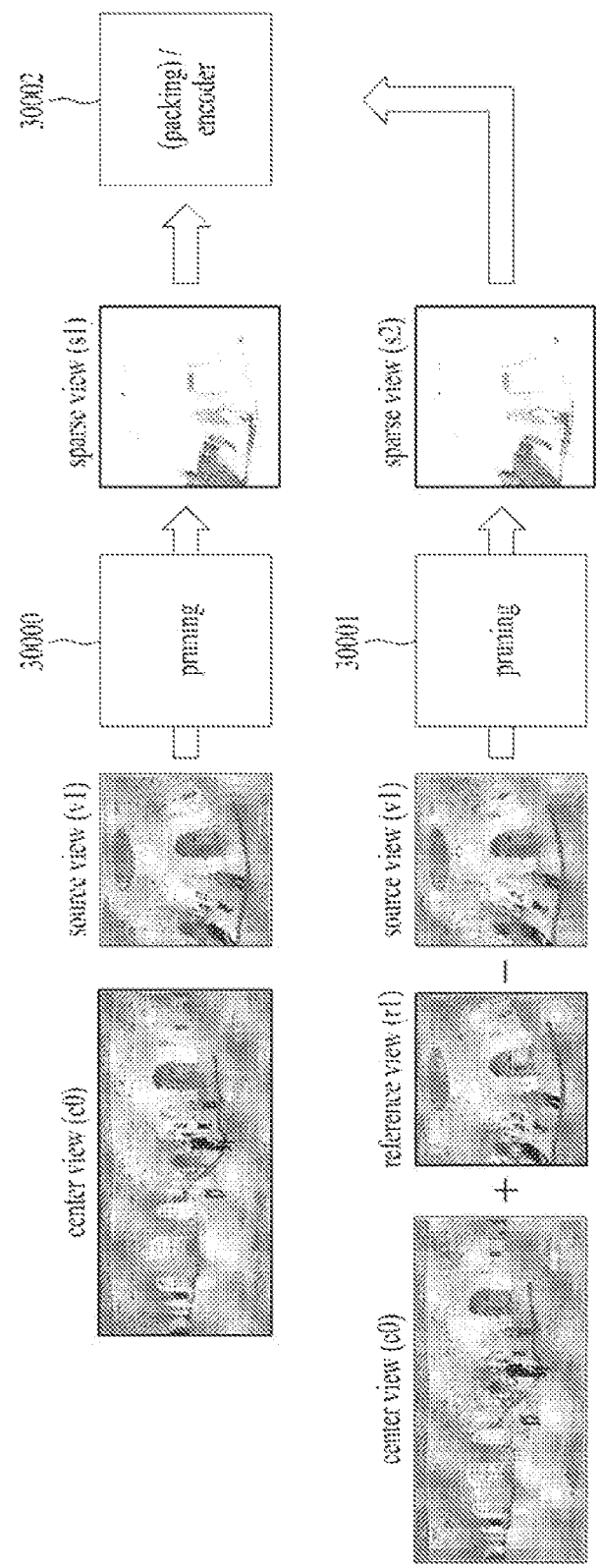
FIG. 30 illustrates an operation of a pruner of an encoder preprocessing module according to embodiments.

FIG. 30 illustrates an operation of a pruner of an encoder preprocessing module according to embodiments.

FIG. 30 illustrates a pruner according to embodiments in which different pruning inputs/outputs are used according to embodiments. As a first example, a first source view v1 according to embodiments may be generated based on one reference view, i.e., a center view picture c0, and a first sparse view s1 may be generated by removing redundancy of the first source view v1. That is, the encoder preprocessing module according to embodiments may generate the first sparse view picture s1 according to the first example.

As a second example, a second source view v2 may be generated using a plurality of reference views, that is, the center view picture c0 and the reference view picture v1. A second sparse view picture may be generated by removing redundancy of the second source view picture v2 described above. That is, the encoder preprocessor according to embodiments may generate the second sparse view picture s2 according to the second example.

In this figure, pictures indicated by bold lines may mean pictures that are packed and/or encoded by a packer and/or an encoder and transmitted by a transmission device according to embodiments. According to embodiments, the packer and/or the encoder may efficiently pack and encode sparse view pruned pictures.

In other words, referring to FIG. 30, in order to reduce the amount of data delivered to the receiver, a pruning module which aims to remove redundant visual information that is caused by the spatial relationship between views is used in an encoder preprocessing step. When this method is used, inverse processing which aims to restore an original view is called view regeneration. For those steps, information about reference and source views and a method to be used in the view regeneration process should be provided by a texture depth regeneration information SEI message or a view regeneration information SEI message and details thereof are addressed in the other documents.

A pruning module may correspond to the pruner of FIG. 27 in accordance with embodiments. In accordance with embodiments, a pruning module may be referred to as a pruner.

According to embodiments, a pruner (or pruning) 3000 generates a sparse view, for example, s1, or a first sparse view, based on the center view c0 and the source view v1. According to embodiments, the sparse view s1 is generated by subtracting the source view v1 from the center view c0 and/or the center view c0 from the source view v1. The sparse view s1 is a picture including unpredictable data, and a gray or black display area of the sparse view s1 is redundant data or redundancy between the center view c0 and the source view s1. By generating the sparse view s1, the performance and efficiency of encoding or transmitting data may be increased.

A pruner (or pruning) 30001 generates the sparse view s2 based on the center view c0, the reference view r1, and/or the source view v2. For example, the center view c0 is added to the reference view r1 and the source view v2 is subtracted from the added pictures.

A packer/encoder (or packing/encoding) 30002 packs/encodes the sparse view s1 and/or the sparse view s2.

In accordance with embodiments, a plurality of sparse views including s1 and s2 may be generated based on pruning to encode/transmit data including pictures.

For example, the sparse view s2 for one of multiple viewing positions (a viewpoint or s2) may be generated by pruning the center view c0, the reference view r1 that is for a viewpoint for r1, and/or the sparse view v2. In accordance with embodiments, the pruner adds the center view c0 and the reference view r1 and subtracts the source view v2 that is for a viewpoint for v2.

In accordance with embodiments, the sparse views may be packed and/or encoded. For example, the sparse view s1 and the sparse view s2 (or more sparse views) are packed and/or encoded.

In accordance with embodiments, the terms may be interpreted as follows or in a similar way. That is, the term c0 is a picture for a center viewpoint/viewing position, the term v1 is a source view picture for a first viewpoint/viewing position, the term s1 is a sparse view picture for a first viewpoint/viewing position, the term r1 is a reference view picture for a first viewpoint/viewing position, the term v2 is a source view picture for a second viewpoint/viewing position, and the term s2 is a sparse view picture for a second viewpoint/viewing position.

Here, in the reception device according to embodiments, views to be regenerated by the view regenerator may be views (or pictures) for different viewing positions (or viewpoints/viewing positions). The different viewing positions may be referred to as a first viewing position, a second viewing position, and the like. Each viewing position may include one or more source views (source view pictures), one or more reference views (reference view pictures), and one or more sparse views (sparse view pictures). When there is a plurality of source view pictures, reference view pictures, and sparse view pictures in each viewing position, the pictures may be referred to as a first source view picture for a first viewing position, a second source view picture for the first viewing position, and the like. In addition, when pictures are referred to as a first source view picture and a second source view picture, respective source view pictures may mean different viewing positions.

Accordingly, a video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

By such a configuration, the video transmission device according to embodiments may efficiently provide a plurality of multi-spherical images representing different viewing positions of a viewpoint.

The pruner according to embodiments may reduce the amount of data to be transmitted.

The pruner or pruning process of the video transmission device may efficiently and accurately provide necessary views to viewers using a small amount of data. This configuration according to embodiments may reduce computational load of the transmission device and the reception device.

Figure 31:
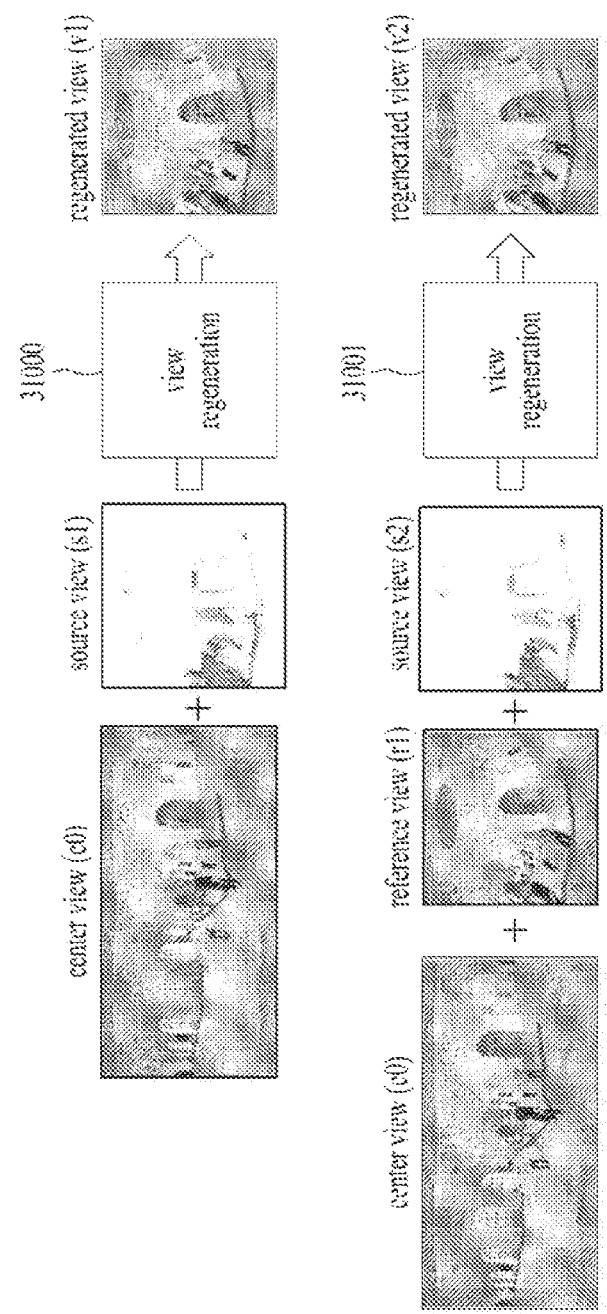
FIG. 31 illustrates view generation of a decoder post-processing module according to embodiments.

FIG. 31 illustrates view generation of a decoder post-processing module according to embodiments.

FIG. 31 illustrates a decoder post-processing scheme including view regeneration according to embodiments. Specifically, FIG. 31 illustrates a decoder post-processing scheme in which different inputs are used to regenerate a first regenerated view picture (or regenerated picture v1) and/or a second regenerated view picture (or regenerated picture v2). In a view regeneration operation according to embodiments, a target view is predicted based on reference view(s), and an unpredictable (or unpredicted) area is filled with sparse views according to embodiments. If information about pictures used in the view regeneration operation according to embodiments is given, the first regenerated view picture may be generated by a center view picture c0 and a first sparse view picture s1. In another embodiment, the second regenerated view picture may be generated by two reference pictures (i.e., the center view picture c0 and one reference view picture r1) and a sparse view picture.

In accordance with embodiments, a decoder performs view regeneration in order to regenerate (or predict) view(s) from received pictures.

Figure 33:
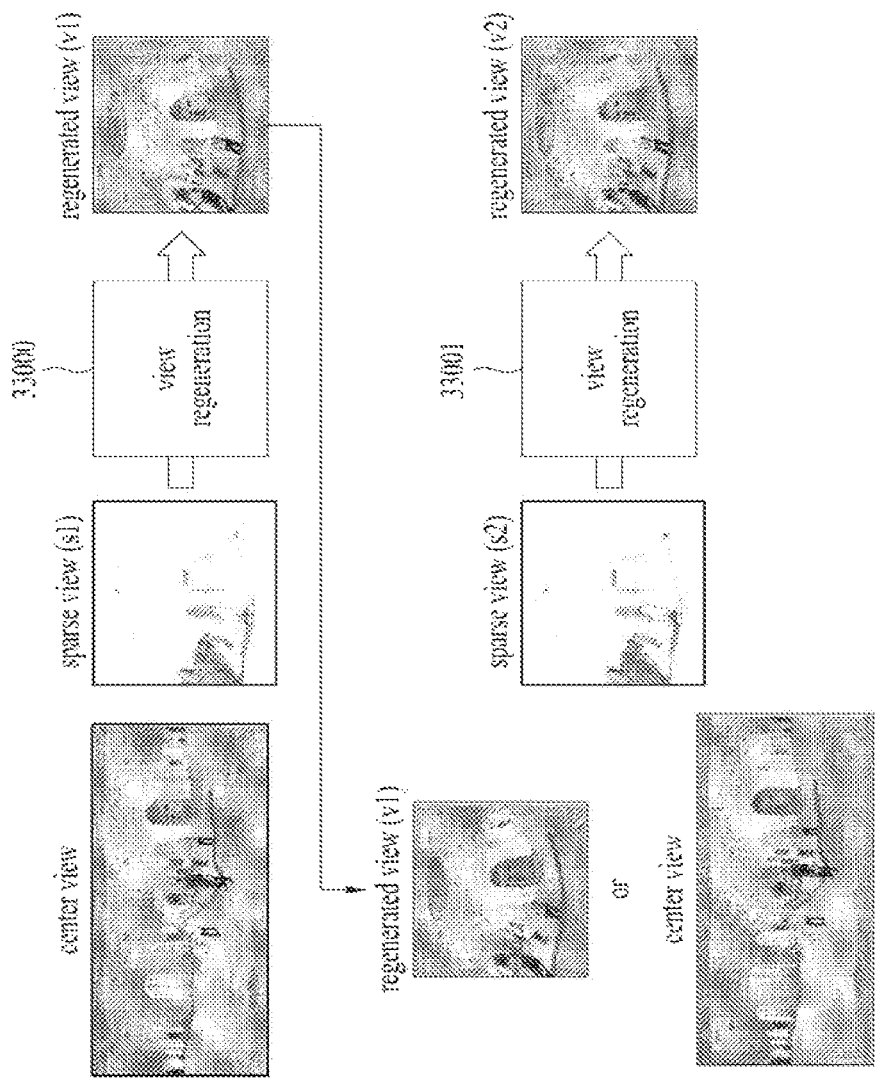
FIG. 33 illustrates performing view regeneration using a regenerated view according to embodiments as a reference view.

A view regenerator (or view regeneration) 31000 generates (regenerates/predicts) the regenerated view v1 based on the center view c0 and the sparse view s1. In accordance with embodiments, the center view may be transmitted by an encoder or a transmitter in accordance with embodiments. In accordance with embodiments, the center view may be generated by a center view generator in accordance with embodiments as illustrated in FIG. 33. In accordance with embodiments, the sparse view v1 is transmitted through packed pictures. Therefore, the view regenerator may generate the view v1 using the center view c0 and the sparse view s1 that includes unpredictable data.

A view regenerator (or view regeneration) 31001 generates (regenerates/predicts) the regenerated view v2 based on the center view c0, the reference view r1, and the sparse view s2.

Therefore, with respect to a plurality of viewing positions or viewpoints, views v1, v2, . . . vN may be (re)generated based on center view(s), sparse view(s), and/or reference view(s).

In accordance with embodiments, the center view c0 may be generated by a center view generator from received reference view pictures. Alternatively, in accordance with embodiments, the center view c0 is included in received reference view pictures. In accordance with embodiments, one or more source views v1, v2, . . . , vN or one or more reference views r1, r2, . . . , rN are included in the received pictures.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

By such a configuration, the video transmission device according to embodiments may efficiently provide a plurality of multi-spherical images representing different viewing positions of a viewpoint.

Using the view regenerator according to embodiments, the receiver according to embodiments may provide accurate views like real views to viewers while reducing the amount of data to be received.

The view regenerator of the reception device may efficiently and accurately provide necessary views using a small amount of data to viewers. This configuration according to embodiments may reduce computational load of the transmission device and the reception device.

Figure 32:
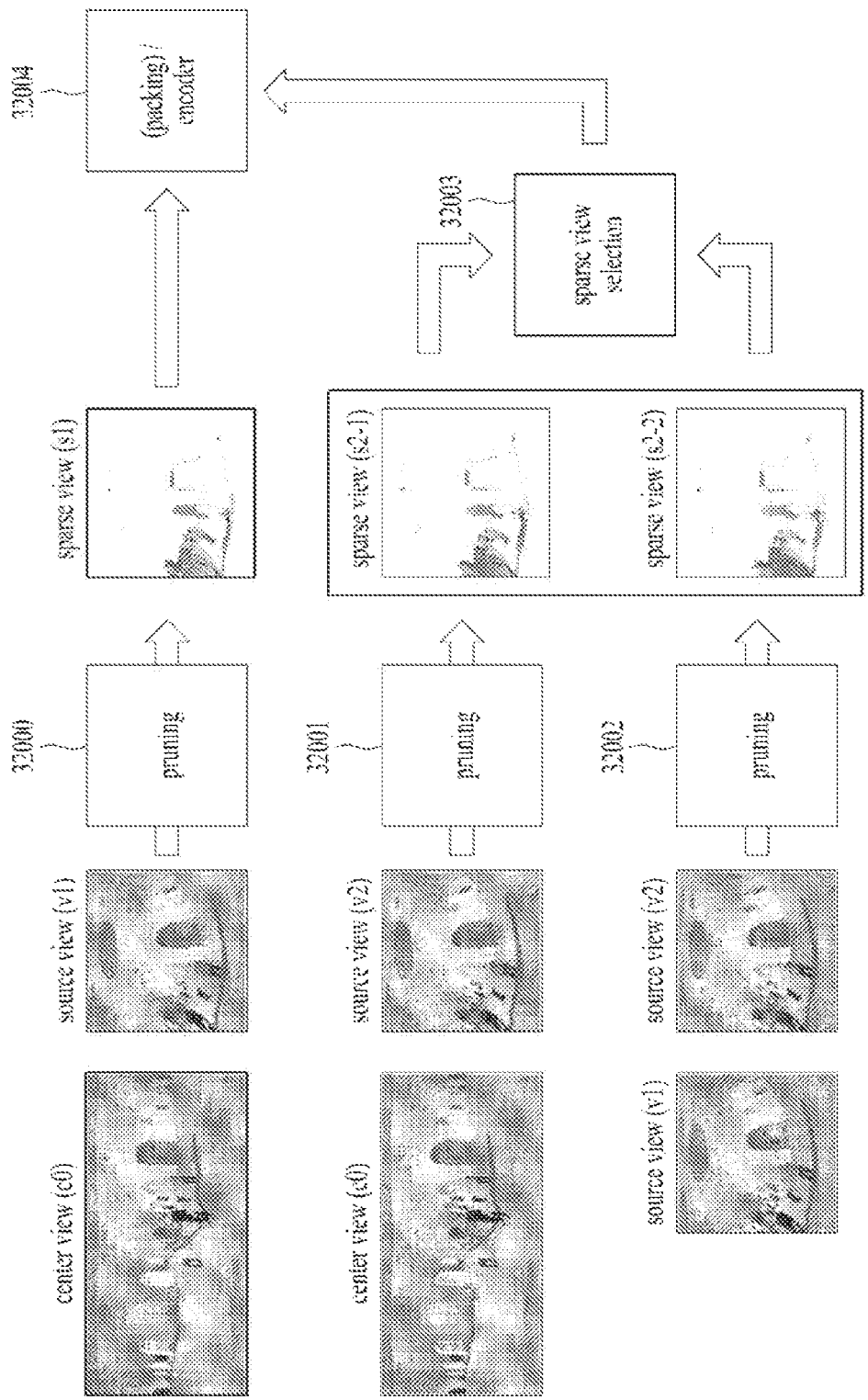
FIG. 32 illustrates an encoder preprocessing scheme according to embodiments using a pruner and a sparse view selector according to embodiments.

FIG. 32 illustrates an encoder preprocessing scheme according to embodiments using a pruner and a sparse view selector according to embodiments.

Regarding replacement of reference view:

FIG. 32 illustrates an operation of an encoder preprocessing module according to embodiments including a pruner and a sparse view selector according to embodiments. In a sparse view selection operation according to embodiments, a sparse view having higher data efficiency may be selected. This may be performed by determining whether a sparse view has a small number of pixels among sparse view pictures. In an example of FIG. 32, since a source view v1 looks closer to a source view than a center view, a sparse view s2-2 may have higher data efficiency than a sparse view s2-1.

In accordance with embodiments, a packer and/or an encoder performs pruning and further performs sparse view selection.

A pruner (or pruning) 32000 prunes a sparse view s1 based on the center view c0 and the source view v1.

A pruner (or pruning) 32001 prunes the sparse view s2-1 based on the center view c0 and a source view v2. For example, the source view v2 is subtracted from the center view c0.

A pruner (or pruning) 32002 prunes a sparse view s2-2 based on the source view v1 and the source view v2 (for example, the source view v2 is subtracted from the source view v1).

A sparse view selector (or sparse view selection) 36003 selects a sparse view to be packed or encoded by considering which sparse view is more efficient. For example, if the sparse view s2-1 has fewer valid pixels, the sparse view selector selects the sparse view s2-1 and, if the sparse view s2-2 has fewer valid pixels, the sparse view selector selects the sparse view s2-1.

A packer (or packing) 32004 packs the sparse view s1 or the sparse view s1 and the selected sparse view.

A video transmission method according to embodiments may include removing inter-view redundancy between pictures for a plurality of viewing positions; packing pictures from which inter-view redundancy has been removed; and encoding the packed pictures and signaling information.

Removing the inter-view redundancy according to embodiments may include performing first pruning on a first source view picture related to a first viewing position based on a center view picture, wherein the performing the first pruning includes generating a first sparse view picture; performing second pruning on the first source view picture based on a second source view picture related to a second viewing position different from the first viewing position, wherein performing the second pruning includes generating a second sparse view picture; and selecting one of the first sparse view picture and the second sparse view picture. The encoding may further include encoding one picture selected from among the first sparse view picture and the second sparse view picture.

The transmission device according to embodiments may perform an adaptive inter-view redundancy removal operation that adjusts the amount of data and computational load according to a transmission/reception environment of the transmission device and the reception device by selecting a sparse view picture for one viewing position. Accordingly, the transmission device according to embodiments may quickly cope with the transmission/reception environment by selecting the sparse view in consideration of the transmission environment of the transmission device and the reception environment of the reception device.

In addition, the transmission device according to embodiments may determine the number of errors of various sparse view pictures for one viewing position to select a picture having fewer errors, thereby providing a VR environment which is accurate, like a real environment, to viewers who use the reception device.

FIG. 33 illustrates performing view regeneration using a regenerated view according to embodiments as a reference view.

FIG. 33 illustrates an embodiment of a decoder post-processing scheme of a decoder post-processing module according to embodiments. The decoder post-processing module according to embodiments replaces a first regenerated view v1 regenerated by a first view regenerator 33000 with a reference view for generating a second regenerated view v2. Due to this configuration, data size required to deliver the regenerated views (i.e., the first regenerated view v1 and the second regenerated view v2) according to embodiments may be reduced.

In this figure, replacement of the reference view may be described.

In accordance with embodiments, a decoder (or receiver) performs view regeneration for regenerating the regenerated views v1, v2, etc.

The view regenerator (or view regeneration) 33000 (re)generates the regenerated view v1 based on a center view and a sparse view s1. For example, the regenerated view v1 may be predicted based on the center view and the sparse view s1.

A view regenerator (or view regeneration) 33001 regenerates the regenerated view v2 based on a sparse view s2 and at least one regenerated view r1 or the center view.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Due to the above-described configuration according to embodiments, the reception device according to embodiments may precisely and efficiently generate regenerated views. In addition, the reception device according to embodiments may use a picture for a first viewpoint (or a first viewing position) to generate a picture for a second viewpoint (or a second viewing position), thereby efficiently regenerating views using a small amount of data.

Using a regenerated view for a first viewpoint (or a first viewing position) when regenerating a regenerated view for a second viewpoint (or a second viewing position), the transmission device according to embodiments may raise efficiency of data transmission and reduce computational load. By this approach, data size occupied to deliver the reference view v1 may be reduced.

Figure 34:
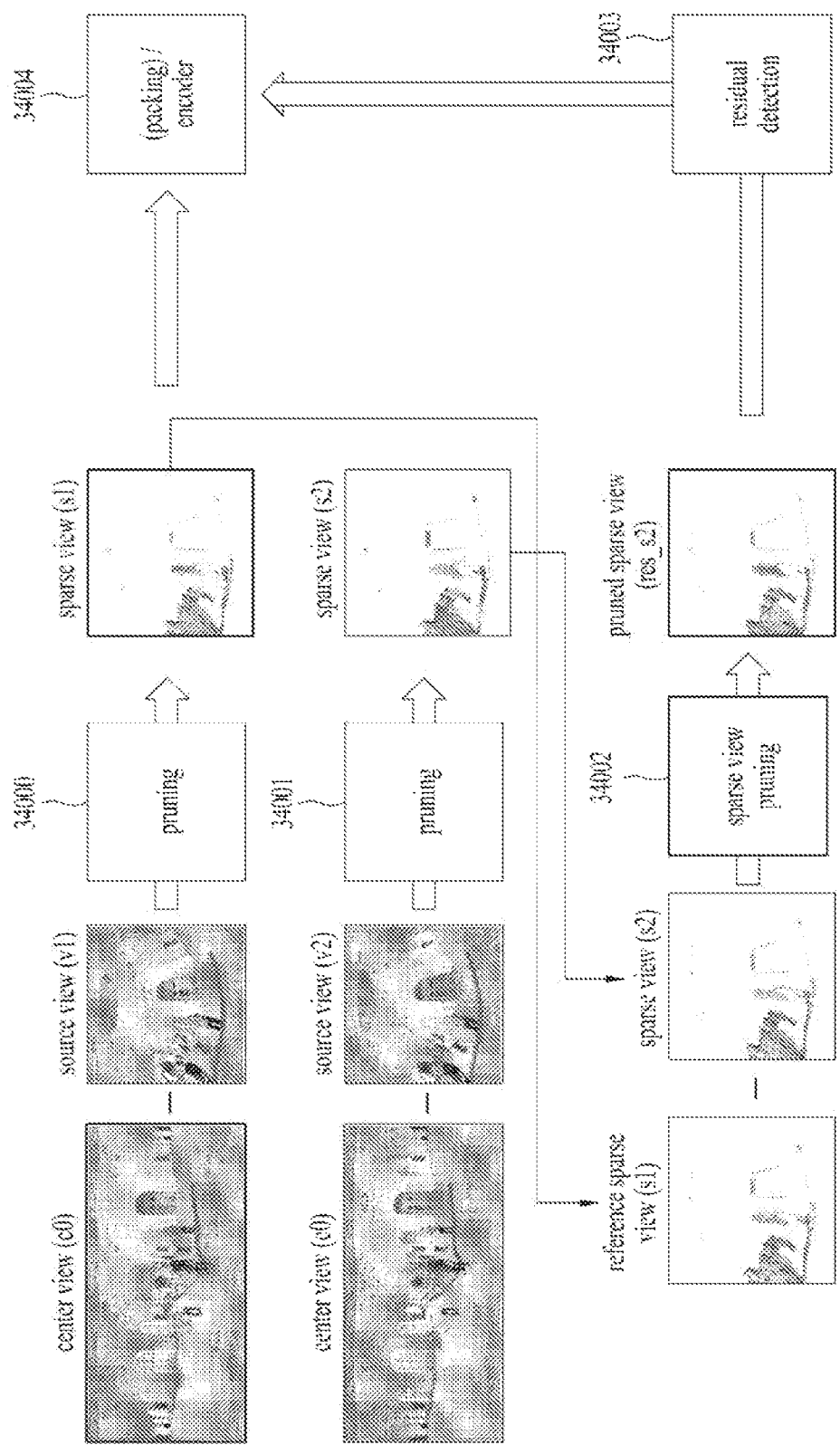
FIG. 34 illustrates an encoder preprocessing module according to embodiments that performs pruning and sparse view pruning according to embodiments.

FIG. 34 illustrates an encoder preprocessing module according to embodiments that performs pruning and sparse view pruning according to embodiments.

Specifically, FIG. 34 illustrates an encoder preprocessing scheme of an encoder preprocessing module including a pruner and/or a sparse view pruner according to embodiments.

Sparse view regeneration:

FIG. 34 illustrates a pruner according to embodiments and a sparse view pruner that is additionally described in the specification. The sparse view pruner according to embodiments compares sparse views and reference sparse views according to embodiments and removes redundancy between the sparse views and the reference sparse views.

Accordingly, for example, transmitting a first sparse view picture s1 and a second sparse view picture s2 may be replaced with transmitting the first sparse view picture corresponding to a reference sparse view picture and a pruned sparce view picture res_s2 indicating redundancy between the first sparse view picture s1 and the second sparse view picture s2. The pruned sparse view picture res_s2 may refer to a picture obtained by again pruning the first sparse view picture (i.e., reference sparse view picture) using the second sparse view picture s2. Conversely, the pruned sparse view picture res_s2 may refer to a picture obtained by pruning again the second sparse view picture (i.e., reference sparse view picture) using the first sparse view picture s1. That is, if the first sparse view picture and the second sparse view picture are correlated or have a correlation relationship, the second sparse view picture may be predicted using the pruned sparse view picture based on the first sparse view picture.

Therefore, remaining data or residual depending on the second sparse view picture s2 may be transmitted by the reference sparse view picture s1 and the pruned sparse view picture res_s2.

If the first sparse view picture and the second sparse view picture are highly correlated or have a high correlation, the pruned sparse view picture according to embodiments may have a very small amount of data. This small amount of data may be noise or less useful data. Accordingly, the transmission device according to embodiments may not transmit the pruned sparse view picture having such a small amount of data. In this case, whether or not to transmit the pruned sparse view picture may be determined by a residual detector 34003. That is, the residual detector may determine whether to transmit the pruned sparse view picture based on the size of the pruned sparse view picture.

In accordance with embodiments, an encoder performs pruning, sparse view pruning, residual detection, and/or (packing) encoding.

A pruner (or pruning) 34000 prunes (or generates) the sparse view s1 based on a center view c0 and a source view v1. For example, the sparse view s1 is generated by subtracting the source view v1 from the center view c0.

A pruner (or pruning) 34001 prunes the sparse view s2 based on the center view c0 and a source view v2. For example, the sparse view s2 is generated by subtracting the source view v2 from the center view c0.

In accordance with embodiments, a sparse view pruner (or sparse view pruning) 34002 generates the pruned sparse view res_s2 based on the sparse view s1 corresponding to the reference sparse view, generated by the pruner, and on the sparse view s2 that is pruned based on the sparse view s2. For example, the pruned sparse view res_s2 is generated by subtracting the sparse view s2 from the reference sparse view s1.

A residual detector (or residual detection) 34003 detects residual information from the pruned sparse view res_s2 in order to determine whether or not the pruned sparse view res_s2 is packed/encoded.

A packer/encoder (or packeting/encoder) 34003 packs/encodes the sparse view s1 or the sparse view and the pruned sparse view res_s2 when the pruned sparse view res_s2 has data that is useful for encoding.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing inter-view redundancy may further include generating reference view pictures, reference view information, and regeneration information.

In addition, the video transmission method according to embodiments may include pruning a reference sparse view picture related to a first viewing position included in the sparse view pictures, based on a sparse view picture related to a second viewing position included in the sparse view pictures and detecting a residual from the pruned sparse view picture. Here, the second viewing position is a viewing position different from the first viewing position, and the pruning the reference sparse view picture may include generating a pruned sparse view picture. The pruned sparse view picture may be packed based on presence of the residual.

The sparse view pruner and the residual detector according to embodiments may raise data transmission efficiency of the transmission device according to embodiments by further removing unnecessary or redundant information.

The reception device according to embodiments may efficiently and accurately provide necessary views to viewers using a small amount of data. This configuration according to embodiments may reduce computational load of the transmission device and the reception device.

FIG. 35 illustrates a decoder post-processing scheme according to embodiments using a view regenerator and/or a sparse view regenerator according to embodiments.

Sparse View Regeneration:

According to embodiments, when sparse_view_regeneration_type is equal to 1, a sparse view regeneration operation may be performed according to FIG. 35. A reference sparse view s1 and a pruned sparse view res_s1 in FIG. 35 may be indicated by reference_sparse_view_id and pruned_sparse_view_id, respectively. In predicting a regenerated view in FIG. 35, disparity between views may be calculated using the locations, rotation, and coverage of a reference sparse view picture and a target view indicated by view_position_descriptor( ). In predicting the regenerated view in FIG. 35, disparity between views may be calculated using the location, rotation, and coverage of the reference sparse view and the location, rotation, and coverage of the target view.

In accordance with embodiments, a decoder performs sparse view regeneration and/or view regeneration.

A sparse view regenerator (or sparse view regeneration) 35000 generates (or predicts) a regenerated sparse view s2 based on the reference sparse view s1 and the pruned sparse view res_s1 in accordance with embodiments. In terms of the regenerated sparse view s2 (for a second viewpoint/viewing position), a reference sparse view s1 (for a first viewpoint/viewing position) may be a reference view. For example, the sparse view regenerator in accordance with embodiments regenerates a sparse view from received sparse views in packed pictures in response to sparse view regeneration type information.

A view regenerator (or view regeneration) 35001 generates a regenerated view v2 based on a center view c0 and the regenerated sparse view s2. In accordance with embodiments the center view is transmitted or generated by a decoder using the reference view. The regenerated view v2 may be (re)generated using the center view and/or the regenerated sparse view.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include regenerating a second sparse view picture from a first sparse view picture in a first mode, and generating the regenerated view based on the regenerated second sparse view picture and the center view picture. When a pruned sparse view picture is included in the sparse view pictures, the regenerating the second sparse view picture may include generating the second sparse view picture based on the pruned sparse view picture. The second viewing position may be different from the first viewing position.

The sparse view pruner and the residual detector according to embodiments may raise data transmission efficiency of the transmission device according to embodiments by further removing unnecessary or redundant information.

The reception device according to embodiments may efficiently and accurately provide necessary views to viewers using a small amount of data. This configuration according to embodiments may reduce computational load of the transmission device and the reception device.

FIG. 36 illustrates a decoder post-processing scheme according to embodiments using a view regenerator and/or a sparse view regenerator according to embodiments.

When sparse_view_regeneration_type is equal to 2, a sparse view regeneration operation may be performed based on FIG. 36. A reference sparse view s1 in FIG. 36 may be indicated by reference_sparse_view_id. In predicting a regenerated view in FIG. 36, disparity between views may be calculated using the locations, rotation, and coverage of a reference sparse view picture and a target view indicated by view_position_descriptor( ). In predicting the regenerated view in FIG. 36, disparity between views may be calculated using the location, rotation, and coverage of the reference sparse view and the location, rotation, and coverage of the target view. The location, rotation, and coverage of the reference sparse view and the location, rotation, and coverage of the target view may be indicated by view position descriptor information (i.e., view_position_descriptor( )) corresponding to reference_sparse_view_id and target_view_id, respectively.

FIG. 36 illustrates another embodiment of the decoder post-processing scheme using a sparse view regenerator. FIG. 36 illustrates the sparse view regenerator when sparse_view_regeneration_type is equal to 2.

In FIG. 36, the sparse view regenerator according to embodiments may not receive a pruned sparse view picture according to embodiments. Therefore, a sparse view regenerator (or decoder post-processing module) 36000 according to embodiments may predict or estimate a sparse view s2 using a reference sparse view s1 (or using only s1). If the sparse view s2 is regenerated (or estimated), a view regenerator (or view regeneration) 36001 according to embodiments may generate a regenerated view (or target view) v2 using a center view picture c0. In this case, another reference view picture may also be used. Accordingly, if the regenerated view v2 is generated, the sparse view regeneration operation may be performed prior to the view regeneration operation.

In accordance with embodiments, a decoder may perform sparse view regeneration and/or view regeneration.

The sparse view regenerator (or sparse view regeneration) 36000 generates the regenerated sparse view s2 based on the reference sparse view s1. In accordance with embodiments, reference sparse views (e.g., s1, s3, etc.) may be used to generate the regenerated sparse view s2. In accordance with embodiments, the best case may be use of a single reference sparse view. In accordance with embodiments, signaling information related to sparse views may be used to regenerate the sparse views.

The view regenerator 36001 generates the regenerated view v2 based on the center view c0 and the regenerated sparse view s2 according to embodiments.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include regenerating a second sparse view picture from a first sparse view picture in a first mode, and generating the regenerated view based on the regenerated second sparse view picture and the center view picture. When a pruned sparse view picture is included in the sparse view pictures, the regenerating the second sparse view picture may include generating the second sparse view picture based on the pruned sparse view picture. The second viewing position may be different from the first viewing position.

The sparse view pruner and the residual detector according to embodiments may raise data transmission efficiency of the transmission device according to embodiments by further removing unnecessary or redundant information.

The reception device according to embodiments may efficiently and accurately provide necessary views to viewers using a small amount of data. This configuration according to embodiments may reduce computational load of the transmission device and the reception device.

FIG. 37 illustrates a decoder post-processing scheme according to embodiments using a view regenerator and/or a sparse view regenerator according to embodiments.

When sparse_view_regeneration_type is equal to 3, a sparse regeneration operation may be performed based on FIG. 37. In this case, a pruned sparse view picture may not be included in decoded and/or unpacked pictures. Accordingly, the decoder post-processing module according to embodiments may predict or estimate a sparse view picture s2 from a reference sparse view picture s1 (or from only from the reference sparce view picture). The case in which sparse_view_regeneration_type is equal to 3 is different from the case in which sparse_view_regeneration_type is equal to 2 in that a sparse view regenerator 37001 according to embodiments estimates the sparse view picture using a temporally regenerated view v1.

To regenerate the regenerated picture v2, all of the temporally regenerated picture v1 may not always be used. Accordingly, the temporally regenerated picture v1 may include only information for estimating the regenerated picture v2. Hence, the decoder post-processing module according to embodiments may include a sparse view regenerator for generating the estimated sparse view picture s2.

If the sparse view picture s2 is regenerated (or estimated), the regenerated picture v2 may be generated by a center view picture c0 and/or the estimated sparse view picture s2. Therefore, as illustrated in FIG. 37, a sparse view regenerator may perform an operation prior to a view regenerator for regenerating the regenerated picture v2.

When sparse_view_regeneration_type is equal to 3, the sparse view regeneration operation may be performed according to FIG. 37. The reference sparse view s1 in FIG. 37 may be indicated by reference_sparse_view_id. Prior to performing the sparse view regeneration operation according to embodiments, the temporally regenerated view v1 may be generated. The temporally regenerated view may be referred to as a reference view. In predicting the sparse view s2 in FIG. 37, disparity between views may be calculated using the location, rotation, and coverage of the reference sparse view and the location, rotation, and coverage of a target view. The location, rotation, and coverage of the reference sparse view and the location, rotation, and coverage of the target view may be indicated by view position descriptor information (i.e., view_position_descriptor( )) corresponding to reference_sparse_view_id and target_view_id, respectively.

In accordance with embodiments, the decoder or the receiver performs view regeneration, sparse view regeneration, and/or view regeneration.

A view regenerator (or view regeneration) 37000 generates the temporally generated view v1 based on the center view c0 and the sparse view s1. In accordance with embodiments, the temporally generated view is a view picture used to temporally regenerate a sparse view.

The sparse view regenerator (or sparse view regeneration) 37001 generates the estimated sparse view s2 based on the temporally generated view v1. According to embodiments, the (estimated) sparse view s2 is generated by regenerating the center view c0, the sparse view s1, and the temporally generated view v1 instead of using the received sparse view s2.

A view regenerator (or view regeneration) 37002 generates the regenerated view v2 based on the center view c0 and the estimated sparse view s2. The regenerated view v2 is generated using the center view c0 and the sparse view s1.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include generating, in a second mode, a temporally generated view related to a first viewing position, based on the center view picture and on a first sparse view related to the first viewing position included in the sparse view pictures, estimating a second sparse view picture related to a second viewing position from the temporally generated view, and generating a regenerated view related to the second viewing position, based on the estimated second sparse view picture and the center view picture. When a pruned sparse view picture is included in the sparse view pictures, the estimating may include estimating the second sparse view picture based on the pruned sparse view picture.

The sparse view pruner and the residual detector according to embodiments may raise data transmission efficiency of the transmission device according to embodiments by further removing unnecessary or redundant information.

The reception device according to embodiments may efficiently and accurately provide necessary views to viewers using a small amount of data. This configuration according to embodiments may reduce computational load of the transmission device and the reception device.

FIG. 38 illustrates a decoder post-processing scheme according to embodiments using a view regenerator and/or a sparse view regenerator according to embodiments.

When sparse_view_regeneration_type is equal to 4, a sparse view regeneration operation may be performed based on FIG. 38. In this case, a pruned sparse view picture may not be included in decoded and/or unpacked pictures.

In FIG. 38, a reference sparse view s1 may be indicated by reference_sparse_view_id. When the decoder post-processing module regenerates a reference view, a target view may be regenerated by an operation of a view synthesizer. When view synthesis is performed, disparity between views may be calculated using the location, rotation, and coverage of the reference view (i.e., a regenerated picture v1) and the location, rotation, and coverage of the target view. The location, rotation, and coverage of the reference sparse view and the location, rotation, and coverage of the target view may be indicated by view position descriptor information (i.e., view_position_descriptor( )) corresponding to reference_sparse_view_id and target_view_id, respectively.

In accordance with embodiments, a decoder may perform view regeneration and/or view synthesis.

A view regenerator (or view regeneration) 38000 generates a regenerated view v1 based on a center view c0 and a sparse view s1.

A view synthesizer (or view synthesis) 38001 perform synthesis to generate a regenerated view v2 based on the center view and the regenerated view v1. In accordance with embodiments, the view synthesizer generates a viewing point for a new viewpoint or a target viewpoint.

A video reception method according to embodiments may include decoding a bitstream of a video based on viewing position information and viewport information; unpacking pictures and signaling information in the decoded bitstream; regenerating views for the unpacked pictures; and synthesizing views for the regenerated pictures. Here, the unpacked bitstream may include the signaling information.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

Such a configuration enables the reception device according to embodiments to efficiently synthesize a target view.

The sparse view pruner and the residual detector according to embodiments may raise data transmission efficiency of the transmission device according to embodiments by further removing unnecessary or redundant information.

The reception device according to embodiments may efficiently and accurately provide necessary views to viewers using a small amount of data. This configuration according to embodiments may reduce computational load of the transmission device and the reception device.

FIG. 39 is sparse view regeneration information SEI message syntax in accordance with embodiments.

The configuration, operation, and other features of this figure are understood by embodiments of this figure described with reference to the attached drawings. In the figure, Next, various methods are provided to efficiently transfer a plurality of spherical images indicating different viewing positions of a viewpoint. Parameters in FIG. 39 may be included in a view regeneration information SEI message or a multi-view packing and view regeneration information SEI message.

A sparse view regeneration information SEI message according to embodiments represents information about regeneration of a sparse view picture according to embodiments.

sparse_view_regeneration_info_id contains an identifying number that may be used to identify the purpose of sparse view regeneration. The value of sparse_view_regeneration_info_id may be used to indicate the different use cases of this SEI message, to support different receiver capabilities, or to indicate the different sparse view regeneration methods, or to indicate the different viewing positions that need sparse view regeneration process before the view regeneration of the texture or depth etc.

When more than one sparse view regeneration information SEI message is present with the same value of sparse_view_regeneration_info_id, the content of these sparse view regeneration information SEI messages shall be the same. When sparse view regeneration information SEI messages are present that have more than one value of sparse_view_regeneration_info_id, this may indicate that the information indicated by the different values of sparse_view_regeneration_info_id are alternatives that are provided for different purposes, for different component (such as texture, depth, etc.) or that a cascading of correction. The value of sparse_view_regeneration_info_id shall be in the range of 0 to 212−1, inclusive.

sparse_view_regeneration_info_cancel_flag equal to 1 indicates that the sparse view regeneration information SEI message cancels the persistence of any previous sparse view regeneration information SEI message in output order that applies to the current layer.

sparse_view_regeneration_info_cancel_flag equal to 0 indicates that sparse view regeneration information follows.

sparse_view_regeneration_info_persistence_flag specifies the persistence of the sparse view regeneration information SEI message for the current layer.

sparse_view_regeneration_info_persistence_flag equal to 0 specifies that the sparse view regeneration information applies to the current decoded picture only.

Let picA be the current picture. sparse_view_regeneration_info_persistence_flag to 1 specifies that the sparse view regeneration information SEI message persists for the current layer in output order until any of the following conditions are true:

A new CLVS of the current layer begins.

The bitstream ends.

A picture picB in the current layer in an access unit containing a sparse view regeneration information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

A new CLVS of the current layer begins.

The bitstream ends.

A picture picB in the current layer in an access unit containing a sparse view regeneration information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

num_sparse_view_minus1 plus 1 specifies the number of views that needs sparse view regeneration process to generate the component of the viewing position by this SEI message.

target_view_id specifies the i-th identifying number of the viewing position or head position of the sparse view regeneration process. This value may be one of the pre-defined identifying number of a viewing positions of a 3DoF+ video specified in the same or in the other SEI message, such as mrwp_view_id specified in the multiview region-wise packing SEI message, viewing_position_id specified in the viewing position group information SEI message. In accordance with embodiments, target view id [i] represents identifier information for a target view.

num_components[i] specifies the number of the components that are related to the i-th view.

component_id[i][j] specifies the identifying number of the j-th component of a reference viewing position or head position that is used to estimate (to regenerate, to reconstruct, or to predict) the i-th component.

component_type[i][j] specifies the type of the i-th component.

component_type[i][j] equal to 0 indicates the type of the component is unspecified.

component_type[i][j] equal to 1 indicates the component is a video or texture component component_type[i][j] equal to 2 indicates the component is a depth map.

component_type[i][j] equal to 3 indicates the component is an alpha channel. When the value of a pixel equals to 1, the value in a texture picture at the corresponding pixel location is not transparent. When the value of a pixel equals to 0, the value in a texture picture at the corresponding pixel location is transparent.

component_type[i][j] equal to 4 indicates the component is an indication map for usability indication. When the value of a pixel equals to 1, the value in a texture or depth picture at the corresponding pixel location is used for occlusion enhancement process. When the value of a pixel equals to 1, the value in a texture or depth picture at the corresponding pixel location is not used for occlusion enhancement process.

component_type[i][j] equal to 5 indicates the component is a overlay.

component_type[i][j] from 6 to 15, inclusive, are reserved for future use.

In accordance with embodiments, component type information represents a texture, a depth, an alpha channel, overlay, etc.

pruned_sparse_view_present_flag[i][j] equal to 1 specifies the pruned_sparse_view is present for the j-th component of the i-th viewing position. pruned_sparse_view_present_flag[i][j] specifies the pruned_sparse_view is not present for the j-th component of the i-th viewing position so sparse view regeneration process may be processed without additional information, e.g., prediction of reference sparse view or directly predict the sparse view from the reference views.

reference_sparse_view_present_flag[i][j] specifies the reference sparse view is present for the j-th component of the i-th viewing position. The reference sparse view is not present for the j-th component of the i-th viewing position.

sparse_view_regeneration_type[i][j] specifies the indicator of the recommended sparse view regeneration process for the j-th component of the i-th viewing position. 0 indicates the type of the recommended sparse view regeneration is unspecified.

sparse_view_regeneration_type[i][j] equal to 0 indicates that the type of the recommended sparse view regeneration is unspecified.

sparse_view_regeneration_type[i][j] equal to 1 indicates that the sparse view regeneration scheme 1 is recommended. In this document, type 1 could be a scheme that uses both reference sparse view and pruned sparse view to regenerate the sparse view of the j-th component of the i-th viewing position. A specific operation will be described with reference to FIG. 55.

sparse_view_regeneration_type[i][j] equal to 2 indicates that the sparse view regeneration scheme 2 is recommended. In this document, type 2 could be the scheme that predicts the sparse view from the reference sparse view without pruned sparse view of the j-th component of the i-th viewing position. A specific operation will be described with reference to FIG. 57.

sparse_view_regeneration_type[i][j] equal to 3 indicates that the sparse view regeneration scheme 3 is recommended. In this document, type 3 could be the scheme that predicts the sparse view from the regenerated view without pruned sparse view of the j-th component of the i-th viewing position. A specific operation will be described with reference to FIG. 58.

sparse_view_regeneration_type[i][j] equal to 4 indicates that the sparse view regeneration scheme 4 is recommended. In this document, type 4 could be the scheme that predicts the regenerated view with the adjacent regenerated view. A specific operation will be described with reference to FIG. 59.

Other values of sparse_view_regeneration_type[i][j] are reserved for future use cases.

pruned_sparse_view_id[i][j] and reference_sparse_view_id[i][j] specifies the identifying number of the pruned sparse view and reference sparse view those are related to the sparse view regeneration of the j-th component of the i-th viewing position or head position.

pruned_sparse_view_id[i][j] and reference_sparse_view_id[i][j] This value can be one of the pre-defined identifying number of a component that belongs to a viewing positions of a 3DoF+ video specified in the same or in the other SEI message, such as mrwp_component_id specified in the multiview region-wise packing SEI message, or picture_id specified in the viewing position group information SEI message.

In the other implementation of the sparse view regeneration, the identifier could be managed within the receiver decoder post-processing so that could provide linkage between pictures generated from unpacking process and the pictures used for the view regeneration including sparse view regeneration or view synthesis and viewport renderer.

In case of reference sparse view, the view position could be provided to use the disparity between the current and the reference viewing positions.

For the sparse view regeneration process, the identifier of texture and/or depth of the current and/or other viewing position could be provided to utilize the information in the other component type.

In each of the j-th component of the i-th viewing position, detailed parameter values which could be used in the sparse view regeneration process, such as location of each patches, global/local disparity values between pictures/patches, weighting functions, etc., could be provided.

viewing_position_id indicate the identifier of a viewing position that is described by the viewing position, orientation and coverage, specified by viewing_position_x, viewing_position_y, and viewing_position_z, viewing_orientation_yaw, viewing_orientation_pitch, and viewing_orientation_roll, and coverage_horizontal and coverage_vertical, respectively. The parameters or features which describe the viewing position could be added to differentiate different viewing positions.

viewing_position_x, viewing_position_y, viewing_position_z indicate the (x,y,z) location of viewing position corresponding to the decoded picture in the units of $2^{-16}$ millimeters, respectively. The range of viewing_position_x, viewing_position_y and viewing_position_z may be in the range of $-32768*2^{16}-1$ (i.e., −2147483647) to $32768*2^{16}$ (i.e., 2147483648), inclusive.

The value of viewing_position_x, viewing_position_y and viewing_position_z could be represented by absolute position in the XYZ coordinate or relative position corresponding to the anchor location.

viewing_orientation_yaw, viewing_orientation_pitch, and viewing_orientation_roll indicate the yaw, pitch, and roll orientation angles in units of $2^{-16}$ degrees, respectively. The value of viewing_orientation_yaw may be in the range of $-180*2^{16}$ (i.e., −11796480) to $180*2^{16}-1$ (i.e., 11796479), inclusive, the value of viewing_orientation_pitch may be in the range of $-90*2^{16}$ (i.e., −5898240) to $90*2^{16}$ (i.e., 5898240), inclusive, and the value of viewing_orientation_roll may be in the range of $-180*2^{16}$ (i.e., −11796480) to $180*2^{16}-1$ (i.e., 11796479), inclusive.

Depending on the applications, viewing_orientation_yaw, viewing_orientation_pitch, and viewing_orientation_roll could be used to indicate azimuth, elevation, and tilt, respectively.

coverage_horizontal and coverage_vertical specifies the horizontal and vertical ranges of the coverage of the viewing position corresponding to the decoded picture, in units of $2^{-16}$ degrees, respectively.

A video transmission device and a video reception device in accordance with embodiments may use (transmit/receive) sparse view regeneration information, which may be referred to as signaling information and/or metadata, in order to regenerate texture and depth pictures for viewing positions.

The signaling information (sparse view regeneration information) in accordance with embodiments may be generated in a process of the sparse view pruner which has been more specifically described with reference to FIG. 32. The signaling information (sparse view regeneration information) in accordance with embodiments may be used in a process of the sparse view regenerator which has been more specifically described with reference to FIG. 33.

In accordance with embodiments, the signaling information (sparse view regeneration information) is used in FIGS. 30 to 42.

The signaling information, which is transmitted by the video transmission device according to embodiments (or received by the video reception device according to embodiments), may include viewing position group information. The viewing position group information may include center view generation information, pre-generation information, view synthesis recommendation information, reference view information, and regeneration information.

By such a configuration, the video transmission device according to embodiments may efficiently provide a plurality of multi-spherical images representing different viewing positions of a viewpoint.

Figure 40:
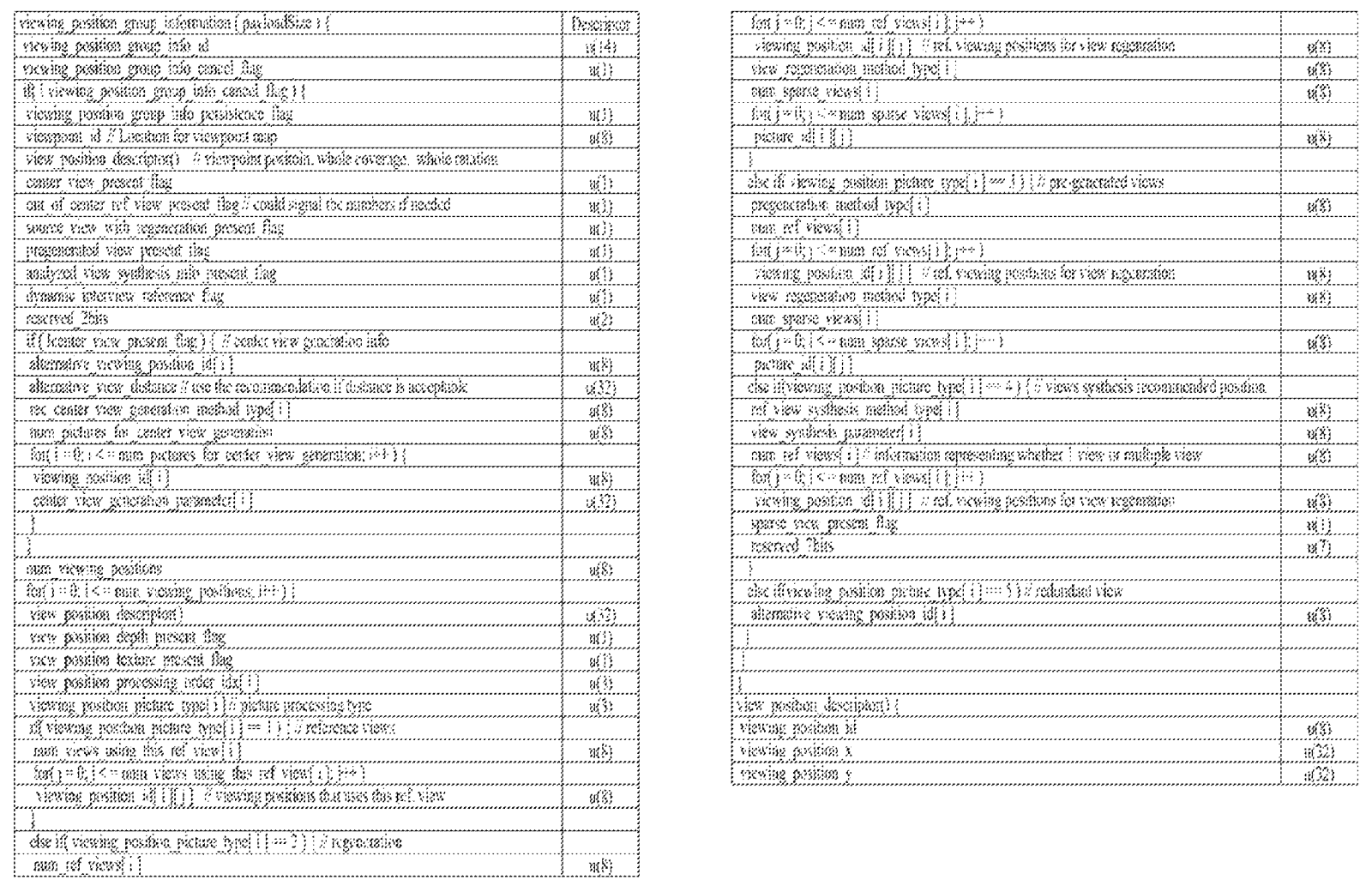

FIG. 40 illustrates a viewing position group information SEI message syntax according to embodiments.

In other words, the viewing position group information SEI message syntax according to embodiments, described in FIG. 31, represents an embodiment of a syntax of signaling information about operations of the video transmission method according to embodiments and the video reception method according to embodiments. That is, the video transmission method according to embodiments and the video reception method (or device) according to embodiments may transmit or receive all or part of the signaling information and parameters in the viewing position group information SEI message syntax according to embodiments described in FIG. 31.

The viewing position group information SEI message syntax according to embodiments or some thereof may be included in a bitstream encoded by the encoder according to embodiments at a transmission end or may mean information transmitted by a block or a module other than the encoder according to embodiments. In contrast, the viewing position group information SEI message syntax, or some parameters or a group of parameters included therein may be included in a bitstream received at a reception end or may be received via a separate path.

Specifically, all of signaling information and parameters in the viewing position group information SEI message syntax shown in FIG. 31 may be encoded and transmitted by the encoder according to embodiments of an encoding end (transmission end) or only some thereof may be encoded and transmitted by the encoder.

Accordingly, the viewing position group information SEI message syntax according to embodiments may include all or part of the signaling information described in FIGS. 24 to 40. For example, in FIG. 25, the packing metadata and the reconstruction parameters according to embodiments may be included in a part of the viewing position group information SEI message syntax. In contrast, the viewing position group information SEI message syntax may include only some of the packing metadata and the reconstruction parameters.

Likewise, the center view generation information, the reference view information, the regeneration information, the pre-generation information, and/or the view synthesis recommendation information according to embodiments may be included in part of the viewing position group information SEI message syntax. In contrast the viewing position group information SEI message syntax may include only part of the above-described related signaling information. Similarly, the signaling information according to embodiments in FIG. 28 may be included in part of the viewing position group information SEI message syntax, or the viewing position group information SEI message syntax may include only part of the signaling information.

Hereinafter, the viewing position group information SEI message syntax will be described as an embodiment of the signaling information according to embodiments.

The viewing position group information SEI message provides information of a viewing position group and the relationship between them in the 3D virtual space and post-decoding process (e.g., regeneration process to restore pictures of intended viewing positions) corresponding to a viewpoint (or center/anchor viewing position).

viewing_position_group_info_id contains an identifying number that may be used to identify the purpose of the viewing position group information. The value of viewing_position_group_info_id may be used to indicate the different use cases of this SEI message, to support different receiver capabilities, or to indicate different level of information contained in the SEI message, different viewpoint, or different group of viewpoints, etc.

When more than one viewing position information SEI message is present with the same value of viewing_position_group_info_id, the content of these viewing position group information SEI messages may be the same. When viewing position group information SEI messages are present that have more than one value of viewing_position_group_info_id, this may indicate that the information indicated by the different values of viewing_position_group_info_id are alternatives that are provided for different purposes or that a cascading of correction to be applied in a sequential order (an order might be specified depending on the application). The value of viewing_position_group_info_id may be in the range of 0 to $2^{12}-1$, inclusive.

viewing_position_group_info_cancel_flag equal to 1 indicates that the viewing position group information SEI message cancels the persistence of any previous viewing position group information SEI message in output order that applies to the current layer. viewing_position_group_info_cancel_flag equal to 0 indicates that viewing position group information follows.

viewing_position_group_info_persistence_flag specifies the persistence of the viewing position group information SEI message for the current layer.

Let picA be the current picture. viewing_position_group_info_persistence_flag to 1 specifies that the viewing position group information SEI message persists for the current layer in output order until any of the following conditions are true:
  A new CLVS of the current layer begins.
  The bitstream ends.
  A picture picB in the current layer in an access unit containing a viewing position group information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

viewing_position_group_info_persistence_flag equal to 0 specifies that the viewing position group information applies to the current decoded picture only.

Let picA be the current picture. viewing_position_group_info_persistence_flag to 1 specifies that the viewing position group information SEI message persists for the current layer in output order until any of the following conditions are true:
  A new CLVS of the current layer begins.
  The bitstream ends.
  A picture picB in the current layer in an access unit containing a viewing position group information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

viewpoint_id specifies the identifier that indicates the viewpoint of the viewing position group that is described in this SEI message. The viewpoint_id might be defined in the other SEI message to describe the overall viewpoints that consists the overall VR/AR environment or subset of viewpoints those are related to each other with spatially or conceptually adjacent so that user could switch from one position to the other positions. In other words, viewpoint_id may indicate where a corresponding viewpoint is located under the assumption that there is a viewpoint map.

The viewpoint could be one of the viewing positions, such as center viewing position or anchor viewing position, which could represent the viewing position group.

The details of viewpoint could be described by XYZ position, viewing orientation (yaw, pitch, and roll), and horizontal and vertical coverage described in view_point_descriptor( ). In this case, the viewing_position_id could indicate one of the viewing position defined in this SEI message.

view_point_descriptor specifies information or a descriptor representing the location of a viewpoint, an application range of a viewing position (i.e., information about full coverage), and information about a viewing orientation (i.e., information about full rotation). view_point_descriptor may include viewing_position_id, viewing_position_x, viewing_position_y, viewing_position_z, viewing_position_yaw, viewing_position_pitch, viewing_position_roll, coverage_horizontal, and/or coverage_vertical, which will be described later. Here, out_of_center_ref_view_present_flag may signal numbers if needed.

center_view_present_flag equal to 1 indicate that the video corresponding to the center (or anchor or representative) viewing position is present in the group of videos for this viewpoint corresponding to viewpoint_id. equal to 0 indicate that the video the corresponding to the center (or anchor or representative) viewing position is not present in the group of videos for this viewpoint corresponding to viewpoint_id.

center_view_present_flag might be set equal to 1 when at least one viewing position whose viewing_position_picture_type[i] equal to 0 is present in the current SEI message.

out_of_center_ref_view_present_flag equal to 1 indicate that the video that are not corresponding to the center (or anchor or representative) viewing position is present in the group of videos for this viewpoint corresponding to viewpoint_id. out_of_center_ref_view_present_flag equal to 0 indicate that the video that are not corresponding to the center (or anchor or representative) viewing position is not present in the group of videos for this viewpoint corresponding to viewpoint_id. Or this could signal the numbers if needed.

out_of_center_ref_view_present_flag might be set equal to 1 when at least one viewing position whose viewing_position_picture_type[i] equal to 1 is present in the current SEI message.

source_view_with_regeneration_present_flag equal to 1 indicate that viewing position that needs additional processing(s) to reconstruct a intended picture is included in the set of viewing positions of a viewpoint that corresponding to the current viewpoint_id.

source_view_with_regeneration_present_flag equal to 0 indicate that viewing position that needs additional processing(s) to reconstruct a intended picture is not present in the set of viewing positions of a viewpoint that corresponding to the current viewpoint_id.

source view_with_regeneration_present_flag might be set equal to 1 when at least one viewing position whose viewing_position_picture_type[i] equal to 2 is present in the current SEI message.)

pregenerated_view_present_flag equal to 1 indicate that viewing position that are not originally captured but generated before encoding is present in the set of viewing positions of a viewpoint that corresponds to the current viewpoint_id. pregenerated_view_present_flag equal to 0 indicate that viewing position that are not originally captured but generated before encoding is not present in the set of viewing positions of a viewpoint that corresponds to the current viewpoint_id.

pregenerated_view_present_flag might be set equal to 1 when at least one viewing position whose viewing_position_picture_type[i] equal to 3 is present in the current SEI message.

analyzed_view_synthesis_info_present_flag equal to 1 indicate that viewing position that additional information that could be used in the view synthesis of an intermediate view or determine the process of the intermediate view generation is present in the set of viewing positions of a viewpoint that corresponding to the current viewpoint_id. analyzed_view_synthesis_info_present_flag equal to 0 indicate that viewing position that additional information that could be used in the view synthesis of an intermediate view or determine the process of the intermediate view generation is not present in the set of viewing positions of a viewpoint that corresponding to the current viewpoint_id.

analyzed_view_synthesis_info_present_flag might be set equal to 1 when at least one viewing position whose viewing_position_picture_type[i] equal to 4 is present in the current SEI message.

dynamic_interview_reference_flag equal to 1 specifies that the reference pictures of the reconstruct/regenerate process of a viewing position could vary when time changes. dynamic_interview_reference_flag equal to 0 indicate that the reference pictures of the reconstruct/regenerate process of a viewing position does not vary when time changes so the reference picture relationship could be utilized in whole video sequences.

Hereinafter, signaling information which may be included in center view generation information according to embodiments will be described. The center view generation information according to embodiments may include alternative_viewing_position_id, alternative_view_distance, rec_center_view_generation_method_type[i], viewing_position_id[i], center_view_generation_parameter[i], num_pictures_for_center_view_generation, and rec_center_view_generation_method_type[i]. Whether all or part of the signaling information included in the center view generation information is present may be indicated by center_view_present_flag.

alternative_viewing_position_id specifies the viewing position that could be used alternative to the center/anchor reference viewing position. The value of alternative_viewing_position_id may be one of the viewing position indicated by viewing_position_id in this SEI message or related SEI message.

alternative_view_distance specifies the distance of the alternative viewing position corresponding to the alternative_viewing_position_id, in the units of $2^{-16}$ millimeters.

rec_center_view_generation_method_type specifies the method to generate the center view when center view is not present in this SEI message. rec_center_view_generation_method_type equal to 0 represent the view synthesis method that uses given viewing positions by viewing_position_id with different weights given by center_view_generation_parameter. rec_center_view_generation_method_type equal to 1 could represent image stitching method with given viewing positions by viewing_position_id with different weights given by center_view_generation_parameter.

viewing_position_id indicates the viewing position that is used for the center view position. The value of viewing_position_id may be one of the viewing position indicated by viewing_position_id in this SEI message or related SEI message.

center_view_generation_parameter specifies the viewing position dependent parameter that is recommended to be used in the center view generation methods indicated by rec_center_view_generation_method_type.

rec_center_view_generation_method_type, viewing_position_id, and center_view_generation_parameter are used to indicate the recommended method of center view generation. Otherwise, rec_center_view_generation_method_type, viewing_position_id, and center_view_generation_parameter could be used to indicate the method and its corresponding parameters that were used to generate the center view picture in the preprocessing before encoding. In this case, a new flag to indicate the presence of this information could be defined and used instead of center_view_present_flag not present flag.

num_pictures_for_center_view_generation may specify information about the number of pictures needed when center view generation is performed.

Hereinbelow, signaling information about one or more viewing positions in accordance with embodiments will be described. The signaling information about one or more viewing positions may include num_viewing_position, view_position_depth_present_flag, view_position_texture_present_flag, view_position_processing_order_idx, and viewing_position_picture_type.

num_viewing_position specifies the total number of viewing positions that are related to the viewpoint or center viewing position that is indicated by viewpoint_id.

view_position_depth_present_flag and view_position_texture_present_flag equal to 1 specify the depth or texture is present for the i-th viewing position, respectively. If there is other component, such as alpha channel to indicate the opacity of the pixel values at each pixel position or other layers such as overlay, logos, they could be indicated by defining flags corresponding to component.

view_position_processing_order_idx specifies the processing order of multiple viewing positions. For example, the lower the number is, the faster the processing order is. If two different viewing positions have same view_position_processing_order_idx, there is no preference in the processing order.

The example use case of the view_position_processing_order_idx is the center viewing position or mostly referenced viewing position in view regeneration process. As the reference pictures are used to restore the other pictures in the view regeneration process, the reference pictures could be assigned with lower view_position_processing_order_idx compared to the non-referenced pictures. When the reference relationship is happened between non-referenced pictures or reference pictures, they could be indicated with different view_position_processing_order_idx according to the processing order.

viewing_position_picture_type specifies the picture type of the i-th viewing position in terms of picture generation. In other words, this may mean processing type of picture of i (i-th viewing position)

When viewing_position_picture_type is equal to 0, the i-th viewing position (or a picture for the i-th viewing position) is a center view (or center view picture).

When viewing_position_picture_type is equal to 1, the picture of the i-th viewing position is used as a reference picture in the view regeneration process.

When viewing_position_picture_type is equal to 2, the picture of the i-th viewing position will be generated from the view regeneration process.

When viewing_position_picture_type is equal to 3, the picture of the i-th viewing position is pre-generated view in the encoding preprocess.

When viewing_position_picture_type is equal to 4, the picture of the i-th viewing position might not be present in the decoded pictures but a view synthesis method is recommended with additional information. This could be used to reduce the time consumption process with regard to view synthesis.

When viewing_position_picture_type is equal to 5, the picture of the i-th viewing position might not be present in the decoded pictures but alternative picture from other viewing position is present.

Hereinafter, signaling information which may be included in reference view information according to embodiments will be described. The reference view information in accordance with embodiments may include num_views_using_this_ref_view and num_ref_views. The reference view information may be information delivered by viewing_position_picture_type[i]==1. Here, viewing_position_id represents a viewing position that uses this reference view.

num_views_using_this_ref_view specifies the number of viewing positions that uses the picture of the i-th viewing position as the reference view in the regeneration process. The viewing positions that use this reference view are indicated by viewing_position_id.

num_ref_views specifies the number of reference views that are used for the regeneration of the picture corresponding to the i-th viewing position. The reference viewing positions are indicated by the viewing_position_id.

Hereinbelow, signaling information which may be included in view regeneration information according to embodiments will be described. The view regeneration information in accordance with embodiments may include num_ref_views and viewing_position_id described above. The view regeneration information according to embodiments may include view_regeneration_method_type, num_sparse_views, and picture_id. Reference view information may be information delivered by viewing_position_picture_type[i]==2. Here, viewing_position_id may specify a reference viewing position for view regeneration.

view_regeneration_method_type specifies the type of view regeneration method that is used to restore the picture of the i-th viewing position.

When view_regeneration_method_type equal to 0, view synthesis based prediction method is used. When view_regeneration_method_type equal to 1, block disparity prediction method is used.)

num_sparse_views (num_sparse_views[i][j]) specifies the number of sparse views used to regenerate the picture corresponding to the i-th viewing position.

picture_id (picture_id[i][j]) specifies an identifier which contains the j-th sparse view that is used to reconstruct a picture corresponding to the i-th viewing position.

specifies the identifier which contains the j-th sparse view that is used to reconstruct the picture corresponding to the i-th viewing position.

Hereinbelow, signaling information which may be included in pre-generation information according to embodiments will be described. The pre-generation information in accordance with embodiments may include num_ref_views and viewing_position_id described above. The pre-generation information according to embodiments may also include pregeneration_method_type, view_regeneration_method_type, picture_id, and num_sparse_views. Reference view information may be information delivered by viewing_position_picture_type[i]==3. Here, viewing_position_id may specify a reference viewing position for view regeneration.

pregeneration_method_type (pregeneration_method_type[i][j]) specifies the view generation method that is used to generate the picture corresponding to the i-th viewing position. When pregeneration_method_type is equal to 0, the reference view synthesis algorithm is used. When pregeneration_method_type is equal to 1, the view generation algorithm A is used.

view_regeneration_method_type may specify signaling information related to a method of performing view generation according to embodiments.

Hereinbelow, signaling information which may be included in view synthesis recommendation information according to embodiments will be described. The view synthesis recommendation information according to embodiments may include ref_view_synthesis_method_type and viewing_position_id. The view synthesis recommendation information according to embodiments may further include sparse_view_present_flag and/or num_ref_views described above. The view synthesis recommendation information according to embodiments may be information delivered by viewing_position_picture_type[i]==4. Here, num_ref_views may indicate whether there is a single view or there are multiple views. In addition, viewing_position_id represents a reference viewing position for view synthesis.

ref_view_synthesis_method_type (ref_view_synthesis_method_type[i][j]) specifies the view synthesis method that is recommended to generate the picture corresponding to the i-th viewing position. When ref_view_synthesis_method_type equal to 0, the reference view synthesis algorithm is recommended. When ref_view_synthesis_method_type equal to 1, the view synthesis algorithm A is recommended.

alternative_view_position_id (alternative_view_position_id[i][j]) specifies the identifier that is recommended to be used as an alternative viewing position of the i-th viewing position.

sparse_view_present_flag specifies signaling information indicating whether a sparse view (or sparse view picture) according to embodiments is present.

Hereinafter, signaling information included in view_point_descriptor and view_point_descriptor described above will be described in detail.

view_point_descriptor specifies information or a descriptor representing the location of a viewpoint, an application range of a viewing position (i.e., information about full coverage), and information about a viewing orientation (i.e., information about full rotation). view_point_descriptor may include viewing_position_id, viewing_position_x, viewing_position_y, viewing_position_z, viewing_position_yaw, viewing_position_pitch, viewing_position_roll, coverage_horizontal, and/or coverage_vertical, which will be described later.

viewing_position_id indicate the identifier of a viewing position that is described by the viewing position, orientation and coverage, specified by viewing_position_x, viewing_position_y, and viewing_position_z, viewing_orientation_yaw, viewing_orientation_pitch, and viewing_orientation_roll, and coverage_horizontal and coverage_vertical, respectively. The parameters or features which describe the viewing position could be added to differentiate different viewing positions.

viewing_position_x, viewing_position_y, and viewing_position_z indicate the (x,y,z) location of viewing position corresponding to the decoded picture in the units of $2^{-16}$ millimeters, respectively. The range of viewing_position_x, viewing_position_y and viewing_position_z may be in the range of $-32768*2^{16}-1$ (i.e., $-2147483647$) to $32768*2^{16}$ (i.e., $2147483648$), inclusive.

The value of viewing_position_x, viewing_position_y and viewing_position_z could be represented by absolute position in the XYZ coordinate or relative position corresponding to the anchor location.

viewing_orientation_yaw, viewing_orientation_pitch, and viewing_orientation_roll indicate the yaw, pitch, and roll orientation angles in units of $2^{-16}$ degrees, respectively. The value of viewing_orientation_yaw may be in the range of $-180*2^{16}$ (i.e., $-11796480$) to $180*2^{16}$ 1 (i.e., $11796479$), inclusive, the value of viewing_orientation_pitch may be in the range of $-90*2^{16}$ (i.e., $-5898240$) to $90*2^{16}$ (i.e., $5898240$), inclusive, and the value of viewing_orientation_roll may be in the range of $-180*2^{16}$ (i.e., $-11796480$) to $180*2^{16}$ 1 (i.e., $11796479$), inclusive.

Depending on the applications, viewing_orientation_yaw, viewing_orientation_pitch, and viewing_orientation_roll could be used to indicate azimuth, elevation, and tilt, respectively.

Also, viewing_orientation_yaw, viewing_orientation_pitch, and viewing_orientation_roll could represent the rotation that is applied to the unit sphere of head position corresponding to the decoded picture to convert the local coordinate axes to the global coordinate axes, respectively.

coverage_horizontal and coverage_vertical specifies the horizontal and vertical ranges of the coverage of the viewing position corresponding to the decoded picture, in units of $2^{-16}$ degrees, respectively.

The signaling information, which is transmitted by the video transmission device according to embodiments (or received by the video reception device according to embodiments), may include viewing position group information. The viewing position group information may include center view generation information, pre-generation information, view synthesis recommendation information, reference view information, and regeneration information.

By such a configuration, the video transmission device according to embodiments may efficiently provide a plurality of multi-spherical images representing different viewing positions of a viewpoint.

Figure 41:
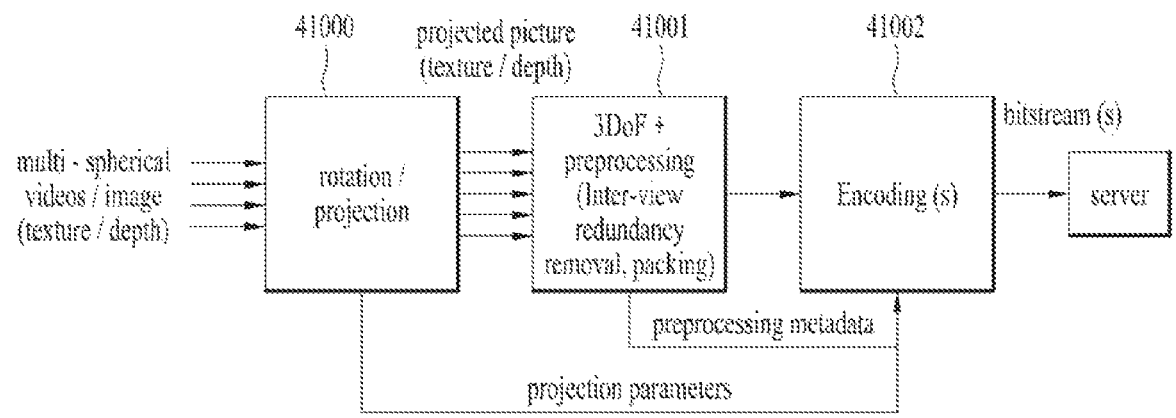
FIG. 41 is a block diagram of an encoder preprocessing module according to embodiments.

FIG. 41 is a block diagram of an encoder preprocessing module according to embodiments.

The encoder preprocessing module may be referred to as an encoder preprocessor, an encoder end, or an encoding module and may generically refer to a device constituting a video transmission device. That is, the encoder preprocessing module may include an inter-view redundancy remover, a packer, and/or an encoder, which are components included in the above-described video transmission device.

The video transmission device (encoder preprocessor, encoding module, encoder module, or encoding end) according to embodiments includes a rotator/projector (or rotation/projection) 41000, a 3DoF+ preprocessor (3DoF+ preprocessing) 41001, and/or an encoder (encoding) 41002 according to embodiments.

The rotator/projector (or rotation/projection) 41000 according to embodiments rotates and/or projects a multi-spherical video/image (multi-spherical video/image data) including a texture/depth picture. Picture(s) of the multi-spherical video/image (texture/depth) may be rotated and/or projected. Output of the rotator/projector is a picture (texture/depth) and/or a rotated/projected picture that may be referred to as source view picture(s) according to embodiments.

The rotator/projector 41000 according to embodiments may mean the rotator/projector 27001 described in FIG. 27. The rotator/projector may further generate a source view picture and/or projection parameters related to a rotation and/or projection operation according to embodiments.

The 3DoF+ preprocessor (3DoF+ preprocessing) 41001 may receive the picture(s) of the multi-spherical video/image (texture/depth) rotated and projected by the rotator/projector 41001 and remove redundancy between the received picture(s) of the multi-spherical video/image (texture/depth) or pack the pictures. For example, the 3DoF+ preprocessor may receive video sequences for a plurality of viewing positions according to embodiments and perform an inter-view redundancy removal operation of removing redundancy between adjacent views for the viewing positions included in the video sequences. The 3DoF+ preprocessor may pack pictures (a texture picture, a depth picture, a texture patch, and/or a texture residual) generated from the inter-view redundancy removal operation to generate one or more packed pictures.

The 3DoF+ preprocessor may include the above-described inter-view redundancy remover and/or packer according to embodiments. The 3DoF+ preprocessor may further include the above-described center view generator, intermediate view synthesizer, and pruner according to embodiments. The 3DoF+ preprocessor may further include a sparse view pruner (sparse view pruning), a sparse view selector (or sparse view selection), and/or a residual detector (or residual detection).

The 3DoF+ preprocessor 41001 may generate preprocessing metadata. The preprocessing metadata may include center view generation information, pre-generation information, view synthesis recommendation information, regeneration information, and reference view information according to embodiments. The preprocessing metadata may also include packing metadata and/or reconstruction parameters. For example, the preprocessing metadata may include all or part of the signaling information or the parameters described in FIG. 39 and/or FIG. 40.

The encoder (or encoding) 41002 encodes, for example, the packed pictures and/or signaling information including center view generation information, reference view information, regeneration information, pre-generation information, and/or view synthesis recommendation information. In accordance with embodiments, the encoded data is transmitted in the form of bitstream(s).

In accordance with embodiments, the 3DoF+ preprocessor includes the rotator/projector, the center view generator, the intermediate view synthesizer, the pruner, the sparse view pruner, the packer, and/or the encoder to perform the operation described above. For example, the 3DoF+ preprocessor may perform an operation based on the preprocessor (encoder-preprocessing module) described in FIG. 27 and in paragraphs of the specification related to FIG. 27.

Accordingly, a video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

Figure 42:
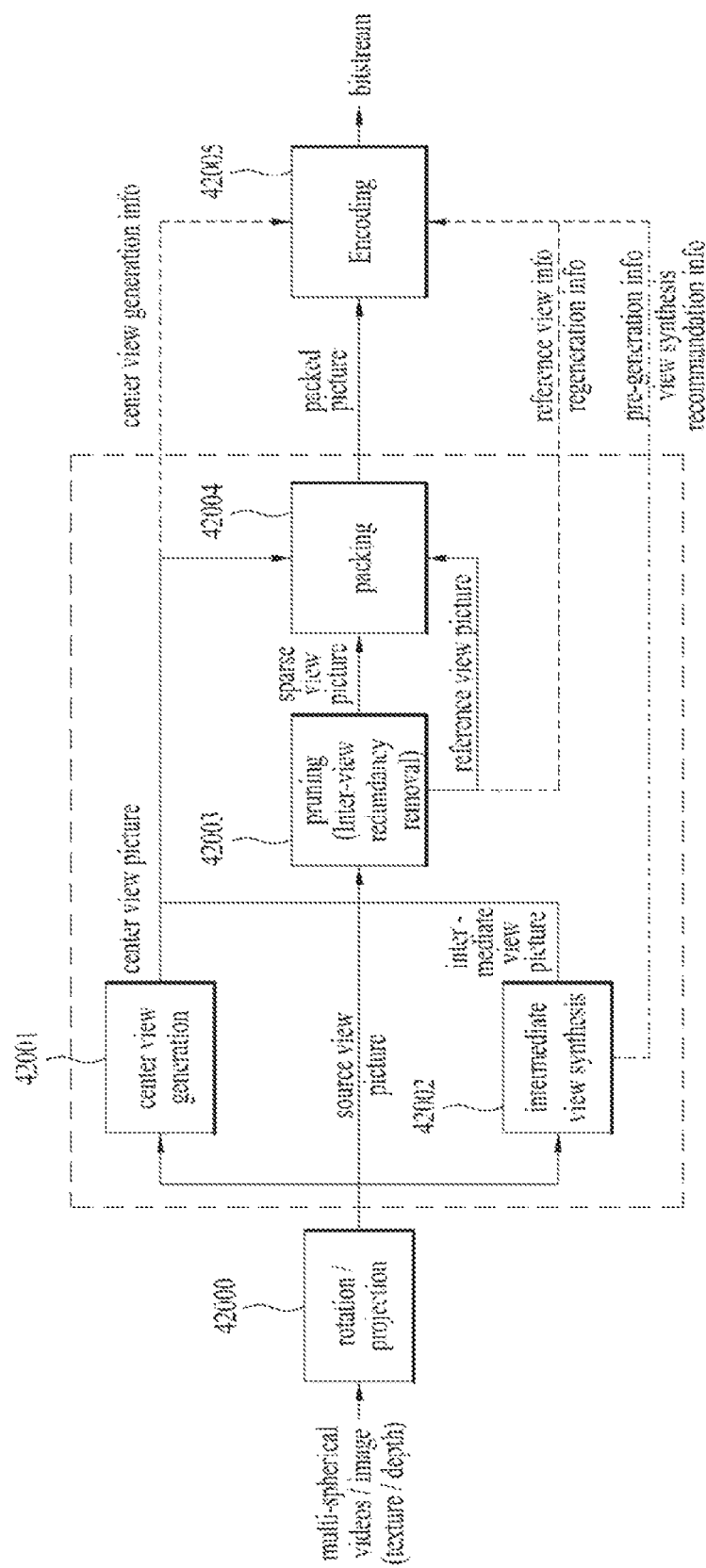
FIG. 42 is a block diagram of an encoder preprocessing module according to embodiments.

FIG. 42 is a block diagram of an encoder preprocessing module according to embodiments.

The encoder preprocessing module may be referred to as an encoder preprocessor, an encoder end, or an encoding module and may generically refer to a device constituting a video transmission device. That is, the encoder preprocessing module may include an inter-view redundancy remover, a packer, and/or an encoder, which are components included in the above-described video transmission device.

FIG. 42 is a block diagram of an inter-view redundancy remover of an encoder preprocessing module according to embodiments.

A center view generator (or center view generation) 42001 generates a center view for a group of viewing positions from received pictures (e.g., source view pictures). The center view generator according to embodiments may generate a center view picture and/or further generate center view generation information. Specifically, the center view picture may mean a spherical video/image for a center position of a multi-spherical video/image. In addition, when the center view picture is included or is not included in an input image, the center view picture may be generated by generating a virtual viewpoint of the center view generator according to embodiments.

An intermediate view synthesizer (or intermediate view synthesis) 42002: If the transmission device according to embodiments uses views generated based on source views (or provided views), an intermediate view may be synthesized. According to embodiments, the intermediate view synthesizer may output intermediate views including additional information of pre-generation information. Furthermore, the transmission device according to embodiments may transmit information related to intermediate view synthesis to the decoder post-processing module.

A pruner (or pruning) 27004: The pruner according to embodiments may remove redundancy between pictures using a source view, a center view, and/or an intermediate view according to embodiments. The pruner according to embodiments may generate sparse view pictures and reference view pictures. The sparse view picture means a picture containing unpredictable information (i.e., including unique information/pixels) for a specific viewing position. That is, the sparse view picture may represent a picture from which information which is commonly present between a plurality of pictures to be pruned has been removed. The reference view picture may mean a picture that may provide basic information/pictures for a specific viewing position. The pruner may generate reference view information and/or regeneration information according to embodiments.

The video transmission device (or the encoder preprocessing module, encoder module, or encoding end) according to embodiments includes a rotator/projector 42000, the center view generator 42001, the intermediate view synthesizer 42002, the pruner 42003, a sparse view pruner 27005, a packer 42004, and/or an encoder 42005.

The rotator/projector (or rotation/projection) 42000 according to embodiments rotates and/or projects a multi-spherical video/image (multi-spherical video/image data) including a texture/depth picture. Picture(s) of the multi-spherical video/image (texture/depth) may be rotated and/or projected. Outputs of the rotator/projector are pictures (texture/depth) and/or the rotated/projected pictures that may be referred to as source view pictures according to embodiments.

The center view generator 27002 according to embodiments generates a center view picture from the rotated/projected pictures and/or pictures (texture/depth) and generates signaling information including center view generation information related to profiles/characteristics of the center view picture.

The intermediate view synthesizer 42002 synthesizes an intermediate view picture from the rotated/projected pictures and/or the pictures (texture/depth) (source view pictures) and generates signaling information including pre-generation information and/or view synthesis recommendation information. The signaling information may be used to decode data in a receiver (a decoder).

The pruner 42003 according to embodiments prunes redundancy between pictures. Pruning represents removing redundancy between views. This process may be referred to as inter-view redundancy removal. According to embodiments, inputs of the pruner include the center view picture, the source view picture, and/or the intermediate view picture. Furthermore, pruned sparse view(s) may be input to the pruner. The pruner generates signaling information including reference view information and/or regeneration information that may be used to decode data in the receiver (decoder). The signaling information includes information related to pruning in order to regenerate views. According to embodiments, outputs of the pruner include a sparse view picture, a reference view picture, and/or a sparse view picture. According to embodiments, a view may be referred to as a view picture.

The packer (or packing) 42004 packs pictures, for example, a center view picture, a pruned sparse view picture, a reference view picture, and/or a sparse view picture. An output of the packer is a packed picture.

The encoder (or encoding) 42005 encodes, for example, the packed picture and/or the signaling information including center view generation information, reference view information, regeneration information, pre-generation information, and/or view synthesis recommendation information. In accordance with embodiments, the encoded data is transmitted in the form of bitstream(s).

In accordance with embodiments, the preprocessor (encoder preprocessing module) includes the rotator/projector, the center view generator, the intermediate view synthesizer, the pruner, the sparse view pruner, the packer, and/or the encoder to perform the operation described above.

In accordance with embodiments, the center view picture means a spherical video/image for a center location of a multi-spherical video/image. In accordance with embodiments, the center view picture may be included in input data or may be generated by generating a virtual viewpoint.

In accordance with embodiments, the intermediate view picture means a virtually generated picture. The intermediate view picture is not included in input data (e.g., a multi-spherical video/image). In accordance with embodiments, the pre-generation information and/or the view synthesis recommendation information is included in a viewing position group information SEI message syntax related to viewing_position_picture_type[i]==3, 4 according to embodiments.

In accordance with embodiments, the source view picture and/or the center view picture is used for pruning. The reference view information and/or the regeneration information in accordance with embodiments is included in a viewing position group information SEI message syntax related to viewing_position_picture_type[i]==1 in accordance with embodiments.

In accordance with embodiments, a viewing position group information SEI message is transmitted by an encoder and received by a receiver as signaling information. The viewing position group information SEI message includes views_position_picture_type.

In accordance with embodiments, VIEW_position_picture_type specifies the picture type of an i-th viewing position in terms of picture generation. When viewer_position_picture_type is equal to 0, the i-th viewing position is a center view. When view_position_picture_type is equal to 1, the picture of the i-th viewing position is used as a reference picture in a view regeneration process. When view_position_picture_type is equal to 2, the picture of the i-th viewing position will be generated from the view regeneration process. When views_position_picture_type is equal to 3, the picture of the i-th viewing position is a view pre-generated by an encoder preprocessor. When views_position_picture_type is equal to 4, the picture of the i-th viewing position may not be present in the decoded picture and a view synthesis method is recommended with additional information. This may be used to reduce a time consuming process with regard to view synthesis. When views_position_picture_type is equal to 5, the picture of the i-th viewing position may not be present in the decoded picture and an alternative picture from another viewing position is present.

In accordance with embodiments, the sparse view picture means a picture including information which is not predictable when a current viewpoint is predicted based on surrounding viewpoint(s). For example, gray or black region(s) mean duplicate information between a picture for a current viewpoint and a picture for surrounding viewpoint(s). In accordance with embodiments, the duplicate information means predictable information. Therefore, the sparse view picture includes unpredictable information.

In accordance with embodiments, a reference viewpoint picture (or reference view picture) means a picture for a surrounding viewpoint used to predict a picture for a current viewpoint. In accordance with embodiments, a source view picture/image and/or a picture/image generated by a virtual viewpoint may be used as the reference view picture.

In accordance with embodiments, the sparse view pruner generates signaling information for a sparse view and/or metadata for indicating a target viewing position, a reference sparse view, and a sparse view regeneration method type, for example, information such as target_view_id, component_id, component_type, pruned_sparse_view_present_flag, reference_sparse_view_present_flag_sprese_view_present, output_sparse_view_id, pruned_sparse_view_id, and reference_sparse_view_id.

In accordance with embodiments, the sparse view pruner generates sparse view regeneration information according to embodiments.

Accordingly, a video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

Figure 43:
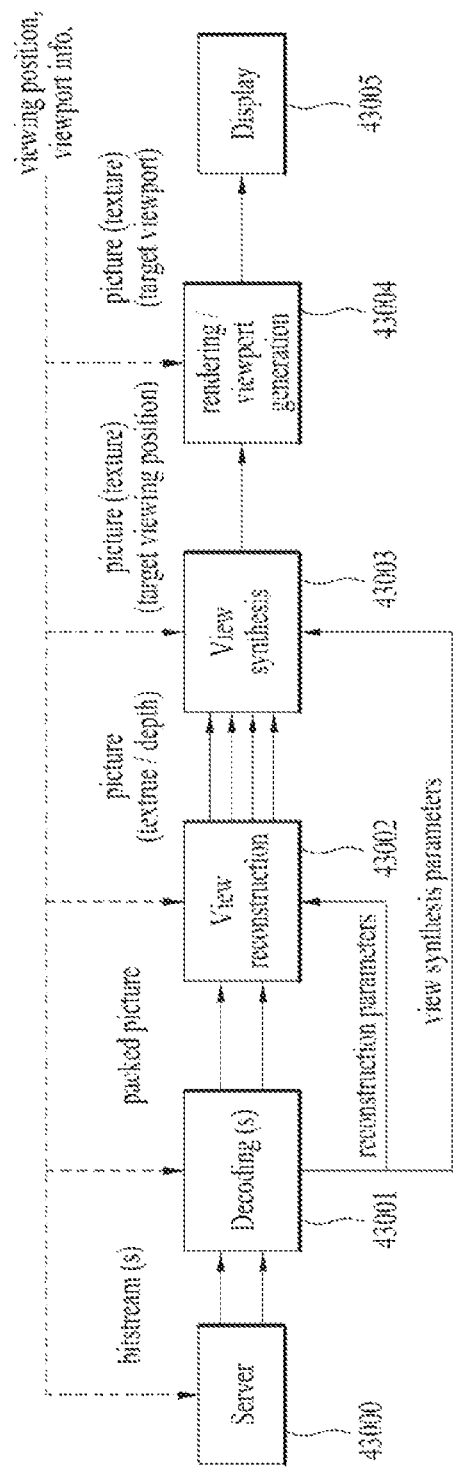
FIG. 43 is a block diagram of a decoder post-processing module according to embodiments.

FIG. 43 is a block diagram of a decoder post-processing module according to embodiments.

The decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

The decoder post-processing module according to embodiments may include a decoder (or decoding) 43001, a view reconstructor (or view reconstruction) 43002, a view synthesizer (or view synthesis) 43003, a renderer/viewport regenerator (or rendering/viewport generation) 43004, and a display (or a display module) 43005.

A server 43000 may transmit a bitstream to the decoder post-processing module according to embodiments. The server may transmit the bitstream based on (or in correspondence to) information about a viewing position (information about a current viewing position) and/or information about a viewport (viewport information) transmitted by the video reception device (or decoder post-processing module) according to embodiments.

The decoder 43001 may receive the bitstream from the server 43000 and generate, output, or parse a packed view (or picture) and/or related signaling information. The decoder may decode the received bitstream based on the information about a viewing position and/or the information about a viewport generated by the decoder post-processing module according to embodiments. The related signaling information may include, for example, reconstruction parameters and view synthesis parameters according to embodiments. The reconstruction parameters may mean signaling information needed to perform view regeneration at the receiving end according to embodiments. For example, the reconstruction parameters may include all or part of the parameters included in the viewing position group information SEI message syntax in FIG. 39 and/or FIG. 40. The reconstruction parameters according to embodiments may also include all or part of viewing position group information to be described later. That is, the reconstruction parameters according to embodiments may include all or part of preprocessing metadata according to embodiments. The preprocessing metadata may include center view generation information, pre-generation information, view synthesis recommendation information, regeneration information, and reference view information according to embodiments.

The view reconstructor 43022 may receive the packed picture (or packed view) generated by the decoder 43001 to generate a regenerated view picture. The view reconstructor may generate the regenerated view based on the information about a viewing position and/or the information about a viewport from the decoder (or the decoder post-processor) according to embodiments. For example, the view reconstructor may regenerate pictures (views) related to the viewing position and/or the viewport according to the viewing position information and/or the viewport information for a viewer of the reception end. In this case, the view reconstructor may generate the regenerated view based on the reconstruction parameters generated by the decoder according to embodiments.

The view reconstructor (or view regenerator) may simultaneously generate regenerated views for a plurality of viewing positions. Alternatively, the view reconstructor may generate a first viewing position and then generate a second viewing position based on a regenerated view for the first viewing position. That is, when the decoder according to embodiments generates pictures for a plurality of viewing positions, the view reconstructor may receive information including an order of viewing positions of regenerated views as signaling information. In this case, the information including the order of the viewing positions may be included in the reconstruction parameters and/or the view synthesis parameters.

The view synthesizer 43003 may generate a synthesized view picture (texture) (or a picture for a target viewing position) based on the regenerated view picture (texture/depth). The view synthesizer may generate the synthesized view based on the information about a viewing position and/or the information about a viewport from the decoder (or decoder post-processor) according to embodiments. For example, the view synthesizer may synthesize pictures (views) related to the viewing position and/or the viewport according to the information about the viewing position and/or the information about a viewport for a viewer of the reception end. In this case, the view synthesizer may generate the synthesized view based on the view synthesis parameters generated by the decoder according to embodiments.

The renderer/viewport generator 43004 may render the synthesized view picture (texture) (or the picture for the target viewing position) according to embodiments and generate a viewport for the synthesized view picture.

The display 43005 may display the rendered picture (texture) (or the rendered picture for the target viewing position) according to embodiments.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Figure 44:
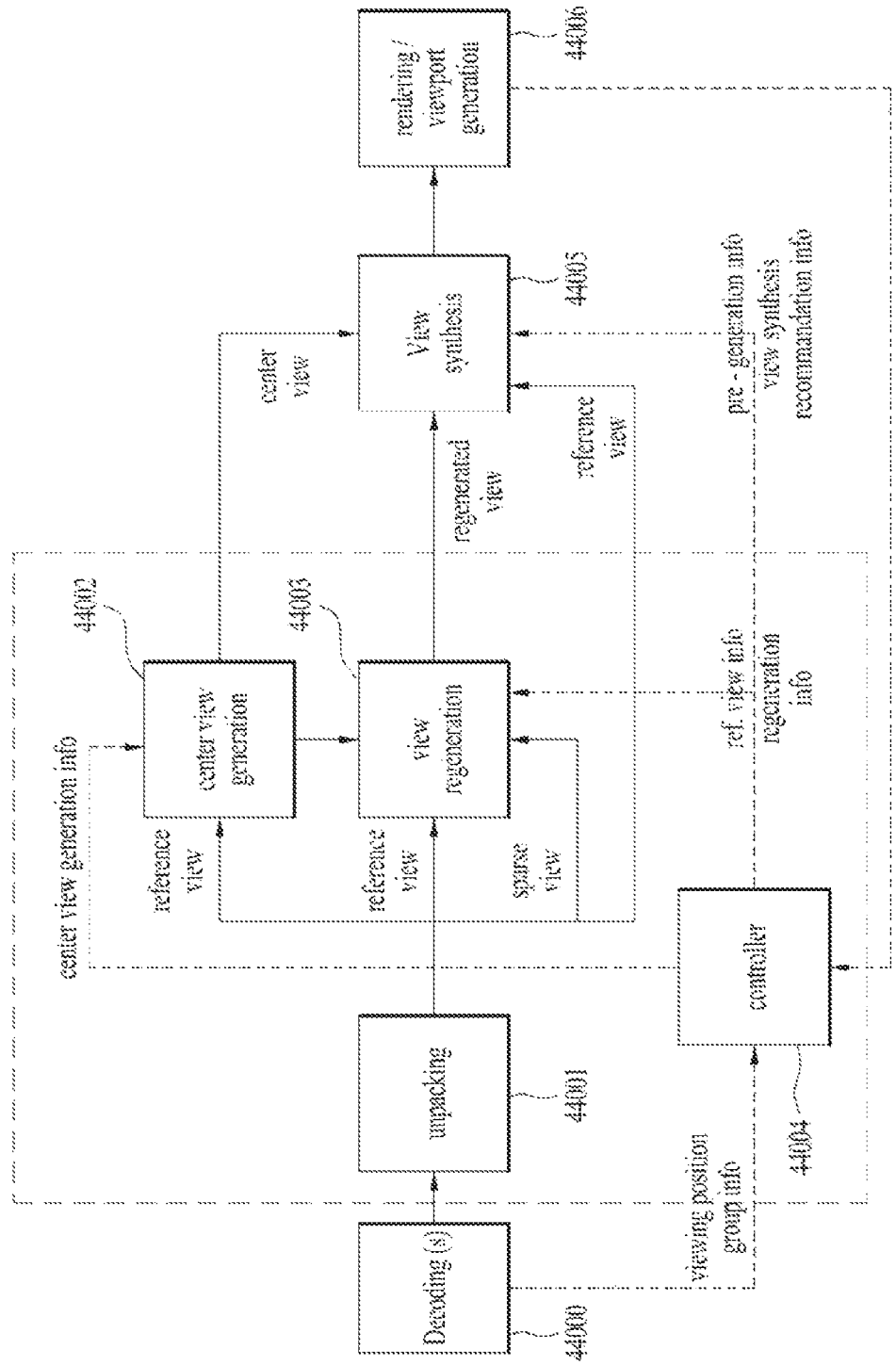
FIG. 44 is a block diagram of a decoder post-processing module according to embodiments.

FIG. 44 is a block diagram of a decoder post-processing module according to embodiments.

The decoder post-processing module according to embodiments may determine a viewing position related to view synthesis performed by a view synthesizer according to a viewpoint of a viewer. Thereafter, the decoder post-processing module may determine an operation for each viewing position and/or an operation order in a receiver.

For example, when a sparse view regeneration SEI message is present, a sparse view regeneration operation may be performed according to sparse_view_regeneration_type information for each viewing position. Next, post-processing may be performed on all components indicated by component_id and component_type corresponding to target_view_id. An example of a sparse view regeneration operation which may be performed based on the sparse_view_regeneration_type information is described below.

Center view generator or center view generation 44002: When viewing_position_picture_type is equal to 0 or center_view_present_flag is 0, the center view generator according to embodiments operates. Reference viewing positions and parameters for respective viewing positions are given by viewing_position_id and center_view_generation_parameter, respectively. If computational complexity is a huge burden on the receiver, an alternative viewing position may be used. The alternative viewing position may be signaled or used by alternative_viewing_position_id, alternative_view_distance, and rec_center_view_generation_method_type. Specifically, a center view picture may represent a spherical video/image for a center position of a multi-spherical video/image. If the center view picture is included or is not included in an input image, the center view picture may be generated by generating a virtual viewpoint.

View generator (or view generation or view generation module) 44003: When viewing_position_picture_type is equal to 1, a corresponding picture may be used as a reference picture for another viewing position. In this case, the decoder may store the picture in a buffer together with information about a viewing position that uses this picture given by viewing_position_id.

When viewing_position_picture_type is equal to 2, the view generator may regenerate a corresponding picture of a corresponding viewing position. A reference view and a sparse view needed to perform a regeneration process according to embodiments may be indicated by viewing_position_id and picture_id, respectively. The receiver may use the regeneration process given by view_regeneration_method_type to restore a viewing position intended by the encoder.

View synthesizer (or view synthesis) 44005: When viewing_position_picture_type is equal to 3, a corresponding picture is not a source picture but a pre-generated view. The receiver determines whether to use this picture or to synthesize a new picture using a regenerated view. One of determination criteria given by pregeneration_method_type may be used as a processing method for this determination. If the receiver uses this picture, a reference picture given by viewing_position_id and a sparse view given by picture_id are used together with the regeneration method.

When viewing_position_picture_type equal to 4, recommended view synthesis information, for example, view synthesis recommendation information according to embodiments, may be provided for this viewing position. This information may include a synthesis method, parameters, a reference viewing position indicator, and a sparse view presence flag, given by ref_view_systhesis_method- _type, view_synthesis_parameter, viewing_position_id, and sparse_view_present_flag, respectively.

When viewing_position_picture_type is equal to 5, a viewing position may be replaced by an alternative view from a source view, a regenerated view, or a synthesized view, indicated by alternative_viewing_position_id.

The metadata and view position group information given by the encoder preprocessor is parsed by the controller 44004. The controller according to embodiments controls the entire viewport generation processing by determining which viewing position is generated, which processing module is controlled, and in which order modules are processed.

The view position group information transmitted by the encoder pre-preprocessing module according to embodiments may be parsed by the controller 44004 according to embodiments. The controller may control the entire viewport generation operation by determining which viewing position is used, which view regeneration operation and/or view synthesis operation method is performed, and in which order view regeneration and/or view synthesis is performed. For example, if a viewer wants to view a picture at a position that is exactly the same as a center position or a reference picture position, unpacking may be performed by selecting only the corresponding picture (a center view picture or a reference view picture).

However, if the center position is not generated by the encoder preprocessing module, the controller according to embodiments may control the center view generator according to embodiments so as to generate a center view from received reference views.

For example, when a corresponding viewing position is not for a full picture, an additional operation for the full picture may be required. In this case, the controller according to embodiments may control the view generator and/or the center view generator according to embodiments. That is, the controller may control the view generator and/or the center view generator according to embodiments using related metadata. Here, the metadata may be signaled by the encoder preprocessing module. The decoder post-processing module according to embodiments may generate a center view picture, a reference view picture, and/or a sparse view picture based on the metadata.

In this process, the center view picture and/or the reference view picture according to embodiments may be used to generate other views (e.g., target views) according to embodiments. Accordingly, an operation of generating the center view, an operation of generating the reference view, and/or an operation of generating an intermediate view may be performed prior to an operation of a view generator according to embodiments.

If a viewing position of the reception device according to embodiments does not match a regenerated or provided viewing position, pictures for the regenerated and/or provided viewing position may be synthesized using given viewing positions. As the view synthesizer produces a new view using other views, the operation of the view regenerator according to embodiments may precede the operation of the view synthesizer according to embodiments. The relationship or the processing order may be indicated by viewing_position_picture_type and/or view_position_processing_order_idx.

In other words, FIG. 44 illustrates the video reception method and/or the video reception device according to embodiments.

A decoder (or decoding) 44000 may perform decoding on a received bitstream. Decoding may be performed by a decoder of the reception device. The decoding and/or decoder described in FIG. 28 may mean the above decoding and/or decoder.

An unpacker (or unpacking) 44001 may perform unpacking on the decoded bitstream. The unpacker may output or generate one or more reference views and/or one or more sparse views by unpacking the decoded bitstream. That is, when the received bitstream is decoded, the decoded bitstream may include one or more reference views and/or one or more sparse views. Unpacking described in FIG. 44 may mean unpacking described above. In addition, unpacking may be performed by an unpacker according to embodiments.

A center view generator (or center view generation) 44002 may generate a center view (or center view picture) based on one or more reference views output or generated by an unpacking operation. The center view may mean a view indicating a viewing position or a group of viewing positions. The center view generator may generate the center view (or center view picture) based on one or more reference views. The center view generator may generate the center view based on center view generation information.

The center view generation information may represent signaling information used by the center view generator to generate the center view. The center view generation information may include all or part of alternative_viewing_position_id[i], alternative_view_distance, rec_center_view_generation_method_type[i], num_pictures_for_center_view_generation[i], viewing_position_id[i], and/or center_view_generation_parameter[i] of FIG. 31. The center view described in FIG. 44 may be referred to as a center view picture.

The center view may mean a spherical video/image picture for a center position of a multi-spherical video or image (or corresponding picture) according to embodiments. The center view generator according to embodiments may generate the center view according to embodiments from a reference view picture (or reference view pictures) when the center view is not included in unpacked pictures. That is, if the center view is included in the input image or is not present, the center view may be generated through a virtual viewpoint by the center view generator.

A view regenerator (or view regeneration) 44003 may generate a regenerated view based on one or more unpacked reference views. The view regenerator may generate the regenerated view, based on one or more unpacked reference views, one or more unpacked sparse views, and/or the center view generated from the center view generator 44002. The regenerated view may be generated based on reference view information and/or regeneration information.

The reference view information may represent signaling information indicating one or more reference views or information about each reference view. The regeneration information may represent signaling information related to the view regenerator 44003. In accordance with embodiments, the reference view information may include num_views_using_this_ref_view[i] and/or viewing_position_id[i] shown in FIG. 31. The view regeneration information may include num_ref_views[i], view_regeneration_method_type[i], num_sparse_views[i], and/or picture_id[i][j] according to embodiments. The reference view information and/or the regeneration information may include all or part of information that may be indicated by viewing_position_picture_type[i]==1, 2.

A controller 44004 may receive viewing position group information included in the decoded bitstream and perform parsing based on the received information. The viewing position group information may mean a group of signaling information about one or more viewing positions. The viewing position group information may include center view generation information, reference view information, regeneration information, pre-generation information, and/or view synthesis recommendation information. The controller may receive information about the reception device (e.g., viewport information and/or viewing position information) according to embodiments, generated by a renderer/viewport generator and perform parsing based on the received information.

The controller 44004 may deliver the center view generation information according to embodiments to the center view generator 44002. The controller 44004 may deliver the reference view information and/or the regeneration information according to embodiments to the view regenerator 44003. The controller 44004 may deliver the pre-generation information and/or the view synthesis recommendation information according to embodiments to a view synthesizer 44005.

The view synthesizer 44005 may perform view synthesis based on the regenerated view generated by the view regenerator. Further, the view synthesizer may perform view synthesis based on the center view generated by the center view generator and/or the unpacked one or more reference views. The view synthesizer may mean view synthesis according to embodiments. The view synthesizer may perform view synthesis based on the pre-generation information and/or the view synthesis recommendation information, which is signaling information.

A render/viewport generator (or rendering/viewport generation) 44006) may generate or render a viewport of a view synthesized by the view synthesizer 44005.

In accordance with embodiments, the decoder 44000, the unpacker 44001, the center view generator 44002, the view regenerator 44003, the view synthesizer 44005, and/or the render/viewport generator 44006 may be implemented by the video transmission device according to embodiments and may be performed by a decoder (or decoding), an unpacker (or unpacking), a center view generator (or center view generation), a view regenerator (or view regeneration), a view synthesizer (or view synthesis), and/or a renderer/viewport generator (or rendering/viewport generation), respectively. The controller 44004 according to embodiments may be implemented by the video transmission device according to embodiments.

A receiver may generate a video or different viewpoints with head motion parallax and/or binocular disparity so that the receiver may generate an interactive video with changing positions.

Therefore, the transmission and reception devices according to embodiments may reduce bandwidth for delivering a 3DoF+ video and a storage space of a storage device and achieve a 3DoF+ video of high quality that provides head motion parallax and/or binocular disparity. Due to this configuration, the reception device according to embodiments may provide different viewing experiences according to behaviors of viewers in a VR environment.

The reception device according to embodiments enables the center view generator 4402 according to embodiments to efficiently generate or estimate a center view picture from reference view pictures and/or center view generation information.

The reception device according to embodiments enables the view regenerator 4403 according to embodiments to efficiently generate a regenerated view for a viewing position desired by a viewer, based on a reference view (reference view picture), a sparse view (sparse view picture), a center view (center view picture), and signaling information including reference view information and/or view regeneration information.

The view synthesizer 44005 according to embodiments may efficiently generate an accurate view for a viewing position desired by a viewer, based on a center view generated by the center view generator, pre-generation information, and/or view synthesis recommendation information.

The above-described operation increases transmission efficiency of 3DoF+ video data and improves decoding performance, based on signaling information according to embodiments.

Figure 45:
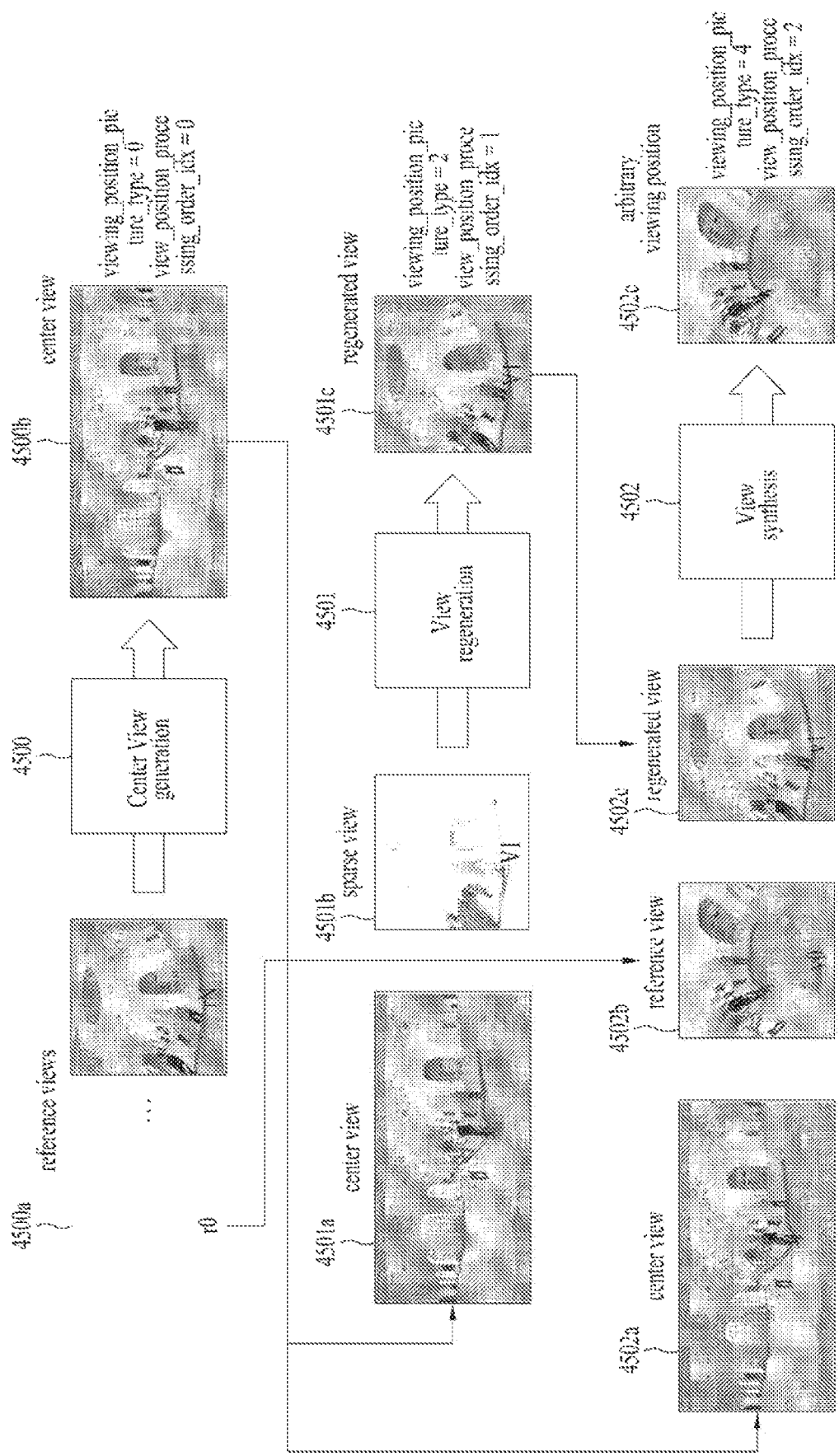
FIG. 45 illustrates an operation flow of a decoder end according to embodiments.

FIG. 45 illustrates an operation flow of a decoder end according to embodiments.

FIG. 45 illustrates an operation of a decoder post-processing module of a reception device according to embodiments and, specifically, illustrates an exemplary relationship between viewing positions due to processing orders.

Reference views 4500*a* may mean unpacked reference view pictures according to embodiments. The reference view pictures may refer to pictures that may provide basic information about one or more source view pictures (or about part or all of corresponding viewing positions). The reference view is an image of a surrounding viewpoint used to estimate (or generate) a current viewpoint. The reference view may use a source view picture or image or use a picture or an image generated by generating a virtual viewpoint. That is, the reference view according to the reception device according to embodiments may be a source view picture or may be an intermediate view picture according to embodiments.

A plurality of reference views according to embodiments may be present. For example, a plurality of reference views including reference view r0 to reference view rN may be present. That is, the reference views may mean pictures for a plurality of viewing positions or for a plurality of surrounding viewpoints and may be represented as r0 to rN.

A center view generator (or center view generation) 4500 may generate a center view picture 4500*b* based on all or part of the unpacked reference view pictures. The center view generator may mean the center view generator 2801*b* according to embodiments described with reference to FIG. 28.

Center views 4500*b*, 4501*a*, and 4502*b* may mean center view pictures according to embodiments. The center view picture may mean the center view picture described with reference to FIG. 42 and/or FIG. 44. That is, the center view picture may mean a spherical video or image picture for a center position of a multi-spherical video or image (or corresponding picture) according to embodiments. The center view generator according to embodiments may generate the center view according to embodiments from a reference view picture (or reference view pictures) when the center view is not included in unpacked pictures. That is, if the center view is included in the input image or is not present, the center view may be generated through a virtual viewpoint by the center viewpoint generator.

The center view generator 4500 according to embodiments generates a center view, which is a picture for a central viewpoint, from pictures for surrounding points, for example, reference views.

Here, whether a specific picture is a center view picture may be indicated by related signaling information. In embodiments, there may be a viewing_position_picture_type[i] parameter to be described later in FIG. 31. viewing_position_picture_type[i] may mean type information of a picture having an i-th index. Therefore, if a specific picture having the i-th index is the center view, viewing_position_picture_type[i] may be represented as 0.

In embodiments, when there is a picture with viewing_position_picture_type of 0 among pictures unpacked by the decoder of the reception device according to embodiments (i.e., when a center view picture is present among the unpacked pictures), the center view generator of the decoder end (reception device) according to embodiments may not perform an operation. However, when the picture having viewing_position_picture_type of 0 is not present among the unpacked pictures (i.e., when the center view picture is not present among the unpacked pictures), the center view generator according to embodiments may perform an operation.

In addition, signaling information related to a processing order for a specific picture may be indicated. In embodiments, there may be a view_position_processing_order_idx [i] parameter to be described later in FIG. 31. Here, a value of view_position_processing_order_idx of a picture corresponding to the center view may be 0. That is, the center view may mean a view that should be processed preferentially from reference views.

A sparse view 4501b may mean a sparse view picture according to embodiments. The sparse view picture refers to a picture including unique information (or pixels) for one or more source view pictures (or for part or all of corresponding viewing positions). That is, the sparse view picture represents an image (or picture) including unpredictable information upon estimating a current viewpoint from surrounding viewpoints through pruning or source view pruning according to embodiments. In this case, information (predictable information) in an image of a current viewpoint overlapping with images of surrounding viewpoints may be represented as a gray/black (or monochrome) area and, in this case, the unpredictable information may be included in the sparse view picture.

A view regenerator 4501 may generate a regenerated view 4501c based on the center view 4501a and/or the sparse view 4501b according to embodiments. The view regenerator 4501 may mean the view regenerator according to embodiments described with reference to FIG. 44.

The view regenerator 4500 according to embodiments may efficiently regenerate (estimate or predict) a view using the center view and/or the sparse view. The center view according to embodiments is generated from the received reference views. The received sparse view according to embodiments is a picture in which redundancy between views has been removed (or pruned) by the encoder or the transmitter, and thus includes unpredictable data. The receiver according to embodiments may efficiently estimate a view using only the generated center view (center view picture) and/or the sparse view (sparse view picture).

Regenerated views 4501c and 4502c may mean pictures generated based on the center view 4501a and/or the sparse view 4501b. Here, signaling information indicating whether a specific picture is a regenerated view or a picture related to the regenerated view may be indicated. In embodiments, there may be a viewing_position_picture_type[i] parameter to be described later in FIG. 31. viewing_position_picture_type[i] may mean type information of a picture having an i-th index. Accordingly, if a specific picture having an i-th index is a regenerated view, viewing_position_picture_type[i] may be represented as 2. A value of view_position_processing_order_idx of a picture corresponding to the regenerated view may be 1. That is, the view regenerator 4501 may perform an operation to be performed after the above-described center view generator.

Here, v0 and v1 may represent view 0 and view 1 and may be viewpoints adjacent to each other. In FIG. 45, the sparse view 4501b may mean a sparse view according to embodiments at a position v1, and a view regeneration process of estimating v1 through the center view 4501b and then generating a view at a final position v1 using a transmitted sparse view (position v1) is illustrated. In FIG. 45, during view synthesis, as an example of using three positions of a center (i.e., the position of the center view), v0, and v1, an arbitrary viewpoint may be generated using the center view, a reference view (using a transmitted image for the position v0), and a regenerated view (using an image regenerated through the sparse view for the position v1).

In other words, v0 may mean a first viewing point, and v1 may mean a second viewing point. That is, the view regenerator may generate a regenerated view for the first viewing point corresponding to v0 using the center view 4501a according to embodiments. In order to generate the regenerated view, the center view and the sparse view for the first viewing point corresponding to v0 may be used. Specifically, the view regenerator may estimate v1 through the center view and then generate a view (picture) at a final position v1 using the transmitted sparse view (position v1).

One or more reference views 4502b to be used for view synthesis may refer to all or part of pictures of the above-described reference views 4500a.

A view synthesizer 4502 may generate a synthesized view 4502c, based on the above-described center view 4502a, one or more reference views 4502b to be used for view synthesis, and/or regenerated view 4502c according to embodiments. The synthesized view may mean an arbitrary viewing position. The arbitrary viewing position may be referred to as a target viewing position. The view synthesizer may refer to the view synthesizer 44005 described with reference to FIG. 44 as embodiments.

Arbitrary viewing positions 4501c and 4502c may represent pictures for arbitrary viewing positions, i.e., synthesized views according to embodiments, which are synthesized based on the above-described center view 4502a, one or more reference views 4502b to be used for view synthesis, and/or a regenerated view 4502c according to embodiments. Here, signaling information indicating whether a specific picture is the synthesized view 4502c or a picture related to the synthesized view may be indicated. In embodiments, there may be a viewing_position_picture_type[i] parameter to be described later in FIG. 31. viewing_position_picture_type[i] may mean type information of a picture having an i-th index. Therefore, if a specific picture having an i-th index is a synthesized view, viewing_position_picture_type[i] may be represented as 4. A value of view_position_processing_order_idx of a picture corresponding to the synthesized view may be 2. That is, the view synthesizer 4502 may perform an operation to be performed after the above-described view regenerator.

Specifically, in order to generate a picture for the arbitrary viewing point, the view synthesizer 4502 may use the center view 4502a, a reference view at a viewing point related to the arbitrary viewing point (e.g., a reference view for v0 corresponding to the first viewing point), and/or a regenerated view at a viewing point related to the arbitrary viewing point (e.g., the regenerated view for the second viewing point in FIG. 45). That is, upon performing view synthesis, pictures at three viewpoints, i.e., a center view picture (a picture for a center position), a picture related to a viewpoint v0 (e.g., a reference view for v0), and a picture related to a viewpoint v1 (e.g., a regenerated view for v1) may be used. That is, as shown in FIG. 45, the arbitrary viewing point may be generated using the center view, the reference view (using a transmitted image for position v0 in an embodiment), and the regenerated view (a regenerated picture reconstructed through a sparse view for position v1).

The decoder according to embodiments may perform view synthesis in order to provide higher accuracy. For example, a view for a final viewing position may be synthesized using a center view generated from reference views for a plurality of viewing positions, a view (e.g., v1) estimated from the center view and/or a sparse view (e.g., v1) for a first viewing position (or viewpoint), and a reference view (e.g., v0) for an adjacent second viewing point.

A receiver may generate a video or different viewpoints with head motion parallax and/or binocular disparity so that the receiver may generate an interactive video with a changed position.

Therefore, the transmission and reception devices according to embodiments may reduce bandwidth for delivering a 3DoF+ video and a storage space of a storage device and achieve a 3DoF+ video of high quality that provides head motion parallax and/or binocular disparity. Due to this configuration, the reception device according to embodiments may provide different viewing experience according to behaviors of viewers in a VR environment.

The reception device according to embodiments enables the center view generator 4500 according to embodiments to efficiently generate or estimate a center view picture from reference view pictures and/or center view generation information.

The reception device according to embodiments enables the view regenerator 4501 according to embodiments to efficiently generate a regenerated view for a viewing position desired by a viewer, based on a reference view (reference view picture), a sparse view (sparse view picture), a center view (center view picture), and signaling information including reference view information and/or view regeneration information.

The view synthesizer 4502 according to embodiments may efficiently generate an accurate view for a viewing position desired by a viewer, based on a center view generated by the center view generator, pre-generation information, and/or view synthesis recommendation information.

The transmitter according to embodiments transmits only images needed for the receiver to perform estimation, which are pruned (i.e., redundancy is removed), instead of transmitting all images, thereby increasing data transmission efficiency and improving decoding performance.

The above-described operation increases transmission efficiency of 3DoF+ video data and improves decoding performance, based on signaling information according to embodiments.

Figure 46:
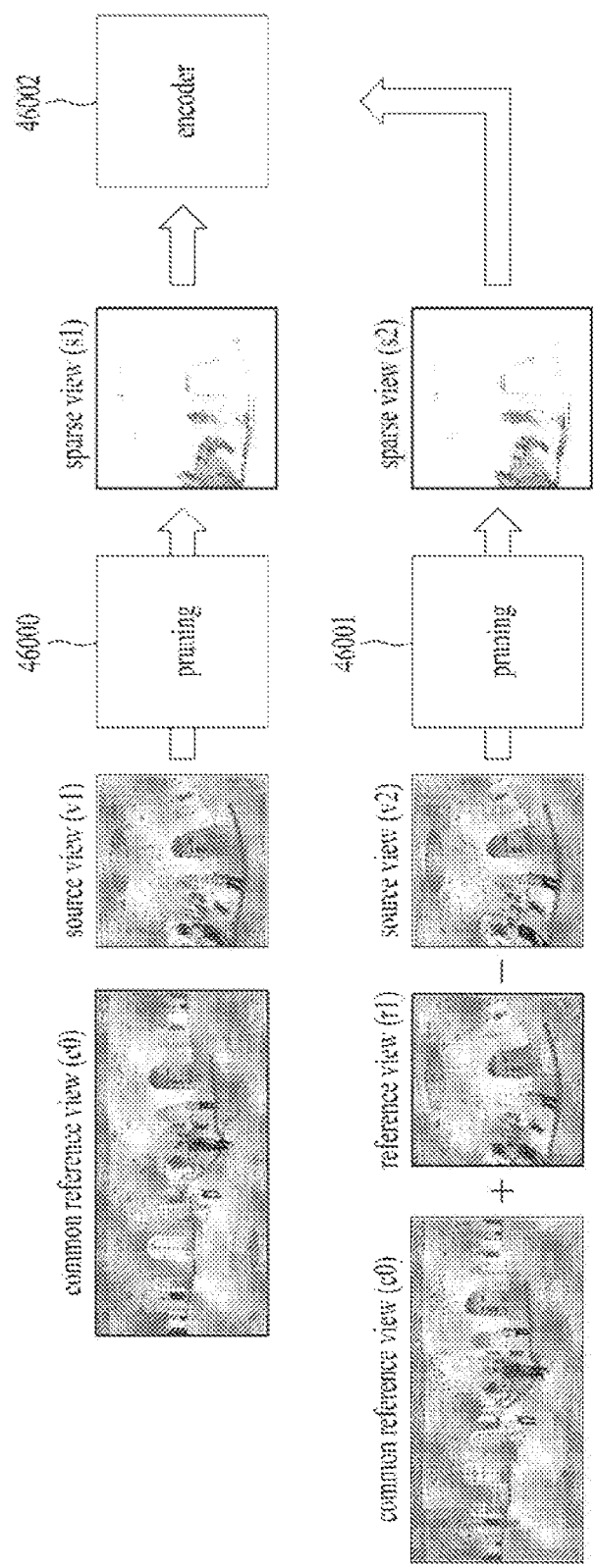
FIG. 46 illustrates a pruning scheme of an encoder preprocessing module according to embodiments.

FIG. 46 illustrates a pruning scheme of an encoder preprocessing module according to embodiments.

Specifically, the pruning scheme may refer to an operation performed by an inter-view redundancy remover or a pruner of the encoder preprocessing module according to embodiments.

Two pruning cases according to embodiments used as a method of reducing information redundancy between views (or pictures) according to embodiments are described below.

1) Case of estimating a source view v1 using one reference view c0 and delivering unpredictable information or additional information as a sparse view s1

2) Case of estimating a source view v2 using two or more reference views c0 and r1 and delivering a view including a predication error or additional information as a sparse view s2

In the transmitted information c0, s1, r1, and s2, image information indicated by a red frame is transmitted.

According to embodiments, a first pruner (or pruning) 46000 generates a sparse view, for example, s1 or a first sparse view, based on a common reference view c0 and a source view v1. According to embodiments, the sparse view s1 is generated by subtracting a source view v1 from the common reference view c0 and/or the center view c0 from the source view v1. The sparse view s1 is a picture including unpredictable data, and a gray or black display area of the sparse view s1 is duplicate data or redundancy between the common reference view c0 and the source view s1. By generating the sparse view s1. data encoding or transmission performance may be increased.

A second pruner (or pruning) 46001 generates a sparse view s2 based on the common reference view c0, the reference view r1, and/or the source view v2. For example, the center view c0 is added to the reference view r1 and the added picture is subtracted together with the source view v2.

A packer/encoder (or packing/encoding) 46002 packs/encodes the sparse view s1 and/or the sparse view s2.

According to embodiments, a plurality of sparse views including s1 and s2 may be generated based on pruning in order to encode/transmit data including a picture.

For example, the sparse view s2 (viewpoint for s2), which is one of a plurality of viewing positions, may be generated by pruning the center view c0, the reference view r1 for a viewpoint of r1, and/or the sparse view v2. According to embodiments, the pruner adds the common reference view c0 and the reference view r1 and subtracts the source view v2 for a viewpoint of v2.

According to embodiments, the sparse views may be packed and/or encoded. For example, the sparse views s1 and s2 (or more sparse views) are packed and/or encoded.

In accordance with embodiments, the terms may be interpreted as follows or in a similar way. That is, the term c0 is a common reference viewpoint/viewing position picture, the term v1 is a first viewpoint/viewing position source view picture, the term s1 is a first viewpoint/viewing position sparse view picture, the term r1 is a first viewpoint/viewing position reference view picture, the term v2 is a second viewpoint/viewing position source view picture, and the term s2 is a second viewpoint/viewing position sparse view picture. According to embodiments, the common reference view may mean a center view.

The inter-view redundancy remover according to embodiments may perform only first pruning according to embodiments, only second pruning according to embodiments, or both first pruning and second pruning as described in FIG. 46. Alternatively, first pruning may be performed for only some of the plurality of source views and/or second pruning may be performed for only the remaining parts of the plurality of source views. Here, the first viewing position and the second viewing position represent different viewing positions.

Accordingly, a video transmission method according to embodiments may include removing inter-view redundancy between pictures for a plurality of viewing positions; packing pictures from which inter-view redundancy has been removed; and encoding the packed pictures and signaling information.

A video transmission device according to embodiments may include an inter-view redundancy remover for removing inter-view redundancy between pictures for a plurality of viewing positions; a packer for packing pictures from which inter-view redundancy has been removed; and an encoder for encoding the packed pictures and signaling information.

Figure 47:
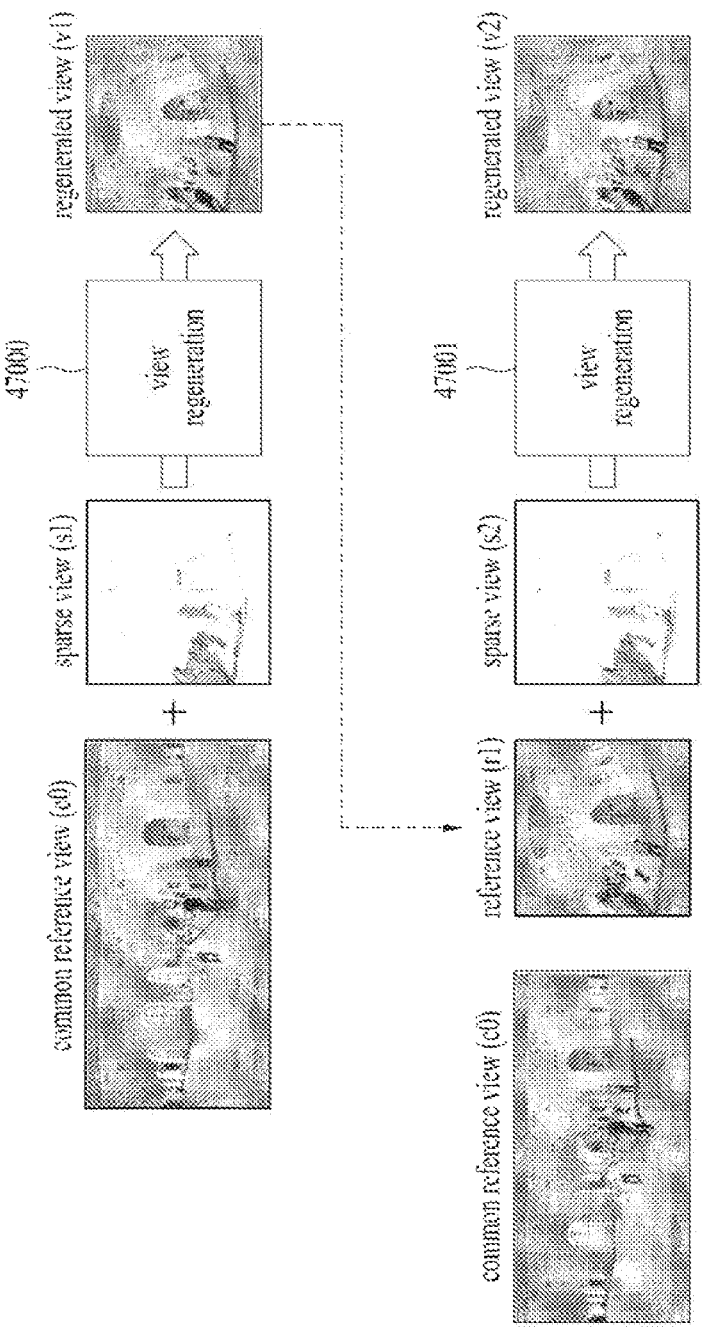
FIG. 47 illustrates a view generation process according to embodiments of a decoder post-processing modules according to embodiments.

FIG. 47 illustrates a view generation process according to embodiments of a decoder post-processing module according to embodiments.

This figure illustrates a view regeneration process of restoring original view information when information from which redundancy is removed using pruning according to embodiments is received.

First, when one reference view c0 and an additional information sparse view s1 are transmitted, a target view is estimated using c0 (in this case, an estimation method used at a transmission end is used) and a final target view is restored using s1. In this case, information such as the location/direction/rotation of the target view, information such as the location/direction/rotation of the reference view, information related to a method of estimating the target view from the reference view, and information related to a method of generating the final regenerated view using the sparse view may be necessary information.

Second, when two or more reference views c0 and r1 and an additional information sparse view s2 are transmitted, the target view is estimated using c0 and r1, and the final target view is restored using s2. The necessary information may be information such as the location/direction/rotation of the target view, information such as the location/direction/rotation of each of the reference views, information related to a method of estimating the target view from the reference views, and information related a method of generating the final regenerated view using the sparse view.

In this case, information restored through view regeneration at a receiving end, rather than a reference view transmitted in a process of restoring a view v2, may be used (in the above example, using a regenerated view v1 instead of a reference view r1 is shown by an arrow of dotted lines). In this case, additional information indicating that the regenerated view v1 should be used without transmitting the reference view r1 may be transmitted.

In other words, view regeneration according to embodiments may be performed by a first view regenerator and a second view regenerator 47001. The first view regenerator and/or the second view regenerator according to embodiments may mean block(s) (or operation(s)) included in the above-described view regenerator (or view generation) according to embodiments.

The first view regenerator 47000 may generate the first regenerated view v2 using the reference view picture c0 according to embodiments and the sparse view picture according to embodiments. The first regenerated view v1 may mean a regenerated view for a first viewing position. Here, the sparse view picture used to generate the first regenerated view v1 may be the first sparse view picture s1. The first sparse view picture s1 may mean a sparse view picture for the first viewing position. A common reference view may be, for example, a center view picture (or a center view c0). Here, the common reference view according to embodiments may mean a center view picture generated from a center view generator (or center view generation) or a center view picture included in a bitstream transmitted by an encoder end according to embodiments.

That is, the view generator according to embodiments may generate the first regenerated view v1 using the first sparse view picture s1 related to the first viewing position included in received sparse view pictures and using the common reference view picture (or center view picture c0) according to embodiments.

The first view generator may use information about the first viewing position in order to generate the first regenerated view v1. For example, the first view generator may generate the first regenerated view v1 using information such as the location/direction/rotation of the first regenerated view (or the first target view v1). In addition, the first view generator may use information such as the location/direction/rotation of reference views, information related to a method of estimating the first target view from the reference views, and a method related to a method of generating a final regenerated view using sparse views.

The second view regenerator 47001 may generate the second regenerated view v2 using the common reference view picture c0 according to embodiments and the sparse view picture according to embodiments. The second regenerated view v2 may mean a regenerated view for a first viewing position. Here, the sparse view picture used to generate the second regenerated view v2 may be the second sparse view picture s2. Here, the first viewing position and the second viewing position mean different viewing positions.

The second view generator may use information about the second viewing position in order to generate the second regenerated view v2. For example, the second view generator may generate the second regenerated view v2 using information such as the location/direction/rotation of the second regenerated view (or the first target view). In addition, the second view generator may use information such as the location/direction/rotation of reference views, information related to a method of estimating the second target view v2 from the reference views, and information related to a method of generating a final regenerated view using sparse views.

In accordance with embodiments, the decoder post-processing module according to embodiments may receive signaling information as to whether the first view regenerator and/or the second view regenerator is used. That is, in order to generate the second regenerated view according to embodiments, information indicating that the first regenerated view is available may be signaled. An example of such signaling information may be view_position_processing_order_idx shown in FIG. 40.

This configuration enables a video transmission device according to embodiments to increase transmission/reception efficiency by reducing the amount of reference view pictures, sparse view pictures, or related pictures to be transmitted. In addition, the video transmission device according to embodiments may effectively reduce the amount of transmitted/received data by transmitting only a small number of sparse views instead of reference views.

This configuration enables a video reception device according to embodiments to reduce the amount of received data, thereby reducing load on a memory and/or a processor of a receiver.

Figure 48:
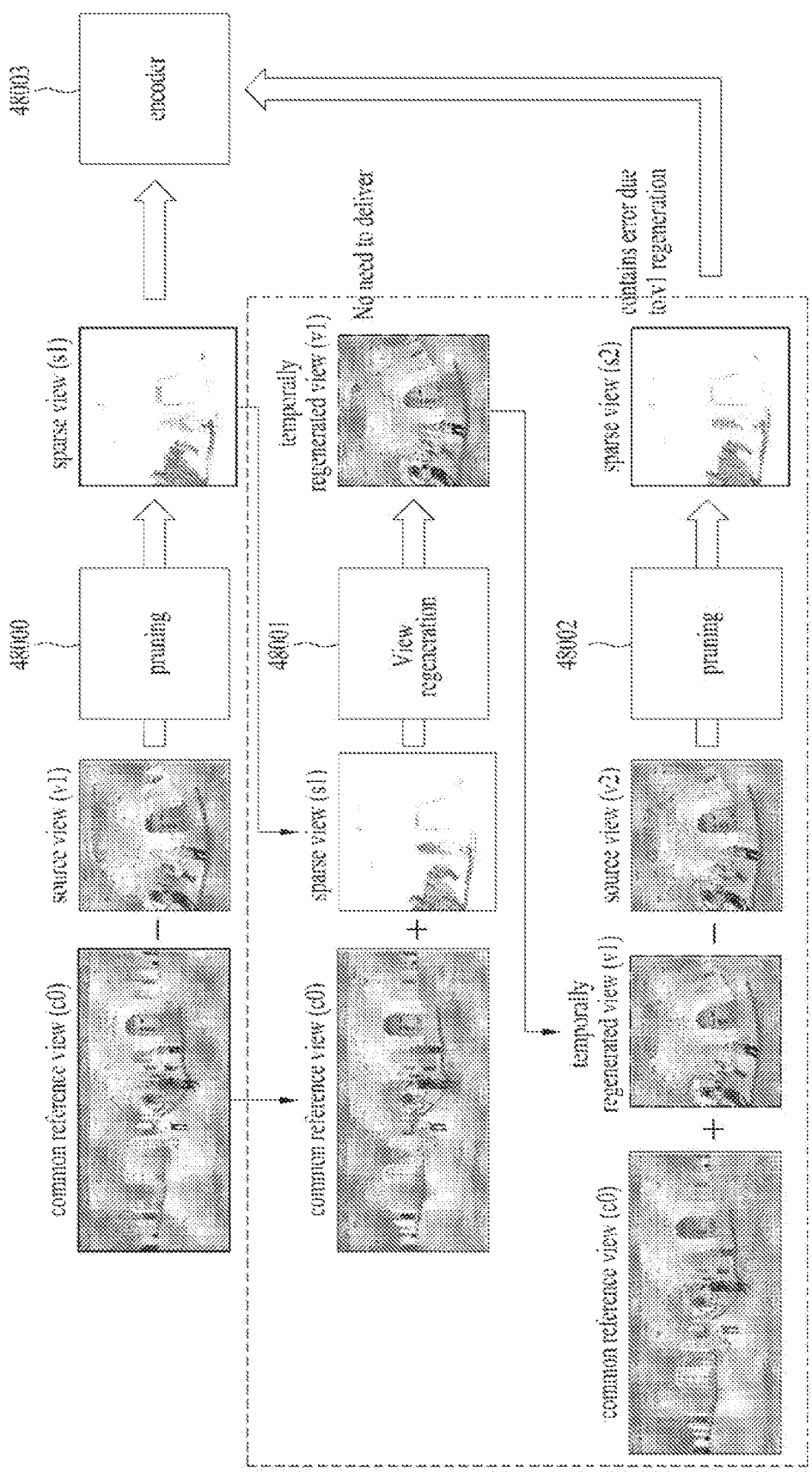
FIG. 48 illustrates an embodiment of a pruning scheme of an encoder preprocessing module according to embodiments.

FIG. 48 illustrates an embodiment of a pruning scheme of an encoder preprocessing module according to embodiments.

When a reception end according to embodiments uses a regenerated view restored by a reception end as a reference view, information may be lost during a pruning and/or view regeneration process. In order to compensate for this information, an additional operation may be considered at a transmitting end.

According to embodiments, when a source view v2 is estimated using two or more reference views c0 and v1 and a view containing an estimation error or additional information is transmitted as a sparse view s2, it is assumed that a part (in this example, the restored view v1) of the reference views is not directly transmitted and restored information is used, so that bit efficiency is increased. In this case, the transmission end may generate the sparse view s2 in consideration of a restoration error of v1 used as the reference view.

Here, v1 is restored using c0 and s1 using a view regeneration method to be used at the reception end according to embodiments. If the regenerated view v1, instead of the original source v1, is used to generate s2, since "v1, information of which has been lost during a pruning/view regeneration process" is used, problems arising in the receiver, for example, decrease of accuracy of prediction as compared with use of the source view v1, may occur and this regenerated view v1 is reflected in an error of the source view v2. In this case, bit efficiency may be improved since r1 is not directly transmitted.

The pruning scheme of the encoder preprocessing module according to embodiments may perform a first pruning process (48000), view regeneration of an encoder end (48001), and/or a second pruning process (48002). In other words, the encoder preprocessing module according to embodiments includes a first pruner 48000 performing the first pruning process, an encoder end view regenerator 48001 performing view regeneration of the encoder end, and/or a second pruner 48002 performing the second pruning process.

Here, pruning means removing a part (or region) that is common within one or more pictures (or views) and generating information (or picture) that is difficult to predict (estimate) by a reception device according to embodiments. That is, pruning a second picture using a first picture (or pruning the first picture using the second picture) means removing a common area (or common portion) between the first picture and the second picture and generating a picture (i.e., a sparse view picture) representing unique information (or a region of a picture) present only in the first picture and/or unique information present only in the second picture. For example, the pruner according to embodiments may generate the sparse view picture using a difference operation between the first picture and the second picture. Pruning may mean all or part of an operation by the pruner according to embodiments. Pruning may also be referred to as inter-view redundancy removal. The method (or embodiment) of performing pruning according to embodiments may be referred to as a pruning scheme.

In addition, the view regenerator of the encoder end is a view regenerator included in the transmission device according to embodiments and may mean a view regenerator included in the reception device according to embodiments. That is, the view generator generates a picture for generating a target view for a first viewing position using a reference view and a sparse view for the first viewing position.

The first pruner (or first pruning) 48000 may generate a first sparse view by pruning a first source view of source views according to embodiments using a common reference view picture c0 according to embodiments. The first sparse view means a source view for the first viewing position. The first sparse view means a sparse view for the first viewing position. Here, the common reference view c0 may mean a center view according to embodiments.

The view regenerator of the encoder end (or view regeneration of the encoder end) 48001 may generate a temporally regenerated view (or temporally regenerated view picture) v1 based on the common reference view c0 according to embodiments and the above-described first sparse view s1. The temporally regenerated view may be encoded by an encoder or may not be encoded.

The second pruner (or second pruning) 48002 may prune a second source view of source views according to embodiments using the common reference view picture c0 according to embodiments and/or the above-described temporally regenerated view picture. In this case, the second sparse view s2 may be generated by pruning the second source view v2. The second source view v2 means a source view for the second viewing position. The second sparse view s2 means a sparse view for the second viewing position. Here, the common reference view c0 may mean a center view according to embodiments.

Here, the second sparse view may be encoded by the encoder according to embodiments. The second sparse view may mean a sparse view for an error when the transmission end regenerates the error that may occur in a process of generating a regenerated view at the view regenerator of the decoder end according to embodiments.

An encoder 48003 performs encoding according to embodiments. The encoder may encode the common reference view picture c0, the first sparse view picture s1, and/or the second sparse view picture s2 according to embodiments. The encoder according to embodiments may transmit the common reference view picture c0, the first sparse view picture s1, and/or the second sparse view picture s2 in the form of a bitstream to the reception device. Here, the first viewing position and the second viewing position mean different viewing positions.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

Here, the video transmission method according to embodiments may further include generating a temporally regenerated view picture based on a first sparse view picture of the sparse view pictures and the center view picture (ask the researcher about this for description of the specification) and pruning an estimated source view from the temporally regenerated view picture and the center view picture. The pruning may include generating a second sparse view picture and the encoding may further include encoding the second sparse view picture.

The structure of the encoder preprocessing module according to embodiments generates the sparce view through the pruner, the temporally regenerated view through the view regenerator, and the sparse view through the pruner to monitor a view regeneration process of the reception device according to embodiments. Therefore, errors that may be generated by the reception device may be prevented, and errors in the encoding process generated by the transmission device may be detected.

The structure of the encoder preprocessing module according to embodiments generates the sparse view through the pruner, the temporally regenerated view through the view regenerator, and the sparse view through the pruner to perform the view regeneration process of the reception device. Therefore, a VR environment which is accurate like a real environment may be provided to viewers who use the reception device.

The reception device according to embodiments may efficiently and accurately provide necessary views using a small amount of data. This configuration according to embodiments may reduce computational load of the transmission device and the reception device.

Figure 49:
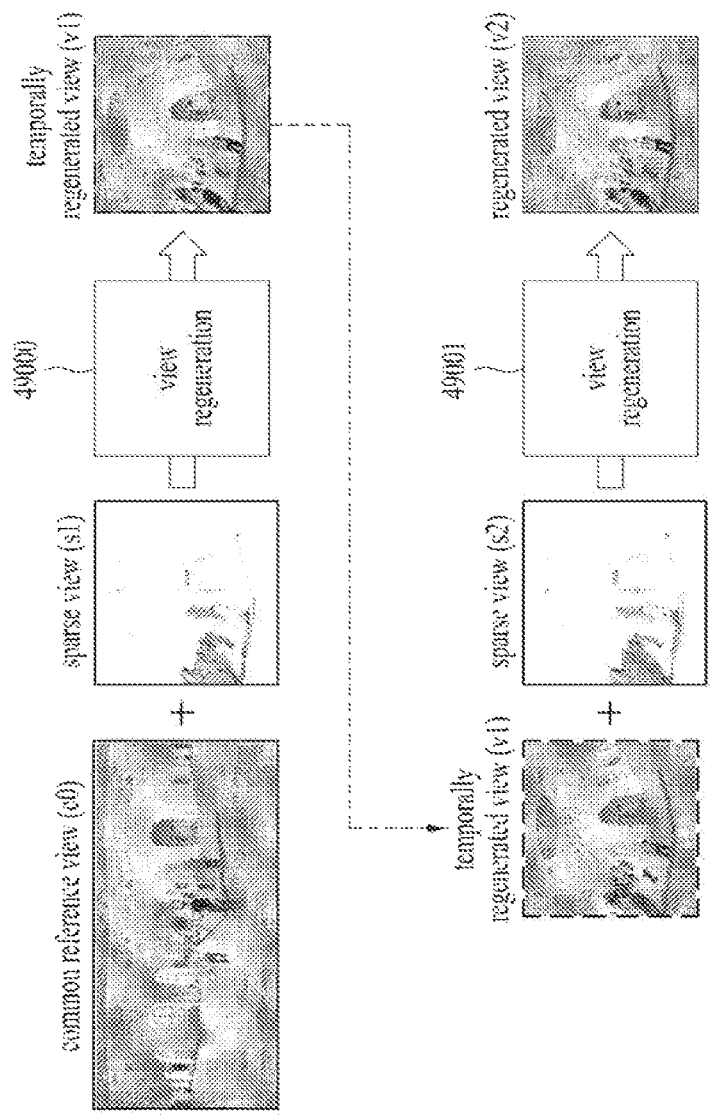
FIG. 49 illustrates view generation according to embodiments of a decoder post-processing module according to embodiments.

FIG. 49 illustrates view generation according to embodiments of a decoder post-processing modules according to embodiments.

View generation according to embodiments of the decoder post-processing module according to embodiments may be performed by a first view regenerator 49000 for generating a first temporally regenerated view picture and/or a second view regenerator 49001 using the first temporally regenerated view. In other words, the decoder post-processing module according to embodiments may include the first view regenerator 49000 for performing a first view regeneration process and the second view regenerator for performing a second view regeneration process.

For information which is encoded to be robust against errors, a receiver according to embodiments may be used. However, when view 2 is restored, since view 1 is used as a reference view, a restoration order between views becomes important in that view 2 should be regenerated after view 1 is regenerated and this restoration order may be additionally transmitted as metadata related to regeneration of view 2 or to a related system.

Therefore, first, when one reference view c0 and an additional information sparse view s1 are transmitted, a target view may be estimated using the reference view c0 (in this case, an estimation method used at a transmission end is used) and a final target view may be restored using the sparse view s1. In this case, information such as the location/direction/rotation of the target view, information such as the location/direction/rotation of the reference view, information related to a method of estimating the target view from the reference view, and information related to a method of generating the final regenerated view using the sparse view may be necessary information.

Second, when two or more reference views c0 and r1 and an additional information sparse view s2 are transmitted, the target view is estimated using c0 and r1, and the final target view is restored using s2. The necessary information may be information such as the location/direction/rotation of the target view, information such as the location/direction/rotation of each of the reference views, information related to a method of estimating the target view from the reference views, and information related to a method of generating the final regenerated view using the sparse view. The necessary information may further include information as to whether the reference views are transmitted and information related to a reference view generation method (i.e., a view regeneration method, information necessary for the view regeneration method, information about images (e.g., c0 and s1) necessary for the view regeneration method, a reference view position, and/or information as to whether a view has been generated to be robust against errors).

View regeneration according to embodiments may be performed by the first view regenerator 49000 and the second view regenerator 49001. The first view regenerator and/or the second view regenerator according to embodiments shown in FIG. 49 may refer to block(s) (or operation(s)) included in the above-described view regenerator (or view generation) according to embodiments.

The first view regenerator (or first view regeneration) 49000 may generate the first temporally regenerated view (or target view v1) using the common reference view picture c0 according to embodiments and/or the first sparse view picture of received sparse view pictures. The first sparse view picture may mean a sparse view picture for a first viewing position. The first sparse view picture is included in the received sparse view pictures. The common reference view picture c0 according to embodiments may mean a center view. The first regenerator may generate a target picture for the first viewing position. That is, the temporally regenerated view may be the target view for the first viewing position.

The first view generator may use information about the first viewing position in order to generate the first regenerated view v1. For example, the first view generator may generate the first regenerated view v1 using information such as the location/direction/rotation of the first regenerated view (or the first target view v1). In addition, the first view generator may use information such as the location/direction/rotation of reference views, information related to a method of estimating the first target view from the reference views, and information related to a method of generating a final regenerated view using sparse views.

The second view generator (or second view generation) 49001 generates a target picture for a second viewing position. In this case, the second view generator may generate a second regenerated picture v2 using the above-described temporally regenerated view (or the target picture for the first viewing position) and/or the second sparse view picture s2.

The second view generator may use information about the second viewing position in order to generate the second regenerated view v2. For example, the second view generator may generate the second regenerated view v2 using information such as the location/direction/rotation of the second regenerated view (or the first target view). In addition, the second view generator may use information such as the location/direction/rotation of reference views, information related to a method of estimating the second target view v2 from the reference views, and information related to a method of generating a final regenerated view using sparse views. For example, the second view regenerator may use information as to whether the reference views are transmitted and information related to a reference view generation method (i.e., a view regeneration method of the first view regenerator as information related to the first view regenerator), a reference view position, and/or information as to whether a view has been generated to be robust against errors. For example, view_regeneration_method_type, num_ref_views, num_views_using_this_ref_view, viewing_position_picture_type, picture_id, and view_regeneration_method_type according to embodiments may be used.

In accordance with embodiments, the decoder post-processing module according to embodiments may receive signaling information as to whether the first view regenerator and/or the second view regenerator is used. That is, in order to generate the second regenerated view, information indicating that the first regenerated view is available may be signaled. An example of such signaling information may be view_position_processing_order_idx shown in FIG. 40.

Figure 50:
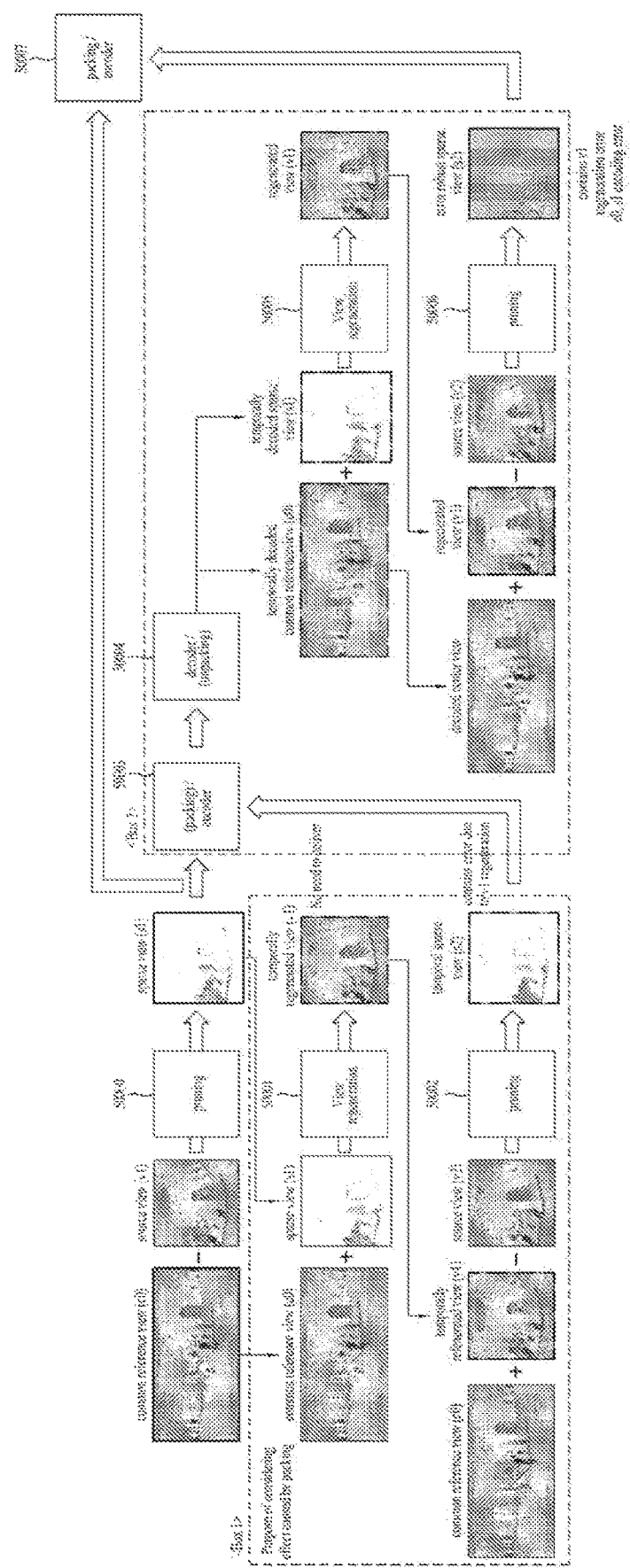
FIG. 50 illustrates view generation according to embodiments of a decoder post-processing module according to embodiments.

FIG. 50 illustrates view regeneration according to embodiments of a decoder post-processing module according to embodiments.

In addition to consideration (<Box 1> of a left side) of an error generated due to use of a regenerated view according to embodiments, an error generated in a process of encoding a packed picture may be additionally considered (<Box 2> of a right side).

That is, in order to reproduce an error generated in an encoding/decoding process, a reference view and a sparse view may be acquired 1) after packing information to be transmitted, such as the sparse view and the reference view, 2) encoding is performed at a target bitrate, 3) decoding and 4) unpacking processes are performed with respect to a generated bitstream. In this case, each view has an error caused by encoding/decoding. If a view regeneration process is performed using the view having an error, an effect of a coding error generated during view regeneration at a receiver and an error caused by view regeneration on view regeneration may be considered. A source view v2 is estimated based on regenerated views c0, s1, and v1 and both the 'error caused by coding' and the 'error caused by reference view regeneration' may be considered for a generated sparse view s2.

The encoder preprocessing module according to embodiments includes a first pruner 50000, a first view generator 50001 of an encoder end, a second pruner 50002, a first packing/encoder 50003, a decoder/unpacker 50004 of the encoder end, a second view regenerator 50005 of the encoder end, a third pruner 50006, and/or a second packer/encoder 50007. The first view regenerator and/or the second view regenerator shown in FIG. 50 according to embodiments may mean block(s) (or operation(s)) included in the above-described view regenerator (or view generation) according to embodiments. In addition, the first pruner, the second pruner, and/or the third pruner according to embodiments may be included in an inter-view redundancy remover according to embodiments. In addition, the packer/encoder conceptually includes a packer (or packing) and/or an encoder (encoding) according to embodiments.

The first pruner 50000 may generate a first sparse view by pruning (or removing inter-view redundancy) a first source view picture v1 according to embodiments using a common reference view picture c0 according to embodiments. The first source view picture means a source view picture for a first viewing position among source view pictures. In addition, the first sparse view picture means a sparse view picture for the first viewing position among sparse view pictures generated by the inter-view redundancy remover. The generated first sparse view picture may be packed and encoded by the first packer/encoder and/or the second packer/encoder.

Here, the common reference view may be a reference view indicating a view commonly used in the pruner according to embodiments or the first view generator of the encoder end according to embodiments. For example, the common reference view c0 may mean a center view according to embodiments.

The source view picture (or source view) refers to an original picture (or original view) obtained by the encoder preprocessing module according to embodiments. The sparse view picture (or sparse view) refers to a picture from which redundancy has been removed by a pruner according to embodiments.

The first view generator 50001 of the encoder end generates a temporally regenerated view v1 based on the common reference view picture c0 according to embodiments and/or the above-described first sparse view picture s1. The temporarily regenerated view v1 is a picture related to a target view for a first viewing position. The temporarily regenerated view may or may not be packed and/or encoded by the first packer/encoder and/or the second packer/encoder according to embodiments. That is, the temporarily regenerated view may or may not be transmitted to a reception end according to embodiments.

The second pruner 50002 may generate a temporal sparse view by pruning a second source view picture v2 estimated based on the common reference view picture c0 according to embodiments and/or on the above-described temporally regenerated view. In this case, the second source view picture may mean a source view picture related to a second viewing position included in received source views or a source view picture for the second viewing position estimated from the above-described temporally regenerated view and common reference view picture c0. The temporal sparse view picture s2 may mean a source view picture for the second viewing position among source view pictures. That is, the temporal sparse view picture may include errors for the second source view estimated using the regenerated view for the first viewing position generated by the first view regenerator.

The first view generator and/or the second pruner of the encoder end according to embodiments has a purpose of causing the reception device to minimize (or consider) the influence of packing.

The first packer/encoder 50003 may receive the above-described first sparse view picture s1 and/or the above-described temporal sparse view picture s2 to pack the received picture(s) into a packed picture and encodes the packed picture according to embodiments to output a bitstream.

The decoder/unpacker 50004 of the encoder end decodes the bitstream generated by the first packer/encoder 50003 according to embodiments and then unpacks the decoded bitstream. The decoder/unpacker according to embodiments may decode and/or unpack the bitstream received from the first packer/encoder to generate a temporarily decoded common reference view c0 and/or a temporally decoded sparse view s1 for the first viewing position.

The temporally decoded common reference view (or temporally decoded common reference view picture) means a common reference view picture generated by performing decoding/unpacking again in order to regenerate a view for the bitstream packed/encoded by the encoder-preprocessing module according to embodiments. The temporally decoded sparse view picture is a sparse view picture generated by performing decoding/unpacking again in order to regenerate a view for the bitstream packed/encoded by the encoder preprocessing module according to embodiments. The temporally regenerated view refers to a view temporarily generated by the view generator of the encoder end by performing decoding/unpacking again in order to regenerate a view for the bitstream packed/encoded by the encoder-preprocessor according to embodiments.

A decoded center view may be an example of the temporally decoded common reference view.

The temporally decoded common reference view and/or the temporally decoded sparse view picture may be a picture generated when a bitstream packed and/or encoded by a packer/encoder is decoded and/or unpacked again. The temporally decoded sparse view picture may include the temporally decoded sparse view s1 for the first viewing position.

The second view generator 50005 of the encoder end may generate a first regenerated view v1 based on the temporally decoded common reference view picture c0 according to embodiments and/or the temporally decoded sparse view picture s1 for the first viewing position according to embodiments. In this case, the temporally decoded common reference view picture may be the same as or different from the above-described common reference view picture. The temporally decoded common reference view picture may also be referred to as a decoded center view.

The third pruner 50006 may generate an error-robust sparse view picture s2 by pruning a second estimated source view v2 estimated using the decoded center view according to embodiments and/or the above-described first regenerated view v1. The first regenerated view means a regenerated view related to the first viewing position. The second estimated source view means a temporally generated source view related to the second viewing position. The second estimated source view may be the same as or different from the above-described second source view picture. The error-robust sparse view picture s2 may mean a sparse view picture for the second viewing position.

The error-robust sparse view picture s2 means a picture indicating an error additionally detected by the decoder/unpacker, the view generator, and/or the pruner of the encoder preprocessing module according to embodiments. That is, the error-robust sparse view picture is a picture for securing error robustness by causing the receiver to further prevent an additional error which may occur. The error-robust sparse view picture may include information about an error which may be generated in a process of regenerating the first regenerated view (a regeneration error for v1) and information about an error which may be generated while the reception device generates the center view c0 or performs decoding/unpacking (an encoding error for s1).

The second packer/encoder 50007 may pack and/or encode the error robust sparse view picture according to embodiments and/or the above-described first sparse view picture. The second packer/encoder may receive the above-described first sparse view picture s1 and/or error-robust sparse view picture s2 to pack the picture(s) into a packed picture according to embodiments and generates a bitstream by encoding the packed picture according to embodiments.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

The video transmission method according to embodiments may include decoding and unpacking the packed and encoded pictures, generating a regenerated view, based on a temporally decoded common reference view picture and a temporally decoded sparse view picture, and pruning the estimated source view picture from the regenerated view and the temporally decoded common reference view picture.

Here, the decoded and unpacked pictures may include the temporally decoded common reference view picture and the temporally decoded sparse view picture. The pruning may include generating an error-robust sparse view picture. Packing may further include packing the error-robust sparse view picture.

The structure of the encoder preprocessing module according to embodiments may further include all or part of elements shown in <BOX 1> and/or <BOX 2> of FIG. 50, thereby checking a view regeneration process of the reception device according to embodiments. Therefore, the transmission device according to embodiments may ensure error robustness by preventing an error which may occur at the reception device and detect errors occurring in an encoding process performed by the video transmission device.

The structure of the encoder preprocessing module according to embodiments may previously detect errors which may occur in a decoding operation of the reception device according to embodiments, an unpacking operation, a center view generation operation according to embodiments, and/or an intermediate view generation operation. Hence, the reception device according to embodiments may receive accurate data without errors from the video transmission device.

The structure of the encoder preprocessing module according to embodiments may provide a VR environment which is accurate like a real environment to viewers who use the reception device through a view regeneration process of the reception device.

The reception device according to embodiments may efficiently and accurately provide necessary views using a small amount of data. This configuration according to embodiments may reduce computational load of the transmission device and the reception device.

Figure 51:
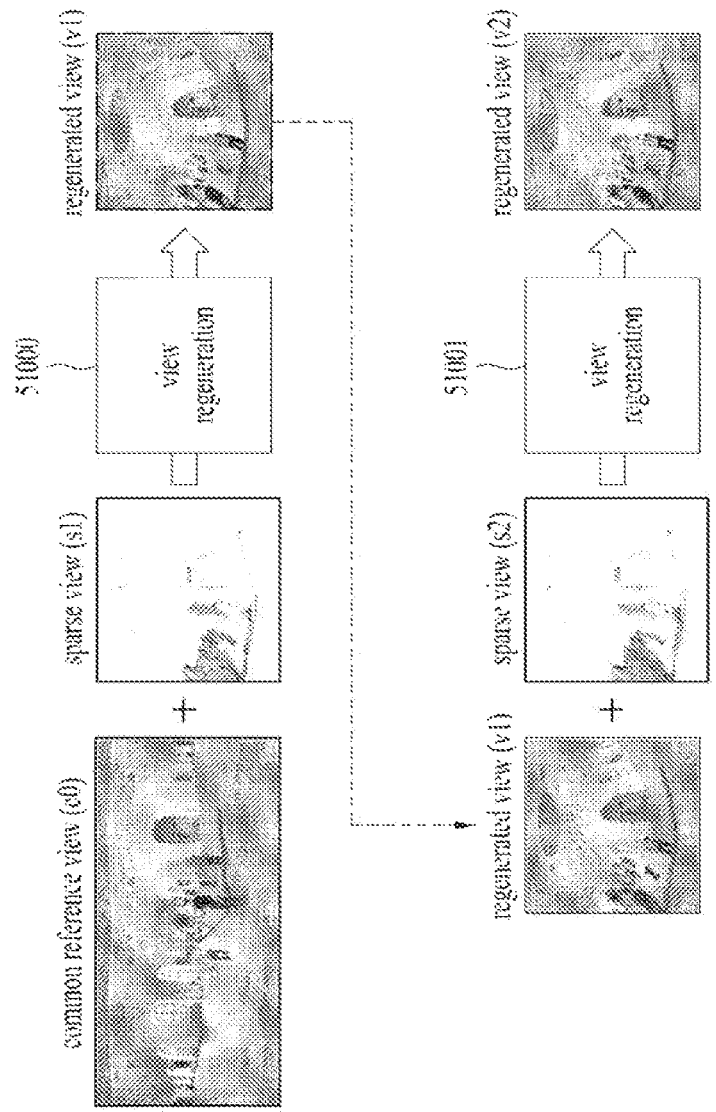
FIG. 51 illustrates view generation according to embodiments of a decoder post-processing module according to embodiments.

FIG. 51 illustrates view regeneration according to embodiments of a decoder post-processing module according to embodiments.

For information which is encoded to be robust against errors, an existing receiver may be used. However, when view 2 is restored, since view 1 is used as a reference view, a restoration order between views becomes important in that view 2 should be regenerated after view 1 is regenerated and this restoration order may be additionally transmitted as metadata related to regeneration of view 2 or to a related system.

Therefore, first, when one reference view (a common reference view or a center view picture) c0 and an additional information sparse view s1 are transmitted, a target view may be estimated using the reference view c0 (in this case, an estimation method used at a transmission end is used) and a final target view may be restored using the sparse view s1. In this case, information such as the location/direction/rotation of the target view, information such as the location/direction/rotation of the reference view, information related to a method of estimating the target view from the reference view, and information related to a method of generating the final regenerated view using the sparse view may be necessary information.

Second, when two or more reference views c0 and r1 and an additional information sparse view s2 are transmitted, the target view is estimated using c0 and r1, and the final target view is restored using s2. The necessary information may be information such as the location/direction/rotation of the target view, information such as the location/direction/rotation of each of the reference views, information related to a method of estimating the target view from the reference views, and information related to a method of generating the final regenerated view using the sparse view. The necessary information may require information as to whether the reference views are transmitted, a reference view generation method, a view regeneration method, information necessary for the view regeneration method, images (e.g., c0 and s1) necessary for the view regeneration method, a reference view position, information as to whether a view has been generated to be robust against errors, and types of considered errors.

Specifically, view regeneration according to embodiments may be performed by a first view regenerator 51000 and a second view regenerator 51001. The first view regenerator and/or the second view regenerator according to embodiments shown in FIG. 49 may refer to block(s) (or operation(s)) included in the above-described view regenerator (or view generation) according to embodiments.

The first view regenerator (or first view regeneration) 51000 may generate a temporally regenerated view (or target view v1) using the common reference view picture c0 according to embodiments and/or a first sparse view picture of received sparse view pictures. The first sparse view picture may mean a sparse view picture for a first viewing position. The first sparse view picture is included in the received sparse view pictures. The common reference view picture c0 according to embodiments may mean a center view. The first regenerator may generate a target picture for the first viewing position. That is, the first regenerated view (or temporally regenerated view) may be the target view for the first viewing position.

The first view generator may use information about the first viewing position in order to generate the first regenerated view v1. For example, the first view generator may generate the first regenerated view v1 using information such as the location/direction/rotation of the first regenerated view (or the temporally regenerated view or the first target view v1). In addition, the first view generator may use information such as the location/direction/rotation of reference views, information related to a method of estimating the first target view from the reference views, and information related to a method of generating a final regenerated view using sparse views.

The second view generator (or second view generation) 51001 generates a target picture for a second viewing position. In this case, the second view generator may generate a second regenerated picture v2 using the above-described temporally regenerated view (or the temporally regenerated view or the target picture for the first viewing position) and/or the second sparse view picture s2.

The second view generator may use information about the second viewing position in order to generate the second regenerated view v2. For example, the second view generator may generate the second regenerated view v2 using information such as the location/direction/rotation of the second regenerated view (or the first target view). In addition, the second view generator may use information such as the location/direction/rotation of reference views, information related to a method of estimating the second target view v2 from the reference views, and information related to a method of generating a final regenerated view using sparse views.

In accordance with embodiments, the decoder post-processing module according to embodiments may receive signaling information as to whether the first view regenerator and/or the second view regenerator is used. The decoder post-processing module may also receive signaling information related to an operation order of the first view regenerator and the second view regenerator, which may be included in regeneration information.

When a reference view picture is additionally transmitted, information related to a reference view generation method may be additionally transmitted. The transmitted information may further include information about the location of a corresponding reference view picture, information as to whether the reference view picture has been generated to be robust against errors by an encoder end according to embodiments, and/or information about the type of a corresponding error.

For example, information as to whether reference view(s) have been transmitted, information related to a reference view generation method (i.e., a view regeneration method of the first view regenerator as information related to the first view regenerator), information about the location of a reference view, and/or information as to whether the reference view has been generated to be robust against errors may be used. For example, view_regeneration_method_type, num_ref_views, num_views_using_this_ref_view, viewing_position_picture_type, picture_id, and/or view_regeneration_method_type according to embodiments may be used.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Due to the configuration such as the first view generator according to embodiments and the second view regenerator using the first regenerated view, the reception device according to embodiments may precisely and efficiently generate regenerated views. In addition, the reception device according to embodiments may use a picture for a first viewpoint (or a first viewing position) to generate a picture for a second viewpoint (or a second viewing position), thereby efficiently regenerating views using a small amount of data.

In addition, the transmission device according to embodiments may raise efficiency of data transmission and reduce computational load by transmitting only a picture for a first viewpoint (or a first viewing position) in order to provide a picture for a second viewpoint (or a second viewing position).

Figure 52:
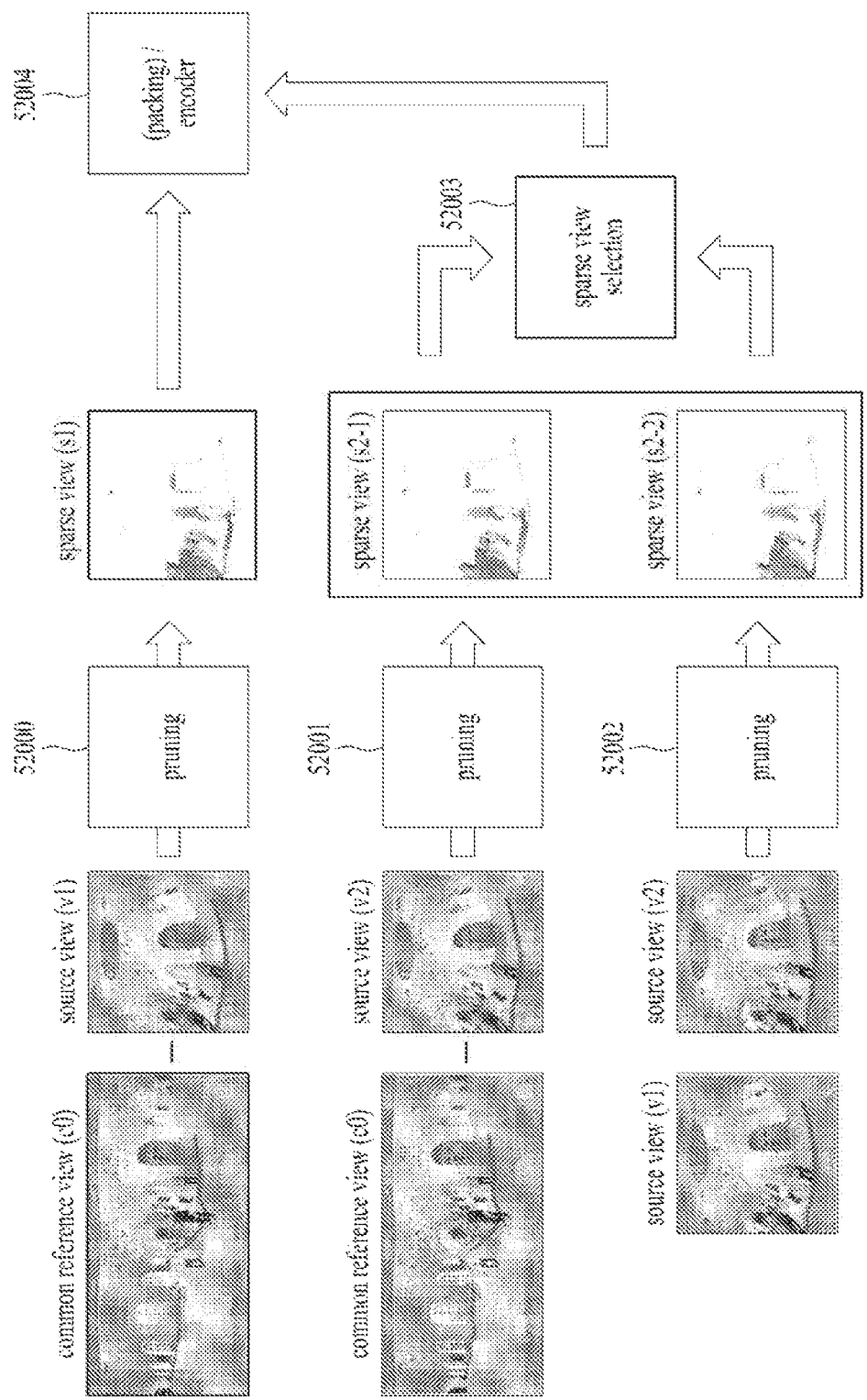
FIG. 52 illustrates an embodiment of a pruning scheme of an encoder preprocessing module according to embodiments.

FIG. 52 illustrates a pruning scheme of an encoder preprocessing module according to embodiments.

For the pruning scheme of the encoder preprocessing module according to embodiments, a pruner 52000 for a first sparse view, a first pruner 52001 for a second sparse view (a first pruning module for a second sparse view or a first pruning for a second sparse view), a second pruner 52002 for a second sparse view (a second pruning module for a second sparse view or a second pruning for a second sparse view), and a sparse view selector (or sparse view selection) 52003 may be provided. The pruning scheme according to embodiments may be performed by an inter-view redundancy remover according to embodiments. The preprocessing module according to embodiments may include a packer/encoder (or packing/encoding) 52004.

To raise accuracy and efficiency of pruning information, a transmission end may configure a method of estimating a target view based on various input views as shown in the above figure and compares sparse views generated from the estimated target view to selectively transmit a sparse view. In this case, the number of images used for estimation may be changed and different images may be used.

The sparse view selector may perform determination based on objective picture quality of a restored view or on whether the restored view has an error. To this end, the sparse view selectors may regenerate a view based on sparse views and reference views and compare the regenerated view with an original view (e.g., prediction error detection through weighted-to-spherically-uniform peak signal-to-noise ratio (WS-PSNR), hole filling, etc.).

The sparse view selector may select a sparse view having less information. Information about a reference view may be differently transmitted according to selection.

The pruner 52000 for the first sparse view may generate a sparse view picture s1 for a first viewing position, using (or based on) a common reference view picture c0 according to embodiments and a first source view v1 of source views according to embodiments. In other words, the pruner for the first sparse view generates the sparse view picture s1 for the first viewing position by pruning the first source view v1 using the common reference view picture c0 according to embodiments. The first source view v1 means a source view for the first viewing position among source views according to embodiments.

The first pruner 52001 for the second sparse view may generate a first sparse view picture s2-1 for a second viewing position, using (or based on) the common reference view picture c0 according to embodiments and a second source view v2 of the source views according to embodiments. In other words, the first pruner for the second sparse view generates the first sparse view picture s2-1 for the second viewing position by pruning the second source view v2 using the common reference view picture c0 according to embodiments. Here, the second source view v2 means a source view for the second viewing position among the source views according to embodiments. The second viewing position is a viewing position different from the first viewing position.

The second pruner 52001 for the second sparse view may generate a second sparse view picture s2-1 for the second viewing position, using (or based on) the source view v1 according to embodiments and the second source view v2 of the source views according to embodiments. In other words, the second pruner for the second sparse view generates the second sparse view picture s2-2 for the second viewing position by pruning the second source view v2 using the first source view v1 according to embodiments (or pruning the first source view using the second source view according to embodiments).

That is, the first pruner 52002 for the second sparse view and the second pruner 52002 for the second sparse view generate sparse view pictures for the second position, which are sparse views related to the second source view. That is, in order to generate the sparse views related to the second viewing position, the first pruner for the second sparse view uses the common reference view picture (or center view picture) according to embodiments, and the second pruner for the second sparse view uses the first source view according to embodiments.

The sparse view selector 52003 selects one (or more) of the first sparse view picture s2-1 for the second viewing position and/or the second sparse view picture s2-2 for the second viewing position. The sparse view selector may select a sparse view picture having less data among the first sparse view picture s2-1 for the second viewing position and/or the second sparse view picture s2-2 for the second viewing position.

The sparse view selector 52003 may confirm the quantity of errors (e.g., change of picture quality) and the quality of errors. In this case, the errors may occur when generating a view regenerated based on the first sparse view picture s2-1 for the second viewing position and/or the second sparse view picture s2-2 for the second viewing position. For example, in order to confirm whether a regenerated view has an error, the sparse view selector may perform a process of reconfiguring (or regenerating) a view using sparse views and reference views according to embodiments and comparing the regenerated view with an original view (e.g., source view picture) (e.g., prediction error detection through WS-PSNR or hole filling).

The packer/encoder 52004 may pack and/or encode the sparse views according to embodiments. The packer/encoder 52004 may pack and/or encode the sparse view picture s1 for the first viewing position and the sparse view picture s2-1 or s2-2 for the second viewing position, selected by the sparse view selector 52003.

For example, when the amount of data of the second sparse view picture s2-2 for the second viewing position is greater than the amount of data of the first sparse view picture s2-1 for the second viewing position, the sparse view selector according to embodiments may select the first sparse view picture s2-1 for the second viewing position, and the packer/encoder according to embodiments may pack and/or encode the sparse view picture s1 for the first viewing position and the first sparse view picture s2-1 for the second viewing position.

As another example, when the amount of estimated errors of the second sparse view picture s2-2 for the second viewing position is greater than the amount of estimated errors of the first sparse view picture s2-1 for the second viewing position, the sparse view selector according to embodiments may select the first sparse view picture s2-1 for the second viewing position, and the packer/encoder according to embodiments may pack and/or encode the sparse view picture s1 for the first viewing position and the first sparse view picture s2-1 for the second viewing position.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

In this case, the removing the inter-view redundancy according to embodiments may include performing first pruning on a first source view picture related to a first viewing position based on a center view picture, wherein the performing the first pruning includes generating a first sparse view picture; performing second pruning on the first source view picture based on a second source view picture related to a second viewing position different from the first viewing position, wherein the performing the second pruning includes generating a second sparse view picture; and selecting one of the first sparse view picture and the second sparse view picture. The encoding may further include encoding one picture selected from among the first sparse view picture and the second sparse view picture.

The transmission device according to embodiments may perform an adaptive inter-view redundancy removal operation that adjusts the amount of data and computational load according to a transmission/reception environment of the transmission device and the reception device by selecting a sparse view picture for one viewing position through the sparse view selector. Accordingly, the transmission device according to embodiments may quickly cope with the transmission/reception environment by selecting the sparse view in consideration of the transmission environment of the transmission device and the reception environment of the reception device.

In addition, the transmission device according to embodiments may determine the number of errors of various sparse view pictures for one viewing position by selecting a sparse view picture for one viewing position through the sparse view selector, thereby selecting a picture having fewer errors and providing a VR environment which is accurate, like a real environment, to viewers who use the reception device.

Figure 53:
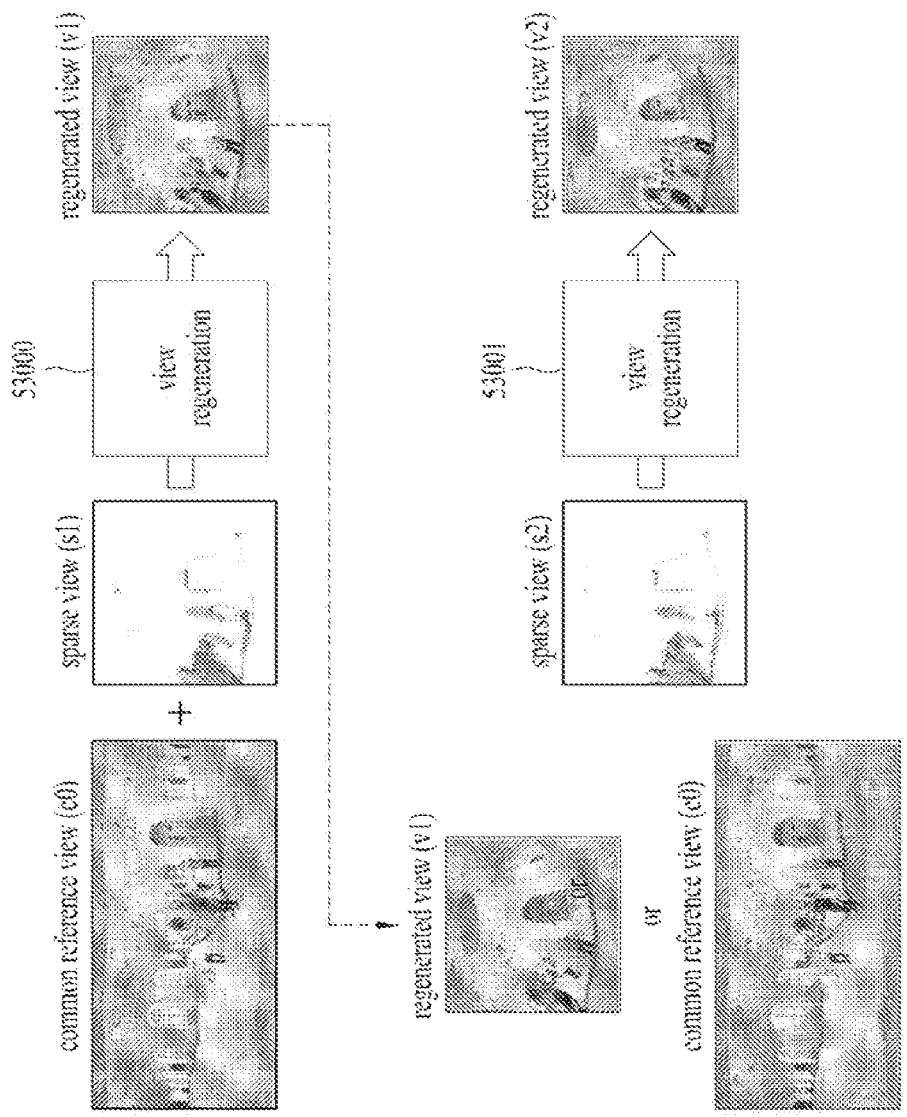
FIG. 53 illustrates view generation according to embodiments of a decoder post-processing modules according to embodiments.

FIG. 53 illustrates view regeneration according to embodiments of a decoder post-processing module according to embodiments.

View regeneration according to embodiments may be performed by a first view regenerator (or view regeneration) 53000 and a second view regenerator 53001. The first view regenerator and/or the second view regenerator according to embodiments shown in FIG. 53 may refer to block(s) (or operation(s)) included in the above-described view regenerator (or view generation) according to embodiments.

In accordance with embodiments, a decoder (or receiver) performs view regeneration in order to generate regenerated views (v1, v2, etc.).

The first view regenerator 53000 (re)generates a regenerated view v1 based on a common reference view c0 and a first sparse view s1 among sparse view pictures. For example, the regenerated view may be predicted based on a center view picture and the first sparse view picture s1. The first sparse view picture means a sparse view picture for a first viewing position among received sparse view pictures according to embodiments. The common reference view (or common reference view picture) may be a center view. For example, the common reference view picture may mean a center view picture generated by a center view generator or a center view picture received from an encoding end.

The second view generator 53001 regenerates a second regenerated view picture v2 based on a sparse view s2 for a second viewing position (i.e., a second sparse view) among the received sparse views according to embodiments and on at least one regenerated view (e.g., the first regenerated view r1 and/or the common reference view picture (e.g., the center view)).

The second view regenerator may operate based on regeneration information according to embodiments among signaling information according to embodiments. The second view regenerator according to embodiments may operate based on signaling information of all or part of regeneration information for generating the first regenerated view among the regeneration information.

For example, information as to whether reference view(s) have been transmitted, information related to a reference view generation method (i.e., a view regeneration method of the first view regenerator as information related to the first view regenerator), and/or information about the location of a reference view, may be used. For example view_regeneration_method_type, num_ref_views, num_views_using_this_ref_view, viewing_position_picture_type, picture_id, and/or view_regeneration_method_type according to embodiments may be used.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

A video reception device according to embodiments may include a decoder for decoding a bitstream of a video based on viewing position information and viewport information; an unpacker for unpacking pictures and signaling information in the decoded bitstream; a view regenerator for regenerating views for the unpacked pictures; and a synthesizer for synthesizing views for the regenerated pictures.

Accordingly, the example shown in FIG. 53 indicates that decoded pictures correspond to the common reference view c0, the first sparse view picture s1, and the second sparse view picture s2 (decoded pictures: c0, s1, and s2).

A reception device according to embodiments includes, as received signaling information, regeneration parameters related to regeneration for v1 and regeneration parameters related to regeneration for v2.

That is, the regeneration parameters related to regeneration for v1 include a first regeneration method, information about a reference view picture (i.e., information about c0), information about a sparse view picture (i.e., information about s1), and information about an output picture (i.e., information about a size, a view position, etc.) (signaling: v1 regeneration—method, reference picture c0, sparse picture s1, output picture information (size, view position, etc.)).

The regeneration parameters related to regeneration for v2 include a second regeneration method, information about a reference view picture (i.e., information about c0 and/or v1), information about a sparse view picture (i.e., information about s2), and information about an output picture (i.e., information about a size, a view position, etc.) (signaling: v2 regeneration—regeneration method, reference picture(s) (c0, v1, or both), output picture information (size, view position, etc.)+v1 regeneration information).

In this case, a reception end requires information about a reference view used to regenerate a target view based on the transmitted view s2 and this information may be transmitted through metadata.

Due to the configuration such as the first view generator according to embodiments and the second view regenerator using the first regenerated view, the reception device according to embodiments may precisely and efficiently generate regenerated views. In addition, the reception device according to embodiments may use a picture for a first viewpoint (or a first viewing position) to generate a picture for a second viewpoint (or a second viewing position), thereby efficiently regenerating views using a small amount of data.

The transmission device according to embodiments may raise efficiency of data transmission and reduce computational load by transmitting only a picture for a first viewpoint (or a first viewing position) in order to provide a picture for a second viewpoint (or a second viewing position) through a configuration such as the first view regenerator of the reception device according to embodiments and the second view regenerator using a regenerated view.

Figure 54:
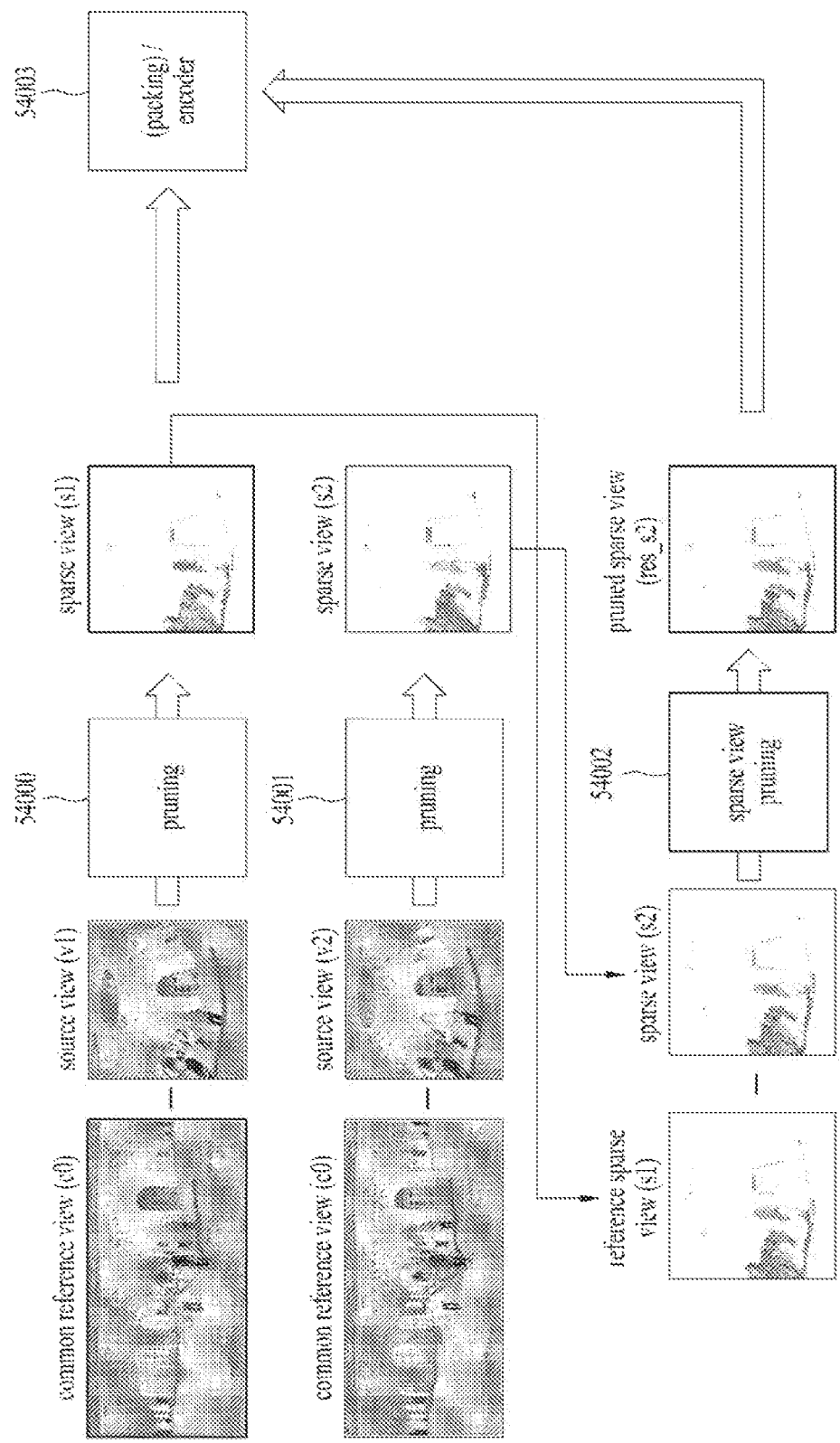
FIG. 54 illustrates an embodiment of a pruning scheme of an encoder preprocessing module according to embodiments.

FIG. 54 illustrates a pruning scheme of an encoder preprocessing module according to embodiments.

As a method of raising efficiency of transmitted information, a method of reducing similarity between sparse views may be considered.

A sparse view pruning process is a process of removing similar information between input views, like source view pruning, and serves to remove remaining similarity in the source view pruning process. For example, when spatial similarity between view 1 and view 2 is high, view 2 may be estimated from view 1 based on corresponding spatial information, similar to estimation of view 2 from view 1. When transmitting remaining information (e.g., a pruned sparse view res_s2) after removing similar information between sparse views through this estimation process, the information may be transmitted with higher bit efficiency as compared with the case in which a sparse view s2 is transmitted.

For the pruning scheme of the encoder preprocessing module according to embodiments, a first pruner (or first pruning module or first pruning) 54000 for a first sparse view, a second pruner (or second pruning module or second pruning) 54001 for a second sparse view, and a sparse view pruner (or sparse view pruning module or sparse pruning) 54002 may be provided. The pruning scheme according to embodiments may be performed by an inter-view redundancy remover according to embodiments. The preprocessing module according to embodiments may include a packer/encoder (or packing/encoding) 54003.

The first pruner 54000 prunes a first source view picture for a first viewing position using a common reference view picture c0 according to embodiments. That is, the first pruner 54000 generates a first sparse view picture s1 by removing redundancy for the first source view picture. The first sparse view picture s1 means a sparse view picture for the first viewing position. The first sparse view picture s1 may also be referred to a reference sparse view picture s1.

The second pruner 54001 prunes a second source view picture for a second viewing position using the common reference view picture c0 according to embodiments. That is, the second pruner 54001 generates a second sparse view picture s2 by removing redundancy for the second source view picture. The second sparse view picture s2 means a sparse view picture for the second viewing position.

The sparse view pruner 54002 may prune the second sparse view picture s2 using the reference sparse view picture s1 according to embodiments. That is, the sparse view pruner may prune the first sparse view picture and/or the second sparse view picture which has already been pruned by the first pruner and/or the second pruner, respectively. In other words, after pruning the second sparse view picture again using the reference sparse view picture s1, the sparse view pruner generates a pruned sparse view picture res_s2.

The packer/encoder 54003 may pack and/or encode the first sparse view picture and/or the pruned sparse view picture according to embodiments. Here, the packer/encoder 54003 may also pack and/or encode the common reference view picture c0. The packed and/or encoded first sparse view picture and/or pruned sparse view picture (and/or common reference view picture (c0)) are transformed into a bitstream type and transmitted to a decoding end according to embodiments by the packer/encoder.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

In this case, the video transmission method according to embodiments may include pruning a reference sparse view picture related to a first viewing position included in the sparse view pictures, based on a sparse view picture related to a second viewing position included in the sparse view pictures, wherein the second viewing position is a viewing position different from the first viewing position, and wherein the pruning the reference sparse view picture includes generating a pruned sparse view picture; and detecting a residual from the pruned sparse view picture. Here, the pruned sparse view picture may be packed based on presence of the residual.

Due to such a configuration, an encoder end according to embodiments may reduce the number of sparse view pictures to be transmitted and reduce the amount of data to be transmitted. In addition, due to this configuration, a decoder end according to embodiments may reduce the number of sparse view pictures to be received so that load on a reception end may be reduced.

The encoder end according to embodiments may cause the decoder end to generate an accurate view for a corresponding viewing position by performing pruning through re-detection of an error between a plurality of sparse views.

The sparse view pruner and the residual detector according to embodiments may raise data transmission efficiency of the transmission device according to embodiments by further removing unnecessary or redundant information.

The reception device according to embodiments may efficiently and accurately provide necessary views using a small amount of data to viewers. This configuration according to embodiments may reduce computational load of the transmission device and the reception device.

The transmission device according to embodiments may reduce computational load of the reception device by determining whether to transmit a sparse view picture pruned by the residual detector and transmitting signaling information indicating whether the pruned sparse view picture has been transmitted.

Figure 55:
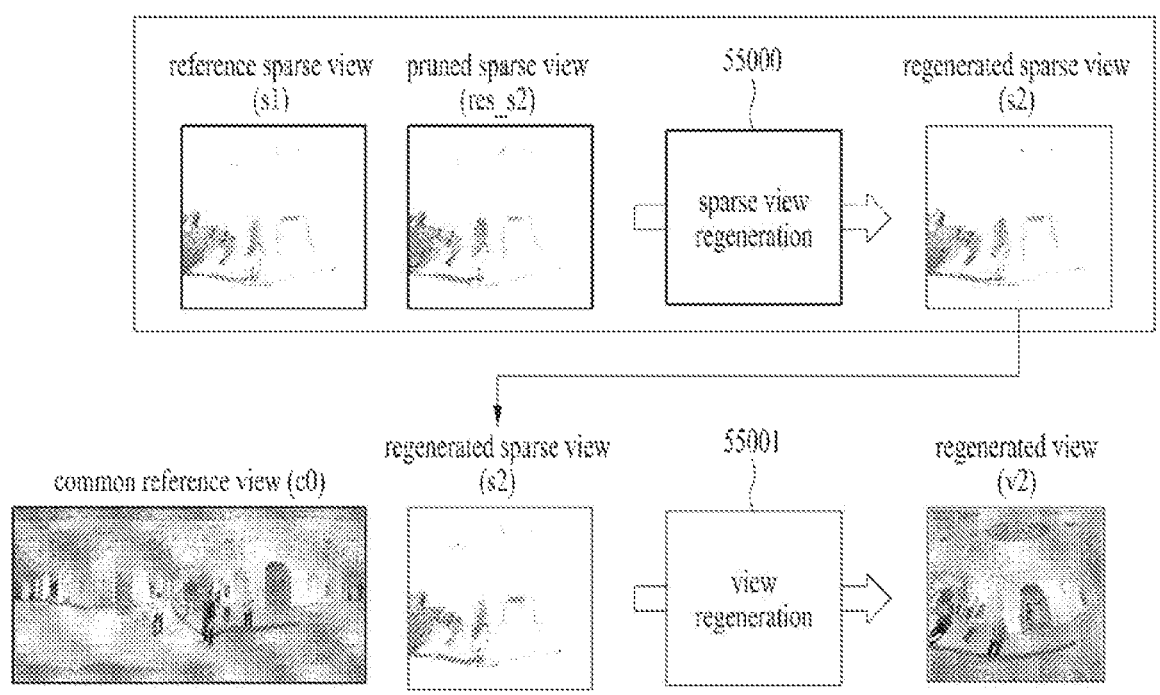
FIG. 55 illustrates view generation according to embodiments of a decoder post-processing module according to embodiments.

FIG. 55 illustrates view regeneration according to embodiments of a decoder post-processing module according to embodiments.

In other words, view regeneration according to embodiments may be performed by a sparse view regenerator (or sparse view regeneration) 55000 and a view regenerator 55001. The sparse view regenerator 55000 and the view regenerator 55001 according to embodiments shown in FIG. 55 may refer to blocks (or operations) included in the above-described view regenerator (or view regeneration) according to embodiments.

In accordance with embodiments, a decoder (or receiver) performs view regeneration in order to generate regenerated views (v2 etc.).

The sparse view regenerator 55000 generates a regenerated sparse view picture s2 for a second viewing position, based on a reference sparse view picture s1 for a first viewing position among sparse views according to embodiments and/or on a pruned sparse view picture res_s2 for the second viewing position. The reference sparse view picture s1 may mean a sparse view picture which is a reference for generating the regenerated sparse view picture for the second viewing position. The pruned sparse view picture res_s2 may mean the pruned sparse view picture res_s2 described in FIG. 54. That is, the pruned sparse view picture res_s2 may be a view picture including residual information used to generate a sparse view for the second viewing position.

The sparse view regenerator 55000 according to embodiments may generate the regenerated sparse view picture s2 for the second viewing position based on related signaling information. The related signaling information may be included in part or all of regeneration information and/or reference view information according to embodiments. For example, the related signaling information may include part or all of information such as target_view_id, component_id, component_type, pruned_sparse_view_present_flag, reference_sparse_view_present_flag_sprese_view_present, output_sparse_view_id, pruned_sparse_view_id, and reference_sparse_view_id described in FIGS. 39 and 40.

The view regenerator 55001 generates a target view for the second viewing position (or the regenerated view v2) based on a common reference view picture c0 and/or the regenerated sparse view picture s2 according to embodiments.

Configurations in the reception device according to embodiments (the view generators and/or the sparse view regenerators according to embodiments) described in FIGS. 55 to 58 and configurations of corresponding operations may be complemented/modified/combined.

Accordingly, the example shown in FIG. 55 indicates that decoded pictures correspond to the common reference view c0, the first sparse view picture s1, and the pruned sparse view picture res_s2 (decoded pictures: c0, s1, and res_s2).

A reception device according to embodiments includes, as received signaling information, regeneration parameters related to regeneration for s2 and regeneration parameters related to regeneration for v2.

That is, the regeneration parameters related to regeneration for s2 include an s2 regeneration method, information about a reference sparse view picture (i.e., information about s1), information about a pruned sparse view picture (i.e., information about res_s2), and information about an output picture (i.e., information about a size, a view position, etc.) (signaling: s2 regeneration—method, reference sparse picture (s1), pruned sparse picture (res_s2), output picture information (size, view position, etc.)).

The regeneration parameters related to regeneration for v2 include a second regeneration method, information about a reference view picture (i.e., information about c0), regeneration information about a sparse view picture (i.e., regeneration information about s2), and information about an output picture (i.e., information about a size, a view position, etc.) (v2 regeneration—regeneration method, reference picture (c0), regenerated sparse view (s2), output picture information (size, view position, etc.)+s2 regeneration information).

In this case, a reception end requires information about a reference view used to regenerate a target view based on the transmitted view s2 and this information may be transmitted through metadata.

For a sparse view generated through sparse view pruning according to embodiments, a receiver requires a sparse view regeneration process for regenerating the sparse view. For example, first, s2 may be estimated based on the reference sparse view s1 and location information (location information for v1 and v2), and s2 may be regenerated using res_s2. Second, v2 may be regenerated using the reference view based on the regenerated information.

Therefore, in order to regenerate v2, information as to whether sparse view regeneration is performed, information about the reference sparse view (s1 and location information), information about the target sparse view (res_s2 and location information), a sparse view regeneration method, and information about the reference view c0 for regenerating v2 should be transmitted.

In this case, bit efficiency is raised since sparse view regeneration information instead of regeneration information for v1 is transmitted and s1 and res_s2 instead of v1 and s1 are transmitted. (In particular, an effect may be remarkably increased in viewport dependent processing.)

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include regenerating a second sparse view picture from a first sparse view picture in a first mode, and generating the regenerated view based on the regenerated second sparse view picture and the center view picture. When a pruned sparse view picture is included in the sparse view pictures, the regenerating the second sparse view picture may include generating the second sparse view picture based on the pruned sparse view picture. The second viewing position may be different from the first viewing position.

Due to such a configuration of the sparse view regenerator according to embodiments, an encoder end according to embodiments may reduce the number of sparse view pictures to be transmitted and reduce the amount of data to be transmitted. In addition, due to this configuration, a decoder end according to embodiments may reduce the number of sparse view pictures to be received so that load on a reception end may be reduced.

Specifically, sparse view regeneration information may be transmitted instead of target view related information about the first viewing position, so that bit efficiency may be raised. (In particular, an effect may be remarkably increased in viewport dependent processing.)

Figure 56:
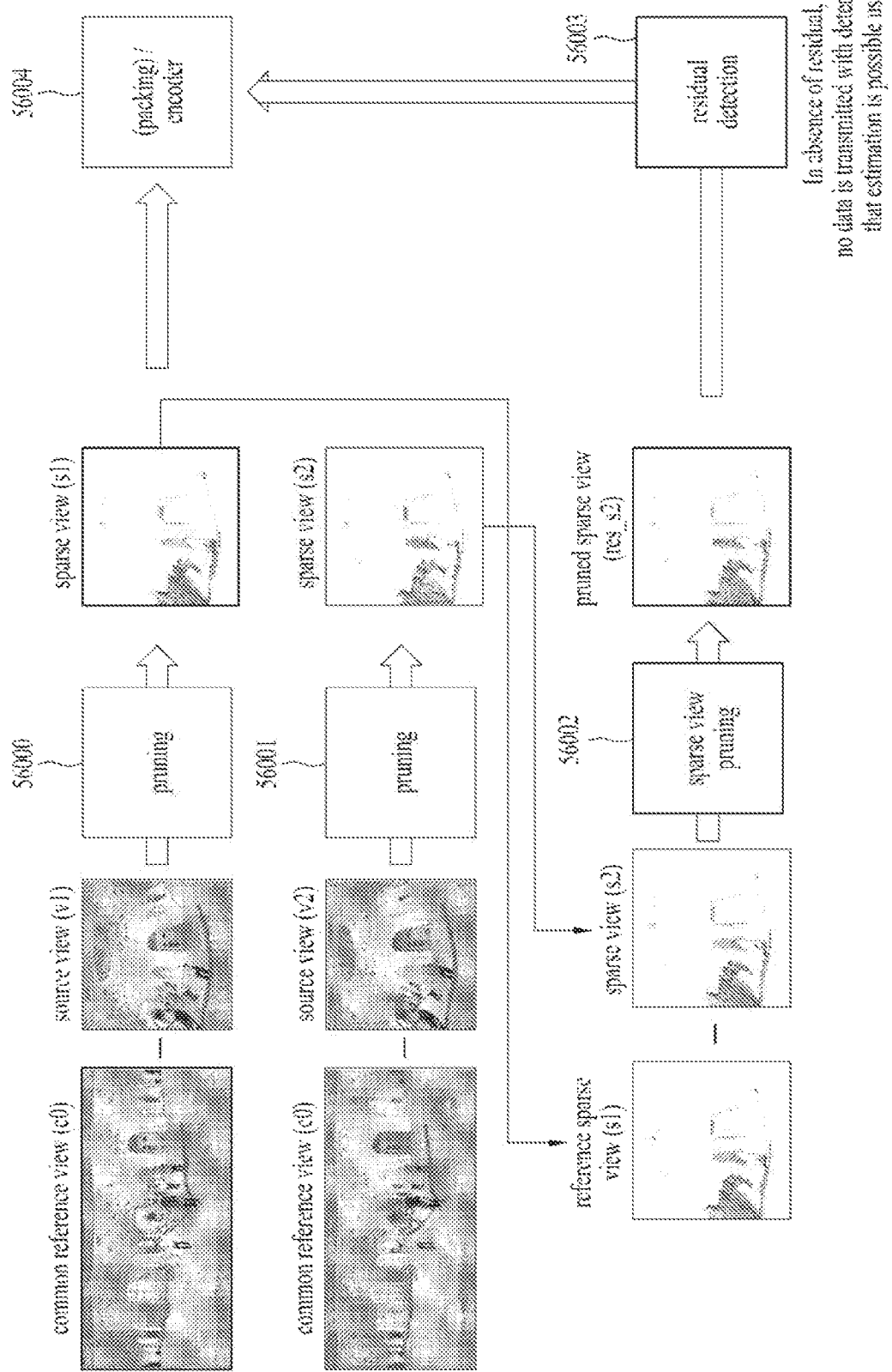
FIG. 56 illustrates an embodiment of a pruning scheme of an encoder preprocessing module according to embodiments.

FIG. 56 illustrates a pruning scheme of an encoder preprocessing module according to embodiments.

When there is no residual, it is determined that view estimation is possible using a view s1 and no data may be transmitted.

As the case in which an effect of sparse view pruning is maximized, the case in which a pruned spare view is not transmitted may be considered. That is, when there is no residual, it is determined that view estimation is possible using a view s1 and no data may be transmitted. A reception end estimates a view s2 only using the view s1. Determination criteria may consider distribution of information in a block and determination of the amount of information through frequency analysis. Whether data has been transmitted may be determined based on a threshold. If there is little information, the amount of information may be further reduced through quantization.

In other words, for the pruning scheme of the encoder preprocessing module according to embodiments, a first pruner (first pruning module or first pruning) 56000 for a first sparse view, a second pruner (second pruning module or second pruning) 56001 for a second sparse view, a sparse view pruner (or sparse view pruning module or sparse view pruning) 56002, and/or a residual detector (or residual detection) 56003 may be provided. The pruning scheme according to embodiments may be performed by an inter-view redundancy remover according to embodiments. The preprocessing module according to embodiments may include a packer/encoder (or packing/encoding) 54003.

The first pruner 56000 prunes a first source view picture for a first viewing position using a common reference view picture c0 according to embodiments. That is, the first pruner 56000 generates a first sparse view picture s1 by removing redundancy for the first source view picture. The first sparse view picture s1 means a sparse view picture for the first viewing position. The first sparse view picture s1 may also be referred to as a reference sparse view picture s1.

The second pruner 56001 prunes a second source view picture for a second viewing position using the common reference view picture c0 according to embodiments. That is, the second pruner 56001 generates a second sparse view picture s2 by removing redundancy for the second source view picture. The second sparse view picture s2 means a sparse view picture for the second viewing position.

The sparse view pruner 56002 may prune the second sparse view picture s2 using the reference sparse view picture s1 according to embodiments. That is, the sparse view pruner may prune the first sparse view picture and/or the second sparse view picture which has already been pruned by the first pruner and/or the second pruner, respectively. In other words, after pruning the second sparse view picture again using the reference sparse view picture s1, the sparse view pruner generates a pruned sparse view picture res_s2. In this case, the pruned sparse view picture res_s2 may or may not be transmitted to a decoder end according to embodiments. Whether the pruned sparse view picture res_s2 will be transmitted or not may be determined by the residual detector 54003. Whether the pruned sparse view picture res_s2 is included in received pictures may be signaled using related signaling information. For example, a reception device according to embodiments may be aware of whether the pruned sparse view picture res_s2 is included in the received pictures through pruned_sparse_view_present_flag signaling information in FIG. 39.

The residual detector 54003 may determine whether the pruned sparse view picture res_s2 will be transmitted or not. That is, when there is no residual, it is determined that the second source view picture may be estimated using the first sparse view picture by the decoder end and data may not be transmitted. That is, since the decoder end may estimate the second sparse view picture s2 using only the first sparse view picture s1. the pruned sparse view picture according to embodiments may not be transmitted. Determination criteria may consider distribution of information in a block and determination of the amount of information through frequency analysis. Whether data has been transmitted may be determined based on a threshold. If there is little information, the amount of information may be further reduced through quantization.

The packer/encoder 54004 may pack and/or encode the first sparse view picture and/or the pruned sparse view picture according to embodiments. Here, the packer/encoder may also pack and/or encode the common reference view picture c0. The packed and/or encoded first sparse view picture and/or pruned sparse view picture (and/or common reference view picture (c0)) are transformed into a bitstream type and transmitted to the decoding end according to embodiments by the packer/encoder.

Configurations in the reception device according to embodiments (the view generators and/or sparse view regenerators according to embodiments) described in FIGS. 55 to 58 and configurations of corresponding operations may be complemented/modified/combined.

Accordingly, a video transmission method in accordance with embodiments may include generating a center view picture and/or center view generation information, based on source view pictures included in pictures for a plurality of viewing positions; and synthesizing an intermediate view picture based on the source view pictures. The synthesizing the intermediate view picture may further include generating pre-generation information and/or view synthesis recommendation information. In this case, removing inter-view redundancy may include generating sparse view pictures based on at least two pictures among the source view pictures, the intermediate view picture, and/or the center view picture. The removing the inter-view redundancy may further include generating reference view pictures, reference view information, and regeneration information.

In this case, the video transmission method according to embodiments may include pruning a reference sparse view picture related to a first viewing position included in the sparse view pictures, based on a sparse view picture related to a second viewing position included in the sparse view pictures, wherein the second viewing position is a viewing position different from the first viewing position, and wherein the pruning the reference sparse view picture includes generating a pruned sparse view picture; and detecting a residual from the pruned sparse view picture. Here, the pruned sparse view picture may be packed based on presence of the residual.

Due to a configuration of the first pruner, the second pruner, and/or the sparse view pruner using a sparse view generated from the first pruner and using a sparse view generated from the second pruner, an encoder end according to embodiments may reduce the number of sparse view pictures to be transmitted and reduce the amount of data to be transmitted. In addition, due to this configuration, a decoder end according to embodiments may reduce the number of sparse view pictures to be received so that load on a reception end may be reduced.

The encoder end according to embodiments may cause the decoder end to generate an accurate view for a corresponding viewing position by performing pruning through re-detection of an error between a plurality of sparse views using the residual detector.

The sparse view pruner and the residual detector according to embodiments may raise data transmission efficiency of the transmission device according to embodiments by further removing unnecessary or redundant information.

The reception device according to embodiments may efficiently and accurately provide necessary views using a small amount of data to viewers. This configuration according to embodiments may reduce computational load of the transmission device and the reception device.

The transmission device according to embodiments may reduce load of computation of the reception device by determining whether to transmit a sparse view picture pruned by the residual detector and transmitting signaling information indicating whether the pruned sparse view picture has been transmitted.

The configuration of the residual detection causes the transmission device according to embodiments to avoid transmission of unnecessary data and prevents the reception end from performing an unnecessary operation process, thereby maximizing an effect of sparse view pruning.

Figure 57:
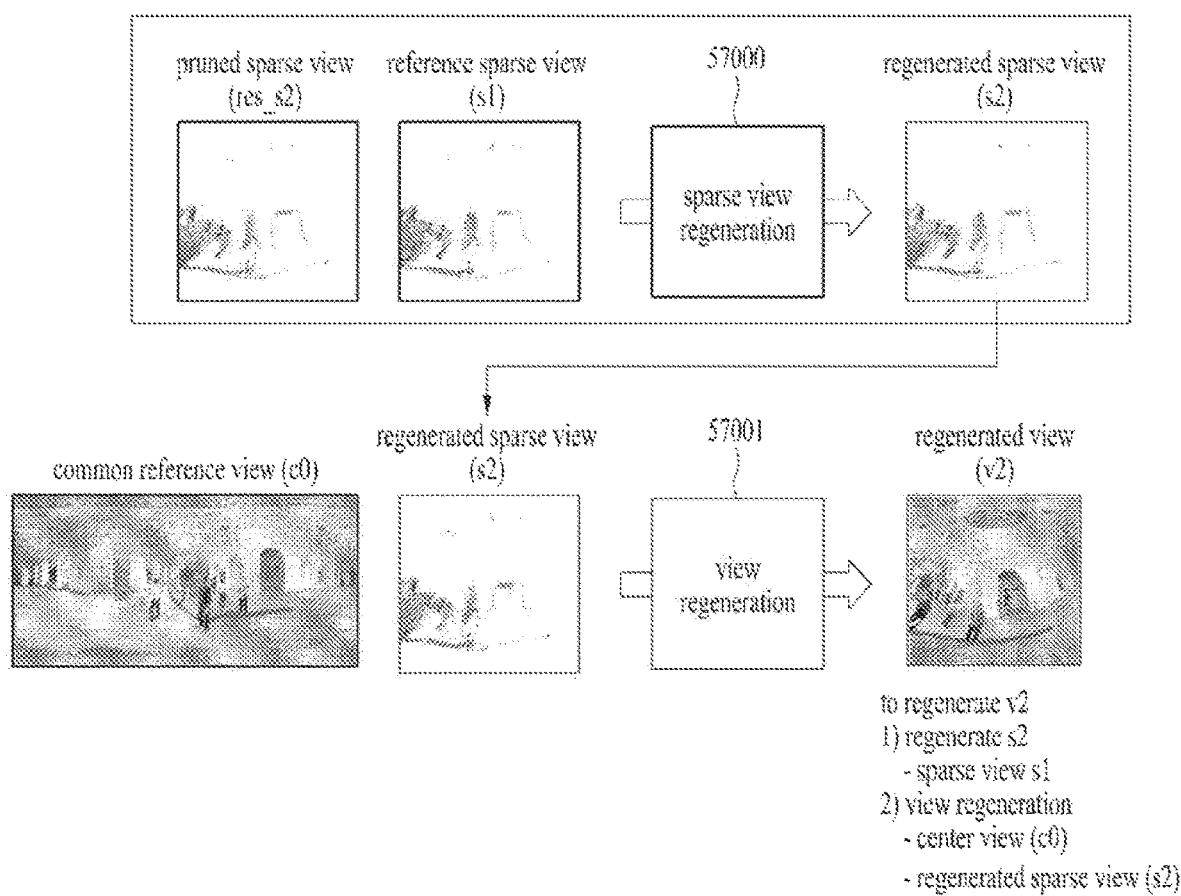
FIG. 57 illustrates view generation according to embodiments of a decoder post-processing module according to embodiments.

FIG. 57 illustrates view regeneration according to embodiments of a decoder post-processing module according to embodiments.

View regeneration according to embodiments may be performed by a sparse view regenerator (or sparse view regeneration) 57000 and a view regenerator 57001. The sparse view regenerator 55000 and the view regenerator 55001 according to embodiments shown in FIG. 57 may refer to blocks (or operations) included in the above-described view regenerator (or view regeneration) according to embodiments.

In accordance with embodiments, a decoder (or receiver) performs view regeneration in order to generate regenerated views (v2 etc.).

The sparse view regenerator 57000 according to embodiments may generate a regenerated sparse view picture s2, based on a pruned sparse view picture res_s2 and a reference sparse view picture s1 according to embodiments. The reference sparse view picture means a sparse view picture for a first viewing position, which is included in received sparse view pictures. The regenerated sparse view picture s2 means a sparse view picture for a second viewing position. The pruned sparse view picture res_s2 may represent the pruned sparse view picture described in FIG. 56. The regenerated sparse view picture s2 means a sparse view picture for the second viewing position, for generating a target view for the second viewing position. Whether the pruned sparse view picture res_s2 is included in received pictures may be signaled using related signaling information. For example, a reception device according to embodiments may be aware of whether the pruned sparse view picture res_s2 is included in the received pictures through pruned_sparse_view_present_flag signaling information in FIG. 39.

The sparse view regenerator 57000 according to embodiments may generate the regenerated sparse view picture s2 for the second viewing position based on related signaling information. The related signaling information may be included in part or all of regeneration information and/or reference view information according to embodiments. For example, the related signaling information may include part or all of information such as target_view_id, component_id, component_type, pruned_sparse_view_present_flag, reference_sparse_view_present_flag_sprese_view_present, output_sparse_view_id, pruned_sparse_view_id, and reference_sparse_view_id described in FIGS. 39 and 40.

The view regenerator 57001 may generate the regenerated view for the second viewing position based on a common reference view picture c0 according to embodiments and/or the regenerated sparse view picture s2 according to embodiments. For example, the view regenerator 57001 may generate a view for the second viewing position using the center view picture c0 and the regenerated sparse view picture s2.

Therefore, the decoding module (or post-decoding processing module) or the reception device according to embodiments may perform two operations in order to generate the target view for the second viewing position. First, the sparse view regenerator 57000 generates the sparse view picture (i.e., regenerated sparse view picture s2) for the second viewing position using the sparse view picture s1 indicating the sparse view picture for the first viewing position among the received sparse view pictures. In this case, the sparse view regenerator 57000 may further use the pruned sparse view picture res_s2 included in the sparse view pictures. Second, when the sparse view regenerator 57000 generates the regenerated sparse view picture s2, the regenerated view v2 for the second viewing position may be generated using the regenerated sparse view picture s2 and the common reference view picture c0.

Configurations in the reception device according to embodiments (the view generators and/or the sparse view regenerators according to embodiments) described in FIGS. 55 to 58 and configurations of corresponding operations may be complemented/modified/combined.

Accordingly, the example shown in FIG. 57 indicates that decoded pictures correspond to the common reference view c0, the first sparse view picture s1. and/or the pruned sparse view picture res_s2 (decoded pictures: c0, s1. and/or res_s2).

A reception device according to embodiments includes, as received signaling information, regeneration parameters related to regeneration for s2 and regeneration parameters related to regeneration for v2.

That is, the regeneration parameters related to regeneration for s2 include an s2 regeneration method, information about a reference sparse view picture (i.e., information about v1), information about a sparse view picture (i.e., information about res_s2), and information about an output picture (i.e., information about a size, a view position, etc.). The pruned sparse view picture may or may not be transmitted. (s2 regeneration—regeneration method (type), reference sparse picture (s1), pruned sparse picture (res_s2), output picture information (size, view position, etc.) (recommended))

The regeneration parameters related to regeneration for v2 include a second regeneration method, information about a reference view picture (i.e., information about s1), regeneration information about a sparse view picture (i.e., regeneration information about s2), and information about an output picture (i.e., information about a size, a view position, etc.) (v2 regeneration—regeneration method (type), reference picture (c0), regenerated sparse view (s2), output picture information (size, view position, etc.)+s2 regeneration information).

When the pruned sparse view is transmitted or is not transmitted through sparse view pruning and residual detection processes, a receiver may perform different operations based on the transmitted information and receiver performance as follows.

1. Direct Sparse View Regeneration

After regenerating the target sparse view s2 through the sparse view regenerator, the receiver may regenerate the target view through the view regenerator.

In this case, the sparse view regenerator may determine whether to perform an additional operation by transmitting, to the receiver, information as to whether the pruned sparse view is transmitted.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include regenerating a second sparse view picture from a first sparse view picture in a first mode, and generating the regenerated view based on the regenerated second sparse view picture and the center view picture. When a pruned sparse view picture is included in the sparse view pictures, the regenerating the second sparse view picture may include generating the second sparse view picture based on the pruned sparse view picture. The second viewing position may be different from the first viewing position.

Due to such a configuration of the sparse view regenerator and the view regenerator based on the regenerated sparse view, an encoder end according to embodiments may reduce the number of sparse view pictures to be transmitted and reduce the amount of data to be transmitted. In addition, due to this configuration, a decoder end according to embodiments may reduce the number of sparse view pictures to be received so that load on a reception end may be reduced.

An encoder end according to embodiments provides an effect capable of generating an accurate view for a corresponding viewing position by the configuration of the view generator of the receiver and the view regenerator based on the regenerated sparse view. The decoder end according to embodiments may raise bit efficiency by generating a virtual space only through reception of a small amount of data.

Specifically, bit efficiency is raised since sparse view regeneration information, instead of target view related information about the first viewing position, is transmitted. (In particular, an effect may be remarkably increased in viewport dependent processing.)

Figure 58:
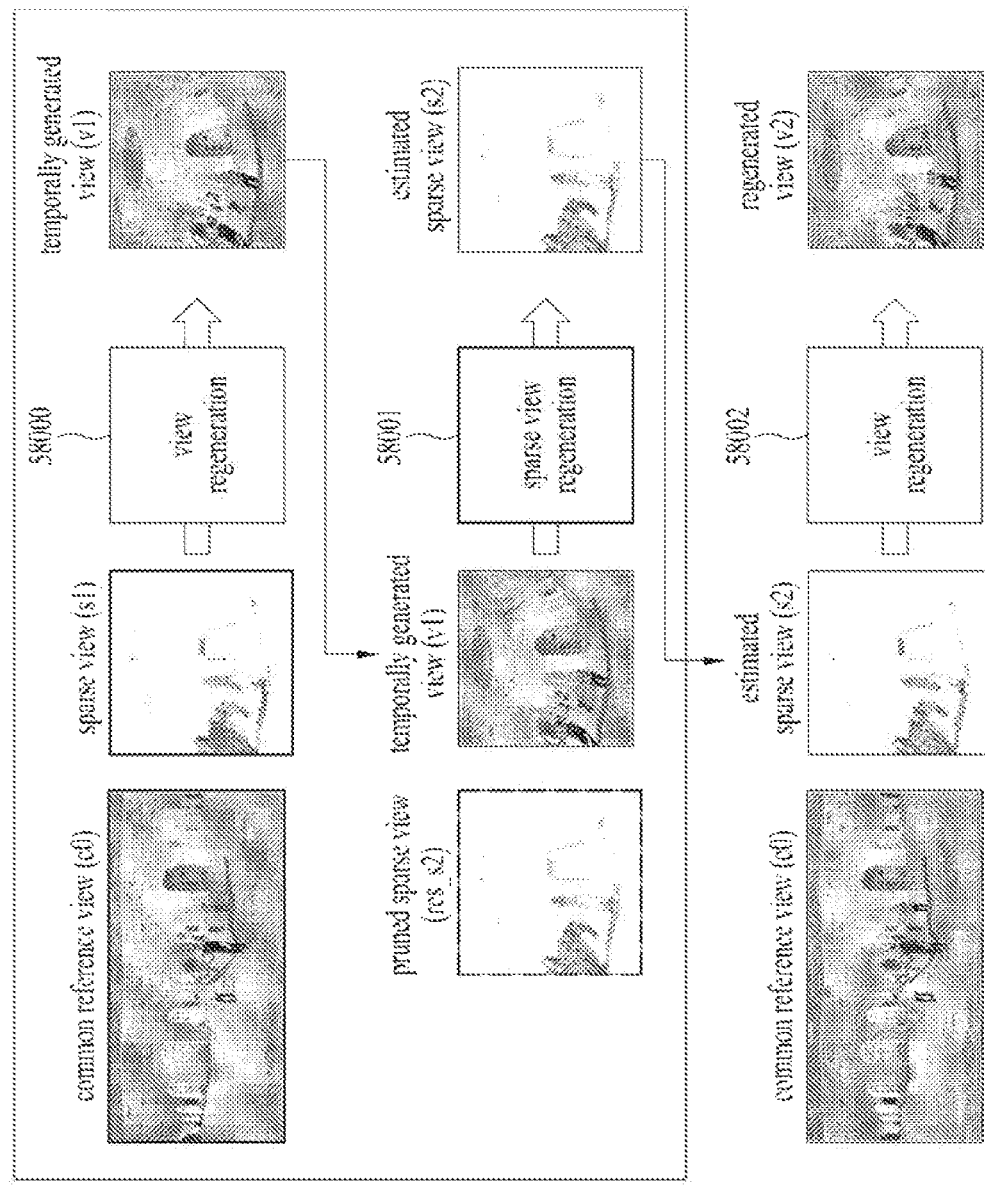
FIG. 58 illustrates view generation according to embodiments of a decoder post-processing module according to embodiments.

FIG. 58 illustrates view regeneration according to embodiments of a decoder post-processing module according to embodiments.

View regeneration according to embodiments may be performed by a first view regenerator 58000, a sparse view estimator 58001, and a second view regenerator 58002. The first view regenerator 58000 and the second view regenerator 58002 according to embodiments shown in FIG. 58 may refer to blocks (or operations) included in the above-described view regenerator (or view regeneration) according to embodiments.

In accordance with embodiments, a decoder (or receiver) performs view regeneration in order to generate regenerated views (v2 etc.).

The first view regenerator 58000 according to embodiments may generate a temporally generated view v1, based on a common reference view picture c0 and a first sparse view s1. The common reference view picture c0 according to embodiments may be a center view generated by a center view generator according to embodiments or may be a center view included in received pictures. A first sparse view picture is included in sparse view pictures according to embodiments and means a sparse view picture for a first viewing position. The temporally generated view v1 may mean a target view picture for the first viewing position.

The sparse view estimator 58001 may generate (or restore) an estimated sparse view picture s2 for a second viewing position based on the temporally generated view picture v1. That is, the sparse view estimator 58001 estimates the estimated sparse view picture s2 for the second viewing position from the temporally generated view v1. The sparse view estimator may use a pruned sparse view picture res_s2. Whether the pruned sparse view picture res_s2 is included in the received pictures may be signaled using related signaling information. For example, the reception device according to embodiments may be aware of whether the pruned sparse view picture res_s2 is included in the received pictures through pruned_sparse_view_present_flag signaling information in FIG. 39. The pruned sparse view picture res_s2 means the pruned sparse view picture according to embodiments described in FIGS. 54 to 57.

The sparse view regenerator 58001 according to embodiments may generate the regenerated sparse view picture s2 for the second viewing position based on related signaling information. The related signaling information may be included in part or all of regeneration information and/or reference view information according to embodiments. For example, the related signaling information may include part or all of information such as target_view_id, component_id, component_type, pruned_sparse_view_present_flag, reference_sparse_view_present_flag_sprese_view_present, output_sparse_view_id, pruned_sparse_view_id, and reference_sparse_view_id described in FIGS. 39 and 40. The related signaling information may also include reference view information about the first viewing position.

The second view regenerator 58002 may generate (or restore) the regenerated view v2 for the second viewing position using the common reference view picture c0 and the estimated sparse view picture s2 according to embodiments.

The received pictures according to embodiments may include the common reference view picture, the sparse view picture for the first viewing position, and/or the pruned sparse view picture res_s2 according to embodiments.

Configurations in the reception device according to embodiments (the view generators and/or the sparse view regenerators according to embodiments) described in FIGS. 55 to 58 and configurations of corresponding operations may be complemented/modified/combined.

Accordingly, the example shown in FIG. 57 indicates that decoded pictures correspond to the common reference view c0, the first sparse view picture s1, and the pruned sparse view picture res_s2 (decoded pictures: c0, s1, and res_s2 (temporal)).

A reception device according to embodiments includes, as received signaling information, regeneration parameters related to regeneration for v1, parameters related to regeneration for s2, and regeneration parameters related to regeneration for v2.

That is, the regeneration parameters related to regeneration for v1 include a v1 regeneration method, information about a reference view picture (i.e., information about c0), information about a sparse view picture (i.e., information about s1), and information about an output picture (i.e., information about a size, a view position, etc.) (signaling: v1 regeneration—regeneration method (type), reference picture (c0), sparse picture (s1), output picture information (size, view position, etc.)).

The regeneration parameters related to regeneration for s2 includes a sparse view regeneration method (estimation), information about a reference sparse view picture (i.e., information about c0), regeneration information about a sparse view picture (i.e., regeneration information about s2), and information about an output picture (i.e., information about a size, a view position, etc.). The regeneration parameters related to regeneration for s2 may also include information about regeneration for s2 (s2 regeneration—regeneration method (type), reference picture (v1), pruned sparse picture (res_s2), output picture information (size, view position, etc.)+v1 regeneration information).

The regeneration parameters related to regeneration for v2 includes a regeneration method, information about a reference sparse view picture (i.e., information about c0), regeneration information about a sparse view picture (i.e., regeneration information about s2), and information about an output picture (i.e., information about a size, a view position, etc.) (v2 regeneration—regeneration method (type), reference picture (c0), regeneration sparse picture (s2), output picture information (size, view position, etc.)+s2 regeneration information).

When the pruned sparse view is transmitted or is not transmitted through sparse view pruning and residual detection processes, the receiver may perform different operations based on transmitted information and receiver performance as follows.

2. Sparse View Estimation

As a method of restoring a sparse view, a method of estimating the sparse view from a reference view may be considered. That is, 1) after estimating a view v1 based on a sparse view s1, 2) a sparse view 2 is restored using the estimated view v1 and a pruned sparse view res_s2, and 3) a target view v2 may be restored based on the restored sparse view s2.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The regenerating according to embodiments may include generating, in a second mode, a temporally generated view related to a first viewing position, based on the center view picture and on a first sparse view related to the first viewing position included in the sparse view pictures, estimating a second sparse view picture related to a second viewing position from the temporally generated view, and generating a regenerated view related to the second viewing position, based on the estimated second sparse view picture and the center view picture. When a pruned sparse view picture is included in the sparse view pictures, the estimating may include estimating the second sparse view picture based on the pruned sparse view picture.

Due to such a configuration of the first view regenerator of a receiver, the sparse view estimator using the temporally regenerated view, and/or the second view regenerator, an encoder end according to embodiments may reduce the number of sparse view pictures to be transmitted and reduce the amount of data to be transmitted. In addition, due to this configuration, a decoder end according to embodiments may reduce the number of sparse view pictures to be received so that load on a reception end may be reduced.

Specifically, bit efficiency is raised since sparse view regeneration information, instead of target view related information about the first viewing position, is transmitted. (In particular, an effect may be remarkably increased in viewport dependent processing.)

Figure 59:
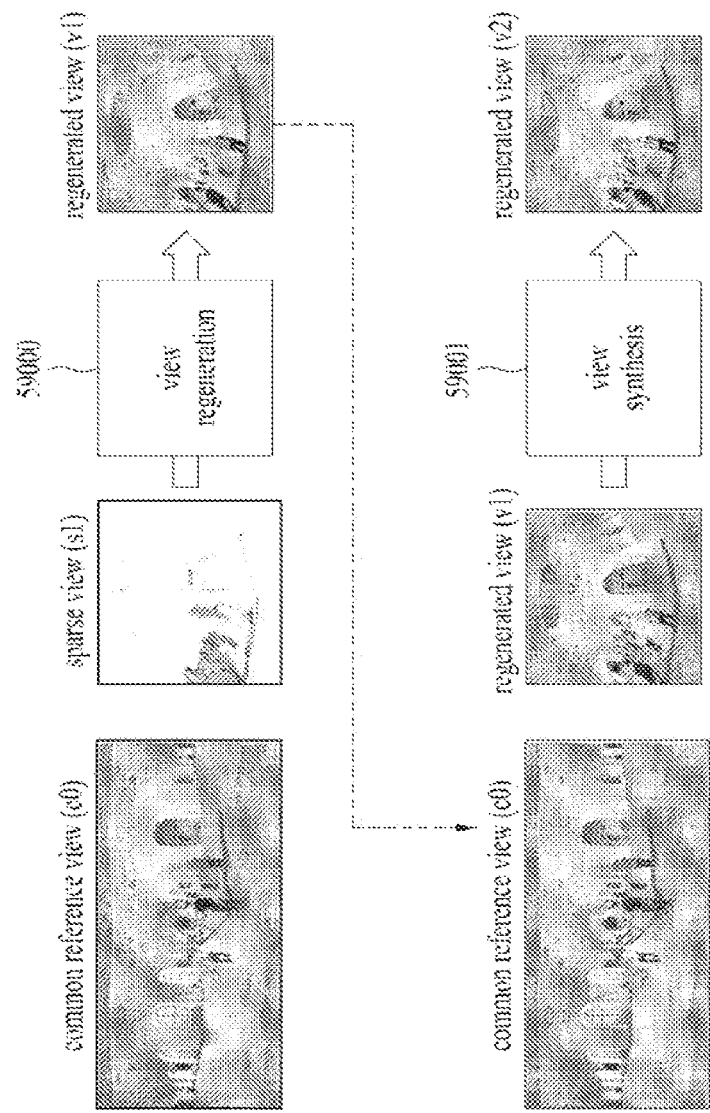
FIG. 59 illustrates view generation according to embodiments of a decoder post-processing module according to embodiments.

FIG. 59 illustrates view generation according to embodiments of a decoder post-processing module according to embodiments.

View regeneration according to embodiments may perform operations of a view regenerator 59000 and a view synthesizer 59001. The view regenerator 58000 and the view synthesizer 58002 shown in FIG. 59 according to embodiments may refer to blocks (or operations) in accordance with the above-described embodiments. View regeneration described in FIG. 59 may be referred to as a view regenerator, view regenerating, a view regeneration module, etc. The view synthesizer described in FIG. 59 may be referred to as view synthesis, a view synthesis module, etc.

According to embodiments, a decoder (or receiver) performs view regeneration in order to generate a regenerated view (v2 etc.).

The view regenerator 59000 may generate a regenerated view picture v1 for a first viewing position according to embodiments using a common reference view picture c0 according to embodiments and a first sparse view picture s1 according to embodiments. The common reference view picture c0 according to embodiments may be a center view generated by a center view generator according to embodiments or may be a center view included in received pictures. A first sparse view picture is included in sparse view pictures according to embodiments and means a sparse view picture for the first viewing position. The regenerated view picture v1 may mean a target view picture for the first viewing position.

The view synthesizer 59001 may generate a regenerated view v2 for a second viewing position (or a synthesized view for the second viewing position) using the common reference view picture c0 according to embodiments and the regenerated view picture v1 for the first viewing position according to embodiments. The view synthesizer may generate a synthesized view for the second viewing position through a view synthesis operation using the common reference view picture c0 and the regenerated view for the first viewing position according to embodiments or regenerate the synthesized view through a view regeneration operation.

The view synthesizer 58001 according to embodiments may synthesize a regenerated view picture s2 based on related signaling information. The related signaling information may be included in all or part of regeneration information, reference view information, and/or view synthesis recommendation information according to embodiments. For example, related signaling information may include part or all of information such as ref_view_synthesis_method_type, view_synthesis_parameter, viewing_position_id, and sparse_view_present_flag, described with reference to FIGS. 39 to 42.

The received pictures according to embodiments may include a common reference view picture, a sparse view picture for a first viewing position, and/or a pruned sparse view picture res_s2 according to embodiments.

Accordingly, in the example shown in FIG. 58, decoded pictures represent the common reference view c0, the first sparse view picture s1, and/or the pruned sparse view picture described above (decoded pictures: c0, s1, and res_s2 (temporal)).

A reception device according to embodiments includes, as received signaling information, regeneration parameters related to regeneration for v1, parameters related to regeneration for s2, and regeneration parameters related to regeneration for v2.

That is, the regeneration parameters related to regeneration for v1 include a v1 regeneration method, information about a reference view picture (i.e., information about c0), information about a sparse view picture (i.e., information about s1), and information about an output picture (i.e., information about a size, a view position, etc.) (signaling: v1 regeneration—method, reference picture c0, sparse picture s1, output picture information (size, view position, etc.)).

The regeneration parameters related to regeneration for s2 include a sparse view regeneration method (view synthesis), information about reference sparse view pictures (i.e., information about c0 and v1), and information about an output picture (i.e., information about a size, a view position, etc.). The regeneration parameters related to regeneration for s2 may also include regeneration information about v1 (v2 regeneration—regeneration method (v synthesis), reference pictures (c0 and v1), output picture info (size, view position, etc.)+v1 regeneration information).

When the pruned sparse view is transmitted or is not transmitted through sparse view pruning and residual detection processes, the receiver may perform different operations based on transmitted information and receiver performance as follows.

3. View Synthesis

When sparse view pruning is performed, it may be assumed that similarity between v1 and v2 is very high. In this case, the receiver may perform a method of synthesizing v2 from v1 which is restored without a sparse view regeneration process.

A video reception method according to embodiments may include decoding a bitstream of a video based on viewing position information and viewport information; unpacking pictures and signaling information in the decoded bitstream, the unpacked bitstream including the signaling information; regenerating views for the unpacked pictures; and synthesizing views for the regenerated pictures.

The video reception method according to embodiments may include generating a center view picture, based on reference view pictures and center view generation information, included in the unpacked pictures. The regenerating may include generating a regenerated view based on the reference view pictures, sparse view pictures in the unpacked pictures, the center view picture, reference view information, and regeneration information. The synthesizing may include generating a synthesized view based on the regenerated view, the center view picture, the reference view pictures, pre-generation information, and view synthesis recommendation information.

The video reception method according to embodiments may include generating a first regenerated view related to a first viewing position, based on the center view and on a first sparse view picture related to the first viewing position included in the sparse view pictures and generating a second regenerated view related to a second viewing position, based on the first regenerated picture and the center view picture. The second viewing position may be a viewing position different from the first viewing position.

The video reception method and device according to embodiments provide a view synthesis structure using view regeneration and a regenerated view so that views for different viewing positions may be regenerated and synthesized by a small amount of data and thus transmission and reception efficiency may be raised. In this case, since view synthesis may be performed without an additional view regeneration operation, a view generation/synthesis rate of the reception device may be increased.

Figure 60:
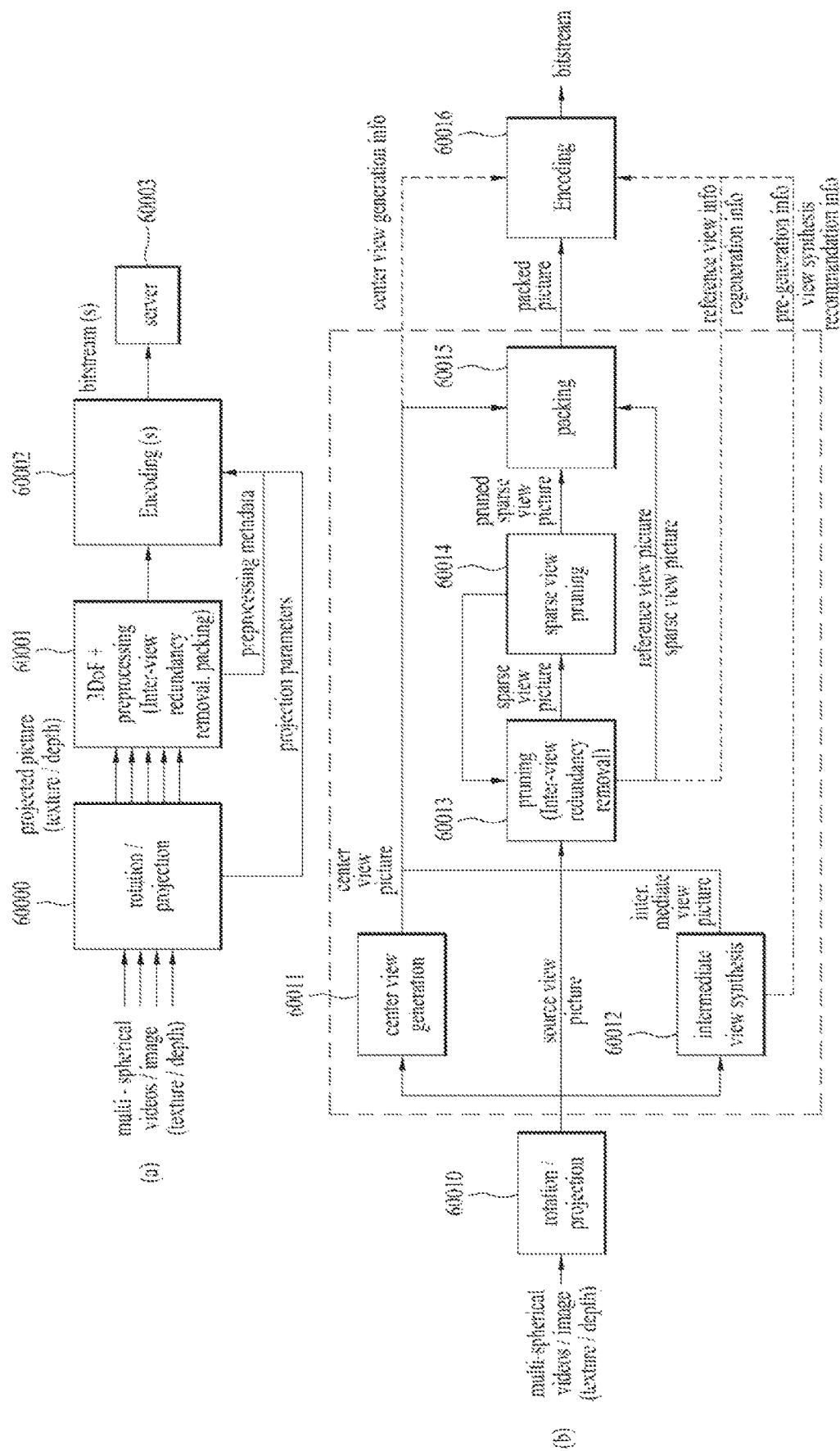
FIG. 60 is a block diagram of a video transmission device according to embodiments.

FIG. 60 is a block diagram of a video transmission device according to embodiments.

Specifically, FIG. 60(A) is an entire block diagram of the video transmission device according to embodiments.

The video transmission device (or encoder preprocessor, encoding module, encoder module, or encoding end) according to embodiments includes a rotator/projector (or rotation/projection) 60000, a 3DoF+ preprocessor (or 3DoF+ preprocessing) 60001, and/or an encoder (or encoding) 60002 according to embodiments. The encoder preprocessor may be referred to as an encoder preprocessing module, an encoder end, or an encoding module and may generically refer to a device constituting the video transmission device. That is, the encoder preprocessor may include an inter-view redundancy remover, a packer, and/or an encoder, which are components included in the above-described video transmission device.

The rotator/projector 60000 according to embodiments rotates and/or projects a multi-spherical video/image (multi-spherical video/image data) including a texture/depth picture. Picture(s) of the multi-spherical video/image (texture/depth) may be rotated and/or projected. Outputs of the rotator/projector are pictures (texture/depth) and/or the rotated/projected pictures that may be referred to as source view picture(s) according to embodiments.

The rotator/projector 60000 according to embodiments may mean the rotator/projector 27001 or 41000 described in FIG. 27 or FIG. 41. The rotator/projector may further generate a source view picture and/or projection parameters related to a rotation and/or projection operation according to embodiments.

The 3DoF+ preprocessor 60001 may receive the picture(s) of the multi-spherical video/image (texture/depth) rotated and projected by the rotator/projector 60000 and remove redundancy between the received picture(s) of the multi-spherical video/image (texture/depth) or pack the pictures. For example, the 3DoF+ preprocessor may receive video sequences for a plurality of viewing positions according to embodiments and perform an inter-view redundancy removal operation of removing redundancy between adjacent views for the viewing positions included in the video sequences. The 3DoF+ preprocessor may pack pictures (a texture picture, a depth picture, a texture patch, and/or a texture residual) generated from the inter-view redundancy removal operation to generate one or more packed pictures.

The 3DoF+ preprocessor may include the above-described inter-view redundancy remover and/or packer according to embodiments. The 3DoF+ preprocessor may further include the above-described center view generator, intermediate view synthesizer, and pruner according to embodiments. The 3DoF+ preprocessor may further include a sparse view pruner (or sparse view pruning), a sparse view selector (or sparse view selection), and/or a residual detector (or residual detection).

The 3DoF+ preprocessor 60001 may generate preprocessing metadata. The preprocessing metadata may include center view generation information, pre-generation information, view synthesis recommendation information, regeneration information, and reference view information according to embodiments. The preprocessing metadata may also include packing metadata and/or reconstruction parameters. For example, the preprocessing metadata may include all or part of the signaling information or the parameters described in FIG. 39 and/or FIG. 40.

The 3DoF+ preprocessor may mean the 3DoF+ preprocessor described with reference to FIG. 41. The 3DoF+ preprocessor according to embodiments may include the encoder-preprocessing module according to FIG. 46, FIG. 48, FIG. 50, FIG. 52, FIG. 54, and/or FIG. 56. Specifically, the 3DoF+ preprocessing module may include the first pruner 46000 or 48000, the second pruner 46001 or 48002, the view generator 48001 of the encoder end, the pruner 52000 for the first sparse view, the first pruner 52001 for the second sparse view, the second pruner 52002 or 54001 for the second sparse view, the sparse view selector 52003, the first pruner 54000 for the first sparse view, and the sparse view pruner 54002 according to FIG. 46, FIG. 48, FIG. 50, FIG. 52, FIG. 54, and/or FIG. 56.

The encoder 60002 encodes, for example, the packed pictures and/or signaling information including center view generation information, reference view information, regeneration information, pre-generation information, and/or view synthesis recommendation information. In accordance with embodiments, the encoded data is transmitted in the form of bitstream(s).

In accordance with embodiments, the 3DoF+ preprocessor includes the rotator/projector, the center view generator, the intermediate view synthesizer, the pruner, the sparse view pruner, the packer, and/or the encoder to perform the operation described above. For example, the 3DoF+ preprocessor may perform an operation based on the preprocessor (encoder-preprocessing module) described in FIG. 27 and in paragraphs of the specification related to FIG. 27. In accordance with embodiments, the 3DoF+ preprocessor may perform an operation based on the transmission device described in FIG. 41 and in paragraphs of the specification related to FIG. 41.

Specifically, FIG. 60(B) is an entire block diagram of the video transmission device according to embodiments. The video transmission device (encoder preprocessor, encoding module, encoder module, or encoding end) according to embodiments includes a rotator/projector (or rotation/projection) 60000, a 3DoF+ preprocessor (or 3DoF+ preprocessing) 60001, and/or an encoder (or encoding) 60002 according to embodiments.

The video transmission device (or encoder preprocessor, encoding module, encoder module, or encoding end) according to embodiments includes a rotator/projector (or rotation/projection) 60010, a center view generator (or center view generation module or center view generation) 60011, an intermediate view synthesizer (or intermediate view synthesis) 60012, a pruner (or pruning) 60013, a sparse view pruner (or sparse view pruning) 60014, a packer (or packing) 60015, and/or an encoder (or encoding) 60016 according to embodiments.

The rotator/projector (or rotation/projection) 60010 according to embodiments rotates and/or projects a multi-spherical video/image (multi-spherical video/image data) including a texture/depth picture. Picture(s) of the multi-spherical video/image (texture/depth) may be rotated and/or projected. Outputs of the rotator/projector are pictures (texture/depth) and/or the rotated/projected pictures that may be referred to as source view picture(s) according to embodiments.

The center view generator (or center view generation) 60011 according to embodiments generates a center view picture from the rotated/projected pictures and/or from the pictures (texture/depth) and generates signaling information including center view generation information related to profiles/characteristics of the center view picture.

The intermediate view synthesizer (or intermediate view synthesis) 60012 synthesizes an intermediate view picture from the rotated/projected pictures and/or the pictures (texture/depth) (source view pictures) and generates signaling information including pre-generation information and/or view synthesis recommendation information. The signaling information may be used to decode data in a receiver (a decoder).

The pruner 60013 according to embodiments prunes redundancy between pictures. Pruning represents removing redundancy between views. This process may be referred to as inter-view redundancy removal. According to embodiments, inputs of the pruner include the center view picture, the source view picture, and/or the intermediate view picture. Furthermore, pruned sparse view(s) may be input to the pruner. The pruner generates signaling information including reference view information and/or regeneration information that may be used to decode data in the receiver (decoder). The signaling information includes information related to pruning in order to regenerate views. According to embodiments, outputs of the pruner include a sparse view picture, a reference view picture, and/or a sparse view picture. According to embodiments, a view may be referred to as a view picture.

The sparse view pruner 60014 prunes redundancy between pictures. Sparse view pruning represents removing redundancy between sparse views (sparse view pictures). According to embodiments, pruning removes redundancy between reference views, whereas sparse view pruning removes redundancy between sparse views. Sparse view pruning efficiently enables removal of redundancy between views so that encoding and/or transmission performance may be improved. In accordance with embodiments, outputs of the sparse view pruner are pruned sparse view pictures and some of the pruned sparse view pictures may be provided to the pruner.

The packer 60015 packs pictures, for example, a center view picture, a pruned sparse view picture, a reference view picture, and/or a sparse view picture. An output of the packing is a packed picture.

The encoder 60017 encodes, for example, the packed picture and/or signaling information including center view generation information, reference view information, regeneration information, pre-generation information, and/or view synthesis recommendation information. In accordance with embodiments, the encoded data is transmitted in the form of bitstream(s).

In accordance with embodiments, the preprocessor (encoder preprocessing module) includes the rotator/projector, the center view generator, the intermediate view synthesizer, the pruner, the sparse view pruner, the packer, and/or the encoder to perform the operation described above.

In accordance with embodiments, the center view picture means a spherical video/image for a center location of a multi-spherical video/image. In accordance with embodiments, the center view picture may be included in input data or may be generated by generating a virtual viewpoint.

In accordance with embodiments, the intermediate view picture means a picture which is virtually generated. The intermediate view picture is not included in input data (e.g., a multi-spherical video/image). In accordance with embodiments, the pre-generation information and/or the view synthesis recommendation information is included in a viewing position group information SEI message syntax related to viewing_position_picture_type[i]==3, 4 in accordance with embodiments.

In accordance with embodiments, the source view picture and/or the center view picture is used for pruning. The reference view information and/or the regeneration information in accordance with embodiments is included in a viewing position group information SEI message syntax related to viewing_position_picture_type[i]==1 in accordance with embodiments.

In accordance with embodiments, a viewing position group information SEI message is transmitted by an encoder and received by a receiver as signaling information. The viewing position group information SEI message includes views_position_picture_type.

In accordance with embodiments, VIEW_position_picture_type specifies the picture type of an i-th viewing position in terms of picture generation. When viewer_position_picture_type is equal to 0, the i-th viewing position is a center view. When view_position_picture_type is equal to 1, the picture of the i-th viewing position is used as a reference picture in a view regeneration process. When view_position_picture_type is equal to 2, the picture of the i-th viewing position will be generated from the view regeneration process. When views_position_picture_type is equal to 3, the picture of the i-th viewing position is a view pre-generated in by an encoder preprocessor. When views_position_picture_type is equal to 4, the picture of the i-th viewing position may not be present in the decoded picture and a view synthesis method is recommended with additional information. This may be used to reduce a time consuming process with regard to view synthesis. When views_position_picture_type is equal to 5, the picture of the i-th viewing position may not be present in the decoded picture and an alternative picture from another viewing position is present.

In accordance with embodiments, the sparse view picture means a picture including information which is not predictable when a current viewpoint is predicted based on surrounding viewpoint(s). For example, gray or black region(s) mean duplicate information between a picture for a current viewpoint and a picture for surrounding viewpoint(s). In accordance with embodiments, the duplicate information means predictable information. Therefore, the sparse view picture includes unpredictable information.

In accordance with embodiments, the reference viewpoint picture (or reference view picture) refers to a picture for a surrounding viewpoint used to estimate a picture for a current viewpoint. In accordance with embodiments, a source view picture/image or a picture/image generated by a virtual viewpoint may be used as the reference viewpoint picture.

In accordance with embodiments, the sparse view pruner generates signaling information for a sparse view and/or metadata for indicating a target viewing position, a reference sparse view, and a sparse view regeneration method type, for example, information such as target_view_id, component_id, component_type, pruned_sparse_view_present_flag, reference_sparse_view_present_flag_sprese_view_present, output_sparse_view_id, pruned_sparse_view_id, and reference_sparse_view_id.

In accordance with embodiments, the sparse view pruner (or sparse view pruning) generates sparse view regeneration information according to embodiments.

Figure 61:
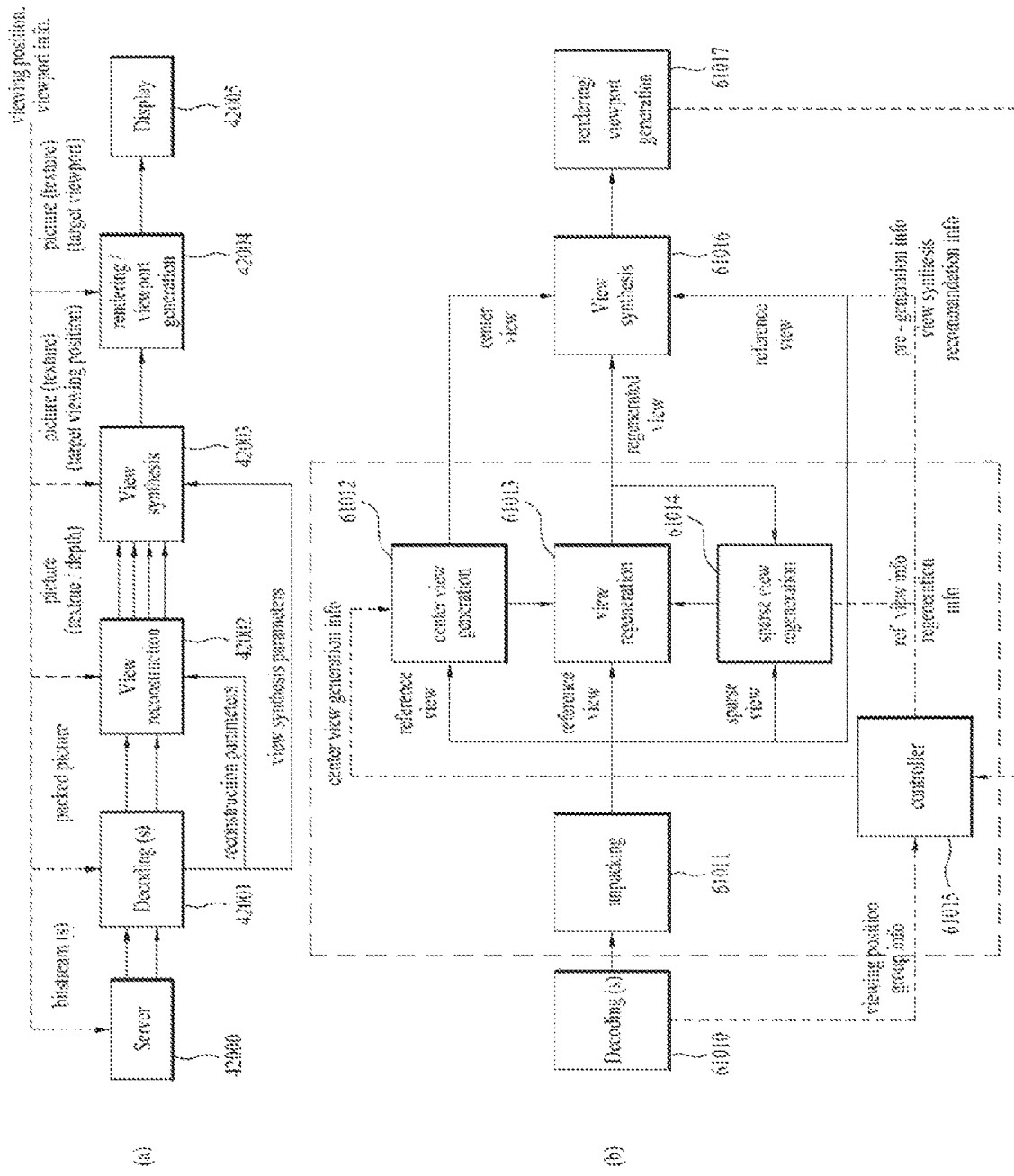
FIG. 61 illustrates a video reception device according to embodiments.

FIG. 61 illustrates a video reception device according to embodiments.

Specifically, FIG. 61(A) is an entire block diagram of the video reception device according to embodiments.

A decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

The decoder post-processing module according to embodiments may include a decoder (or decoding) 61001, a view reconstructor (or view reconstruction) 61002, a view synthesizer (or view synthesis) 61003, a renderer/viewport generator (or rendering/viewport generation) 61004, and a display (or display module).

A server 61000 may transmit a bitstream to the decoder post-processing module according to embodiments. The server may transmit the bitstream based on (or in correspondence to) information about a viewing position (information about a current viewing position) and/or information about a viewport (viewport information) transmitted by the video reception device (or decoder post-processing module) according to embodiments. The server 61000 may mean the server according to embodiments described with reference to FIG. 43. The server 61000 may mean the encoder preprocessing module (or encoder end, transmission end, or transmission device) according to embodiments.

The decoder 61001 may receive the bitstream from the server 61000 and generate, output, or parse a packed view (or picture) and/or related signaling information. The decoder may decode the received bitstream based on the information about a viewing position and/or the information about a viewport generated by the decoder post-processing module according to embodiments. The related signaling information may include, for example, reconstruction parameters and view synthesis parameters according to embodiments. The reconstruction parameters may mean signaling information needed to perform view regeneration of the receiving end according to embodiments. For example, the reconstruction parameters may include all or part of the parameters included in the viewing position group information SEI message syntax in FIG. 39 and/or FIG. 40. The reconstruction parameters according to embodiments may also include all or part of viewing position group information to be described later. That is, the reconstruction parameters according to embodiments may include all or part of preprocessing metadata according to embodiments. The preprocessing metadata may include center view generation information, pre-generation information, view synthesis recommendation information, regeneration information, and reference view information according to embodiments.

The view reconstructor 61022 may receive the packed picture (or packed view) generated by the decoder 61001 to generate a regenerated view picture. The view reconstructor may generate the regenerated view based on the information about a viewing position and/or the information about a viewport from the decoder (or the decoder post-processor) according to embodiments. For example, the view reconstructor may regenerate pictures (views) related to the viewing position and/or the viewport according to the viewing position information and/or the viewport information for a viewer of the reception end. In this case, the view reconstructor may generate the regenerated view based on the reconstruction parameters generated by the decoder according to embodiments.

The view reconstructor (or view regenerator) may simultaneously generate regenerated views for a plurality of viewing positions. Alternatively, the view reconstructor may generate a first viewing position and then generate a second viewing position based on a regenerated view for the first viewing position. That is, when the decoder according to embodiments generates pictures for a plurality of viewing positions, the view reconstructor may receive information including an order of viewing positions of regenerated views as signaling information. In this case, the information including the order of the viewing positions may be included in the reconstruction parameters and/or the view synthesis parameters.

The view reconstructor according to embodiments may include all or part of the first view regenerators 47000, 49000, 51000, 53000, 55000, and 58000 according to embodiments and/or the second view regenerators 47001, 49001, 51001, 53001, 55001, and 58002 according to embodiments, described with reference to FIG. 47, FIG. 49, FIG. 51, FIG. 53, and/or FIG. 58. The view reconstructor according to embodiments may include the sparse view regenerators 55000 and 57000 according to the respective embodiments described with reference to FIG. 55 and/or FIG. 57. The view reconstructor according to embodiments may include the sparse view estimator according to FIG. 58. Here, the first view regenerator and/or the second view regenerator described in FIG. 47, FIG. 49, FIG. 51, FIG. 53, and/or FIG. 58 may be referred by different terms. For example, when the decoder according to embodiments includes the view regenerator structure described in FIGS. 47 and 51, the first view regenerator in FIG. 51 may be referred to as a third view regenerator, and the second view regenerator in FIG. 51 may also be referred to as a fourth view regenerator.

The view synthesizer 61003 may generate a synthesized view picture (texture) (or a picture for a target viewing position) based on the regenerated view picture (texture/depth). The view synthesizer may generate the synthesized view based on the information about a viewing position and/or the information about a viewport from the decoder (or decoder post-processor) according to embodiments. For example, the view synthesizer may synthesize pictures (views) related to the viewing position and/or the viewport according to the information about the viewing position and/or the information about viewport for a viewer of the reception end. In this case, the view synthesizer may generate the synthesized view based on the view synthesis parameters generated by the decoder according to embodiments. Here, the view synthesizer according to embodiments may include the view synthesizer 59001 described in FIG. 59.

The renderer/viewport generator 61004 may render the synthesized view picture (texture) (or the picture for the target viewing position) according to embodiments and generate a viewport for the synthesized view picture.

The display 61005 may display the rendered picture (texture) (or the rendered picture for the target viewing position) according to embodiments.

FIG. 61(B) is a block diagram of a video reception device according to embodiments.

A decoder post-processing module may be referred to as a decoder post-processor, a decoder end, or a decoding module and may generically refer to a device constituting a video reception device. That is, the decoder post-processing module may include a decoder, a view generator, a view synthesizer, and a renderer/viewport generator.

The decoder post-processing module according to embodiments may determine a viewing position related to view synthesis performed by the view synthesizer according to a viewpoint of a viewer. Thereafter, the decoder post-processing module may determine an operation for each viewing position and/or an operation order in a receiver.

For example, when a sparse view regeneration SEI message is present, a sparse view regeneration operation may be performed according to sparse_view_regeneration_type information for each viewing position. Next, post-processing may be performed on all components indicated by component_id and component_type corresponding to target_view_id. An example of the sparse view regeneration operation which may be performed based on the sparse_view_regeneration_type information is described below.

When sparse_view_regeneration_type is equal to 1, the sparse view regeneration operation may be performed based on FIG. 35. The reference sparse view s1 and the pruned sparse view res_s1 in FIG. 35 are indicated by reference_sparse_view_id and pruned_sparse_view_id, respectively. In predicting the regenerated view in FIG. 35, disparity between views may be calculated using the locations, rotation, and coverage of a reference sparse view picture and a target view indicated by view_position_descriptor( ). In predicting the regenerated view in FIG. 35, disparity between views may be calculated using the location, rotation, and coverage of the reference sparse view and the location, rotation, and coverage of the target view. The location, rotation, and coverage of the reference sparse view and the location, rotation, and coverage of the target view may be indicated by view position descriptor information (i.e., view_position_descriptor( )) corresponding to reference_sparse_view_id and target_view_id, respectively.

When sparse_view_regeneration_type is equal to 2, the sparse view regeneration operation may be performed based on FIG. 36. The reference sparse view s1 in FIG. 36 may be indicated by reference_sparse_view_id. In predicting the regenerated view in FIG. 36, disparity between views may be calculated using the locations, rotation, and coverage of a reference sparse view picture and a target view indicated by view_position_descriptor( )). In predicting the regenerated view in FIG. 36, disparity between views may be calculated using the location, rotation, and coverage of the reference sparse view and the location, rotation, and coverage of the target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

When sparse_view_regeneration_type is equal to 3, the sparse view regeneration operation may be performed based on FIG. 37. The reference sparse view s1 in FIG. 37 may be indicated by reference_sparse_view_id. Prior to performing the sparse view regeneration operation according to embodiments, the temporally regenerated view v1 may be generated. The temporally regenerated view may be referred to as a reference view. In predicting the sparse view s2 in FIG. 37, disparity between views may be calculated using the location, rotation, and coverage of the reference sparse view and the location, rotation, and coverage of a target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

When sparse_view_regeneration_type is equal to 4, the sparse view regeneration operation may be performed based on FIG. 38. The reference sparse view s1 in FIG. 38 may be indicated by reference_sparse_view_id. When the decoder post-processing module according to embodiments regenerates a reference view, a target view may be regenerated by an operation of the view synthesizer. In performing view synthesis, disparity between views may be calculated using the location, rotation, and coverage of the reference view (i.e., regenerated picture v1) and the location, rotation, and coverage of the target view. The location, rotation, and coverage of the reference sparse view and the location, rotation, and coverage of the target view may be indicated by the view position descriptor information (i.e., view_position_descriptor( )) corresponding to reference_sparse_view_id and target_view_id, respectively.

View position group information transmitted by the encoder preprocessing module according to embodiments may be parsed by the controller 2806 according to embodiments. The controller may control the entire viewport generation operation by determining which viewing position is used, which view regeneration operation and/or view synthesis operation method is performed, and in which order view regeneration and/or view synthesis is performed. For example, if a viewer wants to view a picture at a position that is exactly the same as a center position or a reference picture position, unpacking may be performed by selecting only the corresponding picture (a center view picture or a reference view picture).

However, if the center position is not generated by the encoder preprocessing module, the controller according to embodiments may control the center view generator according to embodiments so as to generate a center view from received reference views.

In addition, for example, when a corresponding viewing position is not for a full picture, an additional operation for the full picture may be required. In this case, the controller according to embodiments may control the view generator and/or the center view generator according to embodiments. That is, the controller may control the view generator and/or the center view generator according to embodiments using related metadata. Here, the metadata may be signaled by the encoder preprocessing module. The decoder post-processing module according to embodiments may generate a center view picture, a reference view picture, and/or a sparse view picture based on the metadata.

In this process, the center view picture and/or the reference view picture according to embodiments may be used to generate other views (e.g., target views) according to embodiments. Accordingly, an operation of generating the center view, an operation of generating the reference view, and/or an operation of generating an intermediate view may be performed prior to an operation of a view generator according to embodiments.

If a viewing position of the reception device according to embodiments does not match a regenerated or provided viewing position, pictures for the regenerated and/or provided viewing position may be synthesized. Accordingly, the operation of the view regenerator according to embodiments may precede the operation of a view synthesizer according to embodiments. Here, the above-described processing order may be indicated by viewing_position_picture_type and/or view_position_processing_order_idx.

The video reception device in accordance with embodiments includes a decoder, an unpacker, a controller, a center view generator, a view regenerator, a sparse view regenerator, a view synthesizer, and/or a renderer/viewport generator.

A decoder (or decoding module or decoding) 61010 decodes, for example, received data including pictures and signaling information (including viewing position group information) in a bitstream.

An unpacker (or unpacking module or unpacking) 61011 unpacks pictures, for example, packed pictures in the bitstream.

A controller (or controlling) 61015 controls signaling information in the bitstream, for example, viewing position group information, center view generation information according to embodiments, reference view information according to embodiments, regeneration information according to embodiments, pre-generation information according to embodiments, and/or synthesis recommendation information according to embodiments. The signaling information is used for each operation in post-processing.

A center view generator (or center view generation) 61012 generates a center view picture based on the center view generation information. In accordance with embodiments, when viewing_position_picture_type in the signaling information according to embodiments is equal to 0 or center_view_present_flag is equal to 0, center view generation is processed. Reference viewing positions and parameters for respective viewing positions are given by viewing_position_id and center_view_generation_parameter. If computational complexity is a huge burden on the receiver, an alternative viewing position signaled by information such as alternative_viewing_position_id, alternative_view_distance, and rec_center_view_generation_method_type may be used.

A view regenerator (or view regeneration or view regeneration module) 61013 regenerates a regenerated view based on reference view(s) and/or sparse view(s). In accordance with embodiments, the sparse views may be transmitted in the bitstream or may be generated by a sparse view regenerator (or sparse view regeneration).

In accordance with embodiments, when viewing_position_picture_type is equal to 1, a picture may be used as a reference picture for another viewing position. In this case, the decoder may store the picture in a buffer together with information about a viewing position that uses this picture given by viewing_position_id. When viewing_position_picture_type is equal to 2, the view regenerator may be used to regenerate the picture of this viewing position. A reference view and a sparse view that are needed for a regeneration process are indicated by viewing_position_id and picture_id, respectively. The receiver in accordance with embodiments may restore a viewing position intended by the encoder using the regeneration processing given by view_regeneration_method_type.

A sparse view regenerator (or sparse view regeneration) 61014 regenerates a sparse view picture based on a sparse view picture and signaling information in the bitstream. The sparse view regenerator described in FIG. 61 may imply the sparse view regenerator according to embodiments. That is, the sparse view regenerator described in FIG. 61 may include the sparse view regenerators 35000, 36000, 37000, 55000, and 57000 in FIGS. 35 to 37, FIG. 55, and FIG. 57. The sparse view regenerators according to embodiments may include the sparse view estimator 58001 in FIG. 58. The video reception device according to embodiments may include all or part of the sparse view regenerators and/or the view estimations described in FIGS. 35 to 37, FIG. 55, FIG. 57, and/or FIG. 58. The sparse view regenerators described in FIGS. 35 to 37, FIG. 55, and/or FIG. 57 may be referred to by different names. For example, the video reception device according to embodiments includes the sparse view regenerators in FIGS. 35 and 36, the sparse view regenerators may be referred to as a first sparse view regenerator and/or a second sparse regenerator.

A view synthesizer (or view synthesis or view synthesis module) 61016 synthesizes a picture and/or a picture for a target viewing position based on a center view picture (or a common reference view picture), a regenerated view picture, and/or a reference view picture (e.g., for surrounding viewpoints and/or signaling information including pre-generation information and/or view synthesis recommendation information).

In accordance with embodiments, when viewing_position_picture_type is equal to 3, a picture is not a source picture but a pre-generated view. The receiver determines whether to use this picture or to synthesize a new picture using a regenerated picture. In this determination, a processing method may be one of determination criteria given by pregeneration_method_type. If the receiver uses this picture, a reference picture given by viewing_position_id and a sparse view given by picture_id are used together with the regeneration method.

In accordance with embodiments, when viewing_position_picture_type is equal to 4, recommended view synthesis information is provided for this viewing position. The recommended view synthesis information includes a synthesis method, parameters, a reference viewing position indicator, and a sparse view presence flag given by ref_view_systhesis_method_type, view_synthesis_parameter, viewing_position_id, and sparse_view_present_flag, respectively.

In accordance with embodiments, when viewing_position_picture_type is equal to 5, a viewing position may be replaced with an alternative view from a source view, a regenerated view, or a synthesized view, indicated by alternative_viewing_position_id.

A renderer/viewport generator (or rendering/viewport generation) 61017 renders a view that is generated by view synthesis and generates viewport information for a viewport that is acquired from a viewer, a display, or a receiver. Viewport information in accordance with embodiments is provided to the controller.

In accordance with embodiments, the post-processing module including the decoder, the unpacker, the center view generator, the view regenerator, the sparse view regenerator, the controller, the view synthesizer, and/or the renderer/viewport generator performs operations as mentioned above.

Figure 62:
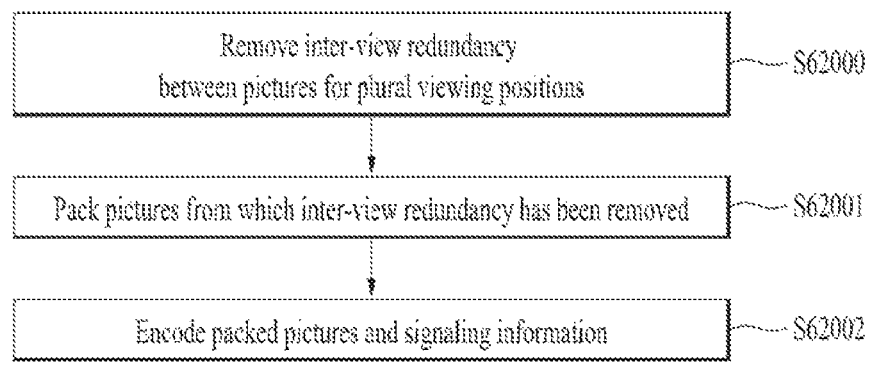
FIG. 62 is a flowchart of a video transmission method according to embodiments.

FIG. 62 illustrates a flowchart of a video transmission method according to embodiments.

The video transmission method according to embodiments includes removing inter-view redundancy between pictures for a plurality of viewing positions (S62000), packing the pictures from which inter-view redundancy has been removed (S62001), and/or encoding the packed pictures and signaling information (S62002).

In relation to S62000, the video transmission method according to embodiments may perform the operation S62000 of removing inter-view redundancy between pictures for a plurality of viewing positions. The pictures for a plurality of viewing positions may mean pictures for an image/video acquired by an encoder end according to embodiments. For example, the pictures for a plurality of viewing positions may include a multi-spherical video/images (multi-spherical video/image data) including a texture/depth picture described in FIG. 41, FIG. 42, and/or FIG. 60. Alternatively, the pictures for a plurality of viewing positions may mean source view pictures on which a rotation and/or projection operation has been performed by a rotator/projector described in FIG. 41, FIG. 42, and/or FIG. 60.

The pictures for a plurality of viewing positions may mean a source view according to embodiments. That is, the pictures for a plurality of viewing positions may include a source view picture (the source view picture v1 for the first viewing position and/or the source view picture v2 for the second viewing position) described in FIGS. 30, 32, 34, 46, 48, 50, 52, 54, and 56.

The operation of removing inter-view redundancy according to embodiments may include removing redundancy between views (e.g., source view pictures). For example, removing redundancy between a plurality of source view pictures means removing elements (e.g., components according to embodiments) of pictures that are commonly included in a plurality of source view pictures. That is, the operation of removing inter-view redundancy includes removing redundancy between a plurality of views and generating a reference view picture according to embodiments and a sparse view picture according to embodiments. The reference view picture refers to a picture in which redundancy is not removed in the operation of removing inter-view redundancy and represents a reference picture for regenerating and/or synthesizing a view from which inter-view redundancy has been removed at the decoder end according to embodiments. The sparse view picture represents a picture obtained by removing redundancy of a source view picture for a specific viewing position by the reference view picture.

In relation to S62001, the operation S62001 of packing pictures from which inter-view redundancy has been removed refers to an operation of packing pictures from which inter-view redundancy has been removed onto one or more 2D images. The operation S62001 of packing of pictures from which inter-view redundancy has been removed may be performed by the 3DoF+ preprocessors 41001 and 60001 described in FIGS. 41 and 60. The operation S62001 of packing pictures from which inter-view redundancy has been removed may be performed by the packers/encoders 30002, 32002, and 33002 described in FIGS. 30, 32, and 34 and/or by the encoders 46002, 48003, 50003, 50007, 52004, 54003, and 56004 described in FIGS. 46, 48, 50, 52, 54, and 56. The operation S62001 of packing pictures from which inter-view redundancy has been removed may also be performed by the packer 42004 described in FIGS. 42 and 60. Here, the operation S62001 of packing pictures from which inter-view redundancy has been removed may include generating signaling information related to packing.

The operation S62001 of packing pictures from which inter-view redundancy has been removed may include generating reconstruction parameters according to embodiments. The reconstruction parameters according to embodiments may include all or part of preprocessing metadata according to embodiments. The preprocessing metadata includes center view generation information, pre-generation information, view synthesis recommendation information, regeneration information, and reference view information according to embodiments.

For example, the reconstruction parameters may include all or part of parameters included in the viewing position group information SEI message syntax in FIGS. 39 and/or FIG. 40. The reconstruction parameter according to embodiments may also include all or part of viewing position group information to be described later.

The operation S62002 of encoding the packed pictures and signaling information may include encoding the packed pictures according to embodiments. That is, the operation S62001 of packing pictures from which inter-view redundancy has been removed may include generating packing metadata according to embodiments. The packing metadata may be signaling information necessary for the unpacker 26602 according to embodiments to perform unpacking.

The operation S62002 of encoding the packed pictures and signaling information may be performed by the encoders (or encoding modules 41002 and 60002) described with reference to FIGS. 41 and 60. The operation S62001 of packing pictures from which inter-view redundancy has been removed may be performed by the packers/encoders 30002, 32002, and 33002 described in FIGS. 30, 32, and 34 and/or the encoders 46002, 48003, 50003, 50007, 52004, 54003, and 56004 described in FIGS. 46, 48, 50, 52, 54, and 56. The operation S62002 of encoding the packed pictures and signaling information includes generating/transmitting a bitstream by encoding the packed pictures.

The method/device according to embodiments may mean the video transmission method/device and/or the video reception method/device according to embodiments.

The method/device according to embodiments may reduce bandwidth for transmitting a 3DoF+ video and a storage space of a storage device and ensure a 3DoF+ video of high quality that provides head motion parallax and/or binocular parallax. In addition, this configuration enables a receiver to generate a video or different viewpoints with head motion parallax and/or binocular parallax so that the receiver may generate an interactive video with a changed position.

The method according to embodiments may be further combined with the above-described embodiments.

Figure 63:
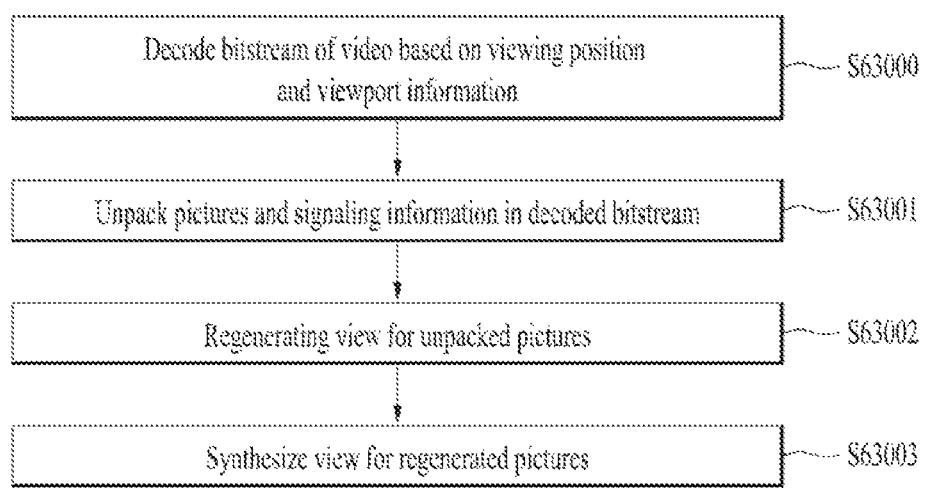
FIG. 63 is a flowchart of a video reception method according to embodiments.

FIG. 63 is a flowchart of a video reception method according to embodiments.

A video transmission method according to embodiments may include decoding a bitstream of a video based on a viewing position and viewport information (S63000), unpacking pictures and signaling information in the decoded bitstream (S63001), regenerating a view for the unpacked pictures (S63002), and synthesizing a view for the regenerated pictures (S63003).

In regard to S63000, the operation S63000 of decoding a bitstream of a video based on a viewing position and viewport information may be performed by the video reception device that decodes a bitstream according to embodiments. The video reception device (or a decoding module or a decoder) may decode all or part of data included in the bitstream. When the video reception device (or decoding module or decoder) decodes only part of the bitstream, the video reception device may perform decoding based on viewing position information and/or viewport information of the video reception device. In other words, the video reception device may display only views for a specific viewing position for a viewer. Accordingly, the video reception device may perform decoding based on information about a viewpoint and/or a viewing position of a viewer so as to regenerate and/or synthesize views by decoding a target projected picture.

The operation S63001 of unpacking pictures and signaling information in the decoded bitstream may include unpacking packed pictures included in the above-described decoded bitstream. The packed pictures may include at least one reference view picture and at least one sparse view picture according to embodiments. The sparse view pictures may include a pruned sparse view picture according to embodiments.

The operation of unpacking pictures and signaling information in the decoded bitstream may be performed by the unpacker or the view reconstructor described in FIGS. 28 and 61. The operation of unpacking pictures and signaling information in the decoded bitstream.

At least one reference view picture and at least one sparse view picture may mean pictures for a plurality of viewing positions. For example, the unpacked pictures may include a reference view for a first viewing position, a first sparse view picture for the first viewing position, a second sparse view picture for the first viewing position, a reference view for a second viewing position, a first sparse view picture for the second viewing position, and a pruned sparse view picture for the second viewing position.

In relation to S63002, the operation S63002 of regenerating views for the unpacked pictures includes generating a regenerated view using reference view picture(s) and sparse view picture(s) included in the unpacked pictures according to embodiments. The operation of regenerating a view may include generating a regenerated view with reference to a center view picture generated by a center view generator.

The operation S63002 of regenerating a view for the unpacked pictures may include all or part of the operations performed by the view regenerators 35001, 36001, 38000, 4501, 55001, and 59000, the sparse view regenerators 35000, 36000, 37001, and 55000, the first view regenerators 31000, 33000, 37000, 47000, 49000, 51000, 53000, and 58000, and the second view regenerators 31001, 33001, 37002, 47001, 49001, 51001, 53001, and 58001 with reference to FIG. 31, FIG. 33, FIG. 35, FIG. 36, FIG. 37, FIG. 38, FIG. 45, FIG. 47, FIG. 49, FIG. 51, FIG. 53, FIG. 55, FIG. 57, and/or FIG. 58.

The operation of synthesizing a view for the regenerated pictures may include generating a synthesized view for viewers using the regenerated view according to embodiments.

The method/device according to embodiments may mean the video transmission method/device and/or the video reception method/device according to embodiments.

The method/device according to embodiments may reduce bandwidth for transmitting a 3DoF+ video and a storage space of a storage device and ensure a 3DoF+ video of high quality that provides head motion parallax and/or binocular parallax. In addition, this configuration enables a receiver to generate a video or different viewpoints with head motion parallax and/or binocular parallax so that the receiver may generate an interactive video with a changed position.

The method according to embodiments may be further combined with the above-described embodiments.

In this specification, "/" and "," may be interpreted as "and/or". For example, the expression "A/B" may mean "A and/or B". Further, "A, B" may mean "A and/or B". Furthermore, "A/B/C" may mean "at least one of A, B, and/or C".

Further, in this specification, "or" may be interpreted to indicate "and/or". For instance, the expression "A or B" may comprise 1) only A, 2) only B, and/or 3) both A and B. In other words, "or" in this specification may be interpreted to indicate "additionally or alternatively".

Modules/blocks for implementing a video transmission method or a video reception method according to embodiments, a video transmission device, a video reception device, and/or internal modules/blocks of the video transmission device or the video reception device may perform functions corresponding to the above-described embodiments.

Elements of the video transmission method, the video reception method, the video transmission device, and the video reception device according to embodiments described with reference to FIGS. 1 to 63 may be constructed in separate hardware (e.g., chips, hardware circuits, communicable devices, etc.) or in single hardware. Elements of the video transmission device and/or the video reception device according to embodiments described with reference to FIGS. 1 to 63 may be constructed in separate software or application programming interfaces (APIs) (or firmware). At least one of elements of an AR mobility control device according to embodiments may be constructed in one or more processors capable of executing programs or software.

Elements of the video transmission method, the video reception method, the video transmission device, and the video reception device according to embodiments described with reference to FIGS. 1 to 63 may be constructed in separate hardware (e.g., chips, hardware circuits, communicable devices, etc.) or in single hardware. At least one of elements of an AR mobility control device according to embodiments may be constructed in one or more processors capable of executing at least one program.

Although a description has been given with reference to each of the accompanying drawings, new embodiments may be implemented by integrating the embodiments shown in the accompanying drawings with each other. In addition, if a recording medium readable by a computer, in which programs for executing the embodiments mentioned in the foregoing description are recorded, is designed, if necessary, by those skilled in the art, this may belong to the scope of the claims to be claimed in the present specification and equivalents thereof.

That is, although a description has been given with reference to the accompanying drawings, this is purely exemplary and is not limited to a specific embodiment. Various modifications that may be made by those skilled in the art are within the scope of the claims. Such modifications should not be understood individually from the technical idea of the embodiments described in the present specification.

Although the terms first, second, etc. used according to embodiments may be used to describe various elements according to embodiments, these elements should not be limited by these terms. These terms are only used to distinguish one element from another. For example, a first pruner may be referred to as a second pruner. Similarly, the second pruner may be referred to as the first pruner. Use of these terms should be construed as not departing from the scope of the various embodiments. Both the first pruner and the second pruner may be interpreted as pruners in a broad meaning, but they are not interpreted as the same elements, unless context clearly indicates otherwise.

Executable instructions for performing the AR mobility device or a control method for the AR mobility device according to embodiments may be stored in a non-transitory computer-readable media (CRM) or other computer program products configured to be executed by one or more processors, or may be stored in a transitory CRM or other computer program products configured to be executed by one or more processors. In addition, the memory according to embodiments may be used as a concept covering not only volatile memories (e.g., RAM) but also nonvolatile memories, flash memories, and PROMs.

Although the exemplary embodiments have been disclosed for illustrative purposes, those skilled in the art will appreciate that various modifications are possible, without departing from the gist of embodiments as claimed in the accompanying claims. Such modifications should not be understood individually from the technical spirit or prospect of the embodiments.

Both device and method inventions are mentioned in this specification and descriptions of both of the device and method invention may be complementarily applied to each other as needed.

It is understood by those skilled in the art that various modifications and variations may be made in the embodiments described in the present specifications without departing from the spirit or scope of the embodiments. Accordingly, the embodiments in the present specification are intended to include the modifications and variations of the embodiments within the appended claims and equivalents thereto.

Both device and method inventions are mentioned in this specification and descriptions of both of the device and method inventions may be complementarily applied to each other.

Mode for Invention

Various embodiments have been described in the best mode for carrying out the invention

INDUSTRIAL APPLICABILITY

Embodiments in the present specification are applicable to VR fields.

The invention claimed is:

1. A video transmission method by an apparatus, comprising:
processing data for images or videos for views; and
encoding the processed data;
wherein the processing includes:
removing inter-view redundancy between pictures for viewing positions, wherein the removing inter-view redundancy includes generating a sparse view picture based on at least two pictures among a source view picture, an intermediate view picture, and a center view picture;
generating a temporally regenerated view picture based on a first sparse view picture of the sparse view picture and the center view picture;
pruning an estimated source view from the temporally regenerated view picture and the center view picture, wherein the pruning includes generating a second sparse view picture; and
packing pictures from which the inter-view redundancy has been removed;
wherein the encoding encodes the packed pictures, the second sparse view picture and signaling information.

2. The video transmission method of claim 1,
wherein the removing inter-view redundancy further includes generating a reference view picture,
wherein the center view picture is generated based on the source view picture included in the pictures for viewing positions, and
wherein the intermediate view picture is synthesized based on the source view picture,
wherein the signaling information includes center view generation information, pre-generation information, view synthesis recommendation information, reference view information, and regeneration information.

3. The video transmission method of claim 2, wherein the processing further comprising:

decoding and unpacking the packed and encoded pictures, wherein the decoded and unpacked pictures include a temporally decoded common reference view picture and a temporally decoded sparse view picture;

generating a regenerated view, based on the temporally decoded common reference view picture and the temporally decoded sparse view picture; and pruning the estimated source view picture from the regenerated view and the temporally decoded common reference view picture, wherein the pruning includes generating an error-robust sparse view picture, wherein the packing further includes packing the error-robust sparse view picture.

4. The video transmission method of claim 2, wherein the removing inter-view redundancy includes:

performing first pruning on a first source view picture related to a first viewing position based on the center view picture, wherein the performing the first pruning includes generating the first sparse view picture;

performing second pruning on the first source view picture based on a second source view picture related to a second viewing position different from the first viewing position, wherein the performing the second pruning includes generating the second sparse view picture; and selecting one of the first sparse view picture and the second sparse view picture, and wherein the encoding further includes encoding one picture selected from among the first sparse view picture and the second sparse view picture.

5. The video transmission method of claim 2, wherein the processing further comprising:

pruning a reference sparse view picture related to a first viewing position included in the sparse view pictures, based on a sparse view picture related to a second viewing position included in the sparse view pictures, wherein the second viewing position is a viewing position different from the first viewing position, and wherein the pruning the reference sparse view picture includes generating a pruned sparse view picture; and detecting a residual from the pruned sparse view picture, wherein the pruned sparse view picture is packed based on presence of the residual.

6. A video transmission device, comprising:

a processor configured to process data for images or videos for views; and an encoder configured to encode the processed data, wherein the processor includes:

an inter-view redundancy remover configured to remove inter-view redundancy between pictures for viewing positions, wherein the inter-view redundancy remover generates a sparse view picture based on at least two pictures among a source view picture, an intermediate view picture, and a center view picture;

a first view regenerator configured to generate a temporally regenerated view picture based on a first sparse view picture of the sparse view picture and the center view picture;

a first pruner configured to prune an estimated source view from the temporally regenerated view picture and the center view picture, wherein the first pruner generates a second sparse view picture; and, a packer configured to pack pictures from which the inter-view redundancy has been removed; and wherein the encoder is configured to encode the packed pictures, the second sparse view picture and signaling information.

7. The video transmission device of claim 6, wherein the inter-view redundancy remover is configured to generate a reference view picture, wherein the center view picture is generated based on the source view picture included in the pictures for viewing positions, and wherein the intermediate view picture is synthesized based on the source view picture, wherein the signaling information includes center view generation information, pre-generation information, view synthesis recommendation information, reference view information, and regeneration information.

8. The video transmission device of claim 7, wherein the processor further includes:

a decoder and an unpacker configured to decode and unpack the packed and encoded pictures, wherein the decoded and unpacked pictures include a temporally decoded common reference view picture and a temporally decoded sparse view picture;

a second view regenerator configured to generate a regenerated view, based on the temporally decoded common reference view picture and the temporally decoded sparse view picture; and a second pruner configured to prune the estimated source view picture from the regenerated view and the temporally decoded common reference view picture, wherein the second pruner generates an error-robust sparse view picture, wherein the packer further configured to pack the error-robust sparse view picture.

9. The video transmission device of claim 7, wherein the inter-view redundancy remover is configured to perform:

first pruning on a first source view picture related to a first viewing position based on the center view picture, wherein the first pruning includes generating the first sparse view picture;

second pruning on the first source view picture based on a second source view picture related to a second viewing position different from the first viewing position, wherein the performing the second pruning includes generating the second sparse view picture; and selecting one of the first sparse view picture and the second sparse view picture, and wherein the encoder is configured to further encode one picture selected from among the first sparse view picture and the second sparse view picture.

10. The video transmission device of claim 7, wherein the processor further includes:

a sparse view pruner configured to prune a reference sparse view picture related to a first viewing position included in the sparse view pictures, based on a sparse view picture related to a second viewing position included in the sparse view pictures, wherein the second viewing position is a viewing position different from the first viewing position, and wherein the sparse view pruner generates a pruned sparse view picture; and a residual detector configured to detect a residual from the pruned sparse view picture, wherein the pruned sparse view picture is packed based on presence of the residual.

11. A video reception method by an apparatus, comprising:
- decoding a bitstream for videos or images for views; and
- processing the decoded bitstream;
- wherein the processing includes:
- unpacking the decoded bitstream including pictures and signaling information;
- generating a regenerated view based on at least one of a reference view picture, a sparse view picture or a center view picture,
- synthesizing the views based on at least one of the regenerated view, the center view picture or the reference view pictures,
- wherein the regenerating further includes:
- generating a first regenerated view related to a first viewing position based on the center view and a first sparse view picture related to the first viewing position included in the sparse view picture; and
- generating a second regenerated view related to a second viewing position based on the first regenerated picture and the center view picture.

12. The video reception method of claim 11,
- wherein the signaling information includes center view generation information, pre-generation information, view synthesis recommendation information, reference view information, and regeneration information,
- wherein the center view picture is generated based on the reference view picture and the center view generation information.

13. The video reception method of claim 12,
- wherein the regenerating includes:
- generating a temporally generated view related to a first viewing position, based on the center view picture and on a first sparse view related to the first viewing position included in the sparse view pictures;
- estimating a second sparse view picture related to a second viewing position from the temporally generated view, wherein, based on inclusion of a pruned sparse view picture in the sparse view pictures, the estimating includes estimating the second sparse view picture based on the pruned sparse view picture; and
- generating a regenerated view related to the second viewing position, based on the estimated second sparse view picture and the center view picture,
- or, wherein the regenerating includes:
- regenerating the second sparse view picture from the first sparse view picture, wherein regenerating the second sparse view picture includes generating the second sparse view based on inclusion of the pruned sparse view picture in the sparse view pictures; and
- generating the regenerated view based on the regenerated second sparse view picture and the center view picture, and
- wherein the second viewing position is different from the first viewing position.

14. A video reception device, comprising:
- a decoder configured to decode a bitstream for videos or images for views; and
- a processor configured to process the decoded bitstream,
- wherein the processor includes:
- an unpacker configured to unpack the decoded bitstream including pictures and signaling information;
- a view regenerator configured to generate a regenerated view based on at least one of a reference view picture, a sparse view picture or a center view picture; and
- a synthesizer configured to generate a synthesized view based on at least one of the regenerated view, the center view picture, or the reference view picture;
- wherein the view regenerator is configured to generate a first regenerated view related to a first viewing position based on the center view and a first sparse view picture related to the first viewing position included in the sparse view picture, and
- wherein the view regenerator is configured to generate a second regenerated view related to a second viewing position based on the first regenerated picture and the center view picture.

15. The video reception device of claim 14,
- wherein the signaling information includes center view generation information, pre-generation information, view synthesis recommendation information, reference view information, and regeneration information,
- wherein the center view picture is generated based on the reference view picture and the center view generation information.

16. The video reception device of claim 15,
- wherein the view regenerator is configured to perform:
- generating a temporally generated view related to a first viewing position, based on the center view picture and on a first sparse view related to the first viewing position included in the sparse view pictures;
- estimating a second sparse view picture related to a second viewing position from the temporally generated view, wherein, based on inclusion of a pruned sparse view picture in the sparse view pictures, the estimating includes estimating the second sparse view picture based on the pruned sparse view picture; and
- generating a regenerated view related to the second viewing position, based on the estimated second sparse view picture and the center view picture;
- or, wherein the view regenerator is configured to perform:
- regenerating the second sparse view picture from the first sparse view picture, wherein, based on inclusion of the pruned sparse view picture in the sparse view pictures, the regenerating the second sparse view picture includes generating the second sparse view based on the pruned sparse view picture; and
- generating the regenerated view based on the regenerated second sparse view picture and the center view picture; and
- wherein the second viewing position is different from the first viewing position.

* * * * *